(12) United States Patent
Yeh et al.

(10) Patent No.: US 12,724,237 B2
(45) Date of Patent: Sep. 1, 2026

(54) OPTICAL PHOTOGRAPHING LENS ASSEMBLY, IMAGE CAPTURING UNIT AND ELECTRONIC DEVICE

(71) Applicant: LARGAN PRECISION CO., LTD., Taichung City (TW)

(72) Inventors: Kuan-Ting Yeh, Taichung City (TW); Cheng-Yu Tsai, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 226 days.

(21) Appl. No.: 18/398,838

(22) Filed: Dec. 28, 2023

(65) Prior Publication Data

US 2025/0155680 A1 May 15, 2025

(30) Foreign Application Priority Data

Nov. 14, 2023 (TW) ................................ 112143798

(51) Int. Cl.
*G02B 13/00* (2006.01)
*G03B 17/17* (2021.01)

(52) U.S. Cl.
CPC ......... *G02B 13/0045* (2013.01); *G03B 17/17* (2013.01)

(58) Field of Classification Search
None
See application file for complete search history.

(56) References Cited

U.S. PATENT DOCUMENTS 2,502,543 A 4/1950 Warmisham
9,671,586 B2 6/2017 Koida
12,124,011 B2 10/2024 Jia et al.
2017/0160519 A1 6/2017 Katsuragi
2019/0025558 A1 1/2019 Chen et al.
2021/0048646 A1* 2/2021 Jung ...................... G02B 7/022
2021/0048647 A1* 2/2021 Park ................... G02B 13/0045
2021/0048648 A1* 2/2021 Baik ........................ G02B 9/64
2021/0356713 A1* 11/2021 Jia ...................... G02B 13/0045
(Continued)

FOREIGN PATENT DOCUMENTS

CN 107728290 A 2/2018
CN 108919463 A 11/2018
(Continued)

OTHER PUBLICATIONS

TW Office Action dated Jan. 6, 2025 as received in Application No. 112143798.

*Primary Examiner* — Ryan Crockett
(74) *Attorney, Agent, or Firm* — Maschoff Brennan

(57) ABSTRACT

An optical photographing lens assembly includes seven lens elements which are, in order from an object side to an image side along an optical path, a first lens element, a second lens element, a third lens element, a fourth lens element, a fifth lens element, a sixth lens element and a seventh lens element. The object-side surface of the first lens element is convex in a paraxial region thereof. The second lens element has positive refractive power. The third lens element has negative refractive power. The image-side surface of the third lens element is concave in a paraxial region thereof. The image-side surface of the seventh lens element is concave in a paraxial region thereof. At least one of the object-side surface and the image-side surface of at least one lens element of the seven lens elements has at least one inflection point.

26 Claims, 52 Drawing Sheets

(56) References Cited

U.S. PATENT DOCUMENTS

| | | | | |
|---|---|---|---|---|
| 2021/0389558 | A1* | 12/2021 | Son | G02B 9/64 |
| 2024/0027733 | A1* | 1/2024 | Sin | G02B 9/64 |
| 2025/0216652 | A1* | 7/2025 | Yeh | G02B 13/0045 |

FOREIGN PATENT DOCUMENTS

| | | | |
|---|---|---|---|
| CN | 112578532 | A | 3/2021 |
| CN | 113534413 | A | 10/2021 |
| CN | 114966919 | A | 8/2022 |
| CN | 115561881 | A | 1/2023 |
| CN | 116224552 | A | 6/2023 |
| EP | 4 283 369 | A1 | 11/2023 |
| JP | 2013-195560 | A | 9/2013 |
| JP | 2014-160098 | A | 9/2014 |
| JP | 2014-232185 | A | 12/2014 |
| JP | 2021-033180 | A | 3/2021 |
| WO | 2014/192567 | A1 | 12/2014 |
| WO | 2021/128064 | A1 | 7/2021 |
| WO | 2021/159406 | A1 | 8/2021 |

* cited by examiner

G1
S1
E1
LF1
S2
E2 E3 E4 E5
G2
S3
E6 E7
G3
S4
LF2
E8
IMG IS

6

OPTICAL PHOTOGRAPHING LENS ASSEMBLY, IMAGE CAPTURING UNIT AND ELECTRONIC DEVICE

RELATED APPLICATIONS

This application claims priority to Taiwan Application 112143798, filed on Nov. 14, 2023, which is incorporated by reference herein in its entirety.

BACKGROUND

Technical Field

The present disclosure relates to an optical photographing lens assembly, an image capturing unit and an electronic device, more particularly to an optical photographing lens assembly and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

Specifically, in recent years, electronic devices such as electronic products have been required for lightness and thinness, so it is difficult for a conventional optical lens to simultaneously meet the requirements of high-specification and miniaturization, especially a small lens featuring a large aperture or a telephoto function. However, as the optical zoom requirement becomes stricter (e.g., increasing the optical zoom magnification, etc.), the conventional telephoto lens becomes unable to catch the technology requirements and thus have problems such as an overly long total length, an overly small aperture, insufficient quality and inability in miniaturization. Therefore, it needs to introduce different optical features to overcome the abovementioned problems for meeting the requirements.

Due to the restriction in thickness of electronic devices, some optical lenses has a trimmed lens barrel or lens element to reduce the length in single axis, which helps to save module space. Also, one or more reflective elements may be used to provide the system with different optical paths, allowing more flexibility to use the space for featuring telephoto function with a long focal length. Through the lens grouping, the focusing performed by adjustment of the focal length of the optical system can be accomplished by moving one or more lens groups according to an object distance, thus achieving high image quality in both distant and close-up photography, and helping to enhance the freedom of photography.

SUMMARY

According to one aspect of the present disclosure, an optical photographing lens assembly includes seven lens elements. The seven lens elements are, in order from an object side to an image side along an optical path, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

Preferably, the object-side surface of the first lens element is convex in a paraxial region thereof. Preferably, the second lens element has positive refractive power. Preferably, the third lens element has negative refractive power. Preferably, the image-side surface of the third lens element is concave in a paraxial region thereof. Preferably, the image-side surface of the seventh lens element is concave in a paraxial region thereof. Preferably, at least one of the object-side surface and the image-side surface of at least one lens element of the seven lens elements has at least one inflection point.

An axial distance between an imaged object and the object-side surface of a lens element closest to the object side is defined as an object distance. When an axial distance between the first lens element and the second lens element in the optical photographing lens assembly with an infinite object distance is T12L, an axial distance between the object-side surface of the second lens element and the image-side surface of the fifth lens element in the optical photographing lens assembly with the infinite object distance is Dr3r10L, an axial distance between the object-side surface of the second lens element and the image-side surface of the seventh lens element in the optical photographing lens assembly with the infinite object distance is Dr3r14L, an axial distance between the object-side surface of the sixth lens element and the image-side surface of the seventh lens element in the optical photographing lens assembly with the infinite object distance is Dr11r14L, a focal length of the fourth lens element is f4, and a focal length of the fifth lens element is f5, the following conditions are satisfied:

$$0.50 < T12L/Dr3r14L < 2.50;$$

$$1.00 < Dr3r10L/Dr11r14L < 3.50;\text{ and}$$

$$0 < |f4/f5| < 1.00$$

According to another aspect of the present disclosure, an optical photographing lens assembly includes seven lens elements. The seven lens elements are, in order from an object side to an image side along an optical path, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

Preferably, the second lens element has positive refractive power. Preferably, the object-side surface of the second lens element is convex in a paraxial region thereof. Preferably, the third lens element has negative refractive power. Preferably, the image-side surface of the third lens element is concave in a paraxial region thereof. Preferably, the fourth lens element has positive refractive power. Preferably, the image-side surface of the seventh lens element is concave in a paraxial region thereof. Preferably, at least one of the object-side surface and the image-side surface of at least one lens element of the seven lens elements has at least one inflection point.

An axial distance between an imaged object and the object-side surface of a lens element closest to the object side is defined as an object distance. When an axial distance between the first lens element and the second lens element in the optical photographing lens assembly with an infinite object distance is T12L, an axial distance between the object-side surface of the second lens element and the image-side surface of the seventh lens element in the optical photographing lens assembly with the infinite object distance is Dr3r14L, an axial distance between the object-side surface of the lens element closest to the object side and an image surface in the optical photographing lens assembly with the infinite object distance is TLL, an axial distance between the image-side surface of a lens element closest to the image side and the image surface in the optical photographing lens assembly with the infinite object distance is BLL, an Abbe number of the fifth lens element is V5, and a refractive index of the fifth lens element is N5, the following conditions are satisfied:

$$0.50 < T12L/Dr3r14L < 2.50;$$

$$1.00 < TLL/BLL < 8.00; \text{ and}$$

$$5.00 < V5/N5 < 32.00.$$

According to another aspect of the present disclosure, an optical photographing lens assembly includes seven lens elements. The seven lens elements are, in order from an object side to an image side along an optical path, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

Preferably, the second lens element has positive refractive power. Preferably, the object-side of the second lens element is convex in a paraxial region thereof. Preferably, the third lens element has negative refractive power. Preferably, the image-side surface of the third lens element is concave in a paraxial region thereof. Preferably, the fourth lens element has positive refractive power. Preferably, the image-side surface of the fourth lens element is convex in a paraxial region thereof. Preferably, the seventh lens element has negative refractive power. Preferably, at least one of the object-side surface and the image-side surface of the seventh lens element has at least one inflection point.

An axial distance between an imaged object and the object-side surface of a lens element closest to the object side is defined as an object distance. When an axial distance between the first lens element and the second lens element in the optical photographing lens assembly with an infinite object distance is T12L, an axial distance between the object-side surface of the second lens element and the image-side surface of the seventh lens element in the optical photographing lens assembly with the infinite object distance is Dr3r14L, an axial distance between the object-side surface of the lens element closest to the object side and an image surface in the optical photographing lens assembly with the infinite object distance is TLL, and an axial distance between the image-side surface of a lens element closest to the image side and the image surface in the optical photographing lens assembly with the infinite object distance is BLL, the following conditions are satisfied:

$$0.50 < T12L/Dr3r14L < 2.50; \text{ and}$$

$$1.00 < TLL/BLL < 10.00.$$

According to another aspect of the present disclosure, an optical photographing lens assembly includes three lens groups. The three lens groups are, in order from an object side to an image side along an optical path, a first lens group, a second lens group and a third lens group. The first lens group includes at least one lens element. The second lens group includes at least three lens elements. The third lens group includes at least one lens element. Each lens element of the optical photographing lens assembly has an object-side surface facing toward the object side and an image-side surface facing toward the image side.

An axial distance between an imaged object and the object-side surface of a lens element closest to the object side is defined as an object distance. Preferably, when the object distance changes from an infinite object distance to a short object distance, the optical photographing lens assembly performs a movement focus process to change from a first state to a second state. Preferably, the second lens group moves towards the object side with respect to the first lens group and the third lens group along a direction in parallel with an optical axis during the movement focus process. Preferably, all lens elements of each of the three lens groups have no relative movement with respect to one another during the movement focus process. Preferably, a first lens element of the second lens group in sequence from the object side to the image side is a positive lens. Preferably, the image-side surface of a third lens element of the second lens group in sequence from the object side to the image side is convex in a paraxial region thereof. Preferably, at least one of the object-side surface and the image-side surface of at least one lens element of the third lens group has at least one inflection point.

Preferably, the optical photographing lens assembly further includes at least one reflective element, and the at least one reflective element is disposed between the imaged object and an image surface. When an axial distance between the first lens group and the second lens group in the optical photographing lens assembly with the infinite object distance is TG1G2L, an axial distance between the first lens group and the second lens group in the optical photographing lens assembly with the short object distance is TG1G2S, an axial distance between the object-side surface of a lens element closest to the object side in the second lens group and the image-side surface of a lens element closest to the image side in the third lens element in the optical photographing lens assembly with the infinite object distance is DG2G3L, an axial distance between the image-side surface of a lens element closest to the image side and the image surface in the optical photographing lens assembly with the infinite object distance is BLL, and an axial distance between the image-side surface of the lens element closest to the image side and the image surface in the optical photographing lens assembly with the short object distance is BLS, the following conditions are satisfied:

$$0.50 < TG1G2L/DG2G3L < 2.50;$$

$$0.95 < BLL/BLS < 1.05; \text{and}$$

$$0.80 < (TG1G2L - TG1G2S)/TG1G2L < 0.50.$$

According to another aspect of the present disclosure, an image capturing unit includes one of the aforementioned photographing lens assemblies, an image stabilizer and an image sensor. The image stabilizer is disposed corresponding to the optical photographing lens assembly. The image sensor is disposed on the image surface of the optical photographing lens assembly.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

An optical photographing lens assembly includes three lens groups. The three lens groups are, in order from an object side to an image side along an optical path, a first lens group, a second lens group and a third lens group. The first lens group can include at least one lens element, the second lens group can include at least three lens element, and the third lens group can include at least one lens element. Therefore, it is favorable for obtaining a proper balance between the size of the optical photographing lens assembly, the object distance range, the movement focus, the image quality and the assembly difficulty through the configuration of the three lens groups. Moreover, the three lens groups can include seven lens elements, and the seven lens elements are, in order from the object side to the image side along the optical path, a first lens element, a second lens element, a third lens element, a fourth lens element, a fifth lens element, a sixth lens element and a seventh lens element. Each of the seven lens elements has an object-side surface facing toward the object side and an image-side surface facing toward the image side. In one aspect, the first lens group can include the first lens element, the second lens group can at least include the second lens element, the third lens element and the fourth lens element, and the third lens group can at least include the sixth lens element and the seventh lens element. In another aspect, the first lens group can include the first lens element, the second lens group can include the second lens element, third lens element, the fourth lens element and the fifth lens element, and the third lens group can include the sixth lens element and the seventh lens element. In further another aspect, the first lens group can include the first lens element, the second lens group can include the second lens element, third lens element and the fourth lens element, and the third lens group can include the fifth lens element, the sixth lens element and the seventh lens element. Therefore, with the design of seven lens elements divided into three lens groups, it is favorable for obtaining a balance between the size of the optical photographing lens assembly and the image quality and achieving movement focus to change the focus state thereof, such that the optical photographing lens assembly with any object distance enjoys high image quality during movement focus. When the total number of lens elements of the optical photographing lens assembly is seven, the first lens element can also be considered as one lens element closest to the object side, and the seventh lens element can also be considered as another lens element closest to the image side.

Figure 1:
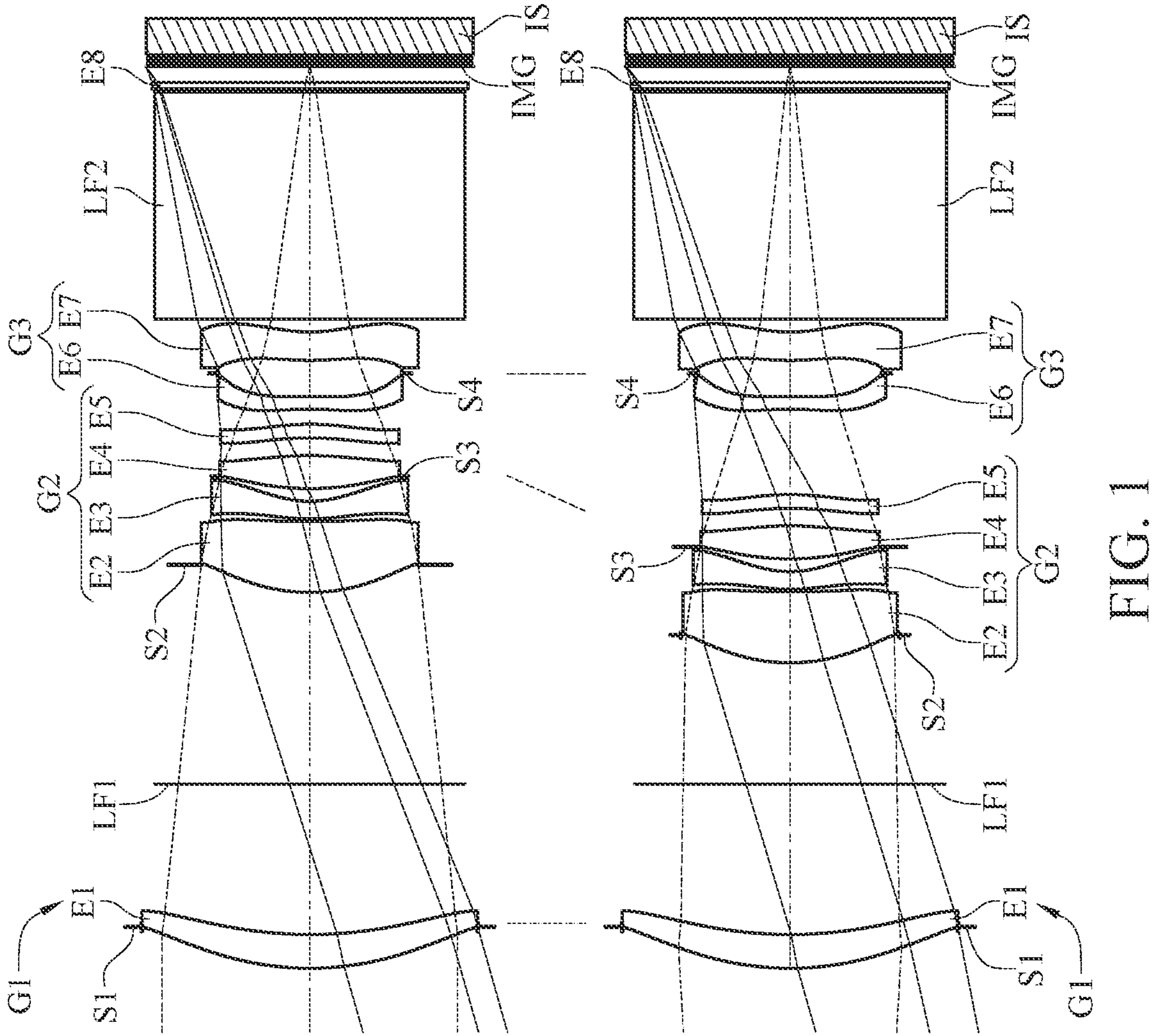
FIG. 1 is a schematic view of an image capturing unit respectively corresponding to an infinite object distance and a short object distance according to the 1st embodiment of the present disclosure.

According to the present disclosure, an axial distance between an imaged object and the object-side surface of the lens element closest to the object side can be defined as an object distance of the optical photographing lens assembly. The optical photographing lens assembly has a first state corresponding to an infinite object distance and a second state corresponding to a short object distance, wherein the first state refers to a state of the optical photographing lens assembly with an imaged object at infinity, and the second state refers to a state of the optical photographing lens assembly with an imaged object at a close distance. When the imaged object at infinity moves to be at the close distance, the optical photographing lens assembly can perform a movement focus process to change from the first state to the second state thereof. Conversely, when the imaged object at the close distance moves to be at infinity, the optical photographing lens assembly can also perform the movement focus process to change from the second state to the first state thereof. Please refer to FIG. 1, which is a schematic view of an optical photographing lens assembly of an image capturing unit respectively at the first state (corresponding to the infinite object distance) and the second state (corresponding to the short object distance) according to the 1st embodiment of the present disclosure. The upper part of FIG. 1 shows the optical photographing lens assembly at the first state, and the lower part of FIG. 1 shows the optical photographing lens assembly at the second state. Moreover, the second lens group can move towards the object side with respect to the first lens group and the third lens group along a direction in parallel with an optical axis during the movement focus process. Therefore, it is favorable for achieving macro photography and simplifying the optical design and mechanism. Moreover, all lens elements of each of the three lens groups can have no relative movement with respect to one another during the movement focus process. Therefore, it is favorable for simplifying the mechanism. In the present disclosure, the term "short object distance" or "close distance" refers to a position of an imaged object, which is obviously closer to the optical photographing lens assembly than infinity. Moreover, the term "short object distance" or "close distance" refers to an axial distance between an imaged object and the lens element closest to the object side of the optical photographing lens assembly (e.g., the first lens element) which is equal to or less than 100.0 millimeters (mm).

The first lens element can have positive refractive power. Therefore, it is favorable for adjusting the refractive power of the first lens element to convergent light while controlling the photography viewing angle and increasing the amount of incident light. The object-side surface of the first lens element can be convex in a paraxial region thereof. Therefore, it is favorable for adjusting the shape of the first lens element so as to reduce the outer diameter of the optical photographing lens assembly at the object end.

The second lens element can have positive refractive power. Therefore, it is favorable for reducing the size of the optical photographing lens assembly and correcting aberrations. The object-side surface of the second lens element can be convex in a paraxial region thereof. Therefore, it is favorable for adjusting the shape as well as the refractive power of the second lens element so as to improve image quality at the center.

The third lens element can have negative refractive power. Therefore, it is favorable for effectively balancing the refractive power of the second lens element so as to prevent excessive aberrations due to an overly large refractive angle of light passing through the second lens element. The image-side surface of the third lens element can be concave in a paraxial region thereof. Therefore, it is favorable for adjusting the refractive power of the third lens element so as to correct spherical aberration of the optical photographing lens assembly.

The fourth lens element can have positive refractive power. Therefore, it is favorable for converging light so as to effectively control the travelling direction of light and obtain a balance between the viewing angle and size of the optical photographing lens assembly. The image-side surface of the fourth lens element can be convex in a paraxial region thereof. Therefore, it is favorable for adjusting the light exiting direction of the fourth lens element so as to enlarge the image surface.

The object-side surface of the fifth lens element can be concave in a paraxial region thereof. Therefore, it is favorable for controlling the light incident angle onto the object-side surface of the fifth lens element so as to prevent light divergence as well as poor illumination at the periphery due to an overly large angle of incident light.

The object-side surface of the sixth lens element can be concave in a paraxial region thereof. Therefore, it is favorable for balancing the refractive power of the sixth lens element and reducing the back focal length.

The seventh lens element can have negative refractive power. Therefore, it is favorable for balancing the refractive power at the image end of the optical photographing lens assembly so as to improve the light convergence quality onto the image surface for various fields of view and correct aberrations. The image-side surface of the seventh lens element can be concave in a paraxial region thereof. Therefore, it is favorable for balancing the back focal length while correcting off-axis aberrations.

The three lens groups can include at least five plastic lens elements. Therefore, it is favorable for enhancing lens plasticity so as to reduces manufacturing costs, and reducing the weight of the lens groups so as to improve focusing accuracy during the movement focus process. Moreover, the three lens groups can include at least six plastic lens elements. Moreover, the three lens groups can include at least seven plastic lens elements.

According to the present disclosure, a first lens element of the second lens group in sequence from the object side to the image side can be a positive lens element. Therefore, it is favorable for reducing the size of the second lens groups. The first lens element of the second lens group in sequence from the object side to the image side can refer to the second lens element of the optical photographing lens assembly.

The image-side surface of a third lens element of the second lens group in sequence from the object side to the image side can be convex in a paraxial region thereof. Therefore, it is favorable for effectively controlling the travelling direction of light so as to enlarge the image surface. The third lens element of the second lens group in sequence from the object side to the image side can refer to the fourth lens element of the optical photographing lens assembly.

According to the present disclosure, at least one reflective element with an optical path folding function can be optionally disposed between the imaged object and the image surface on an imaging optical path. The optical path can be deflected at least once through the reflective element, which is favorable for reducing the size of the optical photographing lens assembly, such that the optical photographing lens assembly can have a deflected optical path and can be more flexible in space arrangement, and therefore the dimensions of an electronic device is not restricted by the total track length of the optical photographing lens assembly, thereby reducing mechanical limitation, miniaturizing the optical photographing lens assembly, and thus achieving various specification requirements. Moreover, the reflective element can be a prism or a mirror, but the present disclosure is not limited thereto. Moreover, the reflective element can be disposed between the first lens group and the second lens group. Therefore, the reflective element can work with the lens group at an object side thereof so as to control the viewing angle and increase the amount of incident light to thereby improving image quality.

Figure 42:
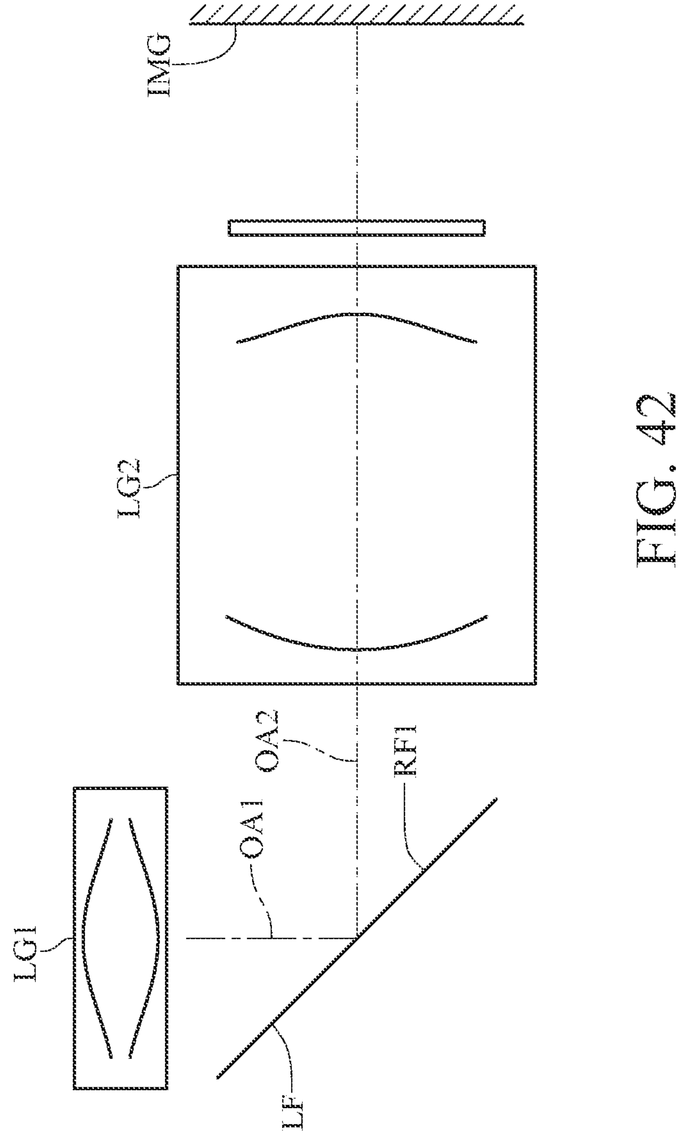
FIG. 42 shows a schematic view of a configuration of one reflective element in an optical photographing lens assembly according to one embodiment of the present disclosure.

Please refer to FIG. 42, which shows a schematic view of a configuration of a reflective element in an optical photographing lens assembly according to one embodiment of the present disclosure. As shown in FIG. 42, in order from an imaged object (not shown in the figure) to an image surface IMG of the optical photographing lens assembly, an optical path can pass through a lens group LG1 and then enter a reflective element LF along a first optical axis OA1, be deflected off at a reflective surface RF1 of the reflective element LF, and then pass through a lens group LG2 and a filter along a second optical axis OA2. The reflective element LF is a mirror disposed between the lens groups LG1 and LG2. Compared to prism, the mirror used as the reflective element is favorable for facilitating light transmission so as to increase the amount of incident light, reducing stray light so as to improve image quality, and also reducing the weight of the optical photographing lens assembly as well as and the sensitivity of the eccentricity, which is favorable for improving assembling yield rate, maintaining the stability of the image or record during photography. However, the present disclosure is not limited thereto. In some other embodiments, the reflective element can also be disposed between the lens group and the image surface of the optical photographing lens assembly.

Figure 43:
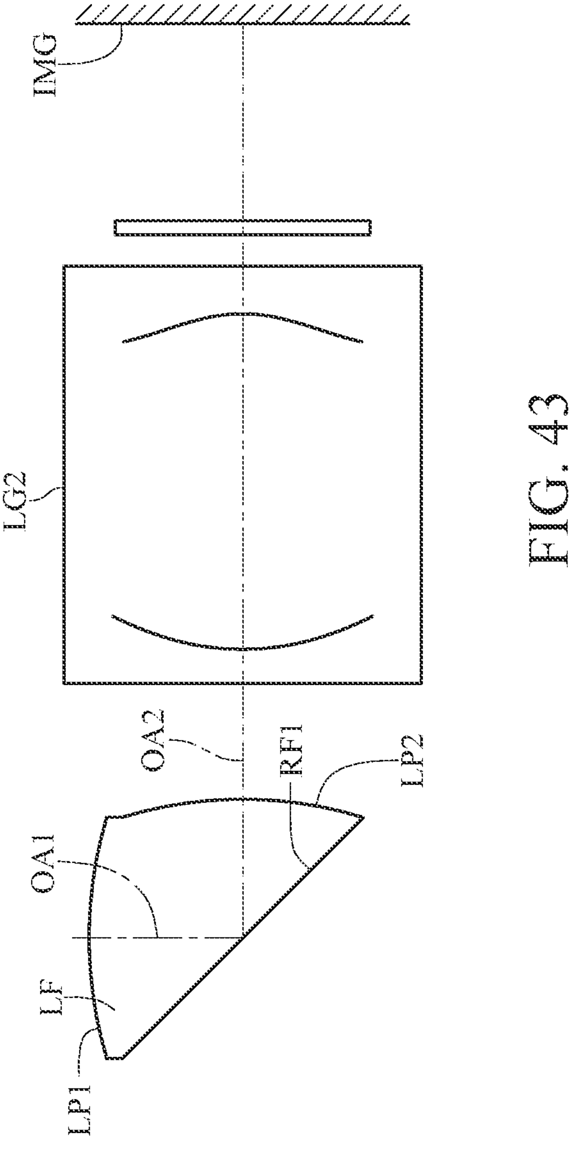
FIG. 43 shows a schematic view of another configuration of one reflective element in an optical photographing lens assembly according to one embodiment of the present disclosure.

In the aspect that the reflective element is a prism, the reflective element can have an object-side surface or an image-side surface being convex in a paraxial region thereof. Therefore, it is favorable for providing additional refractive power for the optical photographing lens assembly so as to reduce the size of the optical photographing lens assembly and improve image quality while making the overall appearance to have a three-dimensional visual effect. Please refer to FIG. 43, which shows a schematic view of another configuration of a reflective element in an optical photographing lens assembly according to one embodiment of the present disclosure. As shown in FIG. 43, in order from an imaged object (not shown in the figure) to an image surface IMG of the optical photographing lens assembly, an optical path can enter a reflective element LF via a light passing surface LP1 along a first optical axis OA1, be deflected off at a reflective surface RF1 of the reflective element LF, and then pass through a light passing LP2, a lens group LG2 and a filter along a second optical axis OA2. The light passing surface LP1 can be convex towards the imaged object in a paraxial region thereof, and the light passing LP2 can be convex towards the lens group LG in a paraxial region thereof.

Figure 44:
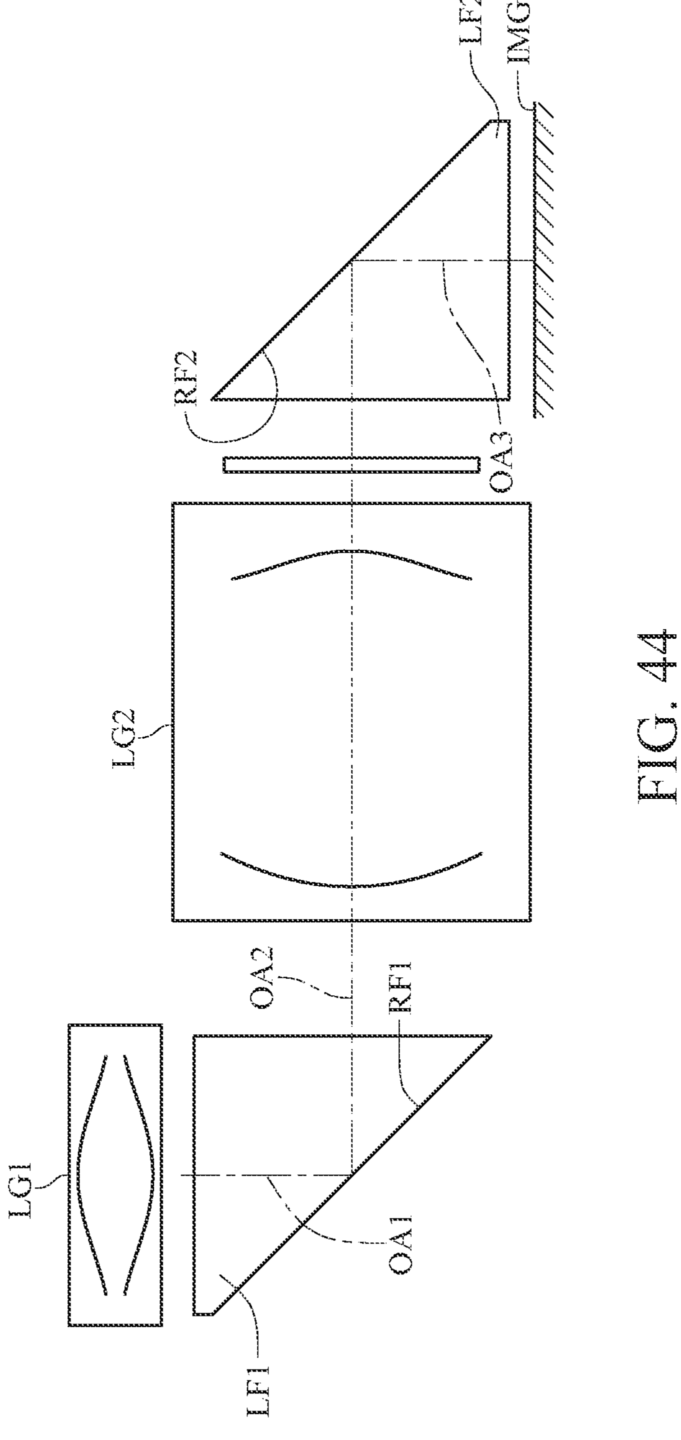
FIG. 44 shows a schematic view of a configuration of two reflective elements in an optical photographing lens assembly according to one embodiment of the present disclosure.

There can be at least two reflective elements. At least one of the at least two reflective elements can be a mirror disposed between the first lens element and the second lens element. Please refer to FIG. 44, which shows a schematic view of a configuration of two reflective elements in an optical photographing lens assembly according to one embodiment of the present disclosure. As shown in FIG. 44, in order from an imaged object (not shown in the figures) to an image surface IMG of the optical photographing lens assembly, an optical path can pass through the lens group LG1 and then enter a reflective element LF1 along a first optical axis OA1, be deflected off at a reflective surface RF1, pass through a lens group LG2 and a filter along a second optical axis OA2, enter another reflective element LF2 to be deflected off at a reflective surface RF2, and then extend onto the image surface IMG along a third optical axis OA3. The first element LF1 is disposed between the lens groups LG1 and LG2, the reflective element LF2 is disposed between the lens group LG2 and the image surface IMG, and the travelling direction of light on the first optical axis OA1 can be the same direction as the travelling direction of light on the third optical axis OA3 as shown in FIG. 44.

Figure 45:
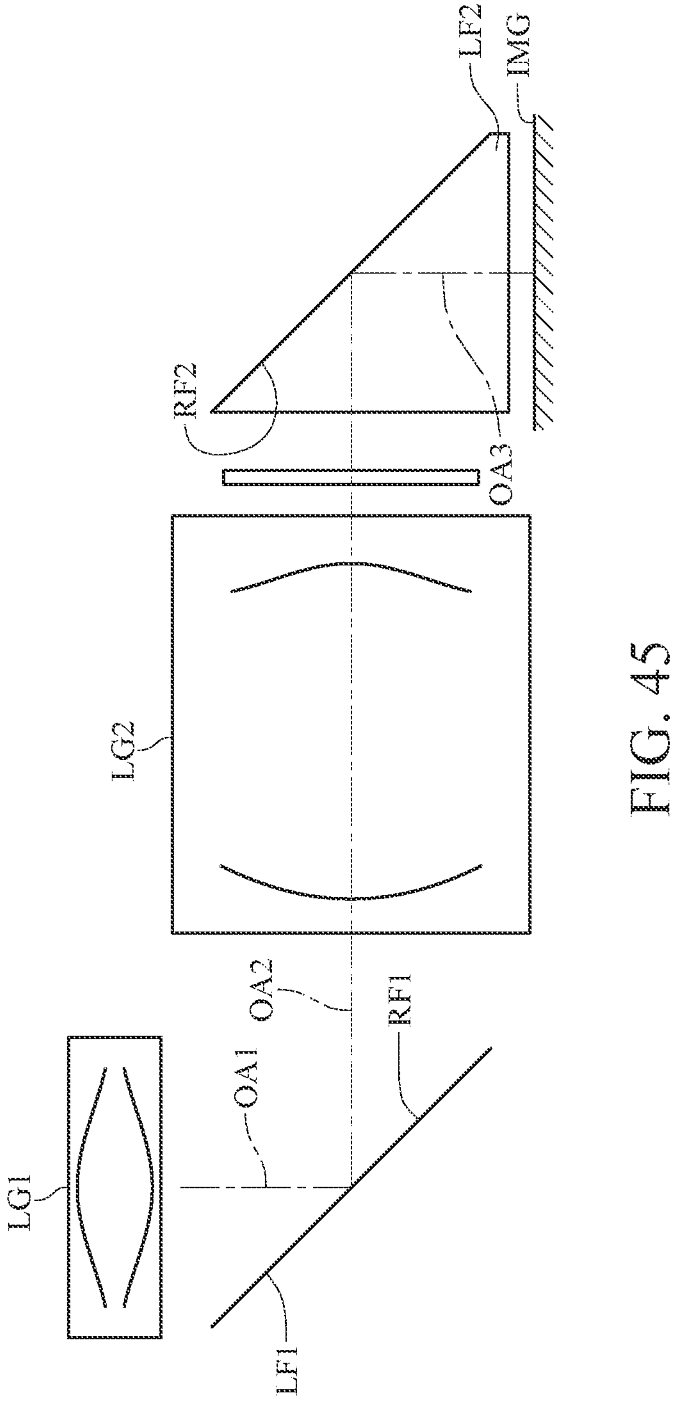
FIG. 45 shows a schematic view of another configuration of two reflective elements in an optical photographing lens assembly according to one embodiment of the present disclosure.

In addition, the at least two reflective elements optionally disposed between the imaged object and the image surface on the imaging optical path of the optical photographing lens assembly can be different types. Please refer to FIG. 45, which shows a schematic view of another configuration of two reflective elements in an optical photographing lens assembly according to one embodiment of the present disclosure. As shown in FIG. 45, a reflective element LF1 of the optical photographing lens assembly is a mirror, which is different from the reflective element LF1 as being a prism in the arrangement of FIG. 44. The optical path along a second optical axis OA2 can also be deflected off at a reflective surface RF2 of the reflective element LF2 and then extend onto the image surface IMG along a third optical axis OA3. The arrangement of FIG. 45 is similar to that of FIG. 44, and the description is not repeated herein. The optical photographing lens assembly can be optionally provided with three or more reflective elements, and the present disclosure is not limited to the type, amount and position of the reflective elements of the embodiments disclosed in the aforementioned figures.

Figure 46:
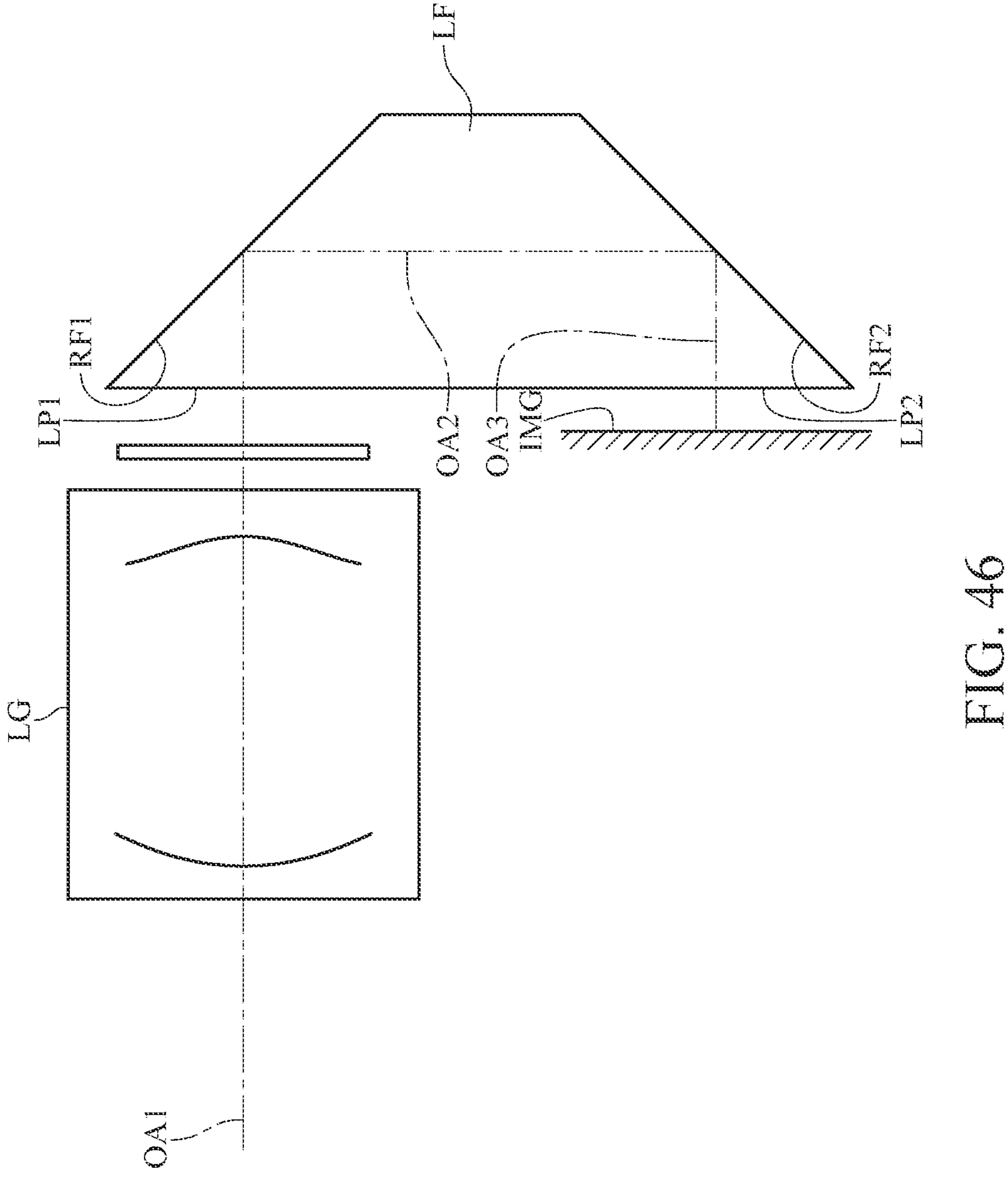
FIG. 46 shows a schematic view of a configuration of a double-reflective element in an optical photographing lens assembly according to one embodiment of the present disclosure.

In addition, one reflective element can have at least two reflective surfaces, at least three reflective surfaces or at least four reflective surfaces. It can also be considered that the optical path can be deflected once, twice, three times, four times or even more times in one reflective element. Please refer to FIG. 46, which shows a schematic view of a configuration of a double-reflective element in an optical photographing lens assembly according to one embodiment of the present disclosure. As shown in FIG. 46, in order from an imaged object (not shown in the figure) to an image surface IMG of the optical photographing lens assembly, an optical path can pass through a lens group LG and a filter along a first optical axis OA1, enter a double-reflective element LF through a light passing surface LP1 to be deflected off at a reflective surface RF1, extend along a second optical axis OA2 to be deflected off again at a reflective surface RF2, and then pass through the light passing surface LP2 to extend onto the image surface IMG along a third optical axis OA3. The double-reflective element LF is disposed between the filter and the image surface IMG of the optical photographing lens assembly, and the travelling direction of light on the first optical axis OA1 can be an opposite direction from the travelling direction of light on the third optical axis OA3 as shown in FIG. 46.

Figure 47:
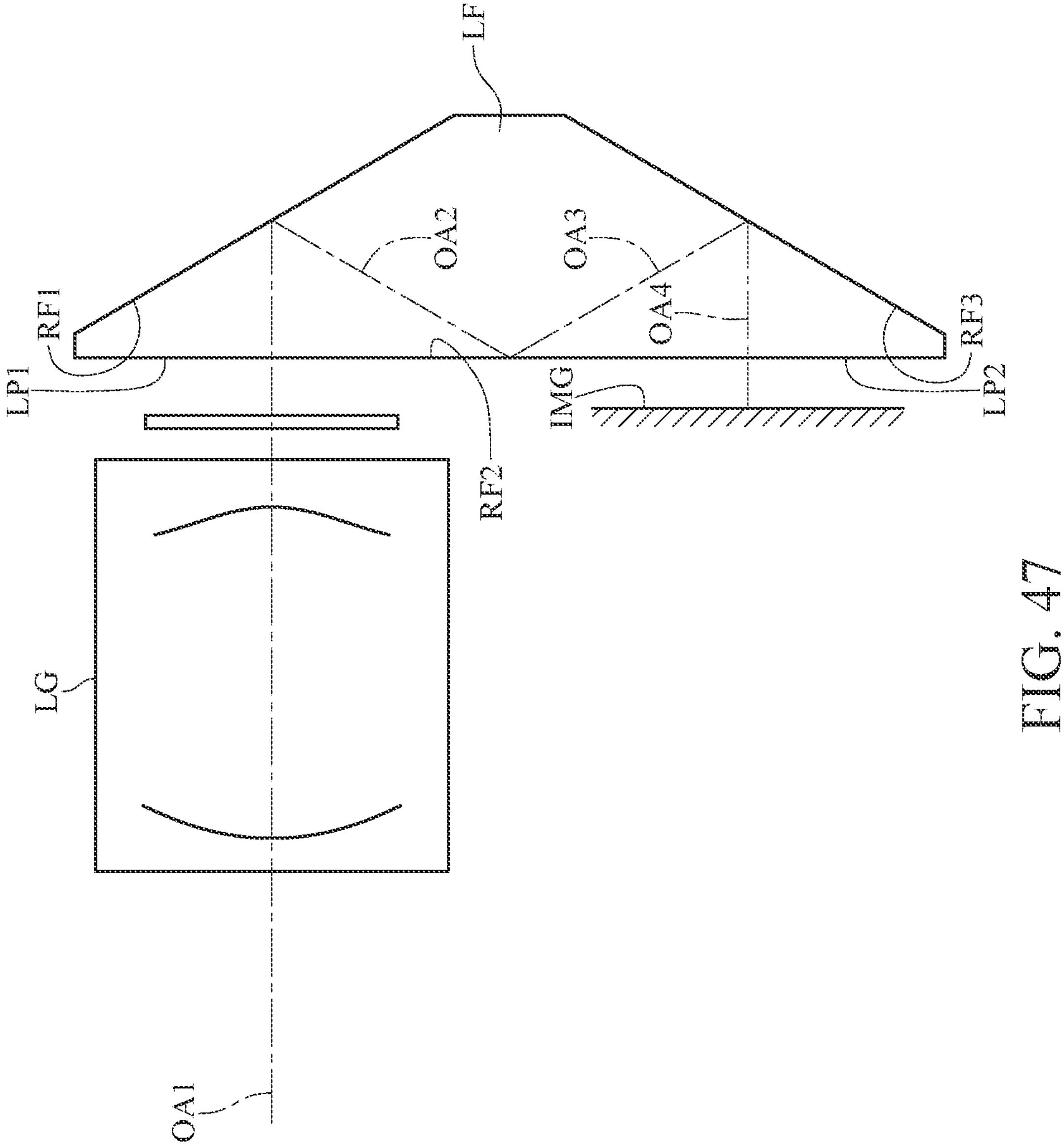
FIG. 47 shows a schematic view of a configuration of a triple-reflective element in an optical photographing lens assembly according to one embodiment of the present disclosure.

In addition, the angle between the normal direction of the reflective surface and the optical axis is not limited to 45 degrees. Other angles can be arranged according to actual requirements such as space arrangement. Please refer to FIG. 47, which shows a schematic view of a configuration of a triple-reflective element in an optical photographing lens assembly according to one embodiment of the present disclosure. As shown in FIG. 47, in order from an imaged object (not shown in the figure) to an image surface IMG of the optical photographing lens assembly, an optical path can pass through a lens group LG and a filter along a first optical axis OA1, enter a triple-reflective element LF through the light passing surface LP1 to be deflected off at a reflective surface RF1, extend along a second optical axis OA2 to be deflected off again at a reflective surface RF2, extend along a third optical axis OA3 to be deflected off further again at a reflective surface RF3, and then pass through the light passing surface LP2 to extend onto the image surface IMG along a fourth optical axis OA4. The triple-reflective element LF is disposed between the filter and the image surface IMG of the optical photographing lens assembly, the travelling direction of light on the first optical axis OA1 can be an opposite direction from the travelling direction of light on the fourth optical axis OA4 as shown in FIG. 47, the angle between the second optical axis OA2 and the normal direction of the reflective surface RF1 is less than 45 degrees, and the angle between the third optical axis OA3 and the normal direction of the reflective surface RF3 is less than 45 degrees.

Figure 48:
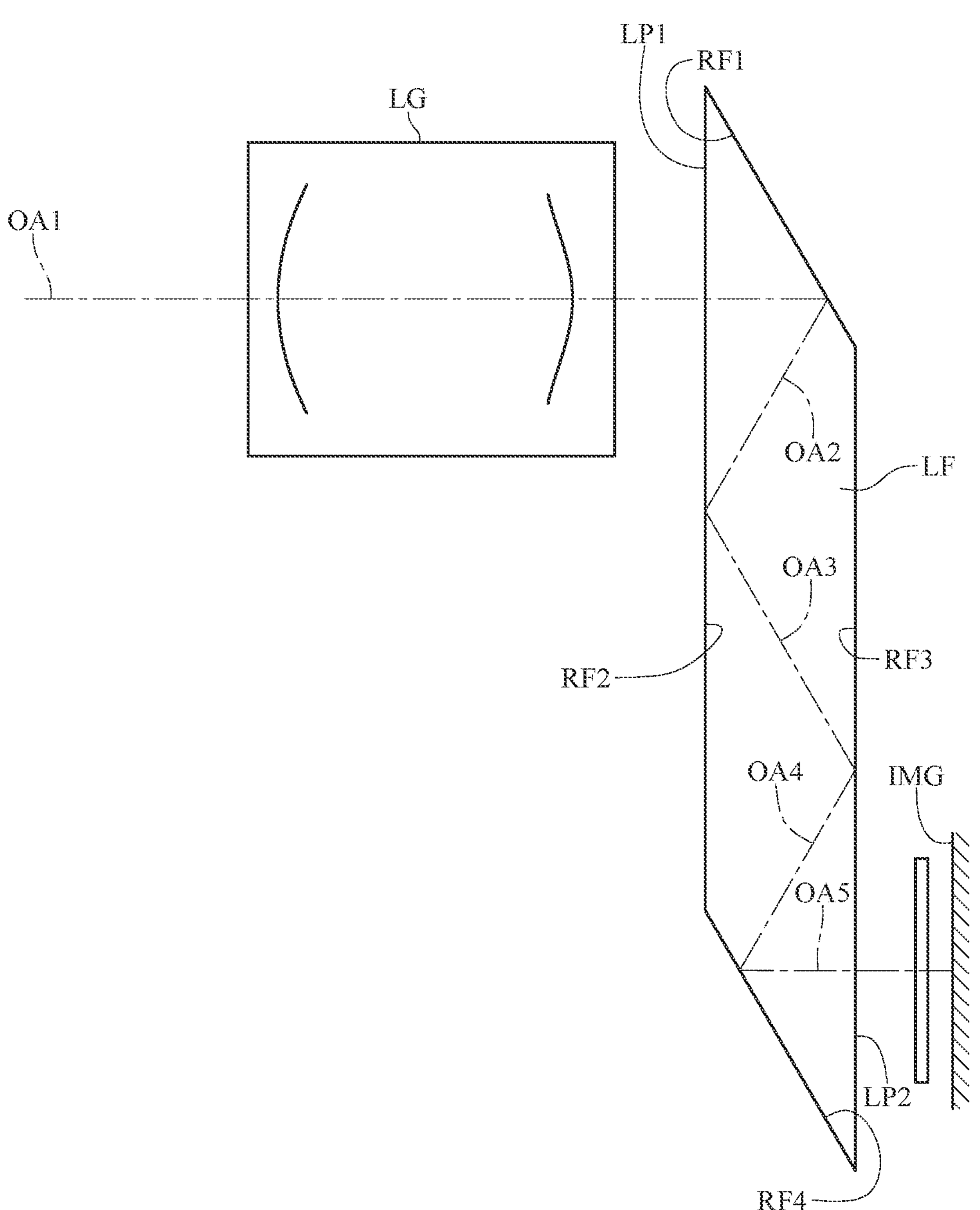
FIG. 48 shows a schematic view of a configuration of a quadruple-reflective element in an optical photographing lens assembly according to one embodiment of the present disclosure.

In addition, the reflective element can also be disposed between the lens group and the filter. Please refer to FIG. 48, which shows a schematic view of a configuration of a quadruple-reflective element in an optical photographing lens assembly according to one embodiment of the present disclosure. As shown in FIG. 48, in order from an imaged object (not shown in the figure) to an image surface IMG of the optical photographing lens assembly, an optical path can pass through a lens group LG along a first optical axis OA1, enter a quadruple-reflective element LF through a light passing surface LP1 to be deflected off at a reflective surface RF1, extend along a second optical axis OA2 to be deflected off again at a reflective surface RF2, extend along a third optical axis OA3 to be deflected off further again at a reflective surface RF3, extend along a fourth optical axis OA4 to be deflected off still further again at a reflective surface RF4, and extend onto the image surface IMG via a filter and a light passing surface LP2 along a fifth optical axis OA5. The quadruple-reflective element LF is disposed between the lens group LG and the filter of the optical photographing lens assembly, and the travelling direction of light on the first optical axis OA1 can be the same direction from the travelling direction of light on the fifth optical axis OA5 as shown in FIG. 48.

Figure 49:
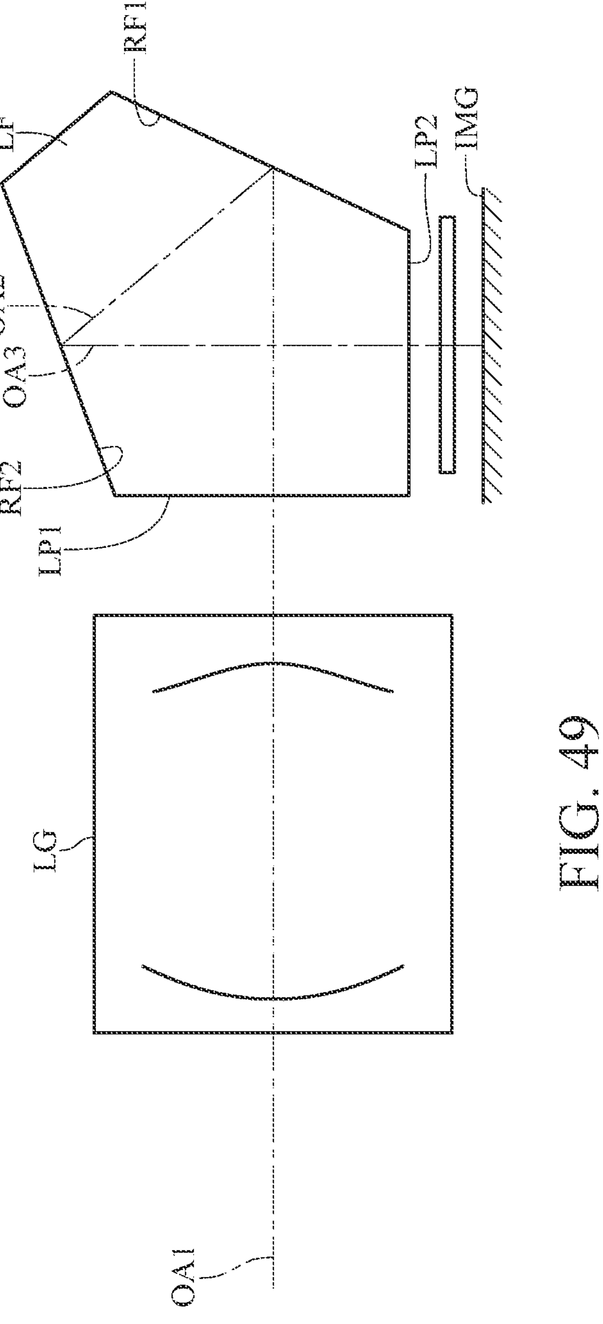
FIG. 49 shows a schematic view of further another configuration of a reflective element in an optical photographing lens assembly according to one embodiment of the present disclosure.

In addition, the optical path in the reflective element can have intersection. Please refer to FIG. 49, which shows a schematic view of further another configuration of a reflective element in an optical photographing lens assembly according to one embodiment of the present disclosure. As shown in FIG. 49, in order from an imaged object (not shown in the figure) to an image surface IMG of the optical photographing lens assembly, an optical path can pass through a lens group LG along a first optical axis OA1, enter a reflective element LF as being a pentaprism through a light passing surface LP1 to be deflected off at a reflective surface RF1, extend along a second optical axis OA2 to be deflected off again at a reflective surface RF2, extend along a third optical axis OA3 to intersect the first optical axis OA1, and then extend onto the image surface IMG via a filter and a light passing surface LP2. The reflective element LF is disposed between the lens group LG and the image surface IMG of the optical photographing lens assembly, and the travelling direction of light on the first optical axis OA1 can be perpendicular to the travelling direction of light on the third optical axis OA3 as shown in FIG. 49.

Figure 50:
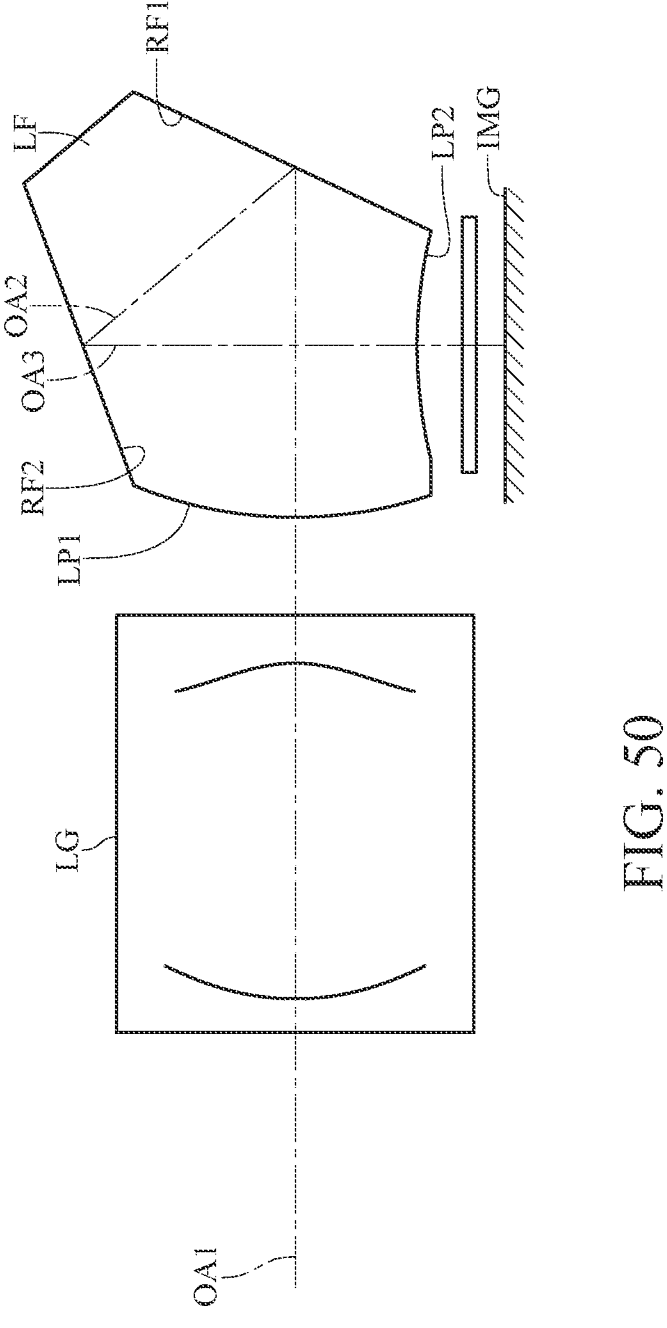
FIG. 50 shows a schematic view of still another configuration of a reflective element in an optical photographing lens assembly according to one embodiment of the present disclosure.

In addition, the surface of the reflective element can be planar surface, spherical surface, aspheric surface or freeform surface according to the optical design requirements, but the present disclosure is not limited thereto. Please refer to FIG. 50, which shows a schematic view of still another configuration of a reflective element in an optical photographing lens assembly according to one embodiment of the present disclosure. As shown in FIG. 50, in order from an imaged object (not shown in the figure) to an image surface IMG of the optical photographing lens assembly, an optical path can pass through a lens group LG along a first optical axis OA1, enter a reflective element LF as being a pentaprism through a light passing surface LP1 to be deflected off at a reflective surface RF1, extend along a second optical axis OA2 to be deflected off again at a reflective surface RF2, extend along a third optical axis OA3 to intersect the first optical axis OA1, and then extend onto the image surface IMG via a filter and a light passing surface LP2. The light passing surface LP1 can be convex towards the lens group LG in a paraxial region thereof, and the light passing surface LP2 can be concave away from the image surface IMG in a paraxial region thereof.

In addition, in order to reduce the size of the optical photographing lens assembly, the length and the width of the mirror may be different from each other, and the length, the width and the height of the prism may be different from one another, as shown as the various reflective elements LF in FIG. 46 to FIG. 50. In addition, the angle between the normal direction of the reflective surface and the optical axis is not limited to 45 degrees. Other angles can be arranged according to actual requirements such as space arrangement. Moreover, an angle between a vector of the optical axis at the object side and that at the image side can be any angle, not limited to 0 degrees, 90 degrees or 180 degrees. Moreover, the reflective element can consist of one or more prisms depending on the design requirements. Moreover, the prism can be made of glass material or plastic material depending on the design requirements. Moreover, the mirror or the prism with the optical path folding function does not belong to the abovementioned lens elements; that is, the lens elements of the optical photographing lens assembly do not include any mirror or prism with an optical path folding function.

Figure 51:
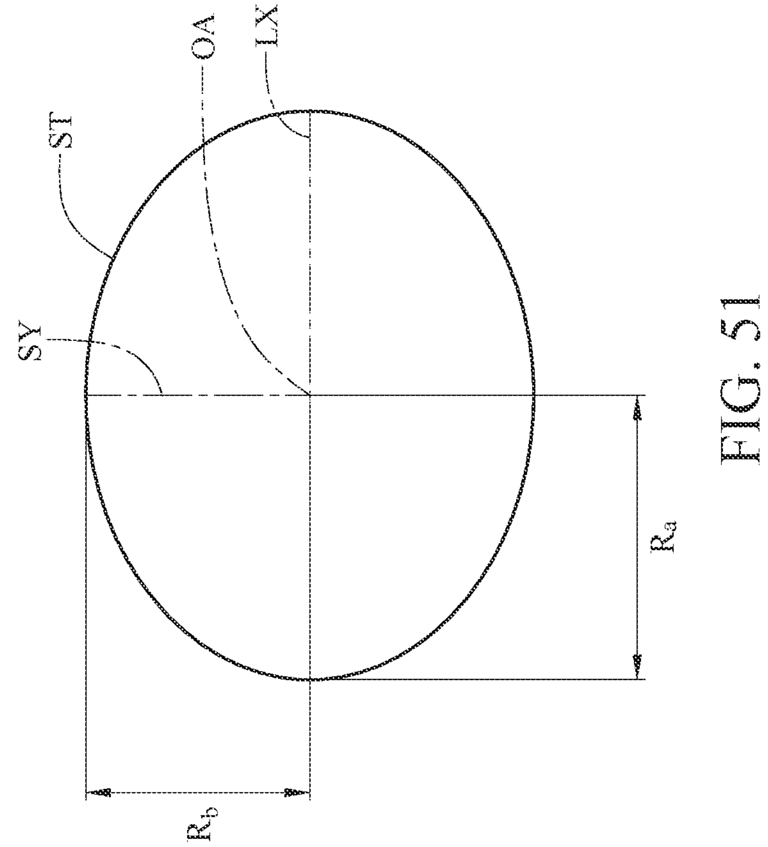
FIG. 51 shows a schematic view of a shape of an aperture stop according to one embodiment of the present disclosure.
Figure 52:
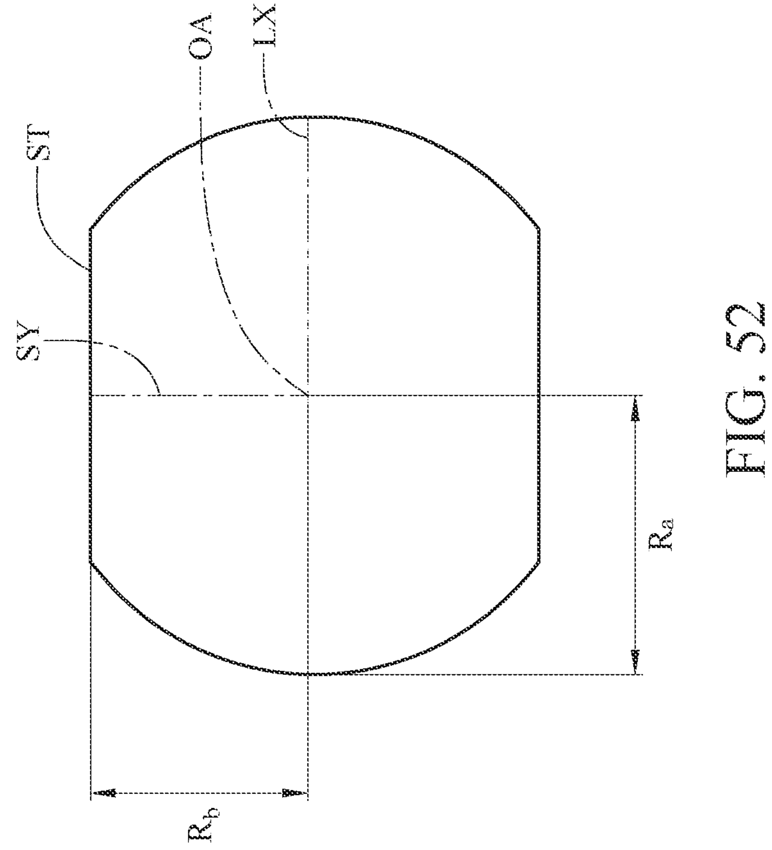
FIG. 52 shows a schematic view of another shape of an aperture stop according to one embodiment of the present disclosure.

According to the present disclosure, the optical photographing lens assembly can further include an aperture stop. The aperture stop can have a major axis direction and a minor axis direction which are perpendicular to the optical axis and are different from each other, and an effective radius of the aperture stop in the major axis direction is different from an effective radius of the aperture stop in the minor axis direction. Therefore, it is favorable for adjusting the shape of the aperture stop so as to reduce stray light. For example, please refer to FIG. 51 and FIG. 52, where FIG. 51 shows a schematic view of a shape of an aperture stop according to one embodiment of the present disclosure, and FIG. 52 shows a schematic view of another shape of an aperture stop according to one embodiment of the present disclosure. As shown in FIG. 51, in some configurations of the present disclosure, a shape of an aperture stop ST is elliptical, and the aperture stop ST has a major axis direction LX and a minor axis direction SY that are perpendicular to an optical axis OA. The major axis direction LX and the minor axis direction SY are two different directions, and an effective radius Ra of the aperture stop ST in the major axis direction LX is greater than an effective radius Rb of the aperture stop ST in the minor axis direction SY. As shown in FIG. 52, in some other configurations of the present disclosure, an aperture stop ST is shaped to have trimmed edges at the periphery thereof, and the aperture stop ST has a major axis direction LX and a minor axis direction SY that are perpendicular to an optical axis OA. The major axis direction LX and the minor axis direction SY are two different directions, and an effective radius Ra of the aperture stop ST in the major axis direction LX is greater than an effective radius Rb of the aperture stop ST in the minor axis direction SY.

Figure 40:
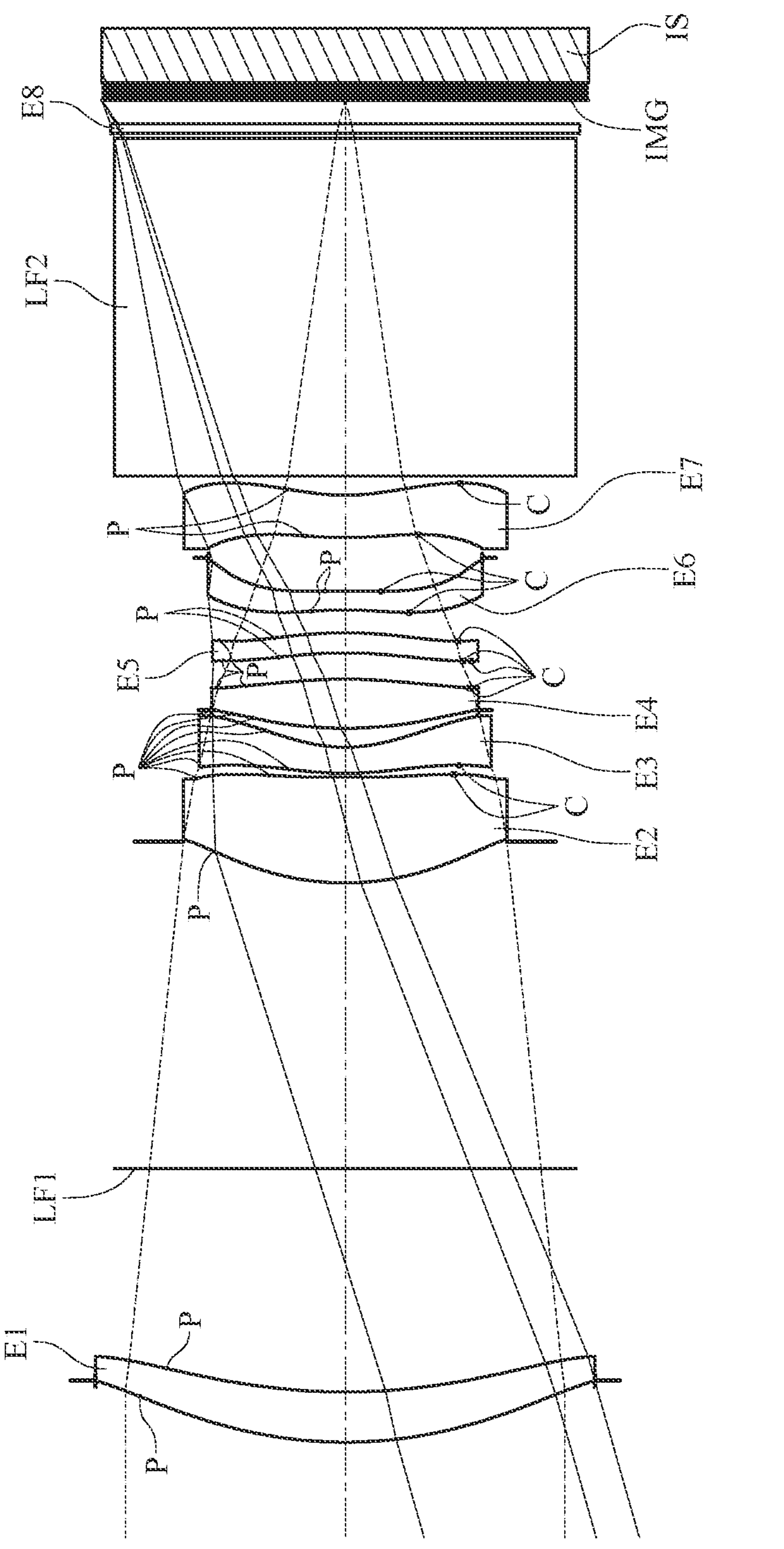
FIG. 40 shows a schematic view of inflection points and critical points of lens elements according to the 1st embodiment of the present disclosure.

According to the present disclosure, at least one of the object-side surface and the image-side surface of at least one lens element of the seven lens elements of the optical photographing lens assembly can have at least one inflection point. Therefore, it is favorable for increasing the design flexibility of the lens shape so as to correct astigmatism. Moreover, the image-side surface of the first lens element can have at least one inflection point. Therefore, it is favorable for adjusting the shape at the periphery of the image-side surface of the first lens element so as to converge peripheral light, and thus it is favorable for reducing the size of the reflective element. Moreover, at least one of the object-side surface and the image-side surface of the seventh lens element can have at least one inflection point. Therefore, it is favorable for enhancing the ability of the seventh lens element for correcting aberrations at the periphery of the seventh lens element. Moreover, at least one of the object-side surface and the image-side surface of at least one lens element of the first lens group can have at least one inflection point. Therefore, it is favorable for effectively adjusting the shape at the periphery of the lens surface so as to converge peripheral light, and thus it is favorable for reduce the size of the reflective element. Moreover, at least one of the object-side surface and the image-side surface of at least one lens element of the third lens group can have at least one inflection point. Therefore, it is favorable for adjusting the light incident angle on the image surface so as to control peripheral light incident angle, thereby reducing vignetting at the periphery, enhancing astigmatism correction and enlarging the image surface. Please refer to FIG. 40, which shows a schematic view of one or more inflection points P of lens element according to the 1st embodiment of the present disclosure. The inflection points of each lens surface of the lens elements in FIG. 40 are only exemplary. Each of the object-side surfaces and the image-side surfaces of the lens elements in the 1st and other embodiments of the present disclosure can also have one or more inflection points.

The object-side surface of the sixth lens element can have at least one convex critical point in an off-axis region thereof. Therefore, it is favorable for adjusting the shape of the sixth lens element at a periphery region thereof so as to correct astigmatism and enlarge the image surface. The image-side surface of the seventh lens element can have at least one convex critical point in an off-axis region thereof. Therefore, it is favorable for adjusting the light incident angle on the image surface so as to control peripheral light angle, thereby preventing vignetting and distortion at the peripheral image. Please refer to FIG. 40, which shows a schematic view of critical points C of some lens element according to the 1st embodiment of the present disclosure. In the 1st embodiment, each of the second lens element, the third lens element, the fourth lens element, the fifth lens element, the sixth lens element and the seventh lens element has one or more inflection points. In FIG. 40, the image-side surface of the second lens element E2 has one convex critical point C in an off-axis region thereof, the object-side surface of the third lens element E3 has one concave critical point C in an off-axis region thereof, the image-side surface of the fourth lens element E4 has one convex critical point C and one concave critical point C in an off-axis region thereof, the object-side surface of the fifth lens element E5 has one convex critical point C and one concave critical point C in an off-axis region thereof, the image-side surface of the fifth lens element E5 has one concave critical point C in an off-axis region thereof, the object-side surface of the sixth lens element E6 has one convex critical point C in an off-axis region thereof, the image-side surface of the sixth lens element E6 has one concave critical point C in an off-axis region thereof, the object-side surface of the seventh lens element E7 has one concave critical point C in an off-axis region thereof, and the image-side surface of the seventh lens element E7 has one convex critical point C in an off-axis region thereof. The critical points of some lens surfaces of the lens elements in FIG. 40 are only exemplary. Each lens surface in other embodiments of the present disclosure can have one or more critical points in an off-axis region thereof.

When an axial distance between the first lens element and the second lens element in the optical photographing lens assembly with the infinite object distance is T12L, and an axial distance between the object-side surface of the second lens element and the image-side surface of the seventh lens element in the optical photographing lens assembly with the infinite object distance is Dr3r14L, the following condition can be satisfied: $0.50<T12L/Dr3r14L<2.50$. Therefore, it is favorable for adjusting a ratio of the axial distance between the first and the second lens elements to the axial distance between the object-side surface of the second lens element and the image-side surface of the seventh lens element so as to provide sufficient space for arranging the reflective element and maintaining an optimal space arrangement in the optical photographing lens assembly. Moreover, the following condition can also be satisfied: $0.60<T12L/Dr3r14L<2.20$. Moreover, the following condition can also be satisfied: $0.75<T12L/Dr3r14L<1.80$. Moreover, the following condition can also be satisfied: $0.83\leq T12L/Dr3r14L\leq 1.44$.

When an axial distance between the object-side surface of the second lens element and the image-side surface of the fifth lens element in the optical photographing lens assembly with the infinite object distance is Dr3r10L, and an axial distance between the object-side surface of the sixth lens element and the image-side surface of the seventh lens element in the optical photographing lens assembly with the infinite object distance is Dr11r14L, the following condition can be satisfied: $1.00<Dr3r10L/Dr11r14L<3.50$. Therefore, it is favorable for adjusting the length of the optical photographing lens assembly with the movable lens group along the optical axis and the length of the optical photographing lens assembly at the image end thereof along the optical axis so as to balance the space arrangement of the lens elements to thereby reduce the sensitivity of the optical photographing lens assembly during the movement focus process. Moreover, the following condition can also be satisfied: $1.50<Dr3r10L/Dr11r14L<3.20$. Moreover, the following condition can also be satisfied: $1.92\leq Dr3r10L/Dr11r14L\leq 2.95$.

When a focal length of the fourth lens element is f4, and a focal length of the fifth lens element is f5, the following condition can be satisfied: $0<|f4/f5|<1.00$. Therefore, it is favorable for adjusting a ratio of the refractive power of the fourth lens element to that of the fifth lens element so as to effectively control the travelling direction of light to thereby reduce the light incident angle on the image surface. Moreover, the following condition can also be satisfied: $0.01<|f4/f5|<0.80$. Moreover, the following condition can also be satisfied: $0.02\leq|f4/f5|\leq 1.64$.

When an axial distance between the object-side surface of the lens element closest to the object side and the image surface in the optical photographing lens assembly with the infinite object distance is TLL, and an axial distance between the image-side surface of the lens element closest to the image side and the image surface in the optical photographing lens assembly with the infinite object distance is BLL, the following condition can be satisfied: $1.00<TLL/BLL<10.00$. Therefore, it is favorable for properly adjusting the proper back focal length so as to facilitate optical path folding. Moreover, the following condition can also be satisfied: $1.00<TLL/BLL<8.00$. Moreover, the following condition can also be satisfied: $2.00<TLL/BLL<7.50$. Moreover, the following condition can also be satisfied: $3.00<TLL/BLL<7.00$. Moreover, the following condition can also be satisfied: $3.40\leq TLL/BLL\leq 6.82$. In one aspect, TLL can be an axial distance between the object-side surface of the first element and the image surface in the optical photographing lens assembly with the infinite object distance. In one aspect, BLL can be an axial distance between the image-side surface of the seventh lens element and the image surface in the optical photographing lens assembly with the infinite object distance.

When an Abbe number of the fifth lens element is V5, and a refractive index of the fifth lens element is N5, the following condition can be satisfied: $5.00<V5/N5<32.00$. Therefore, it is favorable for selecting the material of the fifth lens element so as to correct chromatic aberration in various object distances, which is favorable for preventing overlapped images so as to improve image quality. Moreover, the following condition can also be satisfied: $8.00<V5/N5<28.00$. Moreover, the following condition can also be satisfied: $7.00<V5/N5<30.00$. Moreover, the following condition can also be satisfied: $9.61\leq V5/N5\leq 26.19$.

When an axial distance between the first lens group and the second lens group in the optical photographing lens assembly with the infinite object distance is TG1G2L, and an axial distance between the object-side surface of a lens element closest to the object side in the second lens group and the image-side surface of a lens element closest to the image side in the third lens element in the optical photographing lens assembly with the infinite object distance is DG2G3L, the following condition can be satisfied: $0.50<TG1G2L/DG2G3L<2.50$. Therefore, it is favorable for adjusting a ratio of the axial distance between the first and second lens groups to a sum of total track lengths of the second and third lens groups so as to provide sufficient space for arranging the reflective element and maintaining an optimal space arrangement in the optical photographing lens assembly. Moreover, the following condition can also be satisfied: $0.60<TG1G2L/DG2G3L<2.20$. Moreover, the following condition can also be satisfied: $0.75<TG1G2L/DG2G3L<1.80$. Moreover, the following condition can also be satisfied: $0.83\leq TG1G2L/DG2G3L\leq 1.44$. In one aspect, DG2G3L can be an axial distance between the object-side surface of the second lens element and the image-side surface of the seventh lens element in the optical photographing lens assembly with the infinite object distance.

When the axial distance between the image-side surface of the lens element closest to the image side and the image surface in the optical photographing lens assembly with the infinite object distance is BLL, and an axial distance between the image-side surface of the lens element closest to the image side and the image surface in the optical photographing lens assembly with the short object distance is BLS, the following condition can be satisfied: $0.95<BLL/BLS<1.05$. Therefore, it is favorable for preventing excessive change in the light incident angle on the image surface during the movement focus process. Moreover, the following condition can also be satisfied: $0.98<BLL/BLS<1.02$. Moreover, the following condition can also be satisfied: $BLL/BLS=1.00$. In one aspect, BLL can be the axial distance between the image-side surface of the seventh lens element and the image surface in the optical photographing lens assembly with the infinite object distance. In one aspect, BLS can be an axial distance between the image-side surface of the seventh lens element and the image surface in the optical photographing lens assembly with the short object distance.

When the axial distance between the first lens group and the second lens group in the optical photographing lens assembly with the infinite object distance is TG1G2L, and an axial distance between the first lens group and the second lens group in the optical photographing lens assembly with the short object distance is TG1G2S, the following condition can be satisfied: $0.08<(TG1G2L-TG1G2S)/TG1G2L<0.50$. Therefore, it is favorable for increasing the amount of movement of the second lens group during the movement focus process so as to capture the imaged object at a shorter object distance and improve the viewing angle. Moreover, the following condition can also be satisfied: $0.12<(TG1G2L-TG1G2S)/TG1G2L<0.40$. Moreover, the following condition can also be satisfied: $0.15<(TG1G2L-TG1G2S)/TG1G2L<0.30$. Moreover, the following condition can also be satisfied: $0.19\leq(TG1G2L-TG1G2S)/TG1G2L\leq 0.25$.

When half of a maximum field of view of the optical photographing lens assembly with the infinite object distance is HFOVL, the following condition can be satisfied: 5.0 degrees<HFOVL<25.0 degrees. Therefore, it is favorable for providing a proper field of view of the optical photographing lens assembly for telephoto application. Moreover, the following condition can also be satisfied: 8.0 degrees<HFOVL<22.0 degrees. Moreover, the following condition can also be satisfied: 12.0 degrees<HFOVL<18.0 degrees.

When a focal length of the second lens element is f2, and the focal length of the fifth lens element is f5, the following condition can be satisfied: $0<|f2/f5|<0.80$. Therefore, it is favorable for adjusting a ratio of the refractive power of the second lens element to that of the fifth lens element so as to provide the second lens element with light convergence ability and balance said convergence ability by the fifth lens element, thereby controlling the travelling direction of peripheral light path. Moreover, the following condition can also be satisfied: $0.01<|f2/f5|<0.70$.

When a central thickness of the sixth lens element is CT6, and an axial distance between the sixth lens element and the seventh lens element in the optical photographing lens assembly with the infinite object distance is T67L, the following condition can be satisfied: $0.05<CT6/T67L<2.00$. Therefore, it is favorable for balancing the central thickness of the sixth lens element and the axial distance between the sixth and seventh lens elements so as to improve space utilization efficiency. Moreover, the following condition can also be satisfied: $0.15<CT6/T67L<1.80$.

When the focal length of the fourth lens element is f4, a curvature radius of the object-side surface of the fourth lens element is R7, and a curvature radius of the image-side surface of the fourth lens element is R8, the following condition can be satisfied: $0.10<|f4/R7|+|f4/R8|<6.00$. Therefore, it is favorable for adjusting the refractive power of the fourth lens element, the curvature radius of the object-side surface of the fourth lens element as well as the curvature radius of the image-side surface of the fourth lens element so as to effectively control the traveling direction of peripheral light path, thereby reducing the size of the optical photographing lens assembly and enlarging the image surface. Moreover, the following condition can also be satisfied: $0.50<|f4/R7|+|f4/R8|<4.50$. Moreover, the following condition can also be satisfied: $1.00<|f4/R7|+|f4/R8|<3.00$.

When a total number of lens elements having an Abbe number smaller than 30 in the optical photographing lens assembly is V30, the following condition can be satisfied: $3\leq V30$. Therefore, it is favorable for material selection of the optical photographing lens assembly so as to balance the light convergence ability at different wavelengths and correct chromatic aberration. Moreover, when a total number of lens elements having an Abbe number smaller than 35 in the optical photographing lens assembly is V35, the following condition can be satisfied: $3\leq V35$.

When a curvature radius of the object-side surface of the first lens element is R1, and a curvature radius of the image-side surface of the first lens element is R2, the following condition can be satisfied: $-1.50<(R1-R2)/(R1+R2)<0.2$. Therefore, it is favorable for effectively balancing the curvature radius of the object-side surface of the first lens element and the curvature radius of the image-side surface of the first lens element so as to adjust the travelling direction of peripheral light path, thereby increasing the amount of incident light. Moreover, the following condition can also be satisfied: $-1.00<(R1-R2)/(R1+R2)<0$. Moreover, the following condition can also be satisfied: $-0.50<(R1-R2)/(R1+R2)<-0.05$.

When a central thickness of the fourth lens element is CT4, and a central thickness of the fifth lens element is CT5, the following condition can be satisfied: $0.10<CT5/CT4<0.80$. Therefore, it is favorable for controlling a ratio of the central thickness of the fourth lens element to that of the fifth lens element so as to enhance design flexibility and reduce manufacturing errors. Moreover, the following condition can also be satisfied: $0.18<CT5/CT4<0.65$.

When a focal length of the optical photographing lens assembly with the infinite object distance is fL, a focal length of the first lens element is f1, the focal length of the fourth lens element is f4, and the focal length of the fifth lens element is f5, the following condition can be satisfied: $0.05<(|fL/f1|+|fL/f5|)/|fL/f4|<1.20$. Therefore, it is favorable for adjusting the refractive powers of the first lens element, the fourth lens element and the fifth lens element so as to balance light convergence or divergence, thereby enhancing the convergence quality of all fields of view. Moreover, the following condition can also be satisfied: $0.15<(|fL/f1|+|fL/f5|)/|fL/f4|<1.00$.

When the axial distance between the object-side surface of the lens element closest to the object side and the image surface in the optical photographing lens assembly with the infinite object distance is TLL, and the focal length of the optical photographing lens assembly with the infinite object distance is fL, the following condition can be satisfied: $0.50<TLL/fL<3.50$. Therefore, it is favorable for the optical photographing lens assembly to have a better field of view for various applications. Moreover, the following condition can also be satisfied: $1.00<TLL/fL<2.50$. Moreover, the following condition can also be satisfied: $1.30<TLL/fL<2.00$.

When the curvature radius of the image-side surface of the first lens element is R2, and a curvature radius of the image-side surface of the third lens element is R6, the following condition can be satisfied: $0<|R6/R2|<1.00$. Therefore, it is favorable for adjusting the curvature radius of the image-side surface of the first lens element as well as the curvature radius of the image-side surface of the third lens element so as to enhance the convergence quality of the imaging light, thereby effectively correcting field curvature and spherical aberration. Moreover, the following condition can also be satisfied: $0.05<|R6/R2|<0.80$. Moreover, the following condition can also be satisfied: $0.10<|R6/R2|<0.50$.

Figure 41:
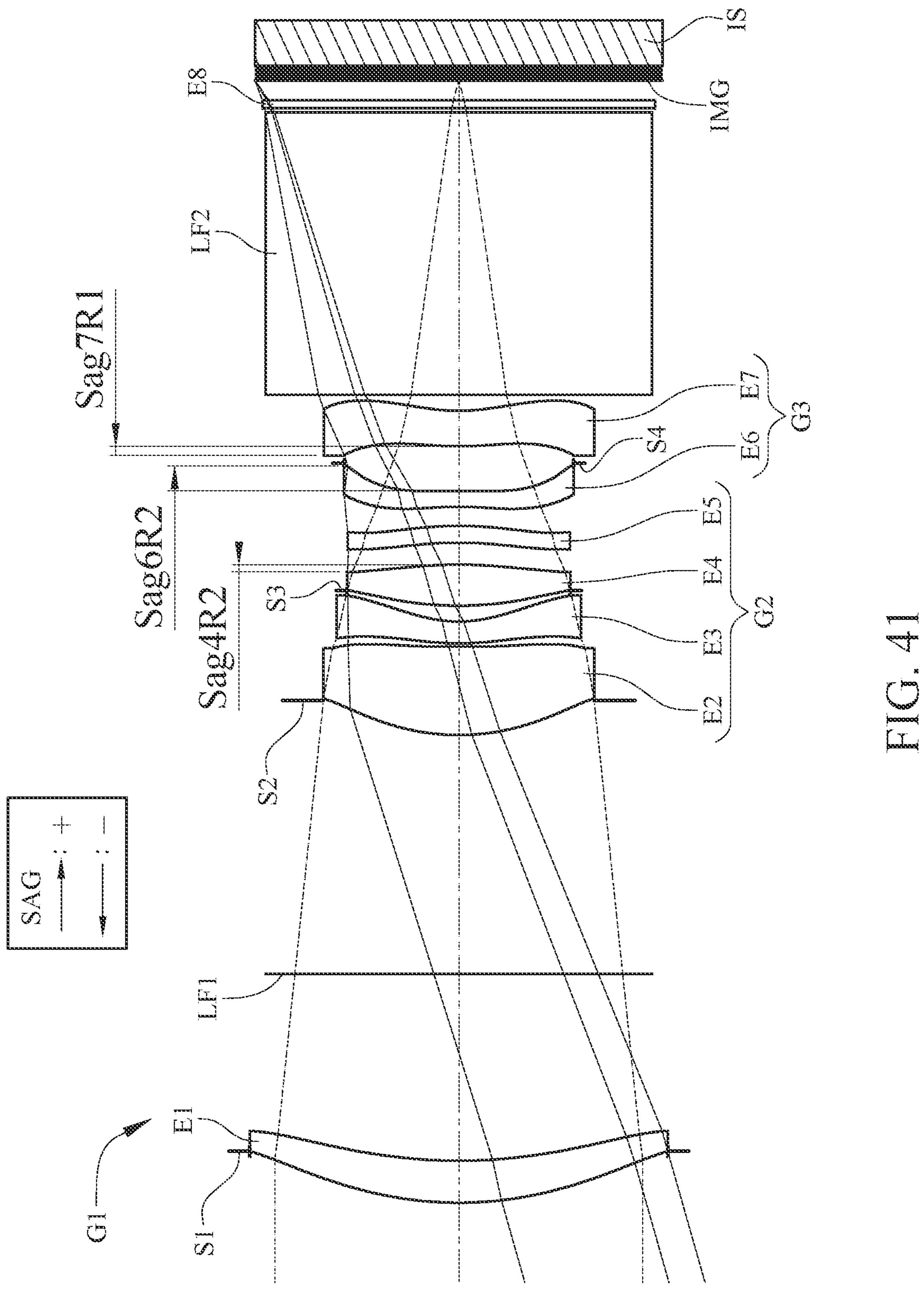
FIG. 41 shows a schematic view of Sag4R2, Sag6R2 and Sag7R1 according to the 1st embodiment of the present disclosure.

When a displacement in parallel with the optical axis from an axial vertex of the image-side surface of the fourth lens element to a maximum effective radius position of the image-side surface of the fourth lens element is Sag4R2, and the central thickness of the fourth lens element is CT4, the following condition can be satisfied: $-1.00<Sag4R2/CT4<-0.02$. Therefore, it is favorable for balancing the curvature at the periphery of the fourth lens element so as to enlarge the image surface and correct aberrations such as distortion. Moreover, the following condition can also be satisfied: $-0.80<Sag4R2/CT4<-0.05$. FIG. 41 shows a schematic view of Sag4R2 according to the 1st embodiment of the present disclosure. Please be noted that the abovementioned displacement has a positive value if the displacement faces towards the image side, and has a negative value if the displacement faces towards the object side.

When the axial distance between the sixth lens element and the seventh lens element in the optical photographing lens assembly with the infinite object distance is T67L, a displacement in parallel with the optical axis from an axial vertex of the image-side surface of the sixth lens element to a maximum effective radius position of the image-side surface of the sixth lens element is Sag6R2, and a displacement in parallel with the optical axis from an axial vertex of the object-side surface of the seventh lens element to a maximum effective radius position of the object-side surface of the seventh lens element is Sag7R1, the following condition can be satisfied: $0.03<(T67L-Sag6R2+Sag7R1)/T67L<1.00$. Therefore, it is favorable for reducing the light incident angle on the object-side surface of the seventh lens element so as to prevent total reflection as well as stray light and balance the space arrangement of the lens elements. Moreover, the following condition can also be satisfied: $0.06<(T67L-Sag6R2+Sag7R1)/T67L<0.85$. FIG. 41 shows a schematic view of Sag6R2 and Sag7R1 according to the 1st embodiment of the present disclosure.

When the axial distance between the object-side surface of the lens element closest to the object side and the image surface in the optical photographing lens assembly with the infinite object distance is TLL, and an axial distance between the object-side surface of the lens element closest to the object side and the image surface in the optical photographing lens assembly with the short object distance is TLS, the following condition can be satisfied: $0.95<TLL/TLS<1.05$. Therefore, it is favorable for maintaining the total track length during the movement focus process so as to simplify the mechanism, thereby enhancing assembling yield rate. Moreover, the following condition can also be satisfied: $0.98<TLL/TLS<1.02$. In one aspect, TLS can be an axial distance between the object-side surface of the first lens element and the image surface in the optical photographing lens assembly with the short object distance.

When a focal length of the first lens group is fG1, and a focal length of the second lens group is fG2, the following condition can be satisfied: $2.50<fG1/fG2<8.50$. Therefore, it is favorable for adjusting a ratio of the focal length of the first lens group to that of the second lens group so as to reduce the size of the optical photographing lens assembly by increasing the refractive power of the second lens group. Moreover, the following condition can also be satisfied: $3.00<fG1/fG2<8.00$.

When the focal length of the optical photographing lens assembly with the infinite object distance is fL, and a focal length of a lens element closest to the image side in the second lens element is fG2N, the following condition can be satisfied: $0<|fL/fG2N|<1.50$. Therefore, it is favorable for adjusting the refractive power of the lens element closest to the image side in the second lens element so as to effectively balance the refractive power of an entirety of the second lens group, thereby correcting spherical aberration. Moreover, the following condition can also be satisfied: $0.10<|fL/fG2N|<1.40$. In one aspect, fG2N can be the focal length of the fourth lens element. In one aspect, fG2N can be the focal length of the fifth lens element.

According to the present disclosure, the aforementioned features and conditions can be utilized in numerous combinations so as to achieve corresponding effects.

According to the present disclosure, the lens elements of the optical photographing lens assembly can be made of either glass or plastic material. When the lens elements are made of glass material, the refractive power distribution of the optical photographing lens assembly may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the optical photographing lens assembly can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point on the surface of the lens element where its tangent is perpendicular to the optical axis.

According to the present disclosure, the image surface of the optical photographing lens assembly, based on the corresponding image sensor, can be flat or curved, especially a curved surface being concave facing towards the object side of the optical photographing lens assembly.

According to the present disclosure, an image correction unit, such as a field flattener, can be optionally disposed between the lens element closest to the image side of the optical photographing lens assembly along the optical path and the image surface for correction of aberrations such as field curvature. The optical characteristics of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

According to the present disclosure, the optical photographing lens assembly can include at least one stop, such as an aperture stop, a glare stop or a field stop. Said glare stop or said field stop can be disposed between an imaged object and the first lens element, between adjacent lens elements, or between the last lens element and the image surface, and is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the optical photographing lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the optical photographing lens assembly and thereby provides a wider field of view for the same.

According to the present disclosure, the optical photographing lens assembly can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the present disclosure, the optical photographing lens assembly can include one or more optical elements for limiting the form of light passing through the optical photographing lens assembly. Each optical element can be, but not limited to, a filter, a polarizer, etc., and each optical element can be, but not limited to, a single-piece element, a composite component, a thin film, etc. The optical element can be located at the object side or the image side of the optical photographing lens assembly or between any two adjacent lens elements so as to allow light in a specific form to pass through, thereby meeting application requirements.

According to the present disclosure, the optical photographing lens assembly can include at least one optical lens element, an optical element, or a carrier, which has at least one surface with a low reflection layer. The low reflection layer can effectively reduce stray light generated due to light reflection at the interface. The low reflection layer can be disposed in an optical non-effective area of an object-side surface or an image-side surface of the said optical lens element, or a connection surface between the object-side surface and the image-side surface. The said optical element can be a light-blocking element, an annular spacer, a barrel element, a cover glass, a blue glass, a filter, a color filter, an optical path folding element, a prism, a mirror, etc. The said carrier can be a base for supporting a lens assembly, a micro lens disposed on an image sensor, a substrate surrounding the image sensor, a glass plate for protecting the image sensor, etc.

According to the present disclosure, the optical photographing lens assembly can further include a light-blocking element. The light-blocking element can have a non-circular opening, and the non-circular opening can have different effective radii in different directions which are perpendicular to the optical axis. Therefore, it is favorable for coordinating with the shape of non-circular lens elements or aperture stop so as to effectively save the space and make full use of the light passing through said non-circular lens elements or aperture stop, thereby reducing stray light. Moreover, the light-blocking element can be provided with a wavy structure or a jagged structure at a periphery of an inner hole portion thereof.

According to the present disclosure, the object side and image side are defined in accordance with the direction of the optical axis, and the axial optical data are calculated along the optical axis. Furthermore, if the optical axis is folded by a light-folding element, the axial optical data are also calculated along the folded optical axis.

According to the above description of the present disclosure, the following specific embodiments are provided for further explanation.

1st Embodiment

Figure 2:
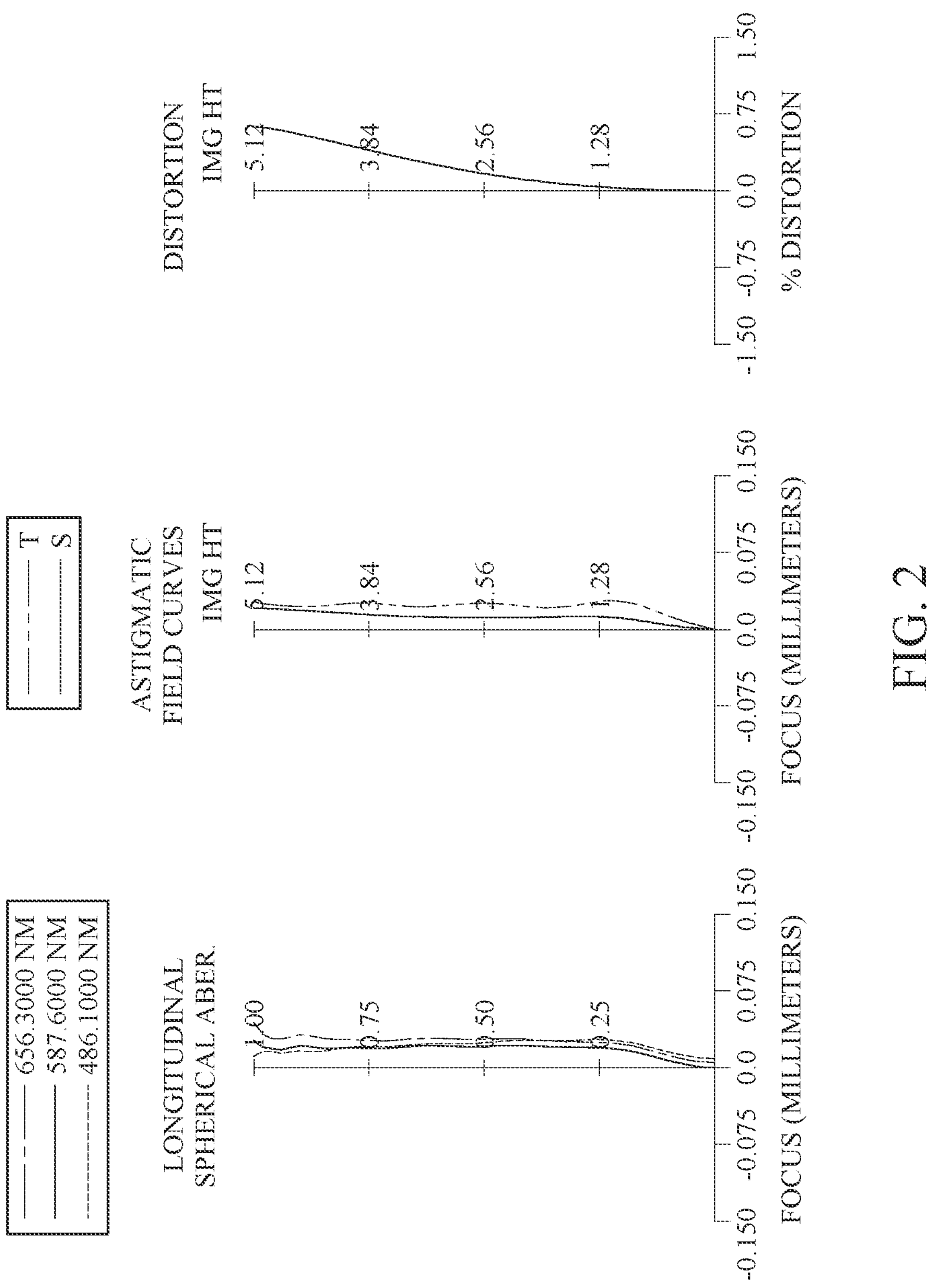
FIG. 2 shows spherical aberration curves, astigmatic field curves and a distortion curve of the image capturing unit corresponding to the infinite object distance according to the 1st embodiment.
Figure 3:
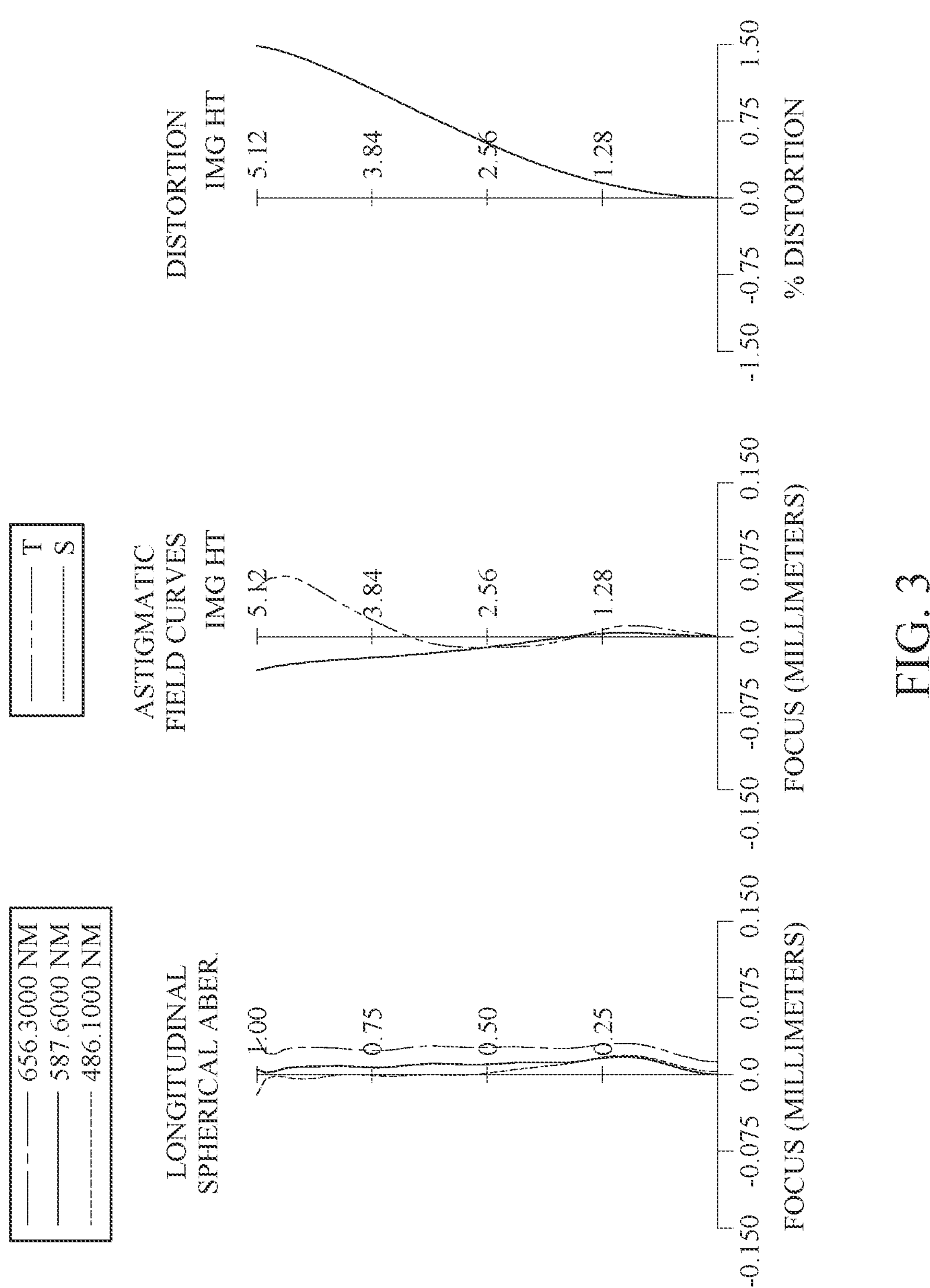
FIG. 3 shows spherical aberration curves, astigmatic field curves and a distortion curve of the image capturing unit corresponding to the short object distance according to the 1st embodiment.

FIG. 1 is a schematic view of an image capturing unit respectively corresponding to an infinite object distance and a short object distance according to the 1st embodiment of the present disclosure. FIG. 2 shows spherical aberration curves, astigmatic field curves and a distortion curve of the image capturing unit corresponding to the infinite object distance according to the 1st embodiment. FIG. 3 shows spherical aberration curves, astigmatic field curves and a distortion curve of the image capturing unit corresponding to the short object distance according to the 1st embodiment. The upper part of FIG. 1 shows the optical photographing lens assembly at a long focus state (a first state), and the lower part of FIG. 1 shows the optical photographing lens assembly at a short focus state (a second state). In FIG. 1, the image capturing unit 1 includes the optical photographing lens assembly (its reference numeral is omitted) of the present disclosure and an image sensor IS. The optical photographing lens assembly includes, in order from an object side to an image side along an optical path, a stop S1, a first lens element E1, a reflective element LF1, a stop S2, a second lens element E2, a third lens element E3, a stop S3, a fourth lens element E4, a fifth lens element E5, a sixth lens element E6, a stop S4, a seventh lens element E7, a reflective element LF2, a filter E8 and an image surface IMG. Further, the optical photographing lens assembly includes, in order from the object side to the image side along the optical path, a first lens group G1, a second lens group G2 and a third lens group G3. The first lens group G1 includes the first lens element E1. The second lens group G2 includes the second lens element E2, the third lens element E3, the fourth lens element E4 and the fifth lens element E5. The third lens group G3 includes the sixth lens element E6 and the seventh lens element E7. The optical photographing lens assembly includes seven lens elements (E1, E2, E3, E4, E5, E6 and E7) with no additional lens element disposed between each of the adjacent seven lens elements.

An axial distance between an imaged object (not shown) and the object-side surface of a lens element closest to the object side is defined as an object distance. In this embodiment, an axial distance between the imaged object and the object-side surface of the first lens element E1 is defined as the object distance. When the object distance changes from the infinite object distance to the short object distance, the optical photographing lens assembly performs a movement focus process to change from the long focus state to the short focus state. As shown in FIG. 1, during the movement focus process, the second lens group G2 moves towards the object side with respect to the first lens group G1 and the third lens group G3 along a direction in parallel with an optical axis. On the other hand, when the object distance changes from the short object distance to the infinite object distance, the second lens group G2 moves towards the image side with respect to the first lens group G1 and the third lens group G3 along a direction in parallel with the optical axis. Moreover, all lens elements of each of the three lens groups have no relative movement with respect to one another during the movement focus process.

Figure 4:
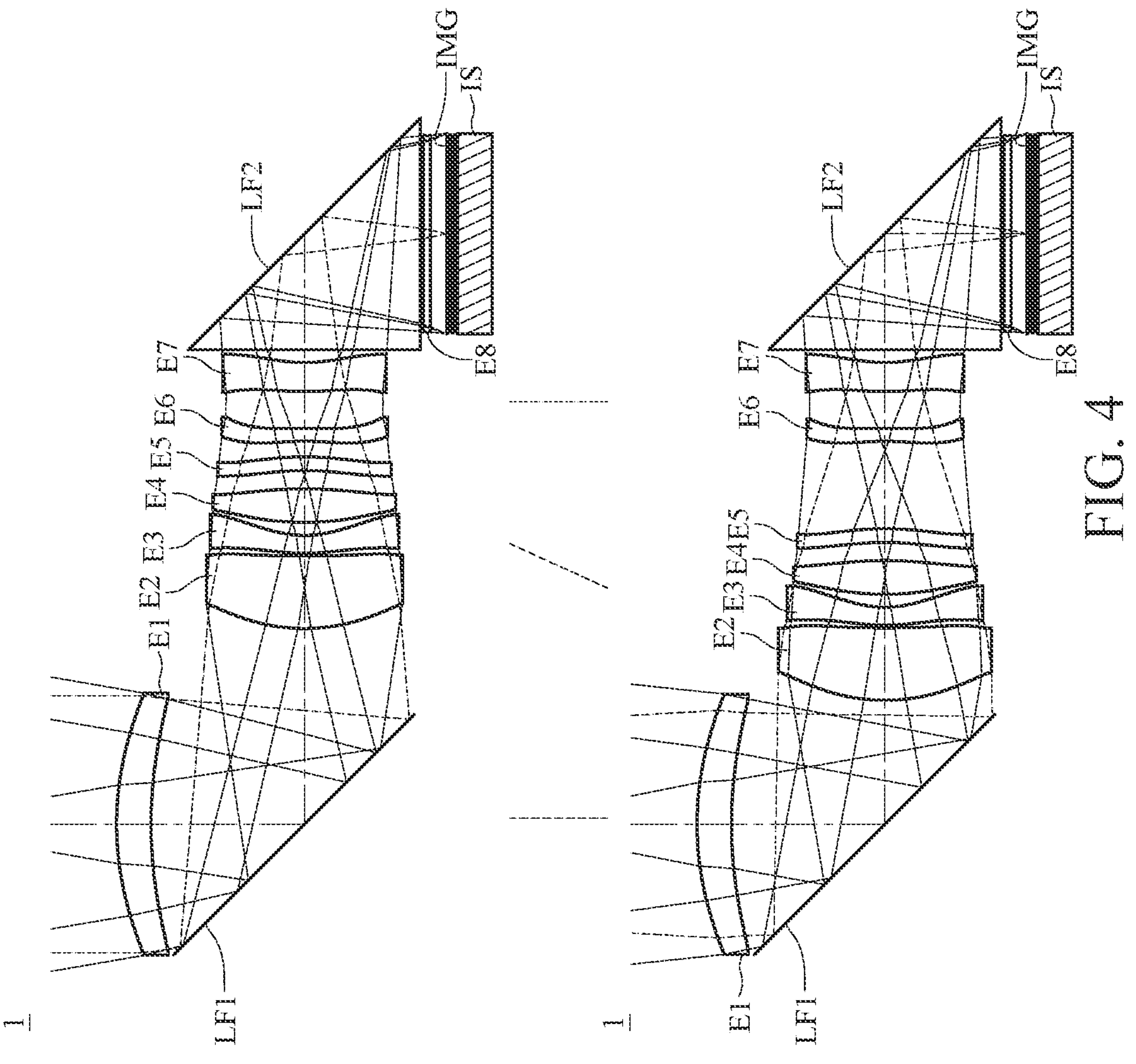
FIG. 4 is a schematic view of a configuration of a reflective element in the image capturing unit according to the 1st embodiment of the present disclosure.

The reflective element LF1 is a reflective mirror, and the reflective element LF2 is a glass prism. The reflective elements LF1, LF2 each provide an optical path folding function. The reflective element can have various forms as shown in FIG. 42 to FIG. 50, which will not be repeated again. Also, the light-folding effect generated by the reflective elements LF1, LF2 is omitted in FIG. 1 and depicted in FIG. 4.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has one inflection point. The image-side surface of the first lens element E1 has one inflection point.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point. The image-side surface of the second lens element E2 has two inflection points. The image-side surface of the second lens element E2 has one convex critical point in an off-axis region thereof.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has two inflection points. The image-side surface of the third lens element E3 has one inflection point. The object-side surface of the third lens element E3 has one concave critical point in an off-axis region thereof.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The object-side surface of the fourth lens element E4 has three inflection points. The image-side surface of the fourth lens element E4 has two inflection points. The image-side surface of the fourth lens element E4 has one convex critical point and one concave critical point in an off-axis region thereof.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric. The object-side surface of the fifth lens element E5 has two inflection points. The image-side surface of the fifth lens element E5 has two inflection points. The object-side surface of the fifth lens element E5 has one concave critical point and one convex critical point in an off-axis region thereof. The image-side surface of the fifth lens element E5 has one concave critical point in an off-axis region thereof.

The sixth lens element E6 with negative refractive power has an object-side surface being concave in a paraxial region thereof and an image-side surface being convex in a paraxial region thereof. The sixth lens element E6 is made of plastic material and has the object-side surface and the image-side surface being both aspheric. The object-side surface of the sixth lens element E6 has one inflection point. The image-side surface of the sixth lens element E6 has one inflection point. The object-side surface of the sixth lens element E6 has one convex critical point in an off-axis region thereof. The image-side surface of the sixth lens element E6 has one concave critical point in an off-axis region thereof.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has one inflection point. The image-side surface of the seventh lens element E7 has one inflection point. The object-side surface of the seventh lens element E7 has one concave critical point in an off-axis region thereof. The image-side surface of the seventh lens element E7 has one convex critical point in an off-axis region thereof.

The filter E8 is made of glass material and located between the reflective element LF2 and the image surface IMG, and will not affect the focal length of the optical photographing lens assembly. The image sensor IS is disposed on or near the image surface IMG.

The equation of the aspheric surface profiles of the aforementioned lens elements of the 1st embodiment is expressed as follows:

$$X(Y)=\left(Y^2/R\right)/\left(1+sqrt\left(1-(1+k)\times\left(Y/R\right)^2\right)\right)+\sum_i (Ai)\times\left(Y^i\right),$$

where,

X is the displacement in parallel with the optical axis from an axial vertex on the aspheric surface to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18, 20, 22, 24, 26 and 28.

In the optical photographing lens assembly of the image capturing unit 1 according to the 1st embodiment, a focal length of the optical photographing lens assembly is f, an f-number of the optical photographing lens assembly is Fno, and half of a maximum field of view of the optical photographing lens assembly is HFOV.

The values of the above optical parameters may be different when the optical photographing lens assembly is at different states due to the movement focus process. When a focal length of the optical photographing lens assembly with the infinite object distance is fL, a focal length of the optical photographing lens assembly with the short object distance is fS, an f-number of the optical photographing lens assembly with the infinite object distance is FnoL, an f-number of the optical photographing lens assembly with the short object distance is FnoS, half of a maximum field of view of the optical photographing lens assembly with the infinite object distance is HFOVL, and half of a maximum field of view of the optical photographing lens assembly with the short object distance is HFOVS, the following conditions are satisfied: fL=17.83 [mm]; fS=12.99 [mm]; FnoL=1.93; FnoS=2.53; HFOVL=15.9 [deg.]; and HFOVS=12.6 [deg.].

In this embodiment, an axial distance between the imaged object and the stop S1 is D0, an axial distance between the reflective element LF1 and the stop S2 is D1, and an axial distance between the image-side surface of the fifth lens element E5 and the object-side surface of the sixth lens element E6 is D2. The optical photographing lens assembly is changeable between different states through the movement focus process, and the values of D0 to D2 may vary accordingly. When the optical photographing lens assembly is with the infinite object distance, the aforementioned parameters have the following values: D0=® (infinity); D1=6.865 [mm]; and D2=0.476 [mm]. When the optical photographing lens assembly is with the short object distance, the aforementioned parameters have the following values: D0=61.293 [mm]; D1=4.665 [mm]; and D2=2.676 [mm].

When an axial distance between the object-side surface of the lens element closest to the object side and the image surface IMG in the optical photographing lens assembly with the infinite object distance is TLL, and an axial distance between the object-side surface of the lens element closest to the object side and the image surface IMG in the optical photographing lens assembly with the short object distance is TLS, the following condition is satisfied: TLL/TLS=1.00. In this embodiment, TLL is an axial distance between the object-side surface of the first lens element E1 and the image surface IMG in the optical photographing lens assembly with the infinite object distance, and TLS is an axial distance between the object-side surface of the first lens element E1 and the image surface IMG in the optical photographing lens assembly with the short object distance.

When an axial distance between the image-side surface of a lens element closest to the image side and the image surface IMG in the optical photographing lens assembly with the infinite object distance is BLL, and an axial distance between the image-side surface of the lens element closest to the image side and the image surface IMG in the optical photographing lens assembly with the short object distance is BLS, the following condition is satisfied: BLL/BLS=1.00. In this embodiment, BLL is an axial distance between the image-side surface of the seventh lens element E7 and the image surface IMG in the optical photographing lens assembly with the infinite object distance, and BLS is an axial distance between the image-side surface of the seventh lens element E7 and the image surface IMG in the optical photographing lens assembly with the short object distance.

When a focal length of the first lens group G1 is fG1, and a focal length of the second lens group G2 is fG2, the following condition is satisfied: fG1/fG2=4.85.

When the focal length of the optical photographing lens assembly with the infinite object distance is fL, and a focal length of a lens element closest to the image side in the second lens element is fG2N, the following condition is satisfied: |fL/fG2N|=0.05. In this embodiment, fG2N is a focal length of the fifth lens element E5.

When an axial distance between the first lens group G1 and the second lens group G2 in the optical photographing lens assembly with the infinite object distance is TG1G2L, and an axial distance between the object-side surface of a lens element closest to the object side in the second lens group G2 and the image-side surface of a lens element closest to the image side in the third lens element G3 in the optical photographing lens assembly with the infinite object distance is DG2G3L, the following condition is satisfied: TG1G2L/DG2G3L=1.31. In this embodiment, DG2G3L is an axial distance between the object-side surface of the second lens element E2 and the image-side surface of the seventh lens element E7 in the optical photographing lens assembly with the infinite object distance.

When the axial distance between the first lens group G1 and the second lens group G2 in the optical photographing lens assembly with the infinite object distance is TG1G2L, and an axial distance between the first lens group G1 and the second lens group G2 in the optical photographing lens assembly with the short object distance is TG1G2S, the following condition is satisfied: (TG1G2L-TG1G2S)/TG1G2L=0.21.

When the axial distance between the object-side surface of the lens element closest to the object side and the image surface IMG in the optical photographing lens assembly with the infinite object distance is TLL, and the focal length of the optical photographing lens assembly with the infinite object distance is fL, the following condition is satisfied: TLL/fL=1.58.

When the axial distance between the object-side surface of the lens element closest to the object side and the image surface IMG in the optical photographing lens assembly with the infinite object distance is TLL, and the axial distance between the image-side surface of the lens element closest to the image side and the image surface IMG in the optical photographing lens assembly with the infinite object distance is BLL, the following condition is satisfied: TLL/BLL=3.40.

When the focal length of the optical photographing lens assembly with the infinite object distance is fL, a focal length of the first lens element E1 is f1, a focal length of the fourth lens element E4 is f4, and the focal length of the fifth lens element E5 is f5, the following condition is satisfied: (|fL/f1|+|fL/f5|)/|fL/f4|=0.20.

When a focal length of the second lens element E2 is f2, and the focal length of the fifth lens element E5 is f5, the following condition is satisfied: |f2/f5|=0.03.

When the focal length of the fourth lens element E4 is f4, and the focal length of the fifth lens element E5 is f5, the following condition is satisfied: |f4/f5|=0.02.

When the focal length of the fourth lens element E4 is f4, a curvature radius of the object-side surface of the fourth lens element E4 is R7, and a curvature radius of the image-side surface of the fourth lens element E4 is R8, the following condition is satisfied: |f4/R7|+|f4/R8|=1.91.

When a curvature radius of the object-side surface of the first lens element E1 is R1, and a curvature radius of the image-side surface of the first lens element E1 is R2, the following condition is satisfied: (R1−R2)/(R1+R2)=−0.17.

When the curvature radius of the image-side surface of the first lens element E1 is R2, and a curvature radius of the image-side surface of the third lens element E3 is R6, the following condition is satisfied: |R6/R2|=0.23.

When an axial distance between the first lens element E1 and the second lens element E2 in the optical photographing lens assembly with the infinite object distance is T12L, and an axial distance between the object-side surface of the second lens element E2 and the image-side surface of the seventh lens element E7 in the optical photographing lens assembly with the infinite object distance is Dr3r14L, the following condition is satisfied: T12L/Dr3r14L=1.31. In this embodiment, an axial distance between two adjacent lens elements is a distance in a paraxial region between two adjacent lens surfaces of the two adjacent lens elements.

When an axial distance between the object-side surface of the second lens element E2 and the image-side surface of the fifth lens element E5 in the optical photographing lens assembly with the infinite object distance is Dr3r10L, and an axial distance between the object-side surface of the sixth lens element E6 and the image-side surface of the seventh lens element E7 in the optical photographing lens assembly with the infinite object distance is Dr11r14L, the following condition is satisfied: Dr3r10L/Dr11r14L=2.18.

When a central thickness of the fourth lens element E4 is CT4, and a central thickness of the fifth lens element E5 is CT5, the following condition is satisfied: CT5/CT4=0.41.

When a central thickness of the sixth lens element E6 is CT6, and an axial distance between the sixth lens element E6 and the seventh lens element E7 in the optical photographing lens assembly with the infinite object distance is T67L, the following condition is satisfied: CT6/T67L=0.36.

When an Abbe number of the fifth lens element E5 is V5, and a refractive index of the fifth lens element E5 is N5, the following condition is satisfied: V5/N5=9.61.

When a total number of lens elements having an Abbe number smaller than 30 in the optical photographing lens assembly is V30, the following condition is satisfied: V30=2.

When the axial distance between the sixth lens element E6 and the seventh lens element E7 in the optical photographing lens assembly with the infinite object distance is T67L, a displacement in parallel with the optical axis from an axial vertex of the image-side surface of the sixth lens element E6 to a maximum effective radius position of the image-side surface of the sixth lens element E6 is Sag6R2, and a displacement in parallel with the optical axis from an axial vertex of the object-side surface of the seventh lens element E7 to a maximum effective radius position of the object-side surface of the seventh lens element E7 is Sag7R1, the following condition is satisfied: (T67L-Sag6R2+Sag7R1)/T67L=0.23.

When a displacement in parallel with the optical axis from an axial vertex of the image-side surface of the fourth lens element E4 to a maximum effective radius position of the image-side surface of the fourth lens element E4 is Sag4R2, and the central thickness of the fourth lens element E4 is CT4, the following condition is satisfied: Sag4R2/CT4=−0.17.

The detailed optical data of the 1st embodiment are shown in Table 1A and Table 1B. and the aspheric surface data are shown in Table 1C below.

TABLE 1A

| 1st Embodiment | | | | | | | | |
|---|---|---|---|---|---|---|---|---|
| Surface # | | Curvature Radius | | Thickness | Material | Index | Abbe # | Focal Length |
| 0 | Object | Plano | | D0 | | | | |
| 1 | Stop | Plano | | −1.293 | | | | |
| 2 | Lens 1 | 9.2284 | (ASP) | 1.056 | Plastic | 1.544 | 56.0 | 53.61 |
| 3 | | 12.9560 | (ASP) | 4.700 | | | | |
| 4 | Reflective element | Plano | | D1 | | | | |
| 5 | Stop | Plano | | −0.865 | | | | |
| 6 | Lens 2 | 5.6940 | (ASP) | 2.219 | Plastic | 1.544 | 56.0 | 11.78 |
| 7 | | 44.1238 | (ASP) | 0.084 | | | | |
| 8 | Lens 3 | 6.3801 | (ASP) | 0.547 | Plastic | 1.614 | 25.6 | −10.12 |
| 9 | | 3.0444 | (ASP) | 0.775 | | | | |
| 10 | Stop | Plano | | −0.372 | | | | |
| 11 | Lens 4 | 9.2611 | (ASP) | 1.029 | Plastic | 1.534 | 56.0 | 9.42 |
| 12 | | −10.6053 | (ASP) | 0.555 | | | | |
| 13 | Lens 5 | −8.7014 | (ASP) | 0.422 | Plastic | 1.697 | 16.3 | 379.11 |
| 14 | | −8.5919 | (ASP) | D2 | | | | |
| 15 | Lens 6 | −8.2609 | (ASP) | 0.400 | Plastic | 1.544 | 56.0 | −24.13 |
| 16 | | −22.6694 | (ASP) | 0.705 | | | | |
| 17 | Stop | Plano | | 0.419 | | | | |
| 18 | Lens 7 | 8.5013 | (ASP) | 0.890 | Plastic | 1.544 | 56.0 | −19.84 |
| 19 | | 4.5800 | (ASP) | 0.400 | | | | |
| 20 | Reflective element | Plano | | 7.100 | Glass | 1.847 | 23.8 | — |
| 21 | | Plano | | 0.100 | | | | |
| 22 | Filter | Plano | | 0.210 | Glass | 1.517 | 64.2 | — |
| 23 | | Plano | | 0.492 | | | | |
| 24 | Image | Plano | | — | | | | |

Note: Reference wavelength is 587.6 nm (d-line).

The aperture stop may be located on different positions depending on the object distance.

The aperture stop is located on Surface 5 at the long focus state (first state).

The aperture stop is located on Surface 10 at the short focus state (second state).

An effective radius of the stop S1 (Surface 1) is 5.250 mm

An effective radius of the stop S2 (Surface 5) is 3.402 mm

An effective radius of the stop S3 (Surface 10) is 2.801 mm

An effective radius of the stop S4 (Surface 17) is 2.880 mm

In Table 1A, the curvature radius, the thickness and the focal length are shown in millimeters (mm). Surface numbers 0-24 represent the surfaces sequentially arranged from the object side to the image side along the optical axis.

TABLE 1B

| Optical data for optical photographing lens assembly with infinite object distance and short object distance | | |
|---|---|---|
| | Infinite object distance (Long focus state) | Short object distance (Short focus state) |
| f[mm] | 17.83 | 12.99 |
| Fno | 1.93 | 2.53 |
| HFOV [deg.] | 15.9 | 12.6 |
| Object distance [mm] | ∞ | 60.000 |
| D0 [mm] | ∞ | 61.293 |
| D1 [mm] | 6.865 | 4.665 |
| D2 [mm] | 0.476 | 2.676 |

Table 1B shows optical data of the long focus state and the short focus state of the optical photographing lens assembly in different focusing conditions. It should be understood that only two focusing conditions (i.e., the long focus state and the short focus state) are disclosed in this embodiment, but the present disclosure is not limited thereto. The optical photographing lens assembly of this embodiment can further have other object distances corresponding to the intermediate range of infinity and the close-up distance related to other focusing conditions besides the long focus state and the short focus state for different object distances.

Referring to Table 1B, the optical photographing lens assembly performs the movement focus process according to the object distance, and the second lens group G2 is moved relative to the first lens group G1 and the third lens element G3 along the optical axis in the movement focus process. In specific, when the object distance D0 varies to 60.000 millimeters from infinity, the optical photographing lens assembly changes to the short focus state from the long focus state. That is, when the object distance decreases, the second lens group G2 moves along the optical axis towards the object side relative to the first lens group G1 and the third lens element G3 during the movement focus process.

TABLE 1C

Aspheric Coefficients

| Surface # | 2 | 3 | 6 | 7 |
|---|---|---|---|---|
| k= | −1.97977000E−01 | −3.76888000E−01 | −2.03216000E−01 | −7.22252000E+01 |
| A4= | −2.00793261E−04 | −2.32887082E−04 | 3.71609779E−05 | 5.59594447E−03 |
| A6= | 9.95639129E−06 | 7.70926230E−06 | −7.58684235E−05 | −5.93092172E−03 |
| A8= | −2.73524476E−06 | −2.64002891E−06 | −7.05616784E−06 | 5.79856287E−03 |
| A10= | 3.21961401E−07 | 3.52340720E−07 | 1.05812890E−05 | −3.55908594E−03 |
| A12= | −2.56409073E−08 | −3.27313203E−08 | −5.73063703E−06 | 1.36423929E−03 |
| A14= | 1.29407157E−09 | 1.97139777E−09 | 1.62089624E−06 | −3.44571986E−04 |
| A16= | −4.08428989E−11 | −7.60762166E−11 | −2.78665772E−07 | 5.87505748E−05 |
| A18= | 7.58855222E−13 | 1.80411348E−12 | 2.98388794E−08 | −6.77115257E−06 |
| A20= | −7.27172165E−15 | −2.39063279E−14 | −1.93687260E−09 | 5.16945189E−07 |
| A22= | 2.44917858E−17 | 1.35087014E−16 | 6.94609935E−11 | −2.48595327E−08 |
| A24= | — | — | −1.05034994E−12 | 6.74763021E−10 |
| A26= | — | — | — | −7.75279885E−12 |

| Surface # | 8 | 9 | 11 | 12 |
|---|---|---|---|---|
| k= | −9.84699000E−01 | −1.33345000E−02 | 2.39442000E+00 | −1.50536000E+01 |
| A4= | −1.20655439E−02 | −2.37185407E−02 | 1.55899459E−04 | 8.69814114E−04 |
| A6= | −5.44929279E−03 | −2.04924975E−03 | −1.19366519E−03 | −3.59949490E−04 |
| A8= | 8.72035611E−03 | 6.40614677E−03 | 1.16483026E−03 | 2.11031971E−03 |
| A10= | −5.82382544E−03 | −4.09746160E−03 | 8.24006585E−04 | −1.43765422E−03 |
| A12= | 2.32214257E−03 | 1.20457548E−03 | −1.44232439E−03 | 4.87339325E−04 |
| A14= | −6.00100979E−04 | −1.00243330E−04 | 8.12339383E−04 | −1.31176093E−04 |
| A16= | 1.03493517E−04 | −4.51684930E−05 | −2.55345546E−04 | 4.45761823E−05 |
| A18= | −1.19204403E−05 | 1.74054502E−05 | 5.01236814E−05 | −1.51174286E−05 |
| A20= | 8.94317244E−07 | −2.89657046E−06 | −6.29406334E−06 | 3.59403066E−06 |
| A22= | −4.11059837E−08 | 2.67259665E−07 | 4.92386187E−07 | −5.43972890E−07 |
| A24= | 1.01194574E−09 | −1.32887459E−08 | −2.18723803E−08 | 5.03145787E−08 |
| A26= | −9.33886852E−12 | 2.78507903E−10 | 4.21004239E−10 | −2.60306346E−09 |
| A28= | — | — | — | 5.78254569E−11 |

| Surface # | 13 | 14 | 15 | 16 |
|---|---|---|---|---|
| k= | −1.59905000E+00 | −1.24110000E+01 | −8.02285000E−01 | −8.98826000E+01 |
| A4= | 3.74285820E−03 | 1.14259355E−03 | 2.30435412E−02 | 2.02119814E−02 |
| A6= | 2.52169197E−05 | −2.93738195E−04 | −2.98793031E−03 | −1.59010787E−03 |
| A8= | 1.73422259E−03 | 1.79373764E−03 | −5.71577307E−05 | −7.01263563E−04 |
| A10= | −1.09524926E−03 | −1.39876623E−03 | 4.85171881E−04 | 7.90581295E−04 |
| A12= | −2.33530216E−05 | 5.07585142E−04 | −3.09362817E−04 | −4.06404610E−04 |
| A14= | 2.97744003E−04 | −8.06879185E−05 | 1.14283629E−04 | 1.27901169E−04 |
| A16= | −1.60512499E−04 | −4.36759797E−06 | −2.72986909E−05 | −2.52788349E−05 |
| A18= | 4.63415380E−05 | 4.54066987E−06 | 4.27769812E−06 | 2.99230540E−06 |
| A20= | −8.47195855E−06 | −9.25215745E−07 | −4.26733279E−07 | −1.71164701E−07 |
| A22= | 1.01478440E−06 | 9.71244645E−08 | 2.46044785E−08 | −1.55580504E−09 |
| A24= | −7.77339686E−08 | −5.41400555E−09 | −5.75725195E−10 | 7.28930819E−10 |
| A26= | 3.47256909E−09 | 1.27265485E−10 | −1.07006352E−11 | −2.70305714E−11 |
| A28= | −6.90924765E−11 | — | 6.21325369E−13 | — |

TABLE 1C-continued

| Aspheric Coefficients | | |
|---|---|---|
| Surface # | 18 | 19 |
| k= | 4.91454000E+00 | −2.73636000E−01 |
| A4= | −1.83632252E−02 | −1.90403403E−02 |
| A6= | 2.98017620E−03 | 2.19736925E−03 |
| A8= | −2.03577341E−03 | −3.08935841E−04 |
| A10= | 1.51969060E−03 | 3.44722558E−05 |
| A12= | −8.06406907E−04 | −3.10739901E−07 |
| A14= | 2.94634327E−04 | −1.38145018E−06 |
| A16= | −7.48233608E−05 | 4.33280780E−07 |
| A18= | 1.31785032E−05 | −7.32753454E−08 |
| A20= | −1.57701940E−06 | 7.59004741E−09 |
| A22= | 1.22131500E−07 | −4.78247825E−10 |
| A24= | −5.51041648E−09 | 1.68162051E−11 |
| A26= | 1.09721989E−10 | −2.52922109E−13 |

In Table 1C, k represents the conic coefficient of the equation of the aspheric surface profiles. A4-A28 represent the aspheric coefficients ranging from the 4th order to the 28th order. The tables presented below for each embodiment are the corresponding schematic parameter and aberration curves, and the definitions of the tables are the same as Table 1A to Table 1C of the 1st embodiment. Therefore, an explanation in this regard will not be provided again.

2nd Embodiment

Figure 5:
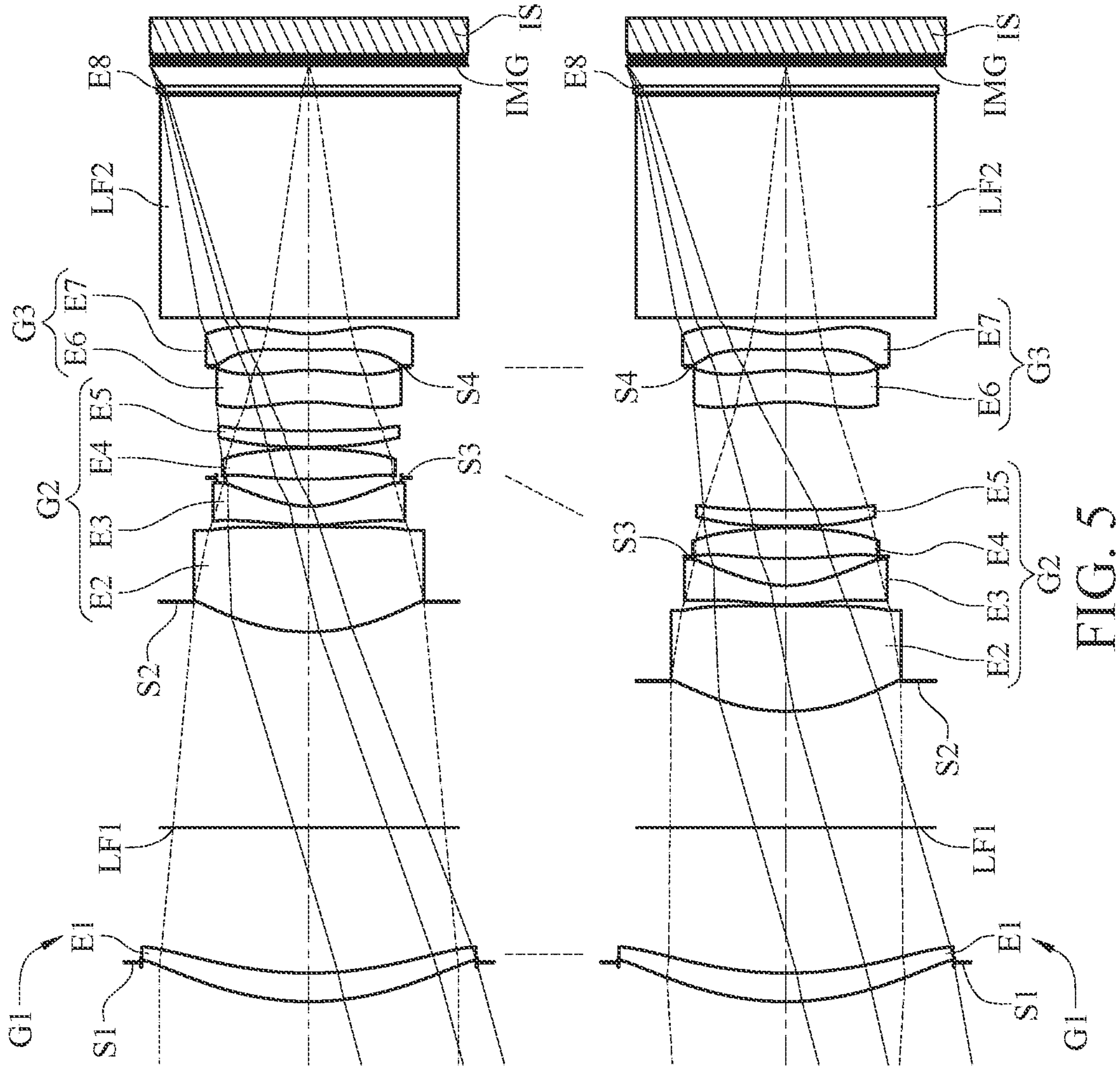
FIG. 5 is a schematic view of an image capturing unit respectively corresponding to an infinite object distance and a short object distance according to the 2nd embodiment of the present disclosure.
Figure 6:
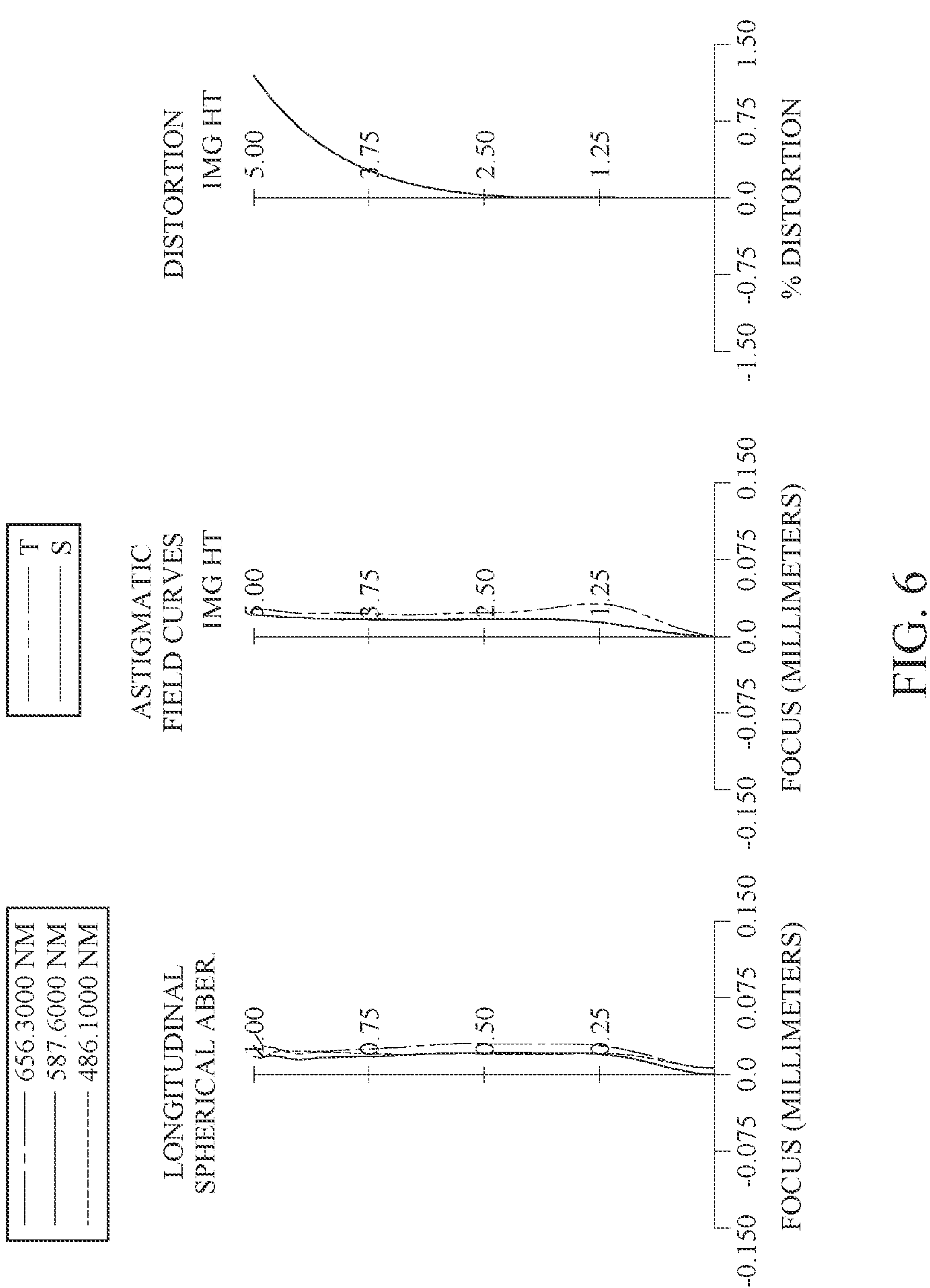
FIG. 6 shows spherical aberration curves, astigmatic field curves and a distortion curve of the image capturing unit corresponding to the infinite object distance according to the 2nd embodiment.
Figure 7:
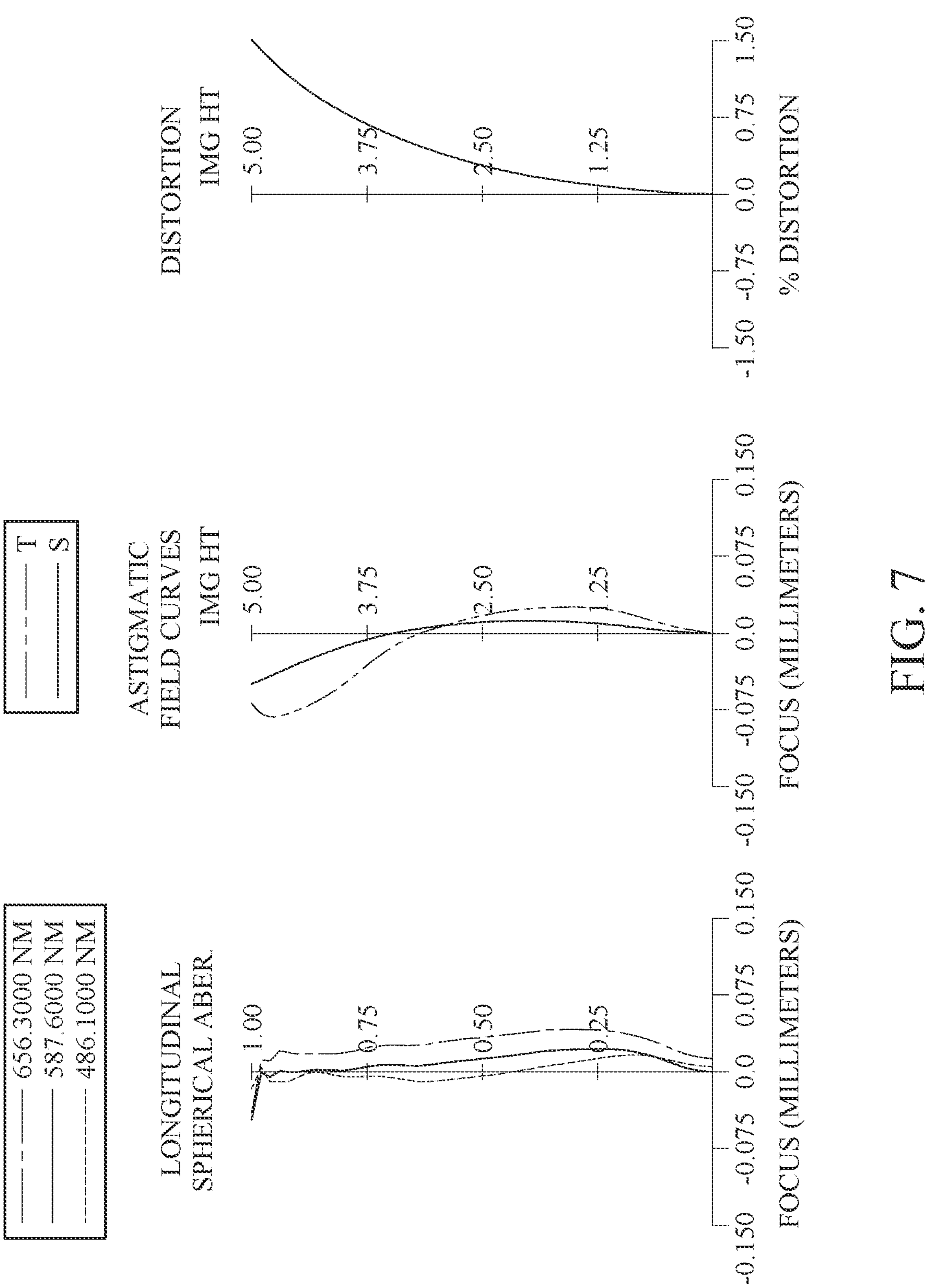
FIG. 7 shows spherical aberration curves, astigmatic field curves and a distortion curve of the image capturing unit corresponding to the short object distance according to the 2nd embodiment.

FIG. 5 is a schematic view of an image capturing unit respectively corresponding to an infinite object distance and a short object distance according to the 2nd embodiment of the present disclosure. FIG. 6 shows spherical aberration curves, astigmatic field curves and a distortion curve of the image capturing unit corresponding to the infinite object distance according to the 2nd embodiment. FIG. 7 shows spherical aberration curves, astigmatic field curves and a distortion curve of the image capturing unit corresponding to the short object distance according to the 2nd embodiment. The upper part of FIG. 5 shows the optical photographing lens assembly at a long focus state (a first state), and the lower part of FIG. 5 shows the optical photographing lens assembly at a short focus state (a second state). In FIG. 5, the image capturing unit 2 includes the optical photographing lens assembly (its reference numeral is omitted) of the present disclosure and an image sensor IS. The optical photographing lens assembly includes, in order from an object side to an image side along an optical path, a stop S1, a first lens element E1, a reflective element LF1, a stop S2, a second lens element E2, a third lens element E3, a stop S3, a fourth lens element E4, a fifth lens element E5, a sixth lens element E6, a stop S4, a seventh lens element E7, a reflective element LF2, a filter E8 and an image surface IMG. Further, the optical photographing lens assembly includes, in order from the object side to the image side along the optical path, a first lens group G1, a second lens group G2 and a third lens group G3. The first lens group G1 includes the first lens element E1. The second lens group G2 includes the second lens element E2, the third lens element E3, the fourth lens element E4 and the fifth lens element E5. The third lens group G3 includes the sixth lens element E6 and the seventh lens element E7. The optical photographing lens assembly includes seven lens elements (E1, E2, E3, E4, E5, E6 and E7) with no additional lens element disposed between each of the adjacent seven lens elements.

An axial distance between an imaged object (not shown) and the object-side surface of a lens element closest to the object side is defined as an object distance. In this embodiment, an axial distance between the imaged object and the object-side surface of the first lens element E1 is defined as the object distance. When the object distance changes from the infinite object distance to the short object distance, the optical photographing lens assembly performs a movement focus process to change from the long focus state to the short focus state. As shown in FIG. 5, during the movement focus process, the second lens group G2 moves towards the object side with respect to the first lens group G1 and the third lens group G3 along a direction in parallel with an optical axis. On the other hand, when the object distance changes from the short object distance to the infinite object distance, the second lens group G2 moves towards the image side with respect to the first lens group G1 and the third lens group G3 along a direction in parallel with the optical axis. Moreover, all lens elements of each of the three lens groups have no relative movement with respect to one another during the movement focus process.

The reflective element LF1 is a reflective mirror, and the reflective element LF2 is a glass prism. The reflective elements LF1, LF2 each provide an optical path folding function. The reflective element can have various forms as shown in FIG. 42 to FIG. 50, which will not be repeated again. Also, the light-folding effect generated by the reflective elements LF1, LF2 is omitted in FIG. 5.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has one inflection point. The image-side surface of the first lens element E1 has one inflection point.

The second lens element E2 with positive refractive power has an object-side surface being convex in a paraxial region thereof and an image-side surface being convex in a paraxial region thereof. The second lens element E2 is made of plastic material and has the object-side surface and the image-side surface being both aspheric. The object-side surface of the second lens element E2 has one inflection point. The image-side surface of the second lens element E2 has three inflection points.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has two inflection points. The image-side surface of the third lens element E3 has two inflection points. The object-side surface of the third lens element E3 has one convex critical point and one concave critical point in an off-axis region thereof.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The object-side surface of the fourth lens element E4 has three inflection points. The object-side surface of the fourth lens element E4 has one concave critical point in an off-axis region thereof.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has one inflection point. The image-side surface of the fifth lens element E5 has one inflection point. The object-side surface of the fifth lens element E5 has one concave critical point in an off-axis region thereof. The image-side surface of the fifth lens element E5 has one convex critical point in an off-axis region thereof.

The sixth lens element E6 with positive refractive power has an object-side surface being concave in a paraxial region thereof and an image-side surface being convex in a paraxial region thereof. The sixth lens element E6 is made of plastic material and has the object-side surface and the image-side surface being both aspheric. The object-side surface of the sixth lens element E6 has one inflection point. The image-side surface of the sixth lens element E6 has one inflection point. The object-side surface of the sixth lens element E6 has one convex critical point in an off-axis region thereof. The image-side surface of the sixth lens element E6 has one concave critical point in an off-axis region thereof.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has one inflection point. The image-side surface of the seventh lens element E7 has one inflection point. The object-side surface of the seventh lens element E7 has one concave critical point in an off-axis region thereof. The image-side surface of the seventh lens element E7 has one convex critical point in an off-axis region thereof.

The filter E8 is made of glass material and located between the reflective element LF2 and the image surface IMG, and will not affect the focal length of the optical photographing lens assembly. The image sensor IS is disposed on or near the image surface IMG.

The detailed optical data of the 2nd embodiment are shown in Table 2A and Table 2B, and the aspheric surface data are shown in Table 2C below.

TABLE 2A

| 2nd Embodiment | | | | | | | | |
|---|---|---|---|---|---|---|---|---|
| Surface # | | Curvature Radius | | Thickness | Material | Index | Abbe # | Focal Length |
| 0 | Object | Plano | | D0 | | | | |
| 1 | Stop | Plano | | −1.241 | | | | |
| 2 | Lens 1 | 9.0026 | (ASP) | 0.898 | Plastic | 1.534 | 56.0 | 62.82 |
| 3 | | 11.8751 | (ASP) | 4.578 | | | | |
| 4 | Reflective element | Plano | | D1 | | | | |
| 5 | Stop | Plano | | −0.948 | | | | |
| 6 | Lens 2 | 6.1824 | (ASP) | 3.312 | Plastic | 1.544 | 56.0 | 10.70 |
| 7 | | −80.3388 | (ASP) | 0.048 | | | | |
| 8 | Lens 3 | 7.2459 | (ASP) | 0.600 | Plastic | 1.614 | 25.6 | −8.83 |
| 9 | | 3.0030 | (ASP) | 0.909 | | | | |
| 10 | Stop | Plano | | −0.053 | | | | |
| 11 | Lens 4 | 16.0891 | (ASP) | 0.974 | Plastic | 1.544 | 56.0 | 10.70 |
| 12 | | −8.9241 | (ASP) | 0.040 | | | | |
| 13 | Lens 5 | 26.1126 | (ASP) | 0.514 | Plastic | 1.587 | 28.3 | 103.49 |
| 14 | | 45.4545 | (ASP) | D2 | | | | |
| 15 | Lens 6 | −5.6330 | (ASP) | 0.998 | Plastic | 1.544 | 56.0 | 65.03 |
| 16 | | −5.1627 | (ASP) | 0.089 | | | | |
| 17 | Stop | Plano | | 0.548 | | | | |
| 18 | Lens 7 | 17.9631 | (ASP) | 0.517 | Plastic | 1.544 | 56.0 | −10.26 |
| 19 | | 4.2153 | (ASP) | 0.500 | | | | |
| 20 | Reflective element | Plano | | 7.000 | Glass | 1.847 | 23.8 | — |
| 21 | | Plano | | 0.100 | | | | |
| 22 | Filter | Plano | | 0.210 | Glass | 1.517 | 64.2 | — |
| 23 | | Plano | | 0.634 | | | | |
| 24 | Image | Plano | | — | | | | |

Note: Reference wavelength is 587.6 nm (d-line).

The aperture stop may be located on different positions depending on the object distance.

The aperture stop is located on Surface 5 at the long focus state (first state).

The aperture stop is located on Surface 5 at the short focus state (second state).

An effective radius of the stop S1 (Surface 1) is 5.283 mm

An effective radius of the stop S2 (Surface 5) is 3.619 mm

An effective radius of the stop S3 (Surface 10) is 2.919 mm

An effective radius of the stop S4 (Surface 17) is 2.870 mm

TABLE 2B

| Optical data for optical photographing lens assembly with infinite object distance and short object distance | | |
|---|---|---|
| | Infinite object distance (Long focus state) | Short object distance (Short focus state) |
| f [mm] | 18.14 | 13.31 |
| Fno | 1.93 | 2.43 |
| HFOV [deg.] | 15.2 | 12.8 |
| Object distance [mm] | ∞ | 58.759 |
| D0 [mm] | ∞ | 60.000 |
| D1 [mm] | 7.120 | 4.620 |
| D2 [mm] | 0.906 | 3.406 |

In Table 2B, the optical data is the same as the data of the 1st embodiment. Please be noted that in this embodiment, an axial distance between the imaged object and the stop S1 is D0, an axial distance between the reflective element LF1 and the stop S2 is D1, and an axial distance between the image-side surface of the fifth lens element E5 and the object-side surface of the sixth lens element E6 is D2.

Moreover, the optical photographing lens assembly of this embodiment can further have other focal lengths object distances corresponding to the intermediate range of infinity and the close-up distance the long focus state and the short focus state in related to other movement focusing conditions besides the long focus state and the short focus state for different object distances. The present disclosure is not limited to the optical photographing lens assembly in TABLE 2B.

TABLE 2C

| Aspheric Coefficients | | | | |
|---|---|---|---|---|
| Surface # | 2 | 3 | 6 | 7 |
| k= | −1.37228000E−01 | −4.52246000E−01 | 1.66065000E−01 | 9.90000000E+01 |
| A4= | −1.88361936E−04 | −1.91606000E−04 | −2.94299917E−04 | 4.34430670E−03 |
| A6= | −6.56923470E−06 | −1.49722380E−05 | −8.57769756E−05 | −6.31780461E−04 |
| A8= | −2.21810963E−07 | 1.44115255E−06 | 4.39239705E−05 | −9.26172921E−04 |
| A10= | 7.28517345E−08 | −1.33610890E−07 | −2.38798913E−05 | 6.66749709E−04 |
| A12= | −1.01578318E−08 | 6.03982760E−09 | 7.69604756E−06 | −2.12023600E−04 |
| A14= | 7.25353484E−10 | −7.97734798E−11 | −1.58773242E−06 | 3.42802147E−05 |
| A16= | −3.04727836E−11 | −5.37335586E−12 | 2.14050188E−07 | −1.79482714E−06 |
| A18= | 7.49915635E−13 | 2.84247803E−13 | −1.87929084E−08 | −3.27230651E−07 |
| A20= | −9.98376483E−15 | −5.45159660E−15 | 1.03544476E−09 | 7.16035817E−08 |
| A22= | 5.46687360E−17 | 3.84115225E−17 | −3.25080354E−11 | −6.09699566E−09 |
| A24= | — | — | 4.43699263E−13 | 2.56014644E−10 |
| A26= | — | — | — | −4.36856770E−12 |
| Surface # | 8 | 9 | 11 | 12 |
| k= | 3.36545000E−01 | −1.59519000E−02 | −1.18928000E+01 | −1.30245000E+00 |
| A4= | −1.32375643E−02 | −2.35537093E−02 | 7.71786549E−04 | 1.15110979E−02 |
| A6= | 2.20302603E−03 | 2.67969765E−03 | 4.72973664E−04 | −7.65550725E−03 |
| A8= | −1.01332181E−03 | 4.07486084E−04 | −1.62358701E−03 | 4.71496113E−03 |
| A10= | 2.53892933E−04 | −1.10843802E−03 | 1.91350357E−03 | −2.01494695E−03 |
| A12= | 1.08291107E−04 | 7.92344984E−04 | −1.36907808E−03 | 5.19832425E−04 |
| A14= | −9.68944870E−05 | −3.24523332E−04 | 6.37919047E−04 | −3.12649886E−05 |
| A16= | 3.14424959E−05 | 8.32693471E−05 | −1.98620692E−04 | −3.36059062E−05 |
| A18= | −5.76358279E−06 | −1.38203643E−05 | 4.11928487E−05 | 1.43903097E−05 |
| A20= | 6.46765122E−07 | 1.48881093E−06 | −5.57871088E−06 | −2.95924736E−06 |
| A22= | −4.41308748E−08 | −1.01326412E−07 | 4.71907186E−07 | 3.57995805E−07 |
| A24= | 1.68554989E−09 | 4.01007178E−09 | −2.25782842E−08 | −2.58397420E−08 |
| A26= | −2.76854383E−11 | −7.16184921E−11 | 4.65843374E−10 | 1.03054816E−09 |
| A28= | — | — | — | −1.74895859E−11 |
| Surface # | 13 | 14 | 15 | 16 |
| k= | −9.90000000E+01 | −9.90000000E+01 | 8.69878000E−01 | −5.84182000E+00 |
| A4= | 9.66738363E−03 | −7.93327528E−04 | 1.81482657E−02 | 2.23009445E−02 |
| A6= | −6.96603783E−03 | −1.20269313E−04 | −1.70592283E−03 | −4.53598743E−03 |
| A8= | 5.37524585E−03 | 1.12144139E−03 | −1.04799026E−04 | 1.17813776E−03 |
| A10= | −3.16232009E−03 | −1.21267403E−03 | 3.00642074E−04 | −2.49765712E−04 |
| A12= | 1.38113494E−03 | 7.50492415E−04 | −1.75209119E−04 | 3.74822908E−05 |
| A14= | −4.16333281E−04 | −2.86500737E−04 | 6.07542873E−05 | −9.01226075E−06 |
| A16= | 7.83441768E−05 | 6.97582446E−05 | −1.36197334E−05 | 3.99568934E−06 |
| A18= | −7.29828895E−06 | −1.09547414E−05 | 1.93994662E−06 | −1.22103229E−06 |
| A20= | −1.74853072E−07 | 1.09395601E−06 | −1.54067374E−07 | 2.20597933E−07 |
| A22= | 1.28557788E−07 | −6.61307815E−08 | 2.51984056E−09 | −2.34261313E−08 |
| A24= | −1.45645640E−08 | 2.15494244E−09 | 6.85073081E−10 | 1.36290567E−09 |
| A26= | 7.51414615E−10 | −2.77699141E−11 | −5.93324082E−11 | −3.36198553E−11 |
| A28= | −1.54235557E−11 | — | 1.58621628E−12 | — |
| Surface # | 18 | | 19 | |
| k= | 1.52802000E+01 | | −4.06273000E−01 | |
| A4= | −1.17326540E−02 | | −2.86599066E−02 | |
| A6= | −1.01611522E−03 | | 4.82726599E−03 | |
| A8= | 7.40418917E−04 | | −1.10936118E−03 | |
| A10= | −2.01567931E−04 | | 3.58860576E−04 | |
| A12= | 6.56326874E−05 | | −1.28503251E−04 | |

TABLE 2C-continued

| Aspheric Coefficients | | |
|---|---|---|
| A14= | −3.93720465E−05 | 3.60453066E−05 |
| A16= | 1.70887922E−05 | −7.09996258E−06 |
| A18= | −4.45194972E−06 | 9.58743501E−07 |
| A20= | 7.09300835E−07 | −8.69353479E−08 |
| A22= | −6.83357656E−08 | 5.05869354E−09 |
| A24= | 3.66964276E−09 | −1.70569661E−10 |
| A26= | −8.44687396E−11 | 2.53118781E−12 |

In the 2nd embodiment, the equation of the aspheric surface profiles of the aforementioned lens elements is the same as the equation of the 1st embodiment. Also, the definitions of these parameters shown in Table 2D below are the same as those stated in the 1st embodiment with corresponding values for the 2nd embodiment, so an explanation in this regard will not be provided again.

Moreover, these parameters can be calculated from Table 2A to Table 2C as the following values and satisfy the following conditions:

TABLE 2D

| Schematic Parameters | | | |
|---|---|---|---|
| fL [mm] | 18.14 | (\|fL/f1\| + \|fL/f5\|)/\|fL/f4\| | 0.27 |
| FnoL | 1.93 | \|f2/f5\| | 0.10 |
| HFOVL [deg.] | 15.2 | \|f4/f5] | 0.10 |
| fS [mm] | 13.31 | \|f4/R7\| + \|f4/R8\| | 1.86 |
| FnoS | 2.43 | (R1 − R2)/(R1 + R2) | −0.14 |
| HFOVS [deg.] | 12.8 | \|R6/R2\| | 0.25 |
| TLL/TLS | 1.00 | T12L/Dr3r14L | 1.14 |
| BLL/BLS | 1.00 | Dr3r10L/Dr11r14L | 2.95 |
| fG1/fG2 | 5.35 | CT5/CT4 | 0.53 |
| \|fL/fG2N\| | 0.18 | CT6/T67L | 1.57 |
| TG1G2L/DG2G3L | 1.14 | V5/N5 | 17.83 |
| (TG1G2L − TG1G2S)/ TG1G2L | 0.23 | V30 | 2 |
| TLL/fL | 1.63 | (T67L − Sag6R2 + Sag7R1)/T67L | 0.17 |
| TLL/BLL | 3.49 | Sag4R2/CT4 | −0.48 |

3rd Embodiment

Figure 8:
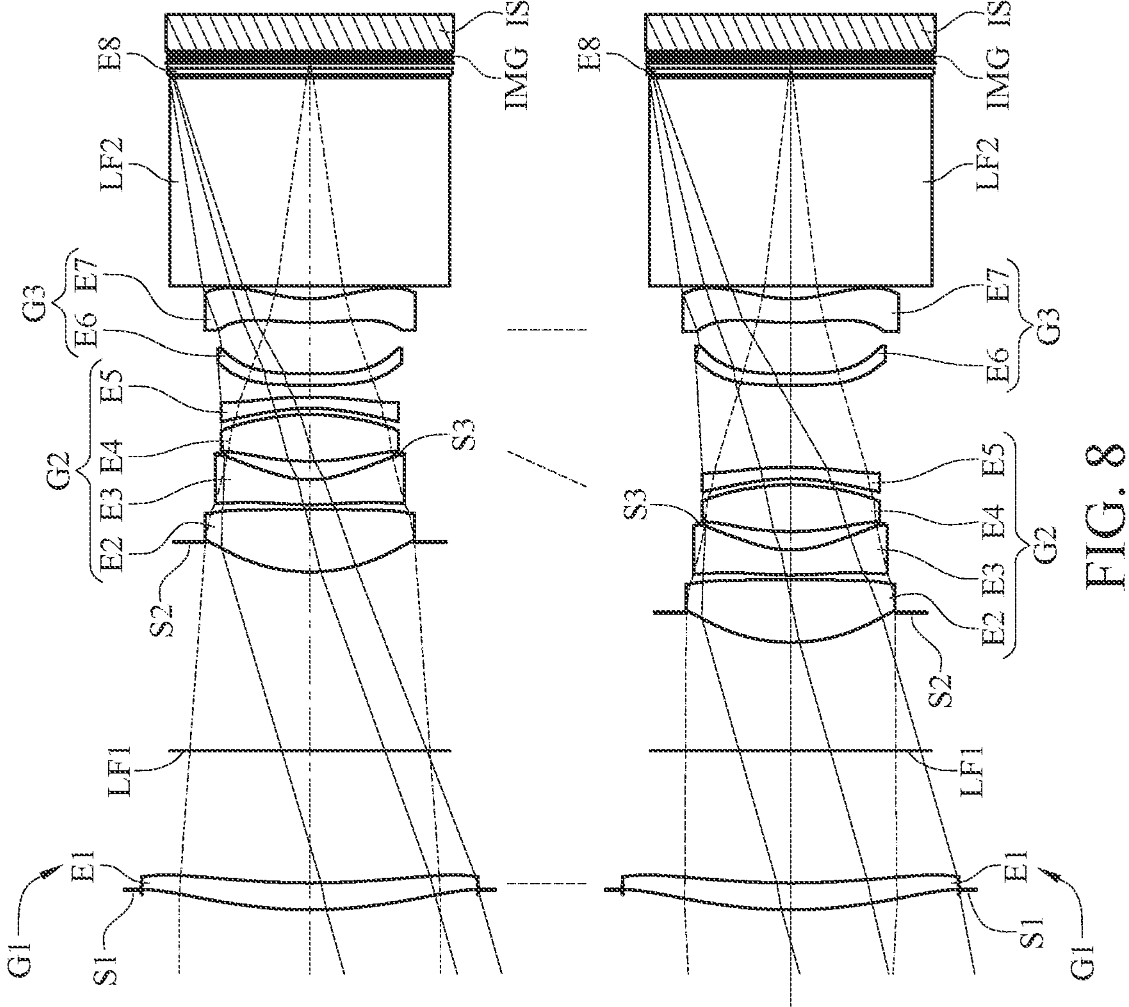
FIG. 8 is a schematic view of an image capturing unit respectively corresponding to an infinite object distance and a short object distance according to the 3rd embodiment of the present disclosure.
Figure 9:
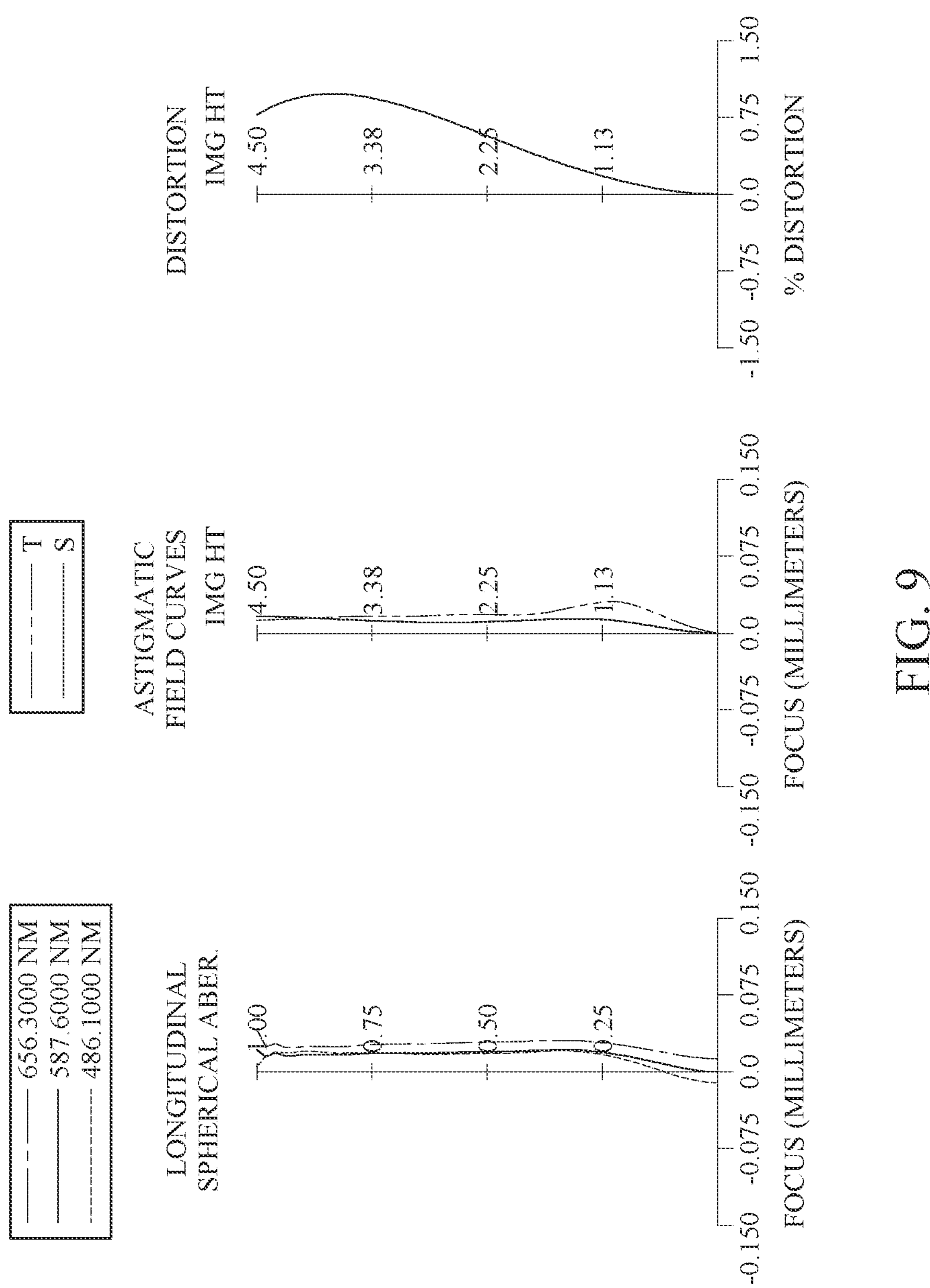
FIG. 9 shows spherical aberration curves, astigmatic field curves and a distortion curve of the image capturing unit corresponding to the infinite object distance according to the 3rd embodiment.
Figure 10:
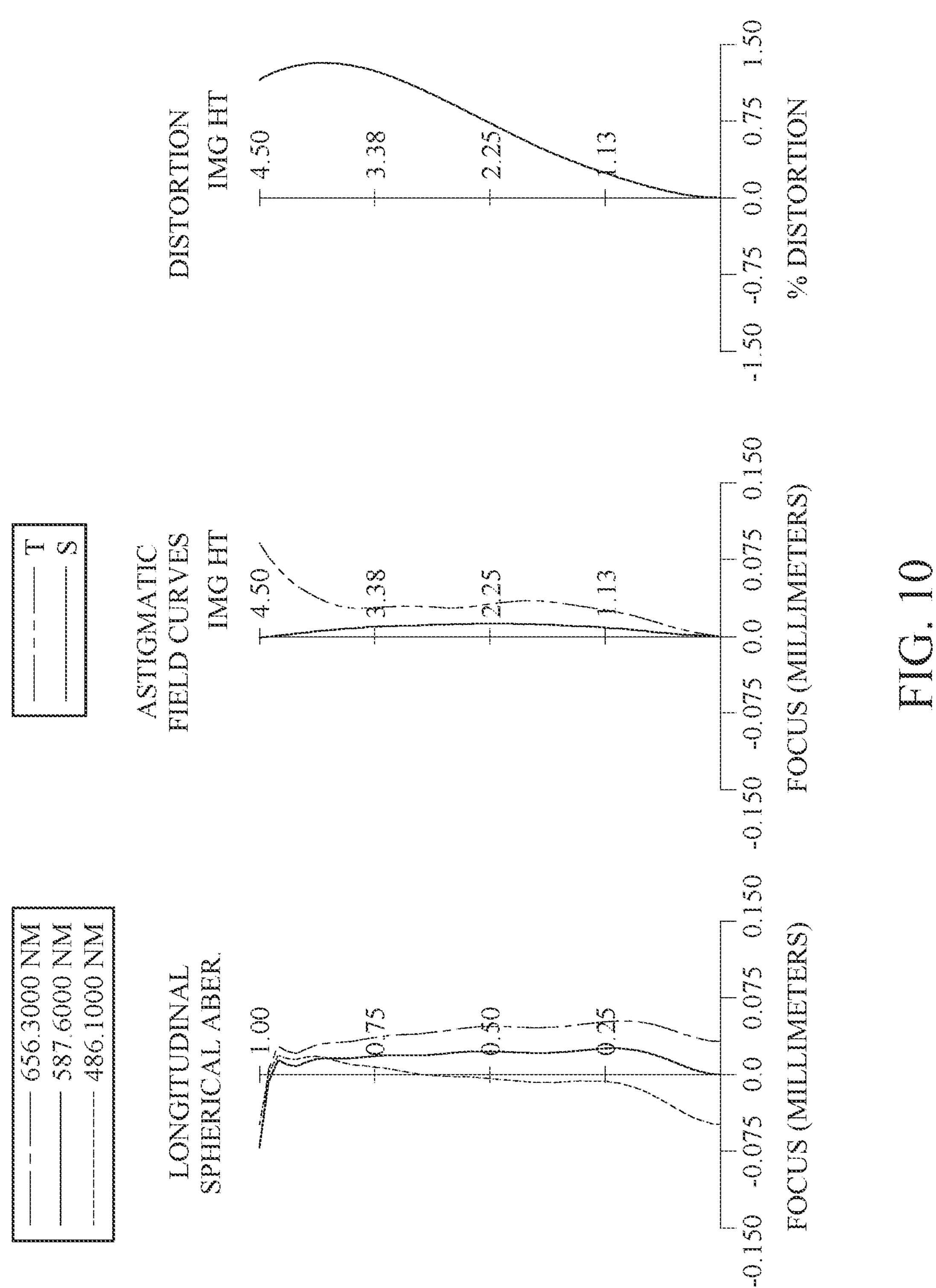
FIG. 10 shows spherical aberration curves, astigmatic field curves and a distortion curve of the image capturing unit corresponding to the short object distance according to the 3rd embodiment.

FIG. 8 is a schematic view of an image capturing unit respectively corresponding to an infinite object distance and a short object distance according to the 3rd embodiment of the present disclosure. FIG. 9 shows spherical aberration curves, astigmatic field curves and a distortion curve of the image capturing unit corresponding to the infinite object distance according to the 3rd embodiment. FIG. shows spherical aberration curves, astigmatic field curves and a distortion curve of the image capturing unit corresponding to the short object distance according to the 3rd embodiment. The upper part of FIG. 8 shows the optical photographing lens assembly at a long focus state (a first state), and the lower part of FIG. 8 shows the optical photographing lens assembly at a short focus state (a second state). In FIG. 8, the image capturing unit 3 includes the optical photographing lens assembly (its reference numeral is omitted) of the present disclosure and an image sensor IS. The optical photographing lens assembly includes, in order from an object side to an image side along an optical path, a stop S1, a first lens element E1, a reflective element LF1, a stop S2, a second lens element E2, a third lens element E3, a stop S3, a fourth lens element E4, a fifth lens element E5, a sixth lens element E6, a seventh lens element E7, a reflective element LF2, a filter E8 and an image surface IMG. Further, the optical photographing lens assembly includes, in order from the object side to the image side along the optical path, a first lens group G1, a second lens group G2 and a third lens group G3. The first lens group G1 includes the first lens element E1. The second lens group G2 includes the second lens element E2, the third lens element E3, the fourth lens element E4 and the fifth lens element E5. The third lens group G3 includes the sixth lens element E6 and the seventh lens element E7. The optical photographing lens assembly includes seven lens elements (E1, E2, E3, E4, E5, E6 and E7) with no additional lens element disposed between each of the adjacent seven lens elements.

An axial distance between an imaged object (not shown) and the object-side surface of a lens element closest to the object side is defined as an object distance. In this embodiment, an axial distance between the imaged object and the object-side surface of the first lens element E1 is defined as the object distance. When the object distance changes from the infinite object distance to the short object distance, the optical photographing lens assembly performs a movement focus process to change from the long focus state to the short focus state. As shown in FIG. 8, during the movement focus process, the second lens group G2 moves towards the object side with respect to the first lens group G1 and the third lens group G3 along a direction in parallel with an optical axis. On the other hand, when the object distance changes from the short object distance to the infinite object distance, the second lens group G2 moves towards the image side with respect to the first lens group G1 and the third lens group G3 along a direction in parallel with the optical axis. Moreover, all lens elements of each of the three lens groups have no relative movement with respect to one another during the movement focus process.

The reflective element LF1 is a reflective mirror, and the reflective element LF2 is a glass prism. The reflective elements LF1, LF2 each provide an optical path folding function. The reflective element can have various forms as shown in FIG. 42 to FIG. 50, which will not be repeated again. Also, the light-folding effect generated by the reflective elements LF1, LF2 is omitted in FIG. 8.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has one inflection point. The image-side surface of the first lens element E1 has one inflection point. The object-side surface of the first lens element E1 has one concave critical point in an off-axis region thereof. The image-side surface of the first lens element E1 has one convex critical point in an off-axis region thereof.

The second lens element E2 with positive refractive power has an object-side surface being convex in a paraxial region thereof and an image-side surface being convex in a paraxial region thereof. The second lens element E2 is made of plastic material and has the object-side surface and the image-side surface being both aspheric. The object-side surface of the second lens element E2 has one inflection point. The image-side surface of the second lens element E2 has three inflection points.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has two inflection points. The object-side surface of the third lens element E3 has one convex critical point and one concave critical point in an off-axis region thereof.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The object-side surface of the fourth lens element E4 has one inflection point.

The fifth lens element E5 with negative refractive power has an object-side surface being concave in a paraxial region thereof and an image-side surface being convex in a paraxial region thereof. The fifth lens element E5 is made of plastic material and has the object-side surface and the image-side surface being both aspheric. The object-side surface of the fifth lens element E5 has two inflection points. The image-side surface of the fifth lens element E5 has one inflection point.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has one inflection point. The image-side surface of the sixth lens element E6 has one inflection point.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has one inflection point. The image-side surface of the seventh lens element E7 has one inflection point. The object-side surface of the seventh lens element E7 has one concave critical point in an off-axis region thereof. The image-side surface of the seventh lens element E7 has one convex critical point in an off-axis region thereof.

The filter E8 is made of glass material and located between the reflective element LF2 and the image surface IMG, and will not affect the focal length of the optical photographing lens assembly. The image sensor IS is disposed on or near the image surface IMG.

The detailed optical data of the 3rd embodiment are shown in Table 3A and Table 3B, and the aspheric surface data are shown in Table 3C below.

TABLE 3A

| 3rd Embodiment | | | | | | | | |
|---|---|---|---|---|---|---|---|---|
| Surface # | | Curvature Radius | | Thickness | Material | Index | Abbe # | Focal Length |
| 0 | Object | Plano | | D0 | | | | |
| 1 | Stop | Plano | | −0.625 | | | | |
| 2 | Lens 1 | 14.7744 | (ASP) | 0.837 | Plastic | 1.566 | 37.4 | 59.37 |
| 3 | | 25.8241 | (ASP) | 4.128 | | | | |
| 4 | Reflective element | Plano | | D1 | | | | |
| 5 | Stop | Plano | | −0.941 | | | | |
| 6 | Lens 2 | 5.5104 | (ASP) | 1.958 | Plastic | 1.544 | 56.0 | 9.22 |
| 7 | | −48.6934 | (ASP) | 0.142 | | | | |
| 8 | Lens 3 | 8.8825 | (ASP) | 0.784 | Plastic | 1.639 | 23.5 | −7.38 |
| 9 | | 2.9743 | (ASP) | 0.803 | | | | |
| 10 | Stop | Plano | | −0.224 | | | | |
| 11 | Lens 4 | 9.2946 | (ASP) | 1.462 | Plastic | 1.587 | 28.3 | 6.78 |
| 12 | | −6.5667 | (ASP) | 0.192 | | | | |
| 13 | Lens 5 | −6.5944 | (ASP) | 0.353 | Plastic | 1.614 | 25.6 | −24.87 |
| 14 | | −11.8481 | (ASP) | D2 | | | | |
| 15 | Lens 6 | 100.0000 | (ASP) | 0.350 | Plastic | 1.669 | 19.5 | −46.33 |
| 16 | | 23.6291 | (ASP) | 1.597 | | | | |
| 17 | Lens 7 | 7.1460 | (ASP) | 0.750 | Plastic | 1.544 | 56.0 | −16.67 |
| 18 | | 3.8493 | (ASP) | 0.400 | | | | |

TABLE 3A-continued

| 3rd Embodiment | | | | | | | |
|---|---|---|---|---|---|---|---|
| Surface # | | Curvature Radius | Thickness | Material | Index | Abbe # | Focal Length |
| 19 | Reflective element | Plano | 6.500 | Glass | 1.847 | 23.8 | — |
| 20 | | Plano | 0.100 | | | | |
| 21 | Filter | Plano | 0.210 | Glass | 1.517 | 64.2 | — |
| 22 | | Plano | 0.161 | | | | |
| 23 | Image | Plano | — | | | | |

Note: Reference wavelength is 587.6 nm (d-line).
The aperture stop may be located on different positions depending on the object distance.
The aperture stop is located on Surface 5 at the long focus state (first state).
The aperture stop is located on Surface 5 at the short focus state (second state).
An effective radius of the stop S1 (Surface 1) is 5.251 mm
An effective radius of the stop S2 (Surface 5) is 3.268 mm
An effective radius of the stop S3 (Surface 10) is 2.675 mm

TABLE 3B

| Optical data for optical photographing lens assembly with infinite object distance and short object distance | | |
|---|---|---|
| | Infinite object distance (Long focus state) | Short object distance (Short focus state) |
| f [mm] | 15.70 | 12.14 |
| Fno | 1.93 | 2.39 |
| HFOV [deg.] | 15.8 | 13.4 |
| Object distance [mm] | ∞ | 60.000 |
| D0 [mm] | ∞ | 60.625 |
| D1 [mm] | 6.531 | 4.331 |
| D2 [mm] | 0.370 | 2.570 |

In Table 3B, the optical data is the same as the data of the 1st embodiment. Please be noted that in this embodiment, an axial distance between the imaged object and the stop S1 is D0, an axial distance between the reflective element LF1 and the stop S2 is D1, and an axial distance between the image-side surface of the fifth lens element E5 and the object-side surface of the sixth lens element E6 is D2.

Moreover, the optical photographing lens assembly of this embodiment can further have other focal lengths object distances corresponding to the intermediate range of infinity and the close-up distance the long focus state and the short focus state in related to other movement focusing conditions besides the long focus state and the short focus state for different object distances. The present disclosure is not limited to the optical photographing lens assembly in TABLE 3B.

TABLE 3C

| Aspheric Coefficients | | | | |
|---|---|---|---|---|
| Surface # | 2 | 3 | 6 | 7 |
| k= | −2.49684000E−01 | −1.00944000E+00 | 1.30046000E−01 | 9.90000000E+01 |
| A4= | −1.77714001E−04 | −1.79213290E−04 | 3.63955608E−04 | −4.06188158E−03 |
| A6= | 3.01407005E−06 | −8.25725191E−06 | −6.76141483E−05 | 7.73806625E−03 |
| A8= | −2.78570801E−06 | −6.21183460E−07 | 4.61610917E−05 | −5.75358699E−03 |
| A10= | 4.37227964E−07 | 1.75526593E−07 | −3.25892240E−05 | 2.85277242E−03 |
| A12= | −4.26958693E−08 | −2.23609461E−08 | 1.27401938E−05 | −1.02068119E−03 |
| A14= | 2.62788194E−09 | 1.60904323E−09 | −3.24075999E−06 | 2.65312101E−04 |
| A16= | −1.03133954E−10 | −7.04952529E−11 | 5.47771758E−07 | −4.97027780E−05 |
| A18= | 2.49887521E−12 | 1.85956619E−12 | −6.11789439E−08 | 6.60127399E−06 |
| A20= | −3.40673066E−14 | −2.71949086E−14 | 4.33076418E−09 | −6.04103414E−07 |
| A22= | 1.99394709E−16 | 1.69222259E−16 | −1.76090439E−10 | 3.61467699E−08 |
| A24= | — | — | 3.13395216E−12 | −1.27130358E−09 |
| A26= | — | — | — | 1.99127683E−11 |
| Surface # | 8 | 9 | 11 | 12 |
| k= | 8.95631000E−01 | −2.88383000E−03 | −5.70551000E−01 | −1.14539000E+00 |
| A4= | −2.24755362E−02 | −2.66815193E−02 | 7.10746177E−04 | −4.41185641E−03 |
| A6= | 1.17010720E−02 | 8.19314846E−03 | 2.14910194E−03 | 1.92535474E−02 |
| A8= | −7.26120217E−03 | −4.85339684E−03 | −1.77025662E−03 | −1.94431581E−02 |
| A10= | 3.56796535E−03 | 2.48995730E−03 | 7.94652361E−04 | 1.26664497E−02 |
| A12= | −1.31596817E−03 | −1.03843152E−03 | −2.73091176E−04 | −6.12900375E−03 |
| A14= | 3.60803503E−04 | 3.34858256E−04 | 6.83659385E−05 | 2.26920368E−03 |
| A16= | −7.23490443E−05 | −8.03220449E−05 | −1.12466882E−05 | −6.40627163E−04 |
| A18= | 1.03748847E−05 | 1.37908254E−05 | 8.77953811E−07 | 1.35400853E−04 |
| A20= | −1.03001811E−06 | −1.62556411E−06 | 5.38905763E−08 | −2.08578632E−05 |
| A22= | 6.70322750E−08 | 1.23851152E−07 | −1.95634383E−08 | 2.25669627E−06 |
| A24= | −2.56754488E−09 | −5.44985649E−09 | 1.74708473E−09 | −1.61778915E−07 |
| A26= | 4.38274233E−11 | 1.04111029E−10 | −5.61585912E−11 | 6.88303776E−09 |
| A28= | — | — | — | −1.31402337E−10 |

TABLE 3C-continued

| Aspheric Coefficients | | | | |
|---|---|---|---|---|
| Surface # | 13 | 14 | 15 | 16 |
| k= | 2.52773000E−01 | −2.44936000E+00 | −9.90000000E+01 | 5.81873000E+01 |
| A4= | −1.28411764E−02 | −6.51421103E−03 | 1.49867140E−02 | 1.40962071E−02 |
| A6= | 3.59229456E−02 | 1.42260047E−02 | −7.54006915E−03 | −6.31781703E−03 |
| A8= | −3.69349367E−02 | −1.27926387E−02 | 7.94601405E−03 | 6.02547582E−03 |
| A10= | 2.45685354E−02 | 7.08359929E−03 | −5.82567050E−03 | −3.77107417E−03 |
| A12= | −1.18452674E−02 | −2.58147325E−03 | 2.97995227E−03 | 1.58615758E−03 |
| A14= | 4.32352258E−03 | 6.41974702E−04 | −1.08936840E−03 | −4.59229359E−04 |
| A16= | −1.20519714E−03 | −1.09817229E−04 | 2.88463337E−04 | 9.23862190E−05 |
| A18= | 2.53610227E−04 | 1.27227826E−05 | −5.54198998E−05 | −1.28155223E−05 |
| A20= | −3.92879902E−05 | −9.55413889E−07 | 7.64427249E−06 | 1.19312911E−06 |
| A22= | 4.31199876E−06 | 4.21568204E−08 | −7.37182029E−07 | −7.03380003E−08 |
| A24= | −3.15562062E−07 | −8.42475169E−10 | 4.71452308E−08 | 2.31872279E−09 |
| A26= | 1.37615795E−08 | 7.33106264E−13 | −1.79489756E−09 | −3.10353584E−11 |
| A28= | −2.69910932E−10 | — | 3.07667566E−11 | — |

| Surface # | 17 | 18 |
|---|---|---|
| k= | 2.52666000E+00 | −4.82978000E−01 |
| A4= | −1.88108903E−02 | −1.99240590E−02 |
| A6= | 2.44785593E−03 | 1.39744424E−03 |
| A8= | −1.91327726E−03 | 2.01976276E−04 |
| A10= | 1.61396211E−03 | −1.67217904E−04 |
| A12= | −9.02191879E−04 | 5.33625094E−05 |
| A14= | 3.37184892E−04 | −1.09989512E−05 |
| A16= | −8.64060787E−05 | 1.55406380E−06 |
| A18= | 1.52485317E−05 | −1.50374140E−07 |
| A20= | −1.82203576E−06 | 9.64157038E−09 |
| A22= | 1.40749362E−07 | −3.80102173E−10 |
| A24= | −6.33938169E−09 | 7.79610440E−12 |
| A26= | 1.26313156E−10 | −5.08060603E−14 |

In the 3rd embodiment, the equation of the aspheric surface profiles of the aforementioned lens elements is the same as the equation of the 1st embodiment. Also, the definitions of these parameters shown in Table 3D below are the same as those stated in the 1st embodiment with corresponding values for the 3rd embodiment, so an explanation in this regard will not be provided again.

Moreover, these parameters can be calculated from Table 3A to Table 3C as the following values and satisfy the following conditions:

TABLE 3D

| Schematic Parameters | | | |
|---|---|---|---|
| fL [mm] | 15.70 | (\|fL/f1\| + \|fL/f5\|)/\|fL/f4\| | 0.39 |
| FnoL | 1.93 | \|f2/f5\| | 0.37 |
| HFOVL [deg.] | 15.8 | \|f4/f5\| | 0.27 |
| fS [mm] | 12.14 | \|f4/R7\| + \|f4/R8\| | 1.76 |
| FnoS | 2.39 | (R1 − R2)/(R1 + R2) | −0.27 |
| HFOVS [deg.] | 13.4 | \|R6/R2\| | 0.12 |
| TLL/TLS | 1.00 | T12L/Dr3r14L | 1.14 |
| BLL/BLS | 1.00 | Dr3r10L/Dr11r14L | 2.03 |
| fG1/fG2 | 5.21 | CT5/CT4 | 0.24 |
| \|fL/fG2N\| | 0.63 | CT6/T67L | 0.22 |
| TG1G2L/DG2G3L | 1.09 | V5/N5 | 15.86 |
| (TG1G2L − TG1G2S)/TG1G2L | 0.23 | V30 | 4 |
| TLL/fL | 1.69 | (T67L − Sag6R2 + Sag7R1)/T67L | 0.36 |
| TLL/BLL | 3.59 | Sag4R2/CT4 | −0.36 |

4th Embodiment

Figure 11:
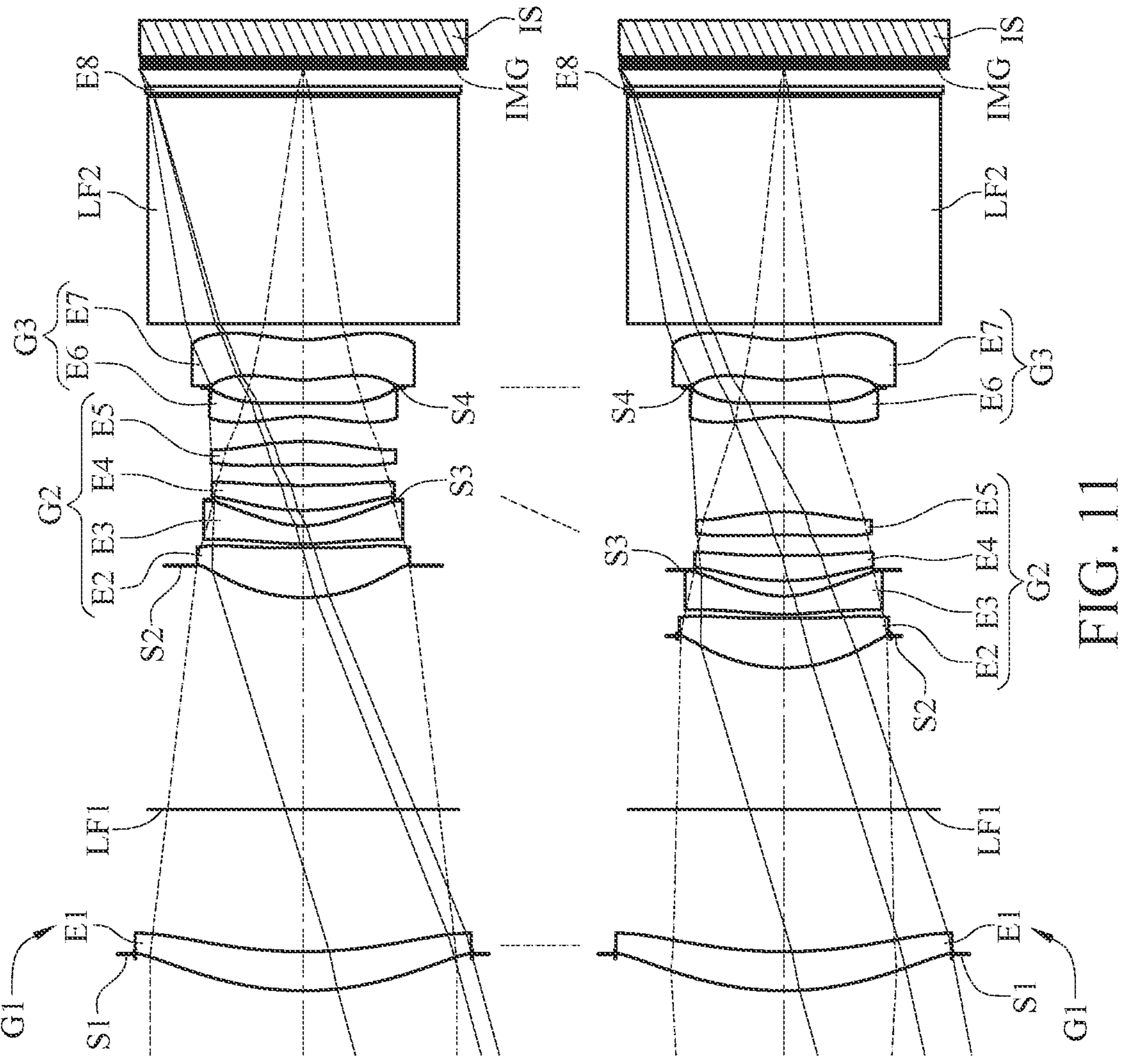
FIG. 11 is a schematic view of an image capturing unit respectively corresponding to an infinite object distance and a short object distance according to the 4th embodiment of the present disclosure.
Figure 12:
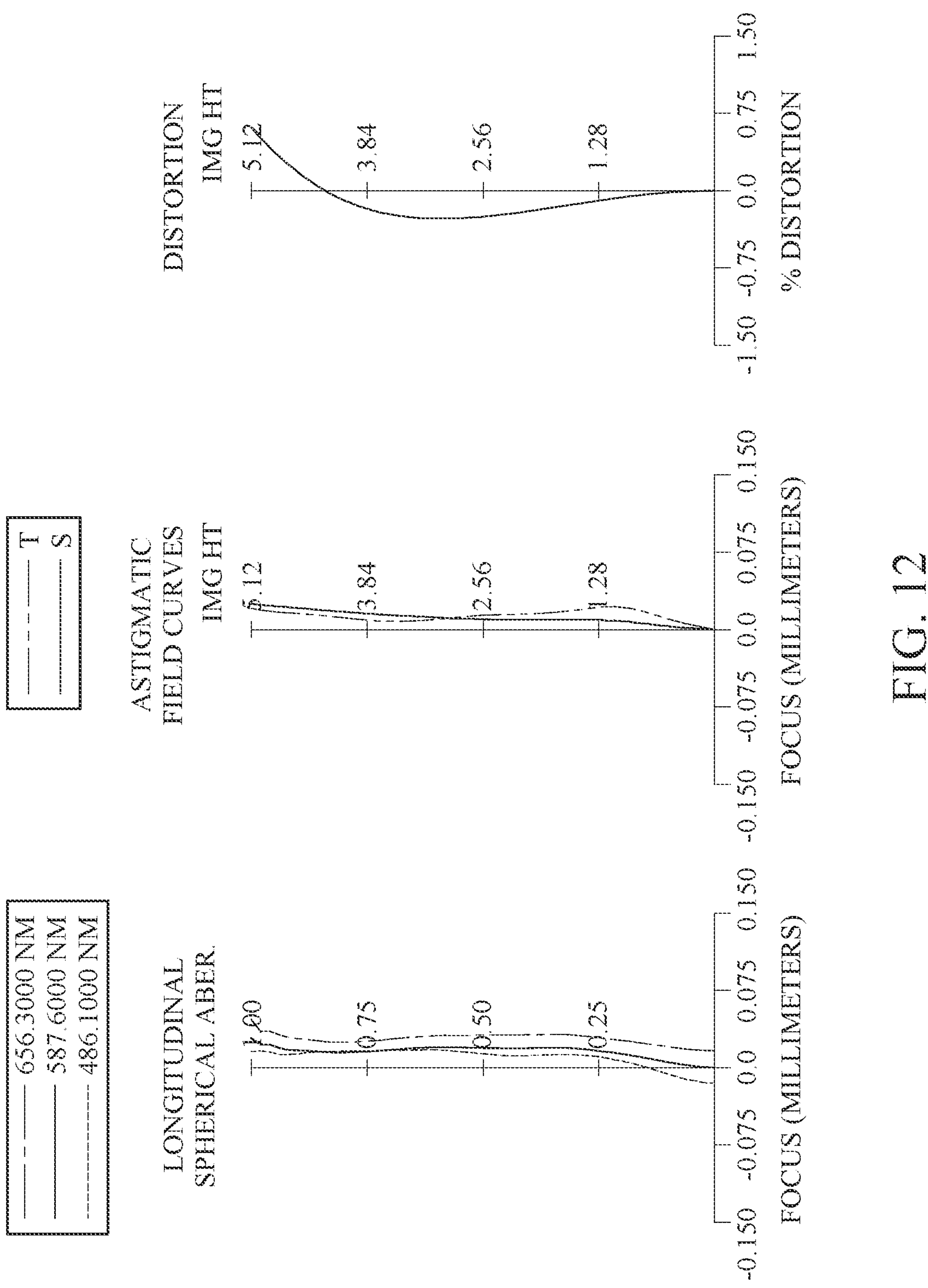
FIG. 12 shows spherical aberration curves, astigmatic field curves and a distortion curve of the image capturing unit corresponding to the infinite object distance according to the 4th embodiment.
Figure 13:
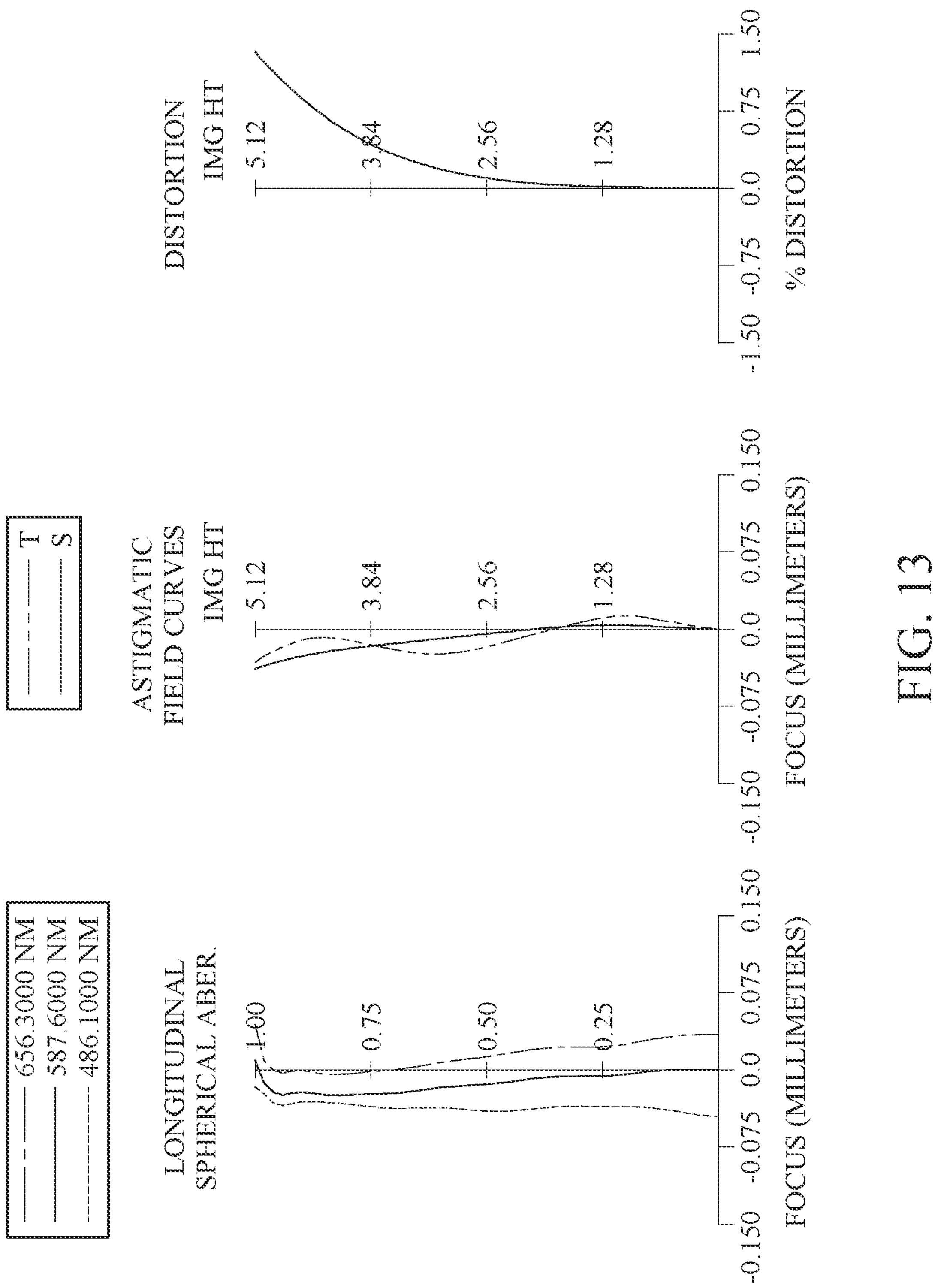
FIG. 13 shows spherical aberration curves, astigmatic field curves and a distortion curve of the image capturing unit corresponding to the short object distance according to the 4th embodiment.

FIG. 11 is a schematic view of an image capturing unit respectively corresponding to an infinite object distance and a short object distance according to the 4th embodiment of the present disclosure. FIG. 12 shows spherical aberration curves, astigmatic field curves and a distortion curve of the image capturing unit corresponding to the infinite object distance according to the 4th embodiment. FIG. 13 shows spherical aberration curves, astigmatic field curves and a distortion curve of the image capturing unit corresponding to the short object distance according to the 4th embodiment. The upper part of FIG. 11 shows the optical photographing lens assembly at a long focus state (a first state), and the lower part of FIG. 11 shows the optical photographing lens assembly at a short focus state (a second state). In FIG. 11, the image capturing unit 4 includes the optical photographing lens assembly (its reference numeral is omitted) of the present disclosure and an image sensor IS. The optical photographing lens assembly includes, in order from an object side to an image side along an optical path, a stop S1, a first lens element E1, a reflective element LF1, a stop S2, a second lens element E2, a third lens element E3, a stop S3, a fourth lens element E4, a fifth lens element E5, a sixth lens element E6, a stop S4, a seventh lens element E7, a reflective element LF2, a filter E8 and an image surface IMG. Further, the optical photographing lens assembly includes, in order from the object side to the image side along the optical path, a first lens group G1, a second lens group G2 and a third lens group G3. The first lens group G1 includes the first lens element E1. The second lens group G2 includes the second lens element E2, the third lens element E3, the fourth lens element E4 and the fifth lens element E5. The third lens group G3 includes the sixth lens element E6 and the seventh lens element E7. The optical photographing lens assembly includes seven lens elements (E1, E2, E3, E4, E5, E6 and E7) with no additional lens element disposed between each of the adjacent seven lens elements.

An axial distance between an imaged object (not shown) and the object-side surface of a lens element closest to the object side is defined as an object distance. In this embodiment, an axial distance between the imaged object and the object-side surface of the first lens element E1 is defined as the object distance. When the object distance changes from the infinite object distance to the short object distance, the optical photographing lens assembly performs a movement focus process to change from the long focus state to the short focus state. As shown in FIG. 11, during the movement focus process, the second lens group G2 moves towards the object side with respect to the first lens group G1 and the third lens group G3 along a direction in parallel with an optical axis. On the other hand, when the object distance changes from the short object distance to the infinite object distance, the second lens group G2 moves towards the image side with respect to the first lens group G1 and the third lens group G3 along a direction in parallel with the optical axis. Moreover, all lens elements of each of the three lens groups have no relative movement with respect to one another during the movement focus process.

The reflective element LF1 is a reflective mirror, and the reflective element LF2 is a glass prism. The reflective elements LF1, LF2 each provide an optical path folding function. The reflective element can have various forms as shown in FIG. 42 to FIG. 50, which will not be repeated again. Also, the light-folding effect generated by the reflective elements LF1, LF2 is omitted in FIG. 11.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has one inflection point. The image-side surface of the first lens element E1 has one inflection point. The object-side surface of the first lens element E1 has one concave critical point in an off-axis region thereof. The image-side surface of the first lens element E1 has one convex critical point in an off-axis region thereof.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has one inflection point. The image-side surface of the second lens element E2 has two inflection points. The image-side surface of the second lens element E2 has one convex critical point in an off-axis region thereof.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has two inflection points. The image-side surface of the third lens element E3 has three inflection points. The object-side surface of the third lens element E3 has one concave critical point in an off-axis region thereof.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has three inflection points. The image-side surface of the fourth lens element E4 has one inflection point. The image-side surface of the fourth lens element E4 has one convex critical point in an off-axis region thereof.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric. The object-side surface of the fifth lens element E5 has two inflection points. The image-side surface of the fifth lens element E5 has two inflection points. The object-side surface of the fifth lens element E5 has one convex critical point and one concave critical point in an off-axis region thereof. The image-side surface of the fifth lens element E5 has one convex critical point and one concave critical point in an off-axis region thereof.

The sixth lens element E6 with negative refractive power has an object-side surface being concave in a paraxial region thereof and an image-side surface being convex in a paraxial region thereof. The sixth lens element E6 is made of plastic material and has the object-side surface and the image-side surface being both aspheric. The object-side surface of the sixth lens element E6 has two inflection points. The image-side surface of the sixth lens element E6 has one inflection point. The object-side surface of the sixth lens element E6 has one convex critical point in an off-axis region thereof. The image-side surface of the sixth lens element E6 has one concave critical point in an off-axis region thereof.

The seventh lens element E7 with positive refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has one inflection point. The image-side surface of the seventh lens element E7 has one inflection point. The object-side surface of the seventh lens element E7 has one concave critical point in an off-axis region thereof. The image-side surface of the seventh lens element E7 has one convex critical point in an off-axis region thereof.

The filter E8 is made of glass material and located between the reflective element LF2 and the image surface IMG, and will not affect the focal length of the optical photographing lens assembly. The image sensor IS is disposed on or near the image surface IMG.

The detailed optical data of the 4th embodiment are shown in Table 4A and Table 4B, and the aspheric surface data are shown in Table 4C below.

TABLE 4A

| 4th Embodiment | | | | | | | |
|---|---|---|---|---|---|---|---|
| Surface # | | Curvature Radius | Thickness | Material | Index | Abbe # | Focal Length |
| 0 | Object | Plano | D0 | | | | |
| 1 | Stop | Plano | −1.150 | | | | |
| 2 | Lens 1 | 9.6543 (ASP) | 1.221 | Plastic | 1.534 | 56.0 | 48.64 |
| 3 | | 14.6840 (ASP) | 4.448 | | | | |
| 4 | Reflective element | Plano | D1 | | | | |
| 5 | Stop | Plano | −0.995 | | | | |
| 6 | Lens 2 | 5.1378 (ASP) | 1.545 | Plastic | 1.544 | 56.0 | 10.21 |
| 7 | | 61.1881 (ASP) | 0.126 | | | | |
| 8 | Lens 3 | 7.4318 (ASP) | 0.571 | Plastic | 1.642 | 22.5 | −8.24 |
| 9 | | 2.9966 (ASP) | 0.813 | | | | |
| 10 | Stop | Plano | −0.330 | | | | |
| 11 | Lens 4 | 7.5696 (ASP) | 0.784 | Plastic | 1.587 | 28.3 | 13.72 |
| 12 | | 121.0399 (ASP) | 0.643 | | | | |
| 13 | Lens 5 | −27.6813 (ASP) | 0.718 | Plastic | 1.566 | 37.4 | 21.36 |
| 14 | | −8.4932 (ASP) | D2 | | | | |
| 15 | Lens 6 | −4.7551 (ASP) | 0.427 | Plastic | 1.544 | 56.0 | −9.95 |
| 16 | | −40.4122 (ASP) | 0.481 | | | | |
| 17 | Stop | Plano | 0.247 | | | | |
| 18 | Lens 7 | 4.6897 (ASP) | 1.254 | Plastic | 1.534 | 56.0 | 77.30 |
| 19 | | 4.7978 (ASP) | 0.500 | | | | |
| 20 | Reflective element | Plano | 7.100 | Glass | 1.847 | 23.8 | — |
| 21 | | Plano | 0.100 | | | | |
| 22 | Filter | Plano | 0.210 | Glass | 1.517 | 64.2 | — |
| 23 | | Plano | 0.558 | | | | |
| 24 | Image | Plano | — | | | | |

Note: Reference wavelength is 587.6 nm (d-line).
The aperture stop may be located on different positions depending on the object distance.
The aperture stop is located on Surface 5 at the long focus state (first state).
The aperture stop is located on Surface 10 at the short focus state (second state).
An effective radius of the stop S1 (Surface 1) is 5.260 mm
An effective radius of the stop S2 (Surface 5) is 3.332 mm
An effective radius of the stop S3 (Surface 10) is 2.804 mm
An effective radius of the stop S4 (Surface 17) is 2.870 mm

TABLE 4B

| Optical data for optical photographing lens assembly with infinite object distance and short object distance | | |
|---|---|---|
| | Infinite object distance (Long focus state) | Short object distance (Short focus state) |
| f [mm] | 18.48 | 13.44 |
| Fno | 1.93 | 2.54 |
| HFOV [deg.] | 15.4 | 12.4 |
| Object distance [mm] | ∞ | 60.000 |
| D0 [mm] | ∞ | 61.150 |
| D1 [mm] | 7.622 | 5.422 |
| D2 [mm] | 0.782 | 2.982 |

In Table 4B, the optical data is the same as the data of the 1st embodiment. Please be noted that in this embodiment, an axial distance between the imaged object and the stop S1 is D0, an axial distance between the reflective element LF1 and the stop S2 is D1, and an axial distance between the image-side surface of the fifth lens element E5 and the object-side surface of the sixth lens element E6 is D2.

Moreover, the optical photographing lens assembly of this embodiment can further have other focal lengths object distances corresponding to the intermediate range of infinity and the close-up distance the long focus state and the short focus state in related to other movement focusing conditions besides the long focus state 10 and the short focus state for different object distances. The present disclosure is not limited to the optical photographing lens assembly in TABLE 4B.

TABLE 4C

| Aspheric Coefficients | | | | |
|---|---|---|---|---|
| Surface # | 2 | 3 | 6 | 7 |
| k= | −1.81088000E−01 | −1.15793000E+00 | −7.69412000E−02 | −2.08975000E+01 |
| A4= | −1.45131578E−04 | −1.44515425E−04 | 2.78875432E−04 | −3.28927112E−03 |
| A6= | −1.55949848E−05 | −2.87674853E−05 | −1.19150908E−04 | 7.82124143E−03 |
| A8= | 1.26825535E−06 | 3.92600800E−06 | 6.82456521E−05 | −5.74699252E−03 |
| A10= | −9.35285697E−08 | −4.29681063E−07 | −3.76815564E−05 | 2.64188735E−03 |
| A12= | 2.82964005E−09 | 2.99460161E−08 | 1.19942163E−05 | −8.78944775E−04 |
| A14= | 2.69295777E−11 | −1.38434282E−09 | −2.57365062E−06 | 2.18774705E−04 |
| A16= | −5.42270951E−12 | 4.14827810E−11 | 3.98793718E−07 | −4.01972524E−05 |

TABLE 4C-continued

| Aspheric Coefficients | | | | |
|---|---|---|---|---|
| A18= | 1.77123343E−13 | −7.73726701E−13 | −4.51206290E−08 | 5.28145589E−06 |
| A20= | −2.41901782E−15 | 8.16027130E−15 | 3.47608746E−09 | −4.76522848E−07 |
| A22= | 1.08207982E−17 | −3.75979243E−17 | −1.58752402E−10 | 2.78480778E−08 |
| A24= | — | — | 3.18026144E−12 | −9.45974761E−10 |
| A26= | — | — | — | 1.41613447E−11 |
| Surface # | 8 | 9 | 11 | 12 |
| k= | 5.89337000E−01 | −3.32822000E−03 | −3.58462000E−01 | −9.90000000E+01 |
| A4= | −2.41653081E−02 | −2.91861976E−02 | 1.62504623E−03 | 5.70059928E−03 |
| A6= | 1.33538409E−02 | 8.68146439E−03 | 1.49740758E−04 | −6.72650368E−04 |
| A8= | −7.24868603E−03 | −2.97397383E−03 | 5.17494080E−04 | 1.03920263E−03 |
| A10= | 2.85748057E−03 | 3.29945298E−04 | −7.50397265E−04 | −1.32782909E−03 |
| A12= | −8.40203873E−04 | 2.04865401E−04 | 4.10020477E−04 | 9.09122652E−04 |
| A14= | 1.93311245E−04 | −1.21368221E−04 | −1.41765898E−04 | −4.13174341E−04 |
| A16= | −3.47960584E−05 | 3.37025791E−05 | 3.37026813E−05 | 1.29637746E−04 |
| A18= | 4.69340146E−06 | −5.91890877E−06 | −5.49144991E−06 | −2.82407256E−05 |
| A20= | −4.46637527E−07 | 6.96352366E−07 | 5.94940763E−07 | 4.25440939E−06 |
| A22= | 2.78757547E−08 | −5.40261927E−08 | −4.05874022E−08 | −4.35542813E−07 |
| A24= | −1.01626119E−09 | 2.52739404E−09 | 1.57129401E−09 | 2.90158632E−08 |
| A26= | 1.63572145E−11 | −5.44169061E−11 | −2.64285337E−11 | −1.13878930E−09 |
| A28= | — | — | — | 2.00438511E−11 |
| Surface # | 13 | 14 | 15 | 16 |
| k= | 1.08684000E+01 | −4.89369000E+00 | −6.04087000E−01 | 8.50856000E+01 |
| A4= | 4.26748136E−03 | 1.06358257E−03 | 1.79550037E−02 | −2.25932868E−03 |
| A6= | −4.62597859E−04 | 1.28806723E−04 | 4.70737147E−03 | 1.23562243E−02 |
| A8= | 6.76771035E−04 | 2.45954038E−04 | −5.20891760E−03 | −7.50294728E−03 |
| A10= | −8.38742279E−04 | −4.05584864E−04 | 2.62145517E−03 | 3.07139707E−03 |
| A12= | 5.84180090E−04 | 3.18674183E−04 | −8.34123727E−04 | −8.50160730E−04 |
| A14= | −2.60064924E−04 | −1.49850566E−04 | 1.58295822E−04 | 1.39171774E−04 |
| A16= | 7.79929569E−05 | 4.58497468E−05 | −1.01916707E−05 | −5.47997627E−06 |
| A18= | −1.59469588E−05 | −9.31577004E−06 | −3.09449235E−06 | −3.02748741E−06 |
| A20= | 2.20991208E−06 | 1.24430193E−06 | 1.00067807E−06 | 7.53378072E−07 |
| A22= | −2.02854375E−07 | −1.04808854E−07 | −1.40862548E−07 | −8.46375987E−08 |
| A24= | 1.17301079E−08 | 5.03894552E−09 | 1.11720211E−08 | 4.89916439E−09 |
| A26= | −3.84067924E−10 | −1.05258072E−10 | −4.82846990E−10 | −1.17976025E−10 |
| A28= | 5.38292259E−12 | — | 8.85203588E−12 | — |
| Surface # | 18 | | 19 | |
| k= | −1.14003000E+00 | | −2.18630000E−01 | |
| A4= | −3.31700992E−02 | | −2.13276023E−02 | |
| A6= | 8.74539003E−03 | | 3.14676334E−03 | |
| A8= | −3.88772638E−03 | | −7.75719213E−04 | |
| A10= | 1.97295299E−03 | | 2.47457419E−04 | |
| A12= | −8.83156158E−04 | | −7.65382888E−05 | |
| A14= | 3.04083772E−04 | | 1.85124643E−05 | |
| A16= | −7.62773476E−05 | | −3.23729494E−06 | |
| A18= | 1.35402288E−05 | | 3.96246662E−07 | |
| A20= | −1.64888983E−06 | | −3.29425482E−08 | |
| A22= | 1.30735476E−07 | | 1.76766996E−09 | |
| A24= | −6.07224316E−09 | | −5.51317670E−11 | |
| A26= | 1.25281973E−10 | | 7.58390456E−13 | |

In the 4th embodiment, the equation of the aspheric surface profiles of the aforementioned lens elements is the same as the equation of the 1st embodiment. Also, the definitions of these parameters shown in Table 4D below are the same as those stated in the 1st embodiment with corresponding values for the 4th embodiment, so an explanation in this regard will not be provided again.

Moreover, these parameters can be calculated from Table 4A to Table 4C as the following values and satisfy the following conditions:

TABLE 4D

| Schematic Parameters | | | |
|---|---|---|---|
| fL [mm] | 18.48 | (\|fL/f1\| + \|fL/f5\|)/\|fL/f4\| | 0.92 |
| FnoL | 1.93 | \|f2/f5\| | 0.48 |

TABLE 4D-continued

| Schematic Parameters | | | |
|---|---|---|---|
| HFOVL [deg.] | 15.4 | \|f4/f5\| | 0.64 |
| fS [mm] | 13.44 | \|f4/R7\| + \|f4/R8\| | 1.93 |
| FnoS | 2.54 | (R1 − R2)/(R1 + R2) | −0.21 |
| HFOVS [deg.] | 12.4 | \|R6/R2\| | 0.20 |
| TLL/TLS | 1.00 | T12L/Dr3r14L | 1.37 |
| BLL/BLS | 1.00 | Dr3r10L/Dr11r14L | 2.02 |
| fG1/fG2 | 4.46 | CT5/CT4 | 0.92 |
| \|fL/fG2N\| | 0.87 | CT6/T67L | 0.59 |
| TG1G2L/DG2G3L | 1.37 | V5/N5 | 23.88 |
| (TG1G2L − TG1G2S)/ TG1G2L | 0.20 | V30 | 2 |
| TLL/fL | 1.56 | (T67L − Sag6R2 + Sag7R1)/T67L | 0.15 |
| TLL/BLL | 3.40 | Sag4R2/CT4 | 0.11 |

5th Embodiment

Figure 14:
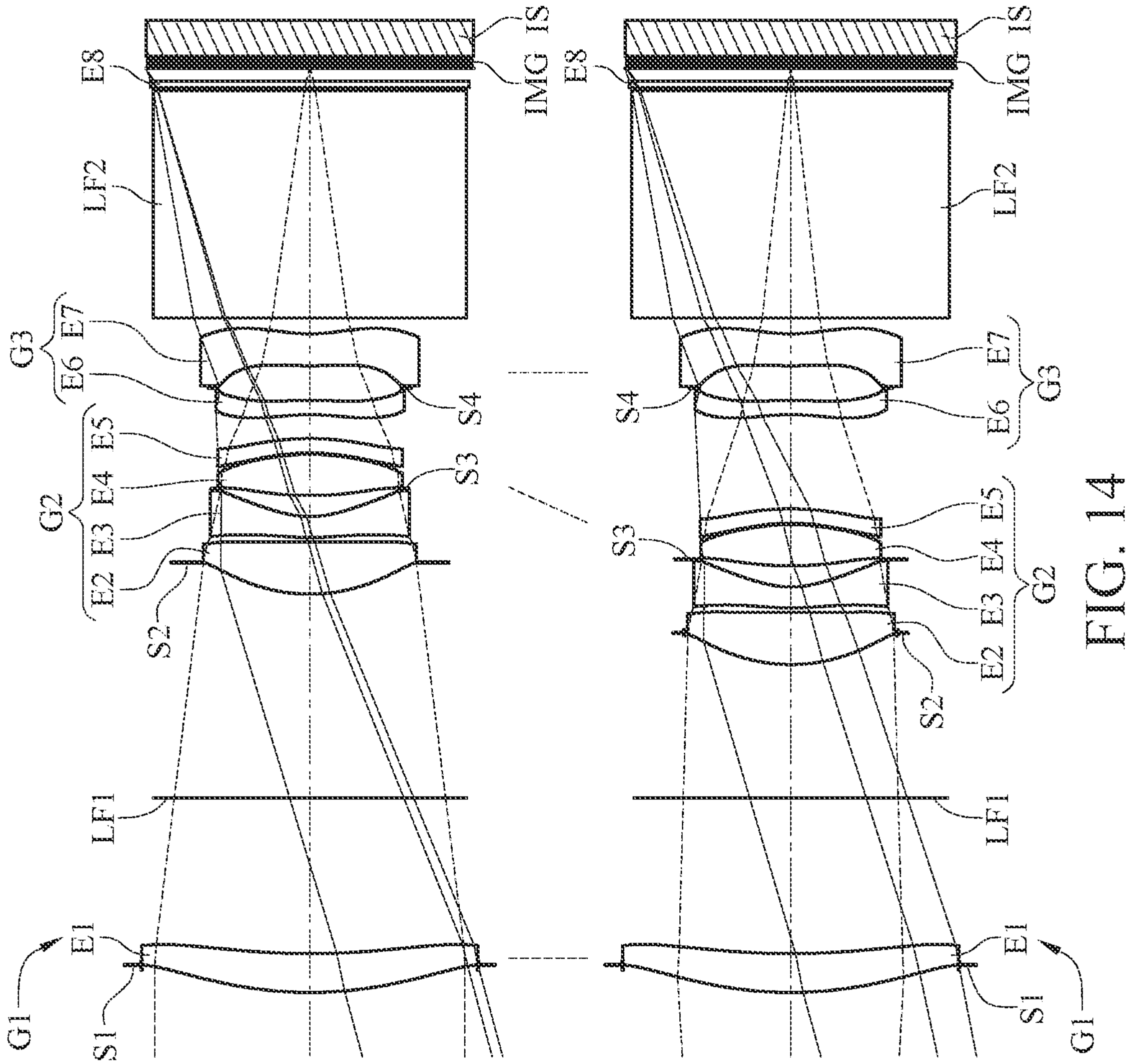
FIG. 14 is a schematic view of an image capturing unit respectively corresponding to an infinite object distance and a short object distance according to the 5th embodiment of the present disclosure.
Figure 15:
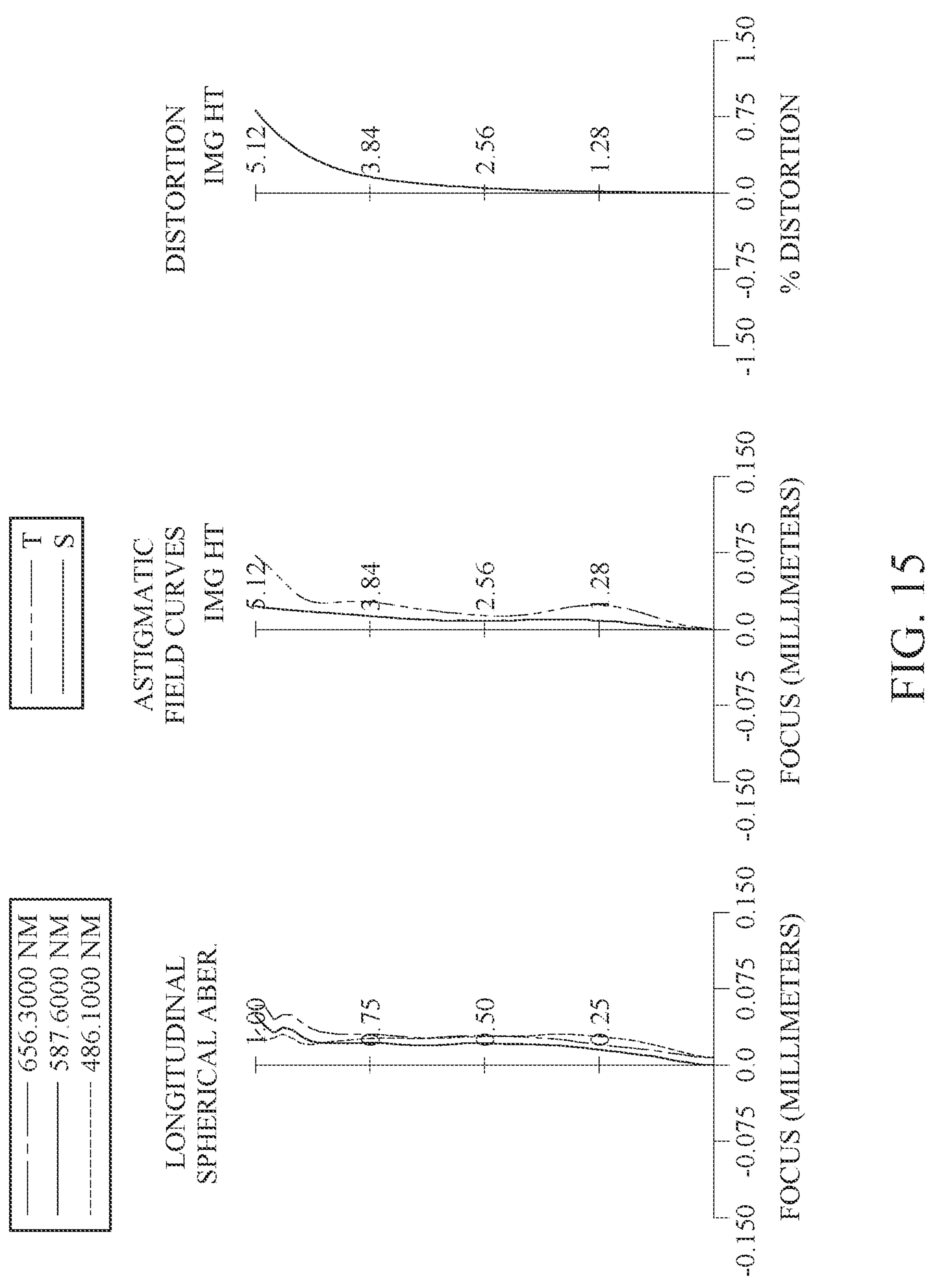
FIG. 15 shows spherical aberration curves, astigmatic field curves and a distortion curve of the image capturing unit corresponding to the infinite object distance according to the 5th embodiment.
Figure 16:
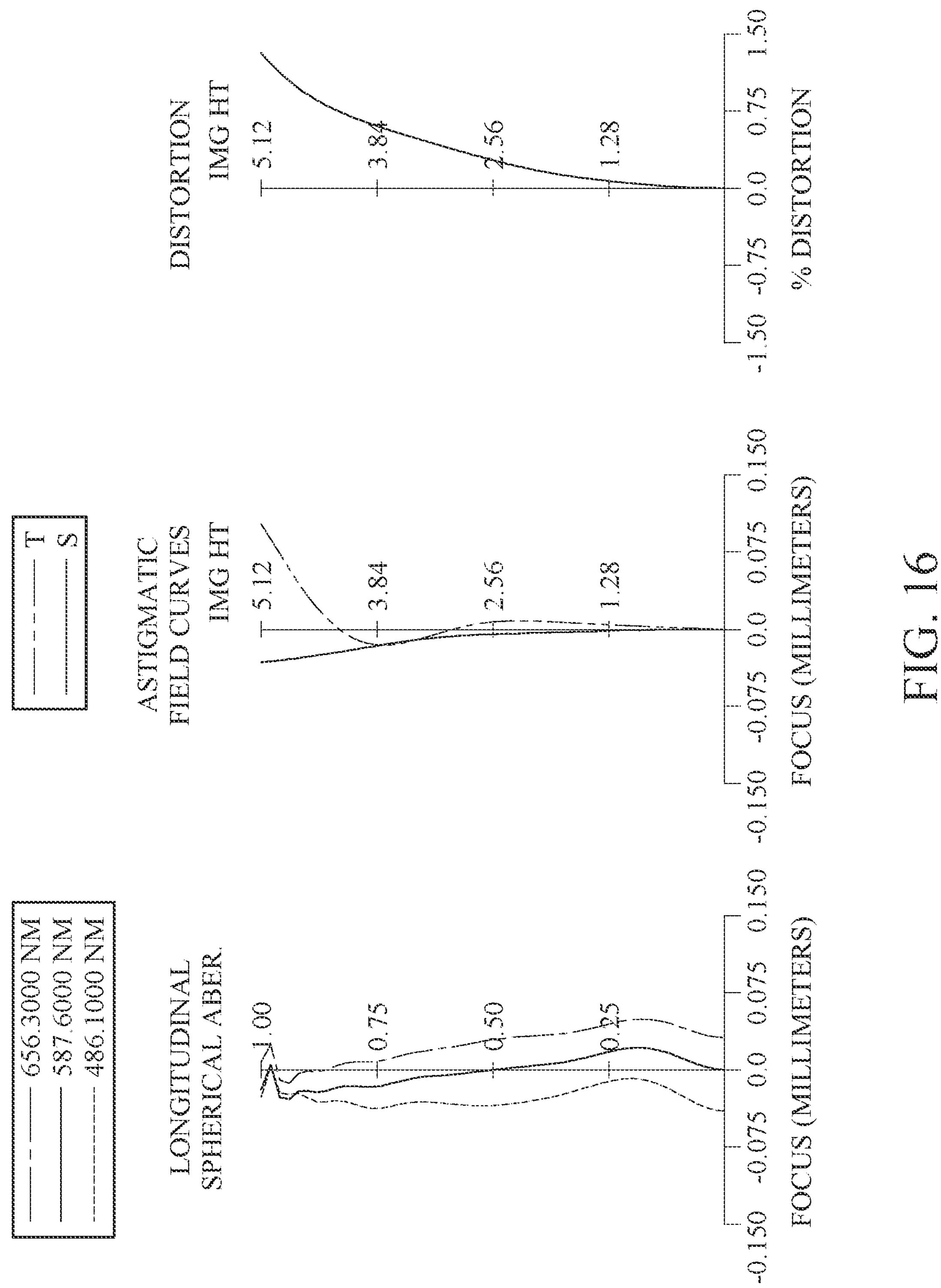
FIG. 16 shows spherical aberration curves, astigmatic field curves and a distortion curve of the image capturing unit corresponding to the short object distance according to the 5th embodiment.

FIG. 14 is a schematic view of an image capturing unit respectively corresponding to an infinite object distance and a short object distance according to the 5th embodiment of the present disclosure. FIG. 15 shows spherical aberration curves, astigmatic field curves and a distortion curve of the image capturing unit corresponding to the infinite object distance according to the 5th embodiment. FIG. 16 shows spherical aberration curves, astigmatic field curves and a distortion curve of the image capturing unit corresponding to the short object distance according to the 5th embodiment. The upper part of FIG. 14 shows the optical photographing lens assembly at a long focus state (a first state), and the lower part of FIG. 14 shows the optical photographing lens assembly at a short focus state (a second state). In FIG. 14, the image capturing unit 5 includes the optical photographing lens assembly (its reference numeral is omitted) of the present disclosure and an image sensor IS. The optical photographing lens assembly includes, in order from an object side to an image side along an optical path, a stop S1, a first lens element E1, a reflective element LF1, a stop S2, a second lens element E2, a third lens element E3, a stop S3, a fourth lens element E4, a fifth lens element E5, a sixth lens element E6, a stop S4, a seventh lens element E7, a reflective element LF2, a filter E8 and an image surface IMG. Further, the optical photographing lens assembly includes, in order from the object side to the image side along the optical path, a first lens group G1, a second lens group G2 and a third lens group G3. The first lens group G1 includes the first lens element E1. The second lens group G2 includes the second lens element E2, the third lens element E3, the fourth lens element E4 and the fifth lens element E5. The third lens group G3 includes the sixth lens element E6 and the seventh lens element E7. The optical photographing lens assembly includes seven lens elements (E1, E2, E3, E4, E5, E6 and E7) with no additional lens element disposed between each of the adjacent seven lens elements.

An axial distance between an imaged object (not shown) and the object-side surface of a lens element closest to the object side is defined as an object distance. In this embodiment, an axial distance between the imaged object and the object-side surface of the first lens element E1 is defined as the object distance. When the object distance changes from the infinite object distance to the short object distance, the optical photographing lens assembly performs a movement focus process to change from the long focus state to the short focus state. As shown in FIG. 14, during the movement focus process, the second lens group G2 moves towards the object side with respect to the first lens group G1 and the third lens group G3 along a direction in parallel with an optical axis. On the other hand, when the object distance changes from the short object distance to the infinite object distance, the second lens group G2 moves towards the image side with respect to the first lens group G1 and the third lens group G3 along a direction in parallel with the optical axis. Moreover, all lens elements of each of the three lens groups have no relative movement with respect to one another during the movement focus process.

The reflective element LF1 is a reflective mirror, and the reflective element LF2 is a glass prism. The reflective elements LF1, LF2 each provide an optical path folding function. The reflective element can have various forms as shown in FIG. 42 to FIG. 50, which will not be repeated again. Also, the light-folding effect generated by the reflective elements LF1, LF2 is omitted in FIG. 14.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has one inflection point. The image-side surface of the first lens element E1 has one inflection point. The image-side surface of the first lens element E1 has one convex critical point in an off-axis region thereof.

The second lens element E2 with positive refractive power has an object-side surface being convex in a paraxial region thereof and an image-side surface being convex in a paraxial region thereof. The second lens element E2 is made of plastic material and has the object-side surface and the image-side surface being both aspheric. The object-side surface of the second lens element E2 has two inflection points. The image-side surface of the second lens element E2 has three inflection points. The image-side surface of the second lens element E2 has one convex critical point and one concave critical point in an off-axis region thereof.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has two inflection points. The image-side surface of the third lens element E3 has one inflection point. The object-side surface of the third lens element E3 has one concave critical point in an off-axis region thereof.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The object-side surface of the fourth lens element E4 has three inflection points.

The fifth lens element E5 with negative refractive power has an object-side surface being concave in a paraxial region thereof and an image-side surface being convex in a paraxial region thereof. The fifth lens element E5 is made of plastic material and has the object-side surface and the image-side surface being both aspheric. The object-side surface of the fifth lens element E5 has six inflection points. The image-side surface of the fifth lens element E5 has one inflection point.

The sixth lens element E6 with negative refractive power has an object-side surface being concave in a paraxial region thereof and an image-side surface being convex in a paraxial region thereof. The sixth lens element E6 is made of plastic material and has the object-side surface and the image-side surface being both aspheric. The object-side surface of the sixth lens element E6 has one inflection point. The image-side surface of the sixth lens element E6 has one inflection point. The object-side surface of the sixth lens element E6 has one convex critical point in an off-axis region thereof. The image-side surface of the sixth lens element E6 has one concave critical point in an off-axis region thereof.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has two inflection points. The image-side surface of the seventh lens element E7 has one inflection point. The object-side surface of the seventh lens element E7 has one concave critical point in an off-axis region thereof. The image-side surface of the seventh lens element E7 has one convex critical point in an off-axis region thereof.

The filter E8 is made of glass material and located between the reflective element LF2 and the image surface IMG, and will not affect the focal length of the optical photographing lens assembly. The image sensor IS is disposed on or near the image surface IMG.

The detailed optical data of the 5th embodiment are shown in Table 5A and Table 5B, and the aspheric surface data are shown in Table 5C below.

TABLE 5A

| 5th Embodiment | | | | | | | | |
|---|---|---|---|---|---|---|---|---|
| Surface # | | Curvature Radius | | Thickness | Material | Index | Abbe # | Focal Length |
| 0 | Object | Plano | | D0 | | | | |
| 1 | Stop | Plano | | −0.850 | | | | |
| 2 | Lens 1 | 12.2005 | (ASP) | 1.218 | Plastic | 1.544 | 56.0 | 44.76 |
| 3 | | 23.5905 | (ASP) | 4.860 | | | | |
| 4 | Reflective element | Plano | | D1 | | | | |
| 5 | Stop | Plano | | −0.984 | | | | |
| 6 | Lens 2 | 5.4382 | (ASP) | 1.637 | Plastic | 1.545 | 56.1 | 9.55 |
| 7 | | −106.8967 | (ASP) | 0.133 | | | | |
| 8 | Lens 3 | 8.3149 | (ASP) | 0.655 | Plastic | 1.639 | 23.5 | −7.65 |
| 9 | | 2.9819 | (ASP) | 0.863 | | | | |
| 10 | Stop | Plano | | −0.206 | | | | |
| 11 | Lens 4 | 11.4742 | (ASP) | 1.290 | Plastic | 1.587 | 28.3 | 7.21 |
| 12 | | −6.4344 | (ASP) | 0.040 | | | | |
| 13 | Lens 5 | −6.5226 | (ASP) | 0.450 | Plastic | 1.639 | 23.5 | −44.57 |
| 14 | | −8.6890 | (ASP) | D2 | | | | |
| 15 | Lens 6 | −6.1572 | (ASP) | 0.450 | Plastic | 1.587 | 28.3 | −22.14 |
| 16 | | −12.0106 | (ASP) | 0.380 | | | | |
| 17 | Stop | Plano | | 0.693 | | | | |
| 18 | Lens 7 | 10.6147 | (ASP) | 1.003 | Plastic | 1.544 | 56.0 | −18.95 |
| 19 | | 5.0560 | (ASP) | 0.500 | | | | |
| 20 | Reflective element | Plano | | 7.100 | Glass | 1.847 | 23.8 | — |
| 21 | | Plano | | 0.100 | | | | |
| 22 | Filter | Plano | | 0.210 | Glass | 1.517 | 64.2 | — |
| 23 | | Plano | | 0.387 | | | | |
| 24 | Image | Plano | | — | | | | |

Note: Reference wavelength is 587.6 nm (d-line).

The aperture stop may be located on different positions depending on the object distance.

The aperture stop is located on Surface 5 at the long focus state (first state).

The aperture stop is located on Surface 10 at the short focus state (second state).

An effective radius of the stop S1 (Surface 1) is 5.253 mm

An effective radius of the stop S2 (Surface 5) is 3.330 mm

An effective radius of the stop S3 (Surface 10) is 2.786 mm

An effective radius of the stop S4 (Surface 17) is 2.870

TABLE 5B

| Optical data for optical photographing lens assembly with infinite object distance and short object distance | | |
|---|---|---|
| | Infinite object distance (Long focus state) | Short object distance (Short focus state) |
| f[mm] | 18.70 | 13.22 |
| Fno | 1.93 | 2.53 |
| HFOV [deg.] | 15.2 | 12.2 |
| Object distance [mm] | ∞ | 60.000 |
| D0 [mm] | ∞ | 60.850 |
| D1 [mm] | 7.362 | 5.162 |
| D2 [mm] | 0.750 | 2.950 |

In Table 5B, the optical data is the same as the data of the 1st embodiment. Please be noted that in this embodiment, an axial distance between the imaged object and the stop S1 is D0, an axial distance between the reflective element LF1 and the stop S2 is D1, and an axial distance between the image-side surface of the fifth lens element E5 and the object-side surface of the sixth lens element E6 is D2.

Moreover, the optical photographing lens assembly of this embodiment can further have other focal lengths object distances corresponding to the intermediate range of infinity and the close-up distance the long focus state and the short focus state in related to other movement focusing conditions besides the long focus state and the short focus state for different object distances. The present disclosure is not limited to the optical photographing lens assembly in TABLE 5B.

TABLE 5C

| Aspheric Coefficients | | | | |
|---|---|---|---|---|
| Surface # | 2 | 3 | 6 | 7 |
| k= | 0.00000000E+00 | 0.00000000E+00 | 0.00000000E+00 | 0.00000000E+00 |
| A4= | −1.76263921E−04 | −2.09718956E−04 | 2.78423911E−04 | −4.39733933E−03 |
| A6= | −4.60112403E−07 | 4.26364398E−07 | 2.01993540E−04 | 1.07146473E−02 |
| A8= | −5.28443342E−07 | −1.30490987E−06 | −2.47209223E−04 | −8.96368149E−03 |
| A10= | −8.54876583E−09 | 1.28626678E−07 | 1.49703401E−04 | 4.83787290E−03 |
| A12= | 5.86242040E−09 | −7.18101479E−09 | −5.82101192E−05 | −1.86603936E−03 |
| A14= | −6.05810613E−10 | 1.50808738E−10 | 1.44232326E−05 | 5.17659431E−04 |
| A16= | 3.14179798E−11 | 3.86467556E−12 | −2.29315875E−06 | −1.01682308E−04 |
| A18= | −9.25108143E−13 | −3.03468011E−13 | 2.31583412E−07 | 1.38604147E−05 |
| A20= | 1.47755014E−14 | 6.76693621E−15 | −1.42969198E−08 | −1.27476276E−06 |
| A22= | −1.00464973E−16 | −5.48439839E−17 | 4.89131744E−10 | 7.52547781E−08 |
| A24= | — | — | −7.04483314E−12 | −2.57172069E−09 |
| A26= | — | — | — | 3.86687378E−11 |
| Surface # | 8 | 9 | 11 | 12 |
| k= | 0.00000000E+00 | 0.00000000E+00 | 0.00000000E+00 | −1.00000000E+00 |
| A4= | −2.40012962E−02 | −2.64606449E−02 | 1.52986651E−03 | 1.44240308E−02 |
| A6= | 1.53227052E−02 | 7.87756321E−03 | 1.13527251E−04 | −3.16407479E−02 |
| A8= | −1.04436947E−02 | −3.43984419E−03 | 5.43883564E−04 | 4.06296357E−02 |
| A10= | 5.23387958E−03 | 6.51549105E−04 | −9.18781081E−04 | −2.68836184E−02 |
| A12= | −1.95793930E−03 | 1.65414486E−04 | 5.83971094E−04 | 1.00171974E−02 |
| A14= | 5.48310365E−04 | −1.56263697E−04 | −2.38739769E−04 | −2.08519431E−03 |
| A16= | −1.11739382E−04 | 5.52435101E−05 | 6.84944631E−05 | 1.74185690E−04 |
| A18= | 1.60162659E−05 | −1.20040038E−05 | −1.35710981E−05 | 2.39957271E−05 |
| A20= | −1.55613926E−06 | 1.69304918E−06 | 1.77718536E−06 | −9.03957701E−06 |
| A22= | 9.70736490E−08 | −1.50116392E−07 | −1.44585889E−07 | 1.24471733E−06 |
| A24= | −3.50004368E−09 | 7.57673670E−09 | 6.54963555E−09 | −9.48005238E−08 |
| A26= | 5.54108519E−11 | −1.65923653E−10 | −1.25132028E−10 | 3.95773359E−09 |
| Surface # | 13 | 14 | 15 | 16 |
| k= | 0.00000000E+00 | 0.00000000E+00 | 0.00000000E+00 | 0.00000000E+00 |
| A4= | 1.48884871E−02 | 2.91275859E−03 | 2.25344465E−02 | 1.68756249E−02 |
| A6= | −3.76097919E−02 | −9.01683698E−03 | −7.14777810E−03 | −4.41603839E−03 |
| A8= | 4.91611532E−02 | 1.19528578E−02 | 7.09735680E−03 | 4.94680166E−03 |
| A10= | −3.40351399E−02 | −9.05799446E−03 | −5.76542709E−03 | −4.11191209E−03 |
| A12= | 1.40447094E−02 | 4.48029379E−03 | 3.14490889E−03 | 2.19001797E−03 |
| A14= | −3.62856033E−03 | −1.50974493E−03 | −1.18093129E−03 | −7.89513325E−04 |
| A16= | 5.82943822E−04 | 3.53639891E−04 | 3.12358298E−04 | 1.97383837E−04 |
| A18= | −5.14322082E−05 | −5.76782612E−05 | −5.87211217E−05 | −3.42863994E−05 |
| A20= | 5.97565480E−07 | 6.42931482E−06 | 7.80555804E−06 | 4.06177098E−06 |
| A22= | 4.14570783E−07 | −4.66998262E−07 | −7.17218636E−07 | −3.13001617E−07 |
| A24= | −4.93436803E−08 | 1.99088277E−08 | 4.33340058E−08 | 1.41380539E−08 |
| A26= | 2.55899644E−09 | −3.77611944E−10 | −1.54837974E−09 | −2.83775568E−10 |
| A28= | — | — | 2.47743061E−11 | — |
| Surface # | 18 | | 19 | |
| k= | 0.00000000E+00 | | 0.00000000E+00 | |
| A4= | −2.11954869E−02 | | −2.10544812E−02 | |
| A6= | 1.50569035E−03 | | 1.92054732E−03 | |
| A8= | 2.13894508E−04 | | 2.00195181E−04 | |
| A10= | −6.25514550E−05 | | −2.24773929E−04 | |
| A12= | −9.23665299E−05 | | 7.60169751E−05 | |
| A14= | 6.84424495E−05 | | −1.56921389E−05 | |

TABLE 5C-continued

| Aspheric Coefficients | | |
|---|---|---|
| A16= | −2.30067444E−05 | 2.16096727E−06 |
| A18= | 4.56846434E−06 | −2.01231477E−07 |
| A20= | −5.63475415E−07 | 1.24331164E−08 |
| A22= | 4.22860911E−08 | −4.83469075E−10 |
| A24= | −1.76118525E−09 | 1.05588248E−11 |
| A26= | 3.10915497E−11 | −9.66271438E−14 |

In the 5th embodiment, the equation of the aspheric surface profiles of the aforementioned lens elements is the same as the equation of the 1st embodiment. Also, the definitions of these parameters shown in Table 5D below are the same as those stated in the 1st embodiment with corresponding values for the 5th embodiment, so an explanation in this regard will not be provided again.

Moreover, these parameters can be calculated from Table 5A to Table 5C as the following values and satisfy the following conditions:

TABLE 5D

| Schematic Parameters | | | |
|---|---|---|---|
| fL [mm] | 18.70 | (\|fL/f1\| + \|fL/f5\|)/\|fL/f4\| | 0.32 |
| FnoL | 1.93 | \|f2/f5\| | 0.21 |
| HFOVL [deg.] | 15.2 | \|f4/f5\| | 0.16 |
| fS [mm] | 13.22 | \|f4/R7\| + \|f4/R8\| | 1.75 |
| FnoS | 2.53 | (R1 − R2)/(R1 + R2) | −0.32 |
| HFOVS [deg.] | 12.2 | \|R6/R2\| | 0.13 |
| TLL/TLS | 1.00 | T12L/Dr3r14L | 1.38 |
| BLL/BLS | 1.00 | Dr3r10L/Dr11r14L | 1.92 |
| fG1/fG2 | 4.10 | CT5/CT4 | 0.35 |
| \|fL/fG2N\| | 0.42 | CT6/T67L | 0.42 |
| TG1G2L/DG2G3L | 1.38 | V5/N5 | 14.34 |
| (TG1G2L − TG1G2S)/TG1G2L | 0.20 | V30 | 4 |
| TLL/fL | 1.54 | (T67L − Sag6R2 + Sag7R1)/T67L | 0.18 |
| TLL/BLL | 3.48 | Sag4R2/CT4 | −0.47 |

6th Embodiment

Figure 17:
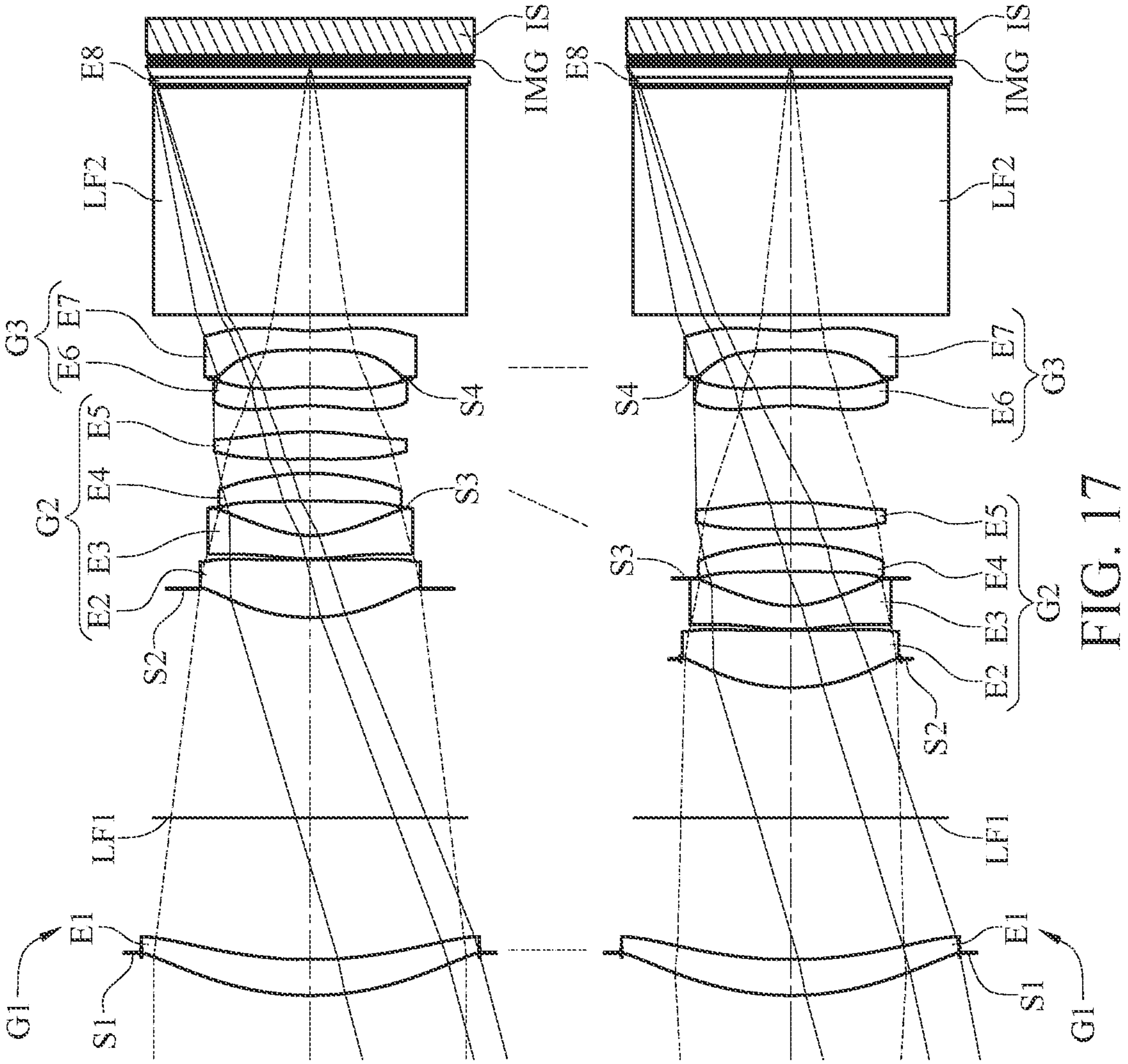
FIG. 17 is a schematic view of an image capturing unit respectively corresponding to an infinite object distance and a short object distance according to the 6th embodiment of the present disclosure.
Figure 18:
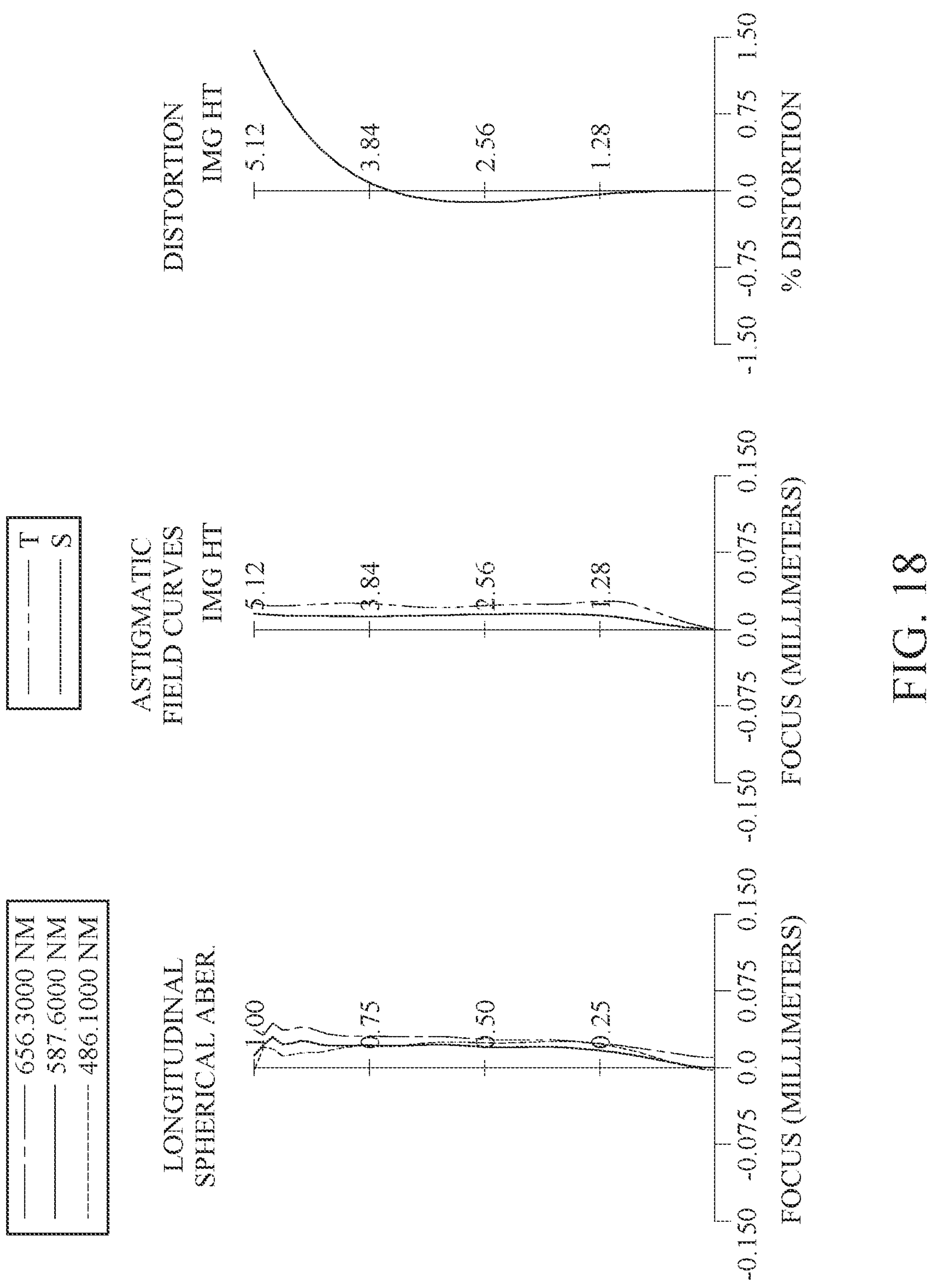
FIG. 18 shows spherical aberration curves, astigmatic field curves and a distortion curve of the image capturing unit corresponding to the infinite object distance according to the 6th embodiment.
Figure 19:
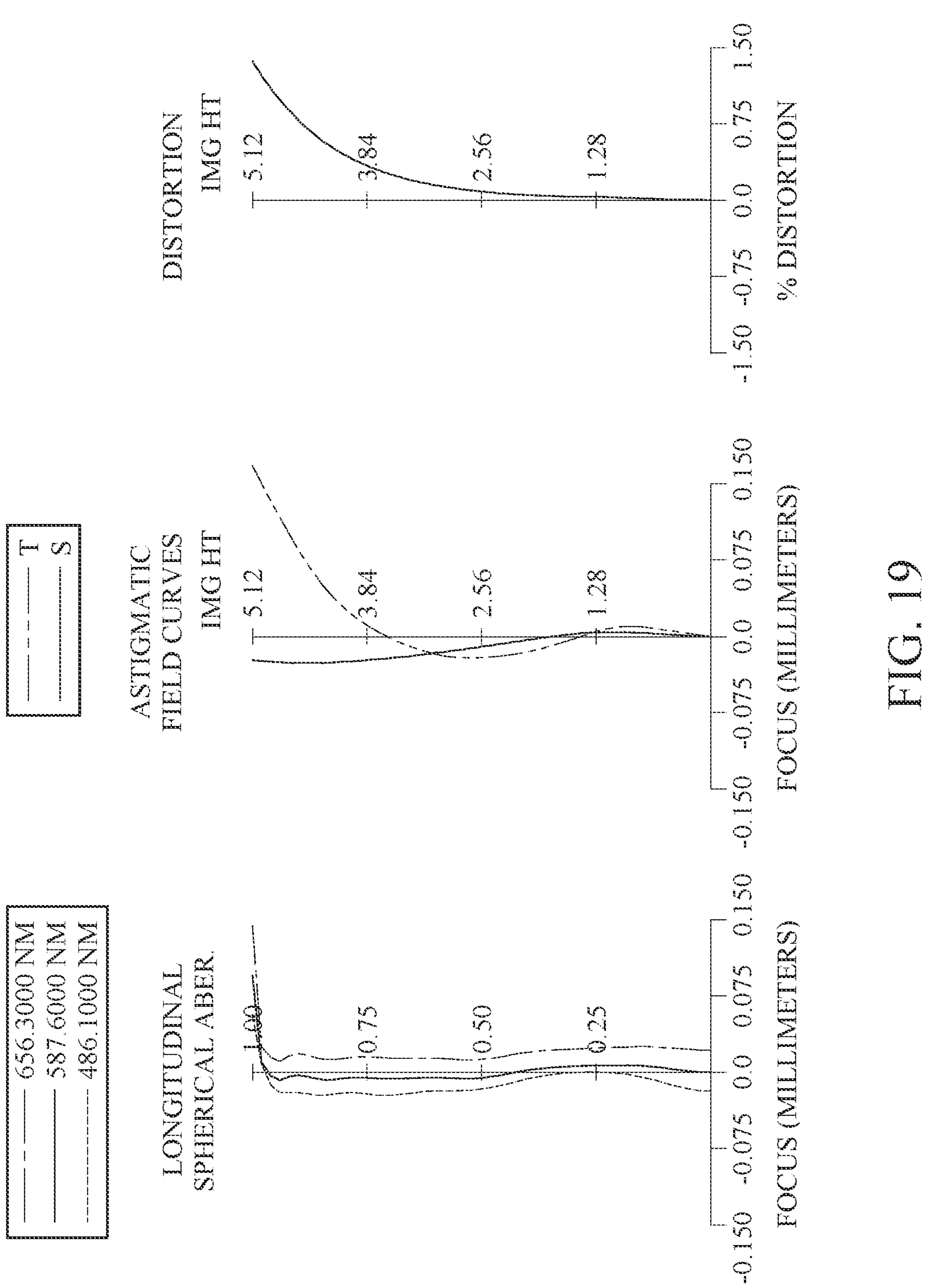
FIG. 19 shows spherical aberration curves, astigmatic field curves and a distortion curve of the image capturing unit corresponding to the short object distance according to the 6th embodiment.

FIG. 17 is a schematic view of an image capturing unit respectively corresponding to an infinite object distance and a short object distance according to the 6th embodiment of the present disclosure. FIG. 18 shows spherical aberration curves, astigmatic field curves and a distortion curve of the image capturing unit corresponding to the infinite object distance according to the 6th embodiment. FIG. 19 shows spherical aberration curves, astigmatic field curves and a distortion curve of the image capturing unit corresponding to the short object distance according to the 6th embodiment. The upper part of FIG. 17 shows the optical photographing lens assembly at a long focus state (a first state), and the lower part of FIG. 17 shows the optical photographing lens assembly at a short focus state (a second state). In FIG. 17, the image capturing unit 6 includes the optical photographing lens assembly (its reference numeral is omitted) of the present disclosure and an image sensor IS. The optical photographing lens assembly includes, in order from an object side to an image side along an optical path, a stop S1, a first lens element E1, a reflective element LF1, a stop S2, a second lens element E2, a third lens element E3, a stop S3, a fourth lens element E4, a fifth lens element E5, a sixth lens element E6, a stop S4, a seventh lens element E7, a reflective element LF2, a filter E8 and an image surface IMG. Further, the optical photographing lens assembly includes, in order from the object side to the image side along the optical path, a first lens group G1, a second lens group G2 and a third lens group G3. The first lens group G1 includes the first lens element E1. The second lens group G2 includes the second lens element E2, the third lens element E3, the fourth lens element E4 and the fifth lens element E5. The third lens group G3 includes the sixth lens element E6 and the seventh lens element E7. The optical photographing lens assembly includes seven lens elements (E1, E2, E3, E4, E5, E6 and E7) with no additional lens element disposed between each of the adjacent seven lens elements.

An axial distance between an imaged object (not shown) and the object-side surface of a lens element closest to the object side is defined as an object distance. In this embodiment, an axial distance between the imaged object and the object-side surface of the first lens element E1 is defined as the object distance. When the object distance changes from the infinite object distance to the short object distance, the optical photographing lens assembly performs a movement focus process to change from the long focus state to the short focus state. As shown in FIG. 17, during the movement focus process, the second lens group G2 moves towards the object side with respect to the first lens group G1 and the third lens group G3 along a direction in parallel with an optical axis. On the other hand, when the object distance changes from the short object distance to the infinite object distance, the second lens group G2 moves towards the image side with respect to the first lens group G1 and the third lens group G3 along a direction in parallel with the optical axis. Moreover, all lens elements of each of the three lens groups have no relative movement with respect to one another during the movement focus process.

The reflective element LF1 is a reflective mirror, and the reflective element LF2 is a glass prism. The reflective elements LF1, LF2 each provide an optical path folding function. The reflective element can have various forms as shown in FIG. 42 to FIG. 50, which will not be repeated again. Also, the light-folding effect generated by the reflective elements LF1, LF2 is omitted in FIG. 17.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has one inflection point. The image-side surface of the first lens element E1 has one inflection point.

The second lens element E2 with positive refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has two inflection points. The image-side surface of the second lens element E2 has four inflection points. The image-side surface of the second lens element E2 has two convex critical points and one concave critical point in an off-axis region thereof.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has four inflection points. The object-side surface of the third lens element E3 has one convex critical point and one concave critical point in an off-axis region thereof.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has one inflection point.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric. The object-side surface of the fifth lens element E5 has two inflection points. The image-side surface of the fifth lens element E5 has two inflection points. The object-side surface of the fifth lens element E5 has one convex critical point and one concave critical point in an off-axis region thereof.

The sixth lens element E6 with negative refractive power has an object-side surface being concave in a paraxial region thereof and an image-side surface being convex in a paraxial region thereof. The sixth lens element E6 is made of plastic material and has the object-side surface and the image-side surface being both aspheric. The object-side surface of the sixth lens element E6 has one inflection point. The image-side surface of the sixth lens element E6 has one inflection point. The object-side surface of the sixth lens element E6 has one convex critical point in an off-axis region thereof. The image-side surface of the sixth lens element E6 has one concave critical point in an off-axis region thereof.

The seventh lens element E7 with negative refractive power has an object-side surface being concave in a paraxial region thereof and an image-side surface being concave in a paraxial region thereof. The seventh lens element E7 is made of plastic material and has the object-side surface and the image-side surface being both aspheric. The image-side surface of the seventh lens element E7 has three inflection points. The image-side surface of the seventh lens element E7 has one convex critical point in an off-axis region thereof.

The filter E8 is made of glass material and located between the reflective element LF2 and the image surface IMG, and will not affect the focal length of the optical photographing lens assembly. The image sensor IS is disposed on or near the image surface IMG.

The detailed optical data of the 6th embodiment are shown in Table 6A and Table 6B, and the aspheric surface data are shown in Table 6C below.

TABLE 6A

| 6th Embodiment | | | | | | | | |
|---|---|---|---|---|---|---|---|---|
| Surface # | | Curvature Radius | | Thickness | Material | Index | Abbe # | Focal Length |
| 0 | Object | Plano | | D0 | | | | |
| 1 | Stop | Plano | | −1.340 | | | | |
| 2 | Lens 1 | 9.1456 | (ASP) | 1.124 | Plastic | 1.534 | 56.0 | 48.68 |
| 3 | | 13.5012 | (ASP) | 4.426 | | | | |
| 4 | Reflective element | Plano | | D1 | | | | |
| 5 | Stop | Plano | | −0.897 | | | | |
| 6 | Lens 2 | 5.8573 | (ASP) | 1.789 | Plastic | 1.544 | 56.0 | 10.78 |
| 7 | | 3516.3081 | (ASP) | 0.044 | | | | |
| 8 | Lens 3 | 6.9930 | (ASP) | 0.726 | Plastic | 1.614 | 25.6 | −9.13 |
| 9 | | 2.9883 | (ASP) | 0.855 | | | | |
| 10 | Stop | Plano | | 0.222 | | | | |
| 11 | Lens 4 | −58.6346 | (ASP) | 0.867 | Plastic | 1.544 | 56.0 | 14.05 |
| 12 | | −6.7964 | (ASP) | 0.446 | | | | |
| 13 | Lens 5 | −143.7810 | (ASP) | 0.845 | Plastic | 1.566 | 37.4 | 23.49 |
| 14 | | −12.1987 | (ASP) | D2 | | | | |
| 15 | Lens 6 | −6.1465 | (ASP) | 0.583 | Plastic | 1.544 | 56.0 | −44.18 |
| 16 | | −8.5341 | (ASP) | 0.255 | | | | |
| 17 | Stop | Plano | | 0.908 | | | | |
| 18 | Lens 7 | −55.5556 | (ASP) | 0.605 | Plastic | 1.544 | 56.0 | −12.44 |
| 19 | | 7.7350 | (ASP) | 0.500 | | | | |
| 20 | Reflective element | Plano | | 7.100 | Glass | 1.847 | 23.8 | — |
| 21 | | Plano | | 0.100 | | | | |
| 22 | Filter | Plano | | 0.210 | Glass | 1.517 | 64.2 | — |
| 23 | | Plano | | 0.344 | | | | |
| 24 | Image | Plano | | — | | | | |

Note: Reference wavelength is 587.6 nm (d-line).
The aperture stop may be located on different positions depending on the object distance.
The aperture stop is located on Surface 5 at the long focus state (first state).
The aperture stop is located on Surface 10 at the short focus state (second state).
An effective radius of the stop S1 (Surface 1) is 5.281 mm
An effective radius of the stop S2 (Surface 5) is 3.449 mm
An effective radius of the stop S3 (Surface 10) is 2.838 mm
An effective radius of the stop S4 (Surface 17) is 2.875 mm

TABLE 6B

| Optical data for optical photographing lens assembly with infinite object distance and short object distance | | |
|---|---|---|
| | Infinite object distance (Long focus state) | Short object distance (Short focus state) |
| f [mm] | 19.03 | 13.31 |
| Fno | 1.95 | 2.50 |
| HFOV [deg.] | 14.8 | 12.3 |
| Object distance [mm] | ∞ | 60.000 |
| D0 [mm] | ∞ | 61.340 |
| D1 [mm] | 7.171 | 4.971 |
| D2 [mm] | 0.823 | 3.023 |

In Table 6B, the optical data is the same as the data of the 1st embodiment. Please be noted that in this embodiment, an axial distance between the imaged object and the stop S1 is D0, an axial distance between the reflective element LF1 and the stop S2 is D1, and an axial distance between the image-side surface of the fifth lens element E5 and the object-side surface of the sixth lens element E6 is D2.

Moreover, the optical photographing lens assembly of this embodiment can further have other focal lengths object distances corresponding to the intermediate range of infinity and the close-up distance the long focus state and the short focus state in related to other movement focusing conditions besides the long focus state 10 and the short focus state for different object distances. The present disclosure is not limited to the optical photographing lens assembly in TABLE 6B.

TABLE 6C

| Aspheric Coefficients | | | | |
|---|---|---|---|---|
| Surface # | 2 | 3 | 6 | 7 |
| k = | 1.36966000E−02 | 1.47615000E−01 | 5.66758000E−02 | 9.90000000E+01 |
| A4 = | −1.81367267E−04 | −2.05064365E−04 | 5.67226192E−04 | −1.77992948E−03 |
| A6 = | 2.90301972E−06 | −3.15246127E−07 | −1.53279134E−04 | 4.80264099E−03 |
| A8 = | −1.75342091E−06 | −1.66372439E−06 | 4.11076233E−05 | −2.94365384E−03 |
| A10 = | 2.17342599E−07 | 2.67240605E−07 | −1.14278090E−05 | 1.19735218E−03 |
| A12 = | −1.75735316E−08 | −2.72798130E−08 | 7.10918649E−07 | −4.08704943E−04 |
| A14 = | 8.60166377E−10 | 1.72971130E−09 | 3.17597377E−07 | 1.16799834E−04 |
| A16 = | −2.48503340E−11 | −6.89397079E−11 | −8.40393417E−08 | −2.51865206E−05 |
| A18 = | 3.69915405E−13 | 1.66815264E−12 | 8.34265036E−09 | 3.77770474E−06 |
| A20 = | −1.62487734E−15 | −2.23335180E−14 | −3.20939970E−10 | −3.75113464E−07 |
| A22 = | −1.27300649E−17 | 1.26030723E−16 | −1.77242892E−12 | 2.33885532E−08 |
| A24 = | — | — | 3.09594262E−13 | −8.27935222E−10 |
| A26 = | — | — | — | 1.26921914E−11 |
| Surface # | 8 | 9 | 11 | 12 |
| k = | −1.36846000E−01 | −9.10290000E−04 | 9.90000000E+01 | −1.47936000E+00 |
| A4 = | −1.91902548E−02 | −2.40360677E−02 | 3.77509494E−04 | 3.50690868E−03 |
| A6 = | 6.22470809E−03 | 1.86090901E−03 | 3.59115788E−04 | 1.39315415E−03 |
| A8 = | −2.05196813E−03 | 1.69719372E−03 | −3.91319045E−04 | −1.51128882E−03 |
| A10 = | 4.76366133E−04 | −1.84403643E−03 | 6.06373970E−04 | 1.47023487E−03 |
| A12 = | −1.21824028E−04 | 9.64336917E−04 | −5.05921555E−04 | −9.99289090E−04 |
| A14 = | 4.71784175E−05 | −3.30137382E−04 | 2.23812803E−04 | 4.25389695E−04 |
| A16 = | −1.45378251E−05 | 7.94259897E−05 | −6.05037300E−05 | −1.19745933E−04 |
| A18 = | 2.77512067E−06 | −1.36519608E−05 | 1.06130566E−05 | 2.32024640E−05 |
| A20 = | −3.22789921E−07 | 1.64435383E−06 | −1.22155290E−06 | −3.13674552E−06 |
| A22 = | 2.24572323E−08 | −1.31382780E−07 | 8.96650993E−08 | 2.92484263E−07 |
| A24 = | −8.61858914E−10 | 6.22135720E−09 | −3.83676837E−09 | −1.80184131E−08 |
| A26 = | 1.40710122E−11 | −1.31636745E−10 | 7.34107439E−11 | 6.62444263E−10 |
| A28 = | — | — | — | −1.10327442E−11 |
| Surface # | 13 | 14 | 16 | 17 |
| k = | 9.90000000E+01 | 4.21796000E+00 | 4.49093000E−01 | −5.43639000E+00 |
| A4 = | 3.11059927E−03 | −4.35383346E−05 | 2.04536005E−02 | 1.92716643E−02 |
| A6 = | 1.58564087E−03 | 7.61927723E−04 | −1.76161063E−03 | −1.96606143E−03 |
| A8 = | −1.52650161E−03 | −6.50419921E−04 | −4.29858550E−04 | 2.36300816E−04 |
| A10 = | 1.27605411E−03 | 5.95703664E−04 | 4.49805219E−04 | −2.05484115E−04 |
| A12 = | −7.74763566E−04 | −3.44769747E−04 | −1.97979977E−04 | 1.60957267E−04 |
| A14 = | 3.10355596E−04 | 1.26435180E−04 | 5.15646882E−05 | −7.55257731E−05 |
| A16 = | −8.35726189E−05 | −3.04877230E−05 | −7.19339568E−06 | 2.27374051E−05 |
| A18 = | 1.55047965E−05 | 4.92423252E−06 | 8.79192201E−08 | −4.53977447E−06 |
| A20 = | −1.99579532E−06 | −5.28546300E−07 | 1.61731140E−07 | 5.99583658E−07 |
| A22 = | 1.75654043E−07 | 3.61922827E−08 | −3.10971824E−08 | −5.03878511E−08 |
| A24 = | −1.01121080E−08 | −1.43103794E−09 | 2.86509736E−09 | 2.43922349E−09 |
| A26 = | 3.44025156E−10 | 2.48568573E−11 | −1.37330434E−10 | −5.16574031E−11 |
| A28 = | −5.25926882E−12 | — | 2.74573143E−12 | — |

| Surface # | 19 | 20 |
|---|---|---|
| k = | −3.08992000E+01 | 1.43301000E+00 |
| A4 = | −1.63470643E−02 | −1.90890716E−02 |
| A6 = | 3.06621722E−03 | 3.05243957E−03 |
| A8 = | −1.94777510E−03 | −7.51706734E−04 |
| A10 = | 1.33641704E−03 | 2.41946618E−04 |
| A12 = | −6.74733550E−04 | −7.93512289E−05 |

TABLE 6C-continued

| Aspheric Coefficients | | |
|---|---|---|
| A14 = | 2.32962672E−04 | 2.08076274E−05 |
| A16 = | −5.48949957E−05 | −3.95845958E−06 |
| A18 = | 8.76884046E−06 | 5.28023727E−07 |
| A20 = | −9.26226101E−07 | −4.79572073E−08 |
| A22 = | 6.11674937E−08 | 2.81832442E−09 |
| A24 = | −2.24200344E−09 | −9.63882518E−11 |
| A26 = | 3.36177510E−11 | 1.45252014E−12 |

In the 6th embodiment, the equation of the aspheric surface profiles of the aforementioned lens elements is the same as the equation of the 1st embodiment. Also, the definitions of these parameters shown in Table 6D below are the same as those stated in the 1st embodiment with corresponding values for the 6th embodiment, so an explanation in this regard will not be provided again.

Moreover, these parameters can be calculated from Table 6A to Table 6C as the following values and satisfy the following conditions:

TABLE 6D

| Schematic Parameters | | | |
|---|---|---|---|
| fL [mm] | 19.03 | (\|fL/f1\| + \|fL/f5\|)/\|fL/f4\| | 0.89 |
| FnoL | 1.95 | \|f2/f5\| | 0.46 |
| HFOVL [deg.] | 14.8 | \|f4/f5\| | 0.60 |
| fS [mm] | 13.31 | \|f4/R7\| + \|f4/R8\| | 2.31 |
| FnoS | 2.50 | (R1 − R2)/(R1 + R2) | −0.19 |
| HFOVS [deg.] | 12.3 | \|R6/R2\| | 0.22 |
| TLL/TLS | 1.00 | T12L/Dr3r14L | 1.19 |
| BLL/BLS | 1.00 | Dr3r10L/Dr11r14L | 2.46 |
| fG1/fG2 | 4.53 | CT5/CT4 | 0.97 |
| \|fL/fG2N\| | 0.81 | CT6/T67L | 0.50 |
| TG1G2L/DG2G3L | 1.19 | V5/N5 | 23.88 |
| (TG1G2L-TG1G2S)/TG1G2L | 0.21 | V30 | 1 |
| TLL/fL | 1.53 | (T67L-Sag6R2 + Sag7R1)/T67L | 0.09 |
| TLL/BLL | 3.52 | Sag4R2/CT4 | −0.69 |

7th Embodiment

Figure 20:
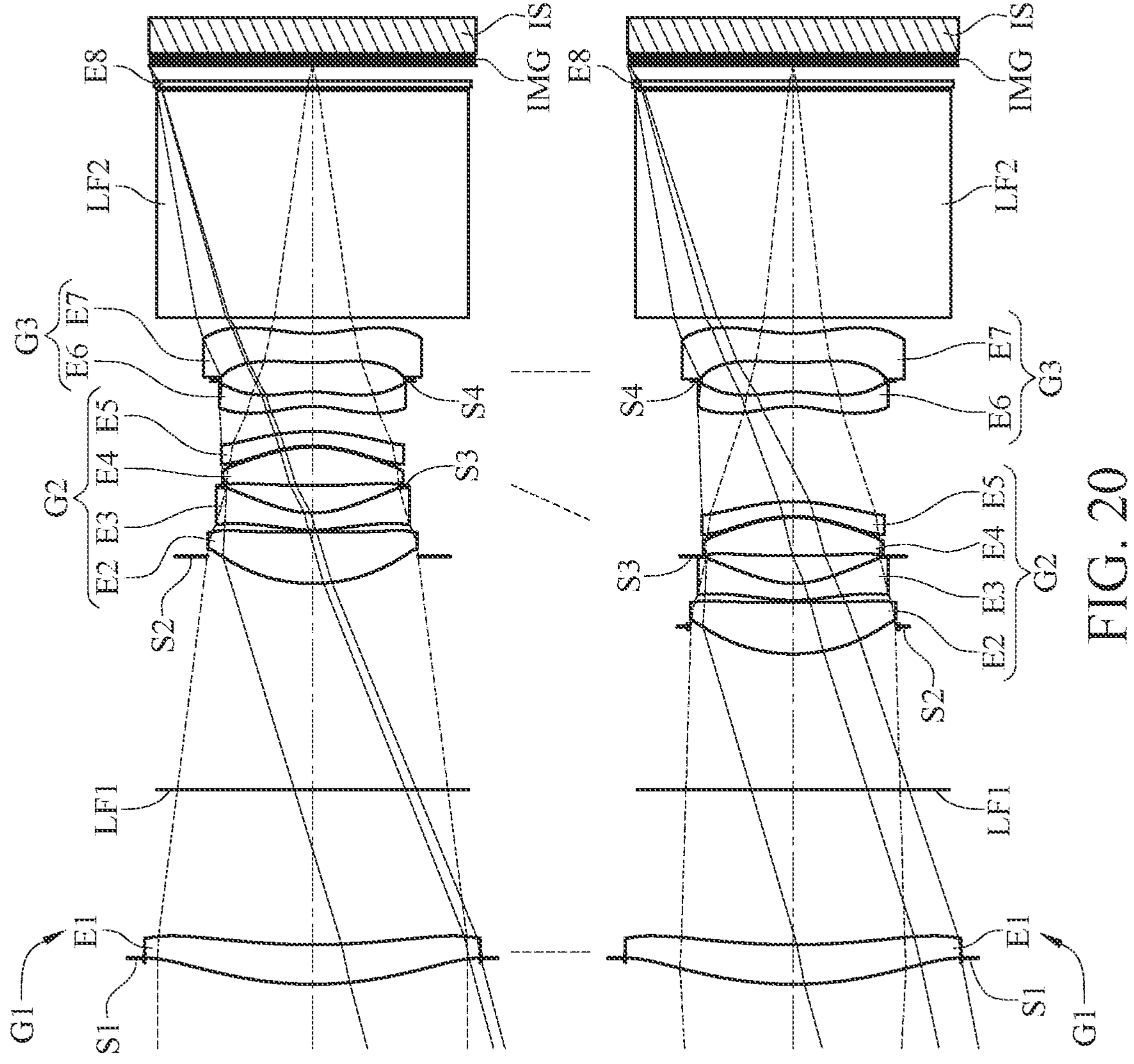
FIG. 20 is a schematic view of an image capturing unit respectively corresponding to an infinite object distance and a short object distance according to the 7th embodiment of the present disclosure.
Figure 21:
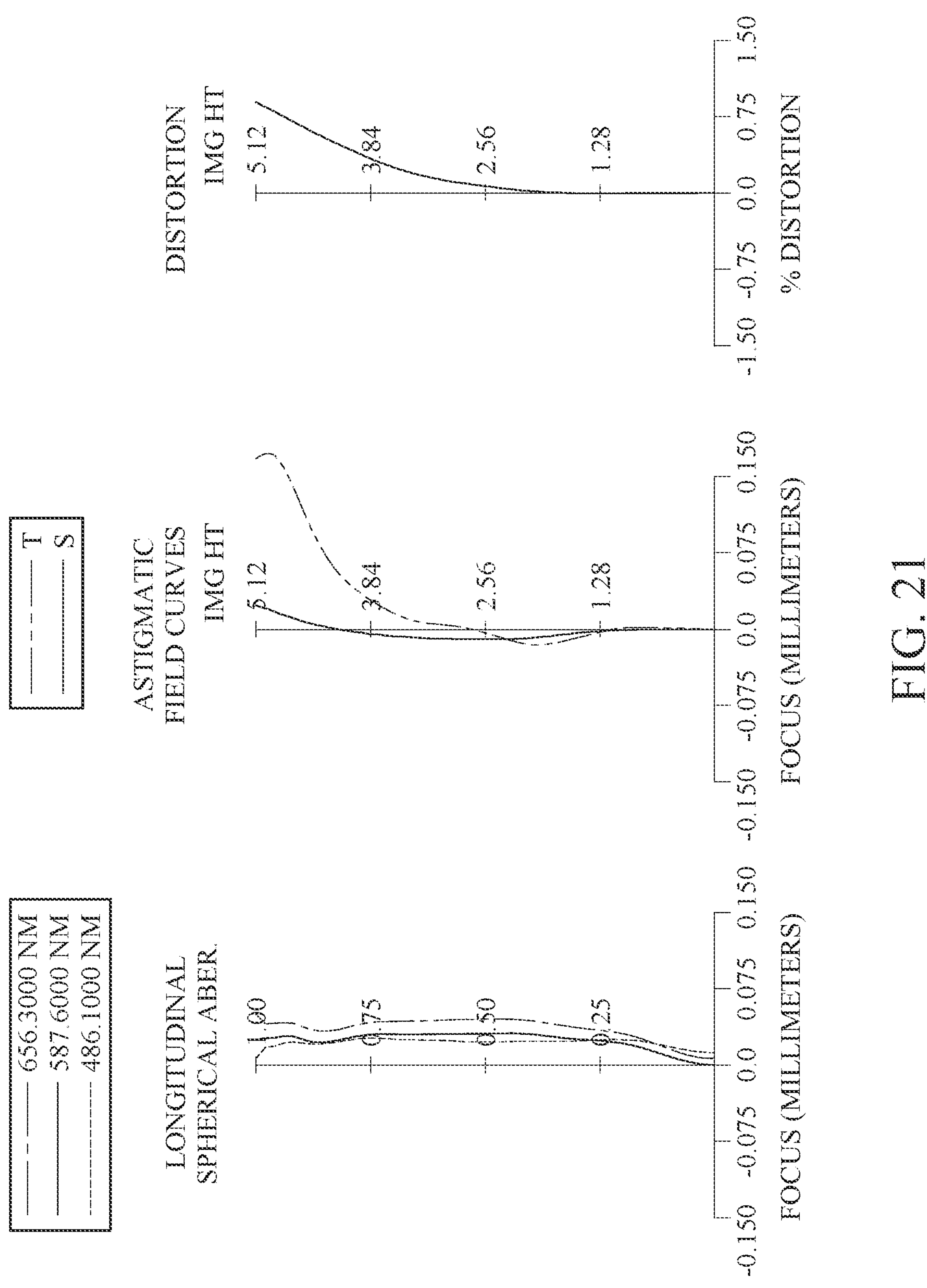
FIG. 21 shows spherical aberration curves, astigmatic field curves and a distortion curve of the image capturing unit corresponding to the infinite object distance according to the 7th embodiment.
Figure 22:
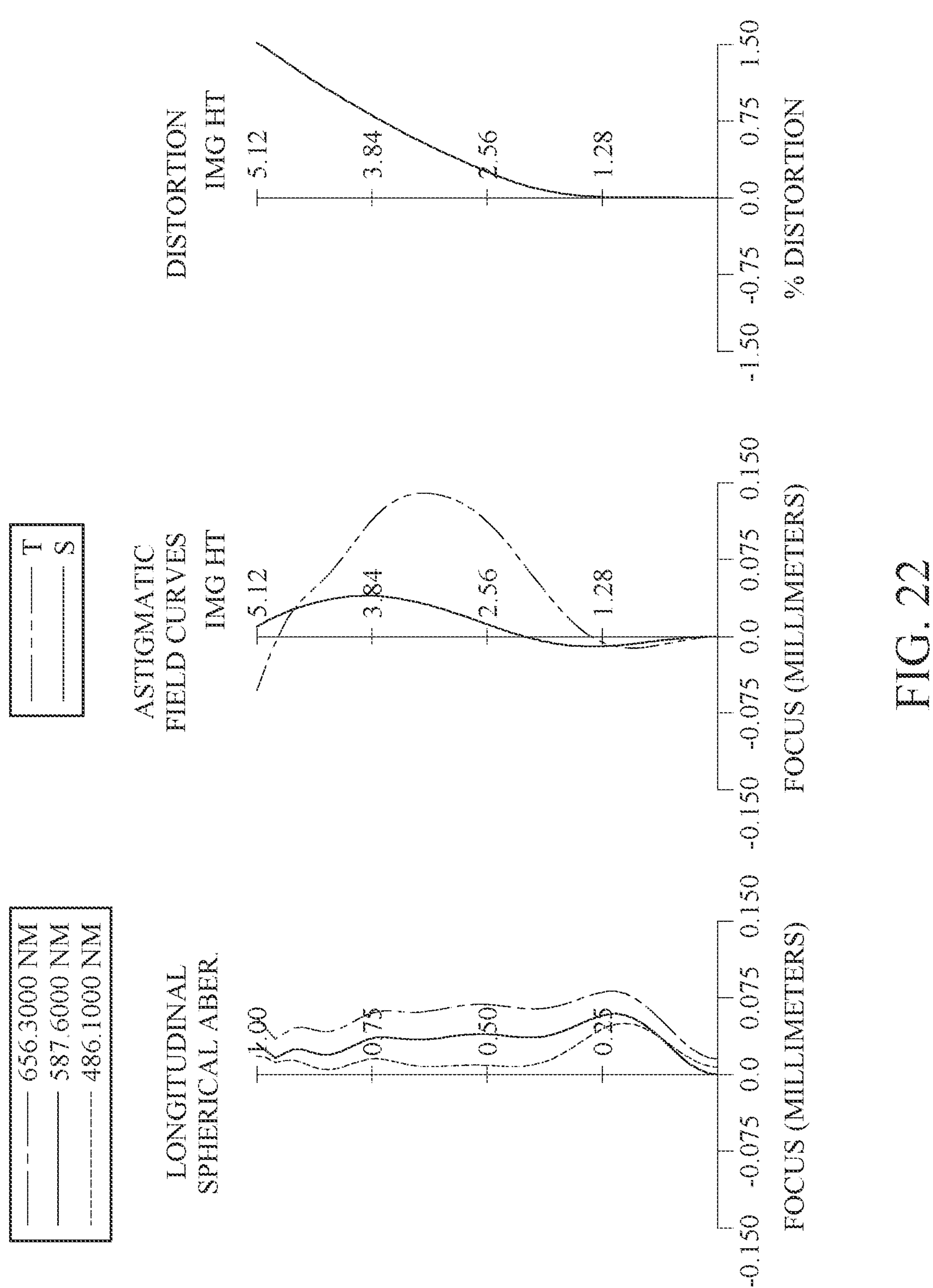
FIG. 22 shows spherical aberration curves, astigmatic field curves and a distortion curve of the image capturing unit corresponding to the short object distance according to the 7th embodiment.

FIG. 20 is a schematic view of an image capturing unit respectively corresponding to an infinite object distance and a short object distance according to the 7th embodiment of the present disclosure. FIG. 21 shows spherical aberration curves, astigmatic field curves and a distortion curve of the image capturing unit corresponding to the infinite object distance according to the 7th embodiment. FIG. 22 shows spherical aberration curves, astigmatic field curves and a distortion curve of the image capturing unit corresponding to the short object distance according to the 7th embodiment. The upper part of FIG. 20 shows the optical photographing lens assembly at a long focus state (a first state), and the lower part of FIG. 20 shows the optical photographing lens assembly at a short focus state (a second state). In FIG. 20, the image capturing unit 7 includes the optical photographing lens assembly (its reference numeral is omitted) of the present disclosure and an image sensor IS. The optical photographing lens assembly includes, in order from an object side to an image side along an optical path, a stop S1, a first lens element E1, a reflective element LF1, a stop S2, a second lens element E2, a third lens element E3, a stop S3, a fourth lens element E4, a fifth lens element E5, a sixth lens element E6, a stop S4, a seventh lens element E7, a reflective element LF2, a filter E8 and an image surface IMG. Further, the optical photographing lens assembly includes, in order from the object side to the image side along the optical path, a first lens group G1, a second lens group G2 and a third lens group G3. The first lens group G1 includes the first lens element E1. The second lens group G2 includes the second lens element E2, the third lens element E3, the fourth lens element E4 and the fifth lens element E5. The third lens group G3 includes the sixth lens element E6 and the seventh lens element E7. The optical photographing lens assembly includes seven lens elements (E1, E2, E3, E4, E5, E6 and E7) with no additional lens element disposed between each of the adjacent seven lens elements.

An axial distance between an imaged object (not shown) and the object-side surface of a lens element closest to the object side is defined as an object distance. In this embodiment, an axial distance between the imaged object and the object-side surface of the first lens element E1 is defined as the object distance. When the object distance changes from the infinite object distance to the short object distance, the optical photographing lens assembly performs a movement focus process to change from the long focus state to the short focus state. As shown in FIG. 20, during the movement focus process, the second lens group G2 moves towards the object side with respect to the first lens group G1 and the third lens group G3 along a direction in parallel with an optical axis. On the other hand, when the object distance changes from the short object distance to the infinite object distance, the second lens group G2 moves towards the image side with respect to the first lens group G1 and the third lens group G3 along a direction in parallel with the optical axis. Moreover, all lens elements of each of the three lens groups have no relative movement with respect to one another during the movement focus process.

The reflective element LF1 is a reflective mirror, and the reflective element LF2 is a glass prism. The reflective elements LF1, LF2 each provide an optical path folding function. The reflective element can have various forms as shown in FIG. 42 to FIG. 50, which will not be repeated again. Also, the light-folding effect generated by the reflective elements LF1, LF2 is omitted in FIG. 20.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has one inflection point. The image-side surface of the first lens element E1 has one inflection point. The object-side surface of the first lens element E1 has one concave critical point in an off-axis region thereof. The image-side surface of the first lens element E1 has one convex critical point in an off-axis region thereof.

The second lens element E2 with positive refractive power has an object-side surface being convex in a paraxial region thereof and an image-side surface being convex in a paraxial region thereof. The second lens element E2 is made of plastic material and has the object-side surface and the image-side surface being both aspheric. The object-side surface of the second lens element E2 has one inflection point. The image-side surface of the second lens element E2 has three inflection points. The image-side surface of the second lens element E2 has one convex critical point and one concave critical point in an off-axis region thereof.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has two inflection points. The image-side surface of the third lens element E3 has one inflection point. The object-side surface of the third lens element E3 has one concave critical point in an off-axis region thereof.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The object-side surface of the fourth lens element E4 has one inflection point. The object-side surface of the fourth lens element E4 has one concave critical point in an off-axis region thereof.

The fifth lens element E5 with negative refractive power has an object-side surface being concave in a paraxial region thereof and an image-side surface being convex in a paraxial region thereof. The fifth lens element E5 is made of plastic material and has the object-side surface and the image-side surface being both aspheric. The object-side surface of the fifth lens element E5 has one inflection point. The image-side surface of the fifth lens element E5 has one inflection point.

The sixth lens element E6 with negative refractive power has an object-side surface being concave in a paraxial region thereof and an image-side surface being convex in a paraxial region thereof. The sixth lens element E6 is made of plastic material and has the object-side surface and the image-side surface being both aspheric. The object-side surface of the sixth lens element E6 has one inflection point. The image-side surface of the sixth lens element E6 has one inflection point. The object-side surface of the sixth lens element E6 has one convex critical point in an off-axis region thereof. The image-side surface of the sixth lens element E6 has one concave critical point in an off-axis region thereof.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has one inflection point. The image-side surface of the seventh lens element E7 has one inflection point. The object-side surface of the seventh lens element E7 has one concave critical point in an off-axis region thereof. The image-side surface of the seventh lens element E7 has one convex critical point in an off-axis region thereof.

The filter E8 is made of glass material and located between the reflective element LF2 and the image surface IMG, and will not affect the focal length of the optical photographing lens assembly. The image sensor IS is disposed on or near the image surface IMG.

The detailed optical data of the 7th embodiment are shown in Table 7A and Table 7B, and the aspheric surface data are shown in Table 7C below.

TABLE 7A

| 7th Embodiment | | | | | | | | |
|---|---|---|---|---|---|---|---|---|
| Surface # | | Curvature Radius | | Thickness | Material | Index | Abbe # | Focal Length |
| 0 | Object | Plano | | D0 | | | | |
| 1 | Stop | Plano | | −0.818 | | | | |
| 2 | Lens 1 | 11.6406 | (ASP) | 1.236 | Plastic | 1.545 | 56.1 | 44.08 |
| 3 | | 21.7376 | (ASP) | 4.860 | | | | |
| 4 | Reflective element | Plano | | D1 | | | | |
| 5 | Stop | Plano | | −0.847 | | | | |
| 6 | Lens 2 | 5.2701 | (ASP) | 1.618 | Plastic | 1.545 | 56.1 | 8.69 |
| 7 | | −41.6920 | (ASP) | 0.057 | | | | |
| 8 | Lens 3 | 5.7740 | (ASP) | 0.526 | Plastic | 1.639 | 23.5 | −9.12 |
| 9 | | 2.7971 | (ASP) | 0.854 | | | | |
| 10 | Stop | Plano | | 0.017 | | | | |
| 11 | Lens 4 | 54.4654 | (ASP) | 1.192 | Plastic | 1.587 | 28.3 | 6.44 |
| 12 | | −4.0306 | (ASP) | 0.040 | | | | |
| 13 | Lens 5 | −3.9357 | (ASP) | 0.450 | Plastic | 1.661 | 20.4 | −15.08 |
| 14 | | −6.8029 | (ASP) | D2 | | | | |
| 15 | Lens 6 | −3.3177 | (ASP) | 0.450 | Plastic | 1.545 | 56.1 | −22.76 |
| 16 | | −4.7459 | (ASP) | 0.339 | | | | |
| 17 | Stop | Plano | | 0.582 | | | | |
| 18 | Lens 7 | 9.7366 | (ASP) | 0.910 | Plastic | 1.545 | 56.1 | −19.75 |
| 19 | | 4.9430 | (ASP) | 0.500 | | | | |

TABLE 7A-continued

| 7th Embodiment | | | | | | | |
|---|---|---|---|---|---|---|---|
| Surface # | | Curvature Radius | Thickness | Material | Index | Abbe # | Focal Length |
| 20 | Reflective element | Plano | 7.100 | Glass | 1.847 | 23.8 | — |
| 21 | | Plano | 0.100 | | | | |
| 22 | Filter | Plano | 0.210 | Glass | 1.517 | 64.2 | — |
| 23 | | Plano | 0.470 | | | | |
| 24 | Image | Plano | — | | | | |

Note: Reference wavelength is 587.6 nm (d-line).
The aperture stop may be located on different positions depending on the object distance.
The aperture stop is located on Surface 5 at the long focus state (first state).
The aperture stop is located on Surface 10 at the short focus state (second state).
An effective radius of the stop S1 (Surface 1) is 5.251 mm
An effective radius of the stop S2 (Surface 5) is 3.300 mm
An effective radius of the stop S3 (Surface 10) is 2.717 mm
An effective radius of the stop S4 (Surface 17) is 2.890 mm

TABLE 7B

| Optical data for optical photographing lens assembly with infinite object distance and short object distance | | |
|---|---|---|
| | Infinite object distance (Long focus state) | Short object distance (Short focus state) |
| f [mm] | 18.67 | 13.29 |
| Fno | 1.93 | 2.51 |
| HFOV [deg.] | 15.2 | 12.2 |
| Object distance [mm] | ∞ | 60.000 |
| D0 [mm] | ∞ | 60.818 |
| D1 [mm] | 7.287 | 5.087 |
| D2 [mm] | 0.786 | 2.986 |

In Table 7B, the optical data is the same as the data of the 1st embodiment. Please be noted that in this embodiment, an axial distance between the imaged object and the stop S1 is D0, an axial distance between the reflective element LF1 and the stop S2 is D1, and an axial distance between the image-side surface of the fifth lens element E5 and the object-side surface of the sixth lens element E6 is D2.

Moreover, the optical photographing lens assembly of this embodiment can further have other focal lengths object distances corresponding to the intermediate range of infinity and the close-up distance the long focus state and the short focus state in related to other movement focusing conditions besides the long focus state and the short focus state for different object distances. The present disclosure is not limited to the optical photographing lens assembly in TABLE 7B.

TABLE 7C

| Aspheric Coefficients | | | | |
|---|---|---|---|---|
| Surface # | 2 | 3 | 6 | 7 |
| k = | 0.00000000E+00 | 0.00000000E+00 | 0.00000000E+00 | 0.00000000E+00 |
| A4 = | −2.90828930E−04 | −3.59712370E−04 | 5.59916756E−04 | 1.20647930E−02 |
| A6 = | 1.87975204E−05 | 3.25736175E−05 | 4.41817059E−05 | −1.03301705E−02 |
| A8 = | −3.80130367E−06 | −8.26121855E−06 | 4.99882189E−05 | 9.29664352E−03 |
| A10 = | 2.87660207E−07 | 1.04714337E−06 | −7.44365958E−05 | −5.94180099E−03 |
| A12 = | −9.25633209E−09 | −8.84921269E−08 | 4.15227703E−05 | 2.67533950E−03 |
| A14 = | −3.52017241E−10 | 4.92470179E−09 | −1.31349176E−05 | −8.71472401E−04 |
| A16 = | 4.62840965E−11 | −1.78213267E−10 | 2.57217396E−06 | 2.06813856E−04 |
| A18 = | −1.89991922E−12 | 4.00679600E−12 | −3.18363760E−07 | −3.55066466E−05 |
| A20 = | 3.70185409E−14 | −5.05237394E−14 | 2.42714229E−08 | 4.33561308E−06 |
| A22 = | −2.88824505E−16 | 2.70509353E−16 | −1.04161703E−09 | −3.65468510E−07 |
| A24 = | — | — | 1.92578146E−11 | 2.01572651E−08 |
| A26 = | — | — | — | −6.53443853E−10 |
| A28 = | — | — | — | 9.42979483E−12 |
| Surface # | 8 | 9 | 11 | 12 |
| k = | 0.00000000E+00 | −1.00000000E+00 | 0.00000000E+00 | 0.00000000E+00 |
| A4 = | −1.13144530E−02 | −2.13231039E−02 | 3.49360724E−04 | 1.34016745E−02 |
| A6 = | −4.80158667E−03 | 4.72756695E−03 | 1.00816959E−03 | −1.09979508E−03 |
| A8 = | 5.76544677E−03 | −1.96570057E−03 | 7.22585553E−04 | −3.01301542E−03 |
| A10 = | −3.40701373E−03 | 1.40429678E−03 | −2.00181403E−03 | 1.40488496E−03 |
| A12 = | 1.39177170E−03 | −7.44171974E−04 | 1.85155452E−03 | 6.64196049E−04 |
| A14 = | −4.47626417E−04 | 2.16333600E−04 | −9.83155654E−04 | −8.25680752E−04 |
| A16 = | 1.15702717E−04 | −2.84699281E−05 | 3.29099356E−04 | 3.50893271E−04 |
| A18 = | −2.28295804E−05 | −7.67602066E−07 | −7.21012783E−05 | −8.51448544E−05 |
| A20 = | 3.24026095E−06 | 8.06262220E−07 | 1.04511769E−05 | 1.30740213E−05 |
| A22 = | −3.14495516E−07 | −1.13935884E−07 | −9.89205511E−07 | −1.29677066E−06 |
| A24 = | 1.96605353E−08 | 7.16783830E−09 | 5.84649959E−08 | 8.08087103E−08 |
| A26 = | −7.11077043E−10 | −1.76678220E−10 | −1.94461448E−09 | −2.88360576E−09 |
| A28 = | 1.12918453E−11 | — | 2.75283165E−11 | 4.50235535E−11 |

TABLE 7C-continued

| Aspheric Coefficients | | | | |
|---|---|---|---|---|
| Surface # | 13 | 14 | 15 | 16 |
| k = | 0.00000000E+00 | 0.00000000E+00 | 0.00000000E+00 | 0.00000000E+00 |
| A4 = | 2.05848306E−02 | 8.92164086E−03 | 4.92183875E−02 | 3.95733565E−02 |
| A6 = | −1.29353439E−02 | −1.24934398E−02 | −1.83983386E−02 | −1.15234565E−02 |
| A8 = | 7.47712610E−03 | 1.17563749E−02 | 1.54454164E−02 | 8.87947315E−03 |
| A10 = | −4.16389955E−03 | −7.12784428E−03 | −1.12395762E−02 | −6.17652184E−03 |
| A12 = | 2.35103912E−03 | 2.84297179E−03 | 5.72171487E−03 | 2.91165723E−03 |
| A14 = | −9.99589157E−04 | −7.16984025E−04 | −2.02354799E−03 | −9.21511490E−04 |
| A16 = | 2.82843220E−04 | 9.92576180E−05 | 5.03548630E−04 | 1.94999075E−04 |
| A18 = | −5.22336202E−05 | −1.67388139E−06 | −8.85523726E−05 | −2.64549641E−05 |
| A20 = | 6.22081881E−06 | −2.02795567E−06 | 1.09163409E−05 | 1.97811493E−06 |
| A22 = | −4.59039218E−07 | 3.89929791E−07 | −9.20233545E−07 | −2.07909125E−08 |
| A24 = | 1.88467906E−08 | −3.55074304E−08 | 5.03675114E−08 | −9.76706262E−09 |
| A26 = | −3.05638152E−10 | 1.67885674E−09 | −1.60673453E−09 | 7.91700662E−10 |
| A28 = | −1.47163078E−12 | −3.31251568E−11 | 2.25633969E−11 | −2.05564110E−11 |

| Surface # | 18 | 19 |
|---|---|---|
| k = | 0.00000000E+00 | 0.00000000E+00 |
| A4 = | −1.74196385E−02 | −2.11838793E−02 |
| A6 = | −1.99649233E−03 | 7.30578358E−05 |
| A8 = | 4.09806567E−03 | 2.72108554E−03 |
| A10 = | −2.76599155E−03 | −1.95739803E−03 |
| A12 = | 1.13529698E−03 | 8.26461831E−04 |
| A14 = | −2.96974026E−04 | −2.35028263E−04 |
| A16 = | 4.69697606E−05 | 4.67212917E−05 |
| A18 = | −3.44652312E−06 | −6.56389590E−06 |
| A20 = | −1.49380104E−07 | 6.48301872E−07 |
| A22 = | 5.41844279E−08 | −4.40020228E−08 |
| A24 = | −4.34373724E−09 | 1.95274008E−09 |
| A26 = | 1.24323628E−10 | −5.09958299E−11 |
| A28 = | — | 5.94041505E−13 |

In the 7th embodiment, the equation of the aspheric surface profiles of the aforementioned lens elements is the same as the equation of the 1st embodiment. Also, the definitions of these parameters shown in Table 7D below are the same as those stated in the 1st embodiment with corresponding values for the 7th embodiment, so an explanation in this regard will not be provided again.

Moreover, these parameters can be calculated from Table 7A to Table 7C as the following values and satisfy the following conditions:

TABLE 7D

<table>
<tr><th colspan="4">Schematic Parameters</th></tr>
<tr><td>fL [mm]</td><td>18.67</td><td>(|fL/f1| + |fL/f5|)/|fL/f4|</td><td>0.57</td></tr>
<tr><td>FnoL</td><td>1.93</td><td>|f2/f5|</td><td>0.58</td></tr>
<tr><td>HFOVL [deg.]</td><td>15.2</td><td>|f4/f5|</td><td>0.43</td></tr>
<tr><td>fS [mm]</td><td>13.29</td><td>|f4/R7| + |f4/R8|</td><td>1.72</td></tr>
<tr><td>FnoS</td><td>2.51</td><td>(R1 − R2)/(R1 + R2)</td><td>−0.30</td></tr>
<tr><td>HFOVS [deg.]</td><td>12.2</td><td>|R6/R2|</td><td>0.13</td></tr>
<tr><td>TLL/TLS</td><td>1.00</td><td>T12L/Dr3r14L</td><td>1.44</td></tr>
<tr><td>BLL/BLS</td><td>1.00</td><td>Dr3r10L/Dr11r14L</td><td>2.08</td></tr>
<tr><td>fG1/fG2</td><td>4.07</td><td>CT5/CT4</td><td>0.38</td></tr>
<tr><td>|fL/fG2N|</td><td>1.24</td><td>CT6/T67L</td><td>0.49</td></tr>
<tr><td>TG1G2L/DG2G3L</td><td>1.44</td><td>V5/N5</td><td>12.28</td></tr>
<tr><td>(TG1G2L-TG1G2S)/TG1G2L</td><td>0.19</td><td>V30</td><td>3</td></tr>
<tr><td>TLL/fL</td><td>1.54</td><td>(T67L-Sag6R2 + Sag7R1)/T67L</td><td>0.22</td></tr>
<tr><td>TLL/BLL</td><td>3.43</td><td>Sag4R2/CT4</td><td>−0.63</td></tr>
</table>

8th Embodiment

Figure 23:
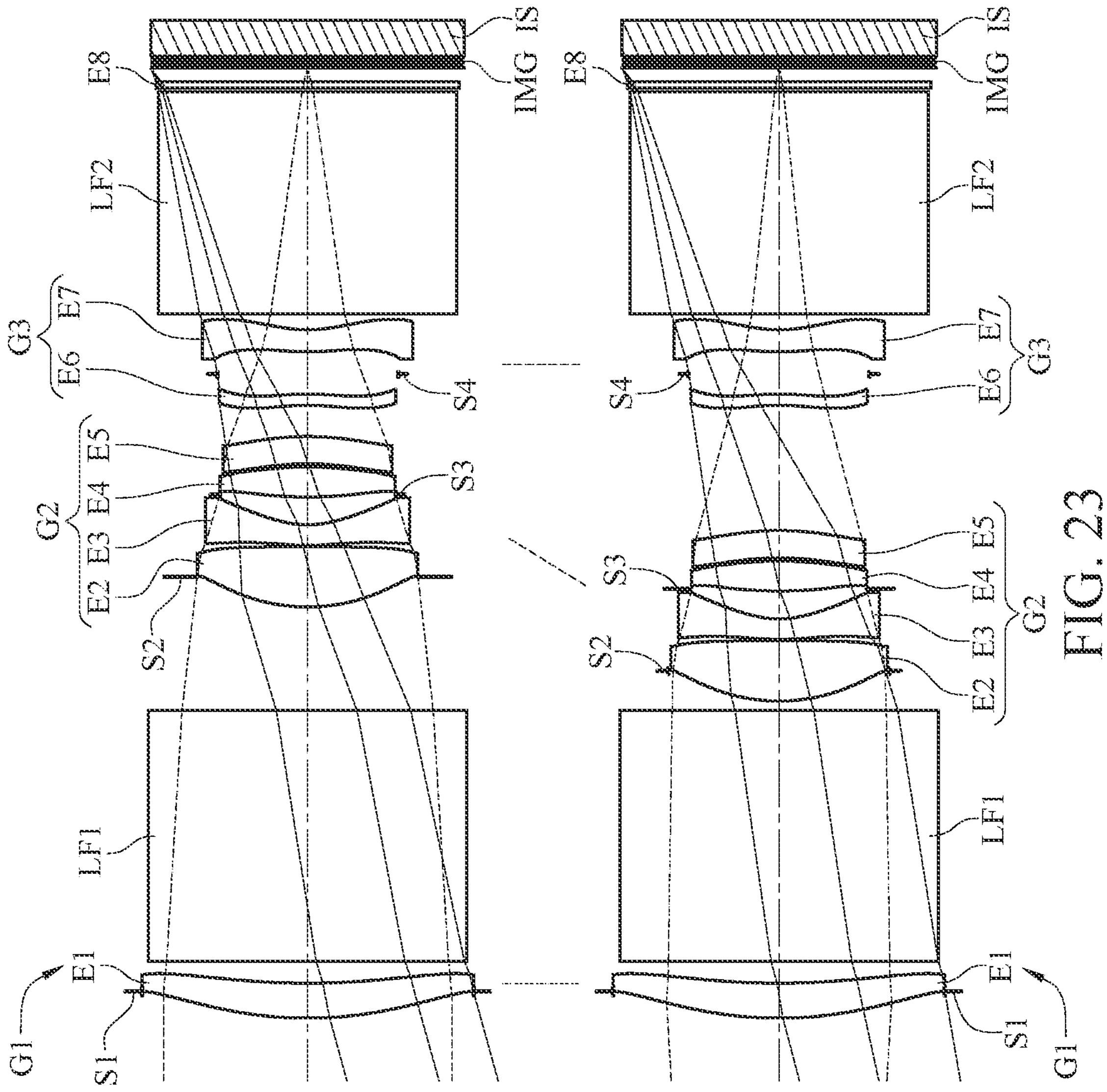
FIG. 23 is a schematic view of an image capturing unit respectively corresponding to an infinite object distance and a short object distance according to the 8th embodiment of the present disclosure.
Figure 24:
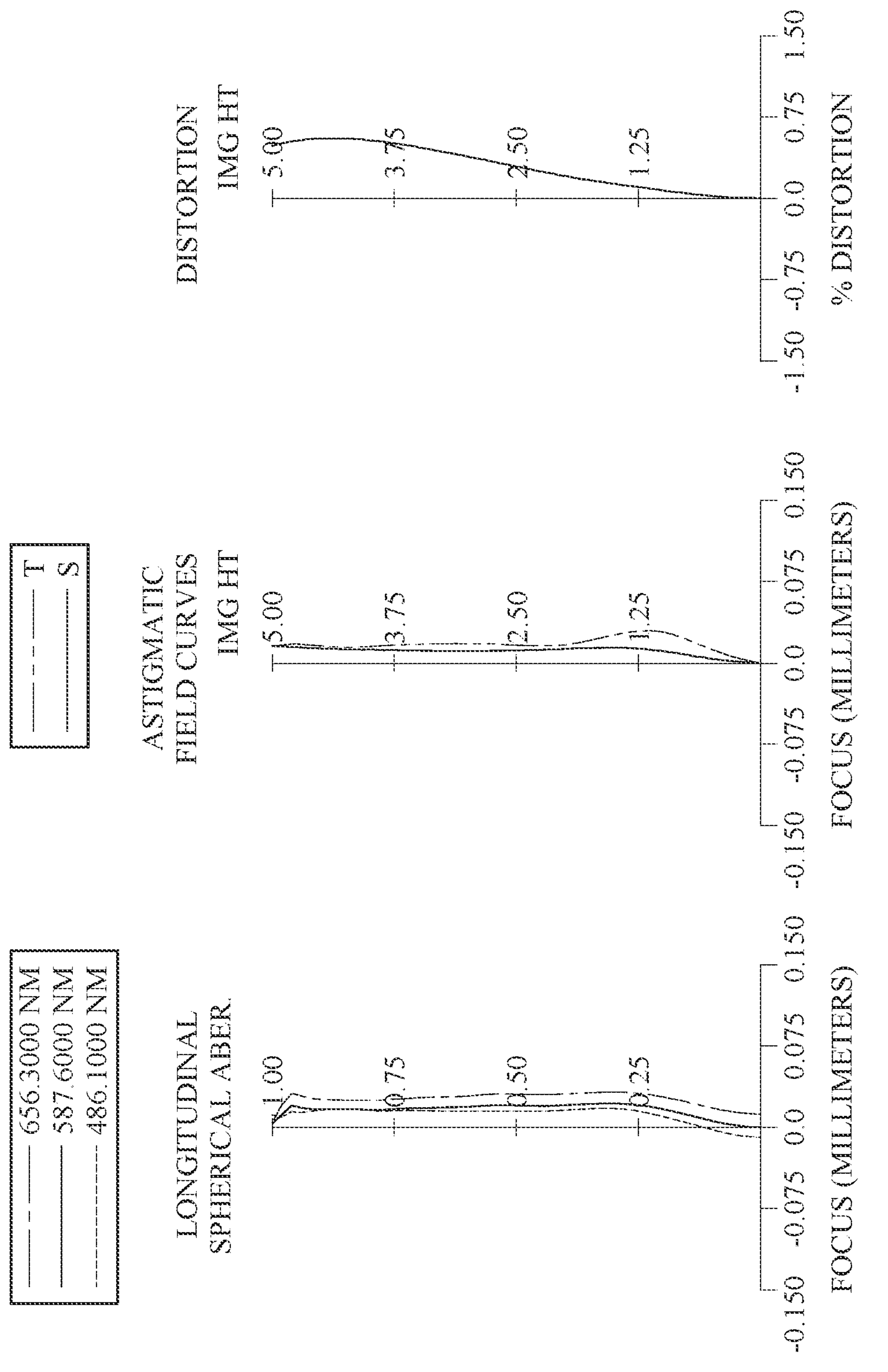
FIG. 24 shows spherical aberration curves, astigmatic field curves and a distortion curve of the image capturing unit corresponding to the infinite object distance according to the 8th embodiment.
Figure 25:
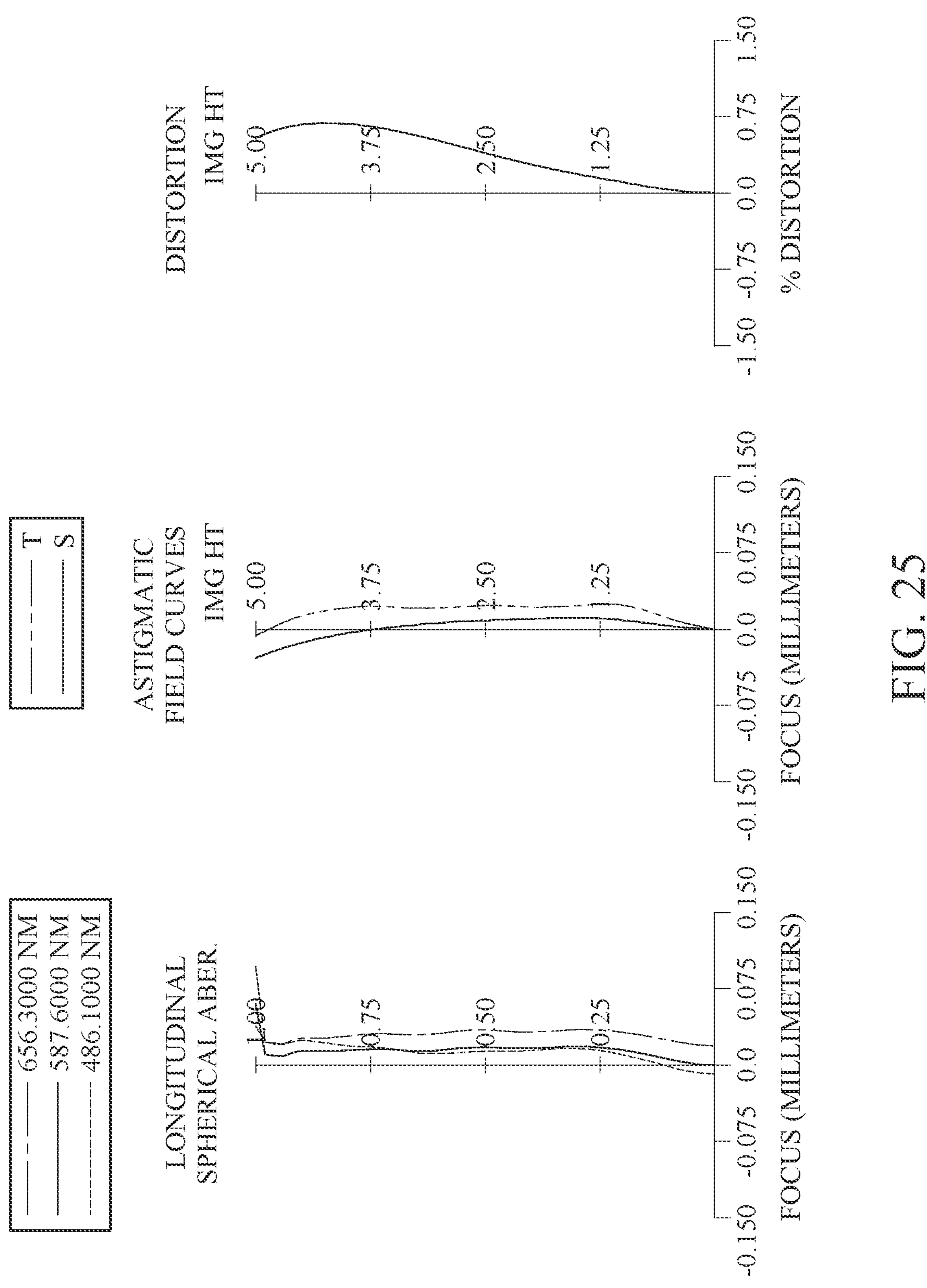
FIG. 25 shows spherical aberration curves, astigmatic field curves and a distortion curve of the image capturing unit corresponding to the short object distance according to the 8th embodiment.

FIG. 23 is a schematic view of an image capturing unit respectively corresponding to an infinite object distance and a short object distance according to the 8th embodiment of the present disclosure. FIG. 24 shows spherical aberration curves, astigmatic field curves and a distortion curve of the image capturing unit corresponding to the infinite object distance according to the 8th embodiment. FIG. shows spherical aberration curves, astigmatic field curves and a distortion curve of the image capturing unit corresponding to the short object distance according to the 8th embodiment. The upper part of FIG. 23 shows the optical photographing lens assembly at a long focus state (a first state), and the lower part of FIG. 23 shows the optical photographing lens assembly at a short focus state (a second state). In FIG. 23, the image capturing unit 8 includes the optical photographing lens assembly (its reference numeral is omitted) of the present disclosure and an image sensor IS. The optical photographing lens assembly includes, in order from an object side to an image side along an optical path, a stop S1, a first lens element E1, a reflective element LF1, a stop S2, a second lens element E2, a third lens element E3, a stop S3, a fourth lens element E4, a fifth lens element E5, a sixth lens element E6, a stop S4, a seventh lens element E7, a reflective element LF2, a filter E8 and an image surface IMG. Further, the optical photographing lens assembly includes, in order from the object side to the image side along the optical path, a first lens group G1, a second lens group G2 and a third lens group G3. The first lens group G1 includes the first lens element E1. The second lens group G2 includes the second lens element E2, the third lens element E3, the fourth lens element E4 and the fifth lens element E5. The third lens group G3 includes the sixth lens element E6 and the seventh lens element E7. The optical photographing lens assembly includes seven lens elements (E1, E2, E3, E4, E5, E6 and E7) with no additional lens element disposed between each of the adjacent seven lens elements.

An axial distance between an imaged object (not shown) and the object-side surface of a lens element closest to the object side is defined as an object distance. In this embodiment, an axial distance between the imaged object and the object-side surface of the first lens element E1 is defined as the object distance. When the object distance changes from the infinite object distance to the short object distance, the optical photographing lens assembly performs a movement focus process to change from the long focus state to the short focus state. As shown in FIG. 23, during the movement focus process, the second lens group G2 moves towards the object side with respect to the first lens group G1 and the third lens group G3 along a direction in parallel with an optical axis. On the other hand, when the object distance changes from the short object distance to the infinite object distance, the second lens group G2 moves towards the image side with respect to the first lens group G1 and the third lens group G3 along a direction in parallel with the optical axis. Moreover, all lens elements of each of the three lens groups have no relative movement with respect to one another during the movement focus process.

Each of the reflective element LF1 and the reflective element LF2 is a glass prism. The reflective elements LF1, LF2 each provide an optical path folding function. The reflective element can have various forms as shown in FIG. 42 to FIG. 50, which will not be repeated again. Also, the light-folding effect generated by the reflective elements LF1, LF2 is omitted in FIG. 23.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has one inflection point. The image-side surface of the first lens element E1 has one inflection point. The image-side surface of the first lens element E1 has one convex critical point in an off-axis region thereof.

The second lens element E2 with positive refractive power has an object-side surface being convex in a paraxial region thereof and an image-side surface being convex in a paraxial region thereof. The second lens element E2 is made of plastic material and has the object-side surface and the image-side surface being both aspheric. The object-side surface of the second lens element E2 has one inflection point. The image-side surface of the second lens element E2 has three inflection points.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has two inflection points. The object-side surface of the third lens element E3 has one convex critical point and concave critical point in an off-axis region thereof.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The object-side surface of the fourth lens element E4 has three inflection points. The object-side surface of the fourth lens element E4 has one concave critical point in an off-axis region thereof.

The fifth lens element E5 with negative refractive power has an object-side surface being concave in a paraxial region thereof and an image-side surface being convex in a paraxial region thereof. The fifth lens element E5 is made of plastic material and has the object-side surface and the image-side surface being both aspheric. The object-side surface of the fifth lens element E5 has four inflection points. The image-side surface of the fifth lens element E5 has two inflection points.

The sixth lens element E6 with negative refractive power has an object-side surface being concave in a paraxial region thereof and an image-side surface being convex in a paraxial region thereof. The sixth lens element E6 is made of plastic material and has the object-side surface and the image-side surface being both aspheric. The object-side surface of the sixth lens element E6 has two inflection points. The image-side surface of the sixth lens element E6 has two inflection points. The object-side surface of the sixth lens element E6 has one convex critical point in an off-axis region thereof. The image-side surface of the sixth lens element E6 has one concave critical point in an off-axis region thereof.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has one inflection point. The image-side surface of the seventh lens element E7 has one inflection point. The object-side surface of the seventh lens element E7 has one concave critical point in an off-axis region thereof. The image-side surface of the seventh lens element E7 has one convex critical point in an off-axis region thereof.

The filter E8 is made of glass material and located between the reflective element LF2 and the image surface IMG, and will not affect the focal length of the optical photographing lens assembly. The image sensor IS is disposed on or near the image surface IMG.

The detailed optical data of the 8th embodiment are shown in Table 8A and Table 8B, and the aspheric surface data are shown in Table 8C below.

TABLE 8A

| 8th Embodiment | | | | | | | | |
|---|---|---|---|---|---|---|---|---|
| Surface # | | Curvature Radius | | Thickness | Material | Index | Abbe # | Focal Length |
| 0 | Object | Plano | | D0 | | | | |
| 1 | Stop | Plano | | −0.860 | | | | |
| 2 | Lens 1 | 12.3886 | (ASP) | 1.114 | Plastic | 1.566 | 37.4 | 46.11 |
| 3 | | 22.8158 | (ASP) | 0.700 | | | | |
| 4 | Reflective element | Plano | | 8.000 | Glass | 1.847 | 23.8 | — |
| 5 | | Plano | | D1 | | | | |
| 6 | Stop | Plano | | −0.964 | | | | |

TABLE 8A-continued

| 8th Embodiment | | | | | | | | |
|---|---|---|---|---|---|---|---|---|
| Surface # | | Curvature Radius | | Thickness | Material | Index | Abbe # | Focal Length |
| 7 | Lens 2 | 5.8279 | (ASP) | 1.930 | Plastic | 1.544 | 56.0 | 9.60 |
| 8 | | −44.5151 | (ASP) | 0.040 | | | | |
| 9 | Lens 3 | 8.3515 | (ASP) | 0.652 | Plastic | 1.587 | 28.3 | −8.25 |
| 10 | | 2.9782 | (ASP) | 0.973 | | | | |
| 11 | Stop | Plano | | −0.087 | | | | |
| 12 | Lens 4 | 13.4229 | (ASP) | 0.960 | Plastic | 1.544 | 56.0 | 10.74 |
| 13 | | −10.0896 | (ASP) | 0.103 | | | | |
| 14 | Lens 5 | −8.0003 | (ASP) | 0.865 | Plastic | 1.566 | 37.4 | −136.46 |
| 15 | | −9.2734 | (ASP) | D2 | | | | |
| 16 | Lens 6 | −6.9289 | (ASP) | 0.359 | Plastic | 1.534 | 56.0 | −89.09 |
| 17 | | −8.2556 | (ASP) | 0.627 | | | | |
| 18 | Stop | Plano | | 0.718 | | | | |
| 19 | Lens 7 | 7.6473 | (ASP) | 0.700 | Plastic | 1.534 | 56.0 | −16.83 |
| 20 | | 4.0005 | (ASP) | 0.500 | | | | |
| 21 | Reflective element | Plano | | 7.100 | Glass | 1.847 | 23.8 | — |
| 22 | | Plano | | 0.100 | | | | |
| 23 | Filter | Plano | | 0.210 | Glass | 1.517 | 64.2 | — |
| 24 | | Plano | | 0.455 | | | | |
| 25 | Image | Plano | | — | | | | |

Note: Reference wavelength is 587.6 nm (d-line).
The aperture stop may be located on different positions depending on the object distance.
The aperture stop is located on Surface 6 at the long focus state (first state).
The aperture stop is located on Surface 11 at the short focus state (second state).
An effective radius of the stop S1 (Surface 1) is 5.280 mm
An effective radius of the stop S2 (Surface 6) is 3.518 mm
An effective radius of the stop S3 (Surface 11) is 2.807 mm
An effective radius of the stop S4 (Surface 18) is 2.880 mm

TABLE 8B

| Optical data for optical photographing lens assembly with infinite object distance and short object distance | | |
|---|---|---|
| | Infinite object distance (Long focus state) | Short object distance (Short focus state) |
| f [mm] | 17.84 | 13.14 |
| Fno | 1.94 | 2.63 |
| HFOV [deg.] | 15.5 | 12.4 |
| Object distance [mm] | ∞ | 60.000 |
| D0 [mm] | ∞ | 60.860 |
| D1 [mm] | 4.264 | 1.264 |
| D2 [mm] | 1.000 | 4.000 |

In Table 8B, the optical data is the same as the data of the 1st embodiment. Please be noted that in this embodiment, an axial distance between the imaged object and the stop S1 is D0, an axial distance between the reflective element LF1 and the stop S2 is D1, and an axial distance between the image-side surface of the fifth lens element E5 and the object-side surface of the sixth lens element E6 is D2.

Moreover, the optical photographing lens assembly of this embodiment can further have other focal lengths object distances corresponding to the intermediate range of infinity and the close-up distance the long focus state and the short focus state in related to other movement focusing conditions besides the long focus state and the short focus state for different object distances. The present disclosure is not limited to the optical photographing lens assembly in TABLE 8B.

TABLE 8C

| Aspheric Coefficients | | | | |
|---|---|---|---|---|
| Surface # | 2 | 3 | 7 | 8 |
| k = | 9.16117000E−02 | 2.81627000E−01 | 1.65816000E−01 | 5.29691000E+01 |
| A4 = | −2.11466093E−04 | −2.45546853E−04 | 1.83409156E−04 | 2.32763621E−03 |
| A6 = | 1.01480285E−05 | 6.96111980E−06 | −9.22363615E−05 | −3.78894012E−04 |
| A8 = | −3.32433182E−06 | −3.18952963E−06 | 2.60579029E−05 | −6.47358617E−04 |
| A10 = | 4.31284776E−07 | 4.83962411E−07 | −1.71489208E−05 | 8.41077229E−04 |
| A12 = | −3.60350365E−08 | −4.65760155E−08 | 8.08057255E−06 | −4.57231174E−04 |
| A14 = | 1.91812211E−09 | 2.85885653E−09 | −2.38336400E−06 | 1.41102404E−04 |
| A16 = | −6.48982972E−11 | −1.12352860E−10 | 4.34012552E−07 | −2.73497363E−05 |
| A18 = | 1.33146521E−12 | 2.72419382E−12 | −4.92060959E−08 | 3.46164510E−06 |
| A20 = | −1.48709599E−14 | −3.70638203E−14 | 3.38481444E−09 | −2.86765079E−07 |
| A22 = | 6.70029849E−17 | 2.15869806E−16 | −1.29464562E−10 | 1.50258788E−08 |
| A24 = | — | — | 2.11432133E−12 | −4.52821246E−10 |
| A26 = | — | — | — | 5.99159662E−12 |
| Surface # | 9 | 10 | 12 | 13 |
| k = | 5.94435000E−01 | −2.48187000E−03 | −3.64343000E+00 | −1.42625000E+00 |
| A4 = | −1.59288836E−02 | −2.43683465E−02 | 8.87865585E−04 | 3.83180952E−04 |
| A6 = | 3.01808381E−03 | 4.04622390E−03 | 2.67737945E−04 | 5.72322593E−03 |

TABLE 8C-continued

| Aspheric Coefficients | | | | |
|---|---|---|---|---|
| A8 = | −1.89147190E−03 | −1.73736208E−03 | −9.09508578E−05 | −3.32367159E−03 |
| A10 = | 1.67161447E−03 | 1.04072270E−03 | −3.32239680E−04 | 3.96975757E−04 |
| A12 = | −8.74197523E−04 | −4.61879369E−04 | 3.42418915E−04 | 5.29705818E−04 |
| A14 = | 2.75093747E−04 | 1.18828017E−04 | −1.71088267E−04 | −3.72738847E−04 |
| A16 = | −5.53648272E−05 | −1.50971899E−05 | 5.06825726E−05 | 1.28598967E−04 |
| A18 = | 7.33791514E−06 | −4.78490094E−09 | −9.39509603E−06 | −2.79215637E−05 |
| A20 = | −6.39854983E−07 | 2.91587992E−07 | 1.09381940E−06 | 4.01631786E−06 |
| A22 = | 3.54273549E−08 | −4.23294701E−08 | −7.68570280E−08 | −3.80332884E−07 |
| A24 = | −1.13186937E−09 | 2.69290273E−09 | 2.92588624E−09 | 2.26123866E−08 |
| A26 = | 1.59259848E−11 | −6.80497648E−11 | −4.49005566E−11 | −7.55941595E−10 |
| A28 = | — | — | — | 1.06405059E−11 |
| Surface # | 14 | 15 | 16 | 17 |
| k = | 6.86514000E−02 | 1.06225000E+00 | 1.23014000E+00 | −3.45622000E+00 |
| A4 = | 3.13197465E−04 | 1.05235645E−03 | 1.73638341E−02 | 1.53633271E−02 |
| A6 = | 5.87075303E−03 | 2.73411587E−04 | −1.82562825E−03 | −2.45848014E−03 |
| A8 = | −3.37542200E−03 | 9.61784438E−05 | 6.19973766E−04 | 1.92071899E−03 |
| A10 = | 4.76740799E−04 | −2.34529601E−04 | −2.90783985E−04 | −1.44318442E−03 |
| A12 = | 4.96112272E−04 | 1.66983675E−04 | 8.68669469E−05 | 7.43223624E−04 |
| A14 = | −3.69098879E−04 | −6.68802611E−05 | −6.71102793E−06 | −2.64319277E−04 |
| A16 = | 1.32364647E−04 | 1.73597671E−05 | −5.64387886E−06 | 6.55763319E−05 |
| A18 = | −3.00642270E−05 | −3.06315440E−06 | 2.63367442E−06 | −1.13119206E−05 |
| A20 = | 4.56024321E−06 | 3.67750471E−07 | −5.88419547E−07 | 1.32983456E−06 |
| A22 = | −4.58756792E−07 | −2.88593981E−08 | 7.90687337E−08 | −1.01671390E−07 |
| A24 = | 2.91907412E−08 | 1.33568124E−09 | −6.50422946E−09 | 4.56186070E−09 |
| A26 = | −1.05395422E−09 | −2.76093464E−11 | 3.03330670E−10 | −9.12561117E−11 |
| A28 = | 1.62462237E−11 | — | −6.17111906E−12 | — |

| Surface # | 19 | 20 |
|---|---|---|
| k = | 4.82184000E+00 | −2.23337000E−01 |
| A4 = | −1.95273037E−02 | −2.16698236E−02 |
| A6 = | 2.14490455E−03 | 2.43434399E−03 |
| A8 = | −6.90287097E−04 | −1.95670947E−04 |
| A10 = | 4.04624967E−04 | −3.33272163E−05 |
| A12 = | −1.91391943E−04 | 1.77149303E−05 |
| A14 = | 6.02214500E−05 | −3.93149179E−06 |
| A16 = | −1.26260412E−05 | 5.43249237E−07 |
| A18 = | 1.75534307E−06 | −4.88267556E−08 |
| A20 = | −1.56887690E−07 | 2.75980971E−09 |
| A22 = | 8.34450370E−09 | −8.79380519E−11 |
| A24 = | −2.19580145E−10 | 1.13256175E−12 |
| A26 = | 1.50746469E−12 | 3.24633283E−15 |

In the 8th embodiment, the equation of the aspheric surface profiles of the aforementioned lens elements is the same as the equation of the 1st embodiment. Also, the definitions of these parameters shown in Table 8D below are the same as those stated in the 1st embodiment with corresponding values for the 8th embodiment, so an explanation in this regard will not be provided again.

Moreover, these parameters can be calculated from Table 8A to Table 8C as the following values and satisfy the following conditions:

TABLE 8D

| Schematic Parameters | | | |
|---|---|---|---|
| fL [mm] | 17.84 | (\|fL/f1\| + \|fL/f5\|)/\|fL/f4\| | 0.31 |
| FnoL | 1.94 | \|f2/f5\| | 0.07 |
| HFOVL [deg.] | 15.5 | \|f4/f5\| | 0.08 |
| fS [mm] | 13.14 | \|f4/R7\| + \|f4/R8\| | 1.86 |
| FnoS | 2.63 | (R1 − R2)/(R1 + R2) | −0.30 |
| HFOVS [deg.] | 12.4 | \|R6/R2\| | 0.13 |
| TLL/TLS | 1.00 | T12L/Dr3r14L | 1.36 |
| BLL/BLS | 1.00 | Dr3r10L/Dr11r14L | 2.26 |
| fG1/fG2 | 3.34 | CT5/CT4 | 0.90 |
| \|fL/fG2N\| | 0.13 | CT6/T67L | 0.27 |
| TG1G2L/DG2G3L | 1.36 | V5/N5 | 23.88 |
| (TG1G2L-TG1G2S)/TG1G2L | 0.25 | V30 | 1 |

TABLE 8D-continued

| Schematic Parameters | | | |
|---|---|---|---|
| TLL/fL | 1.70 | (T67L-Sag6R2 + Sag7R1)/T67L | 0.70 |
| TLL/BLL | 3.62 | Sag4R2/CT4 | −0.36 |

9th Embodiment

Figure 26:
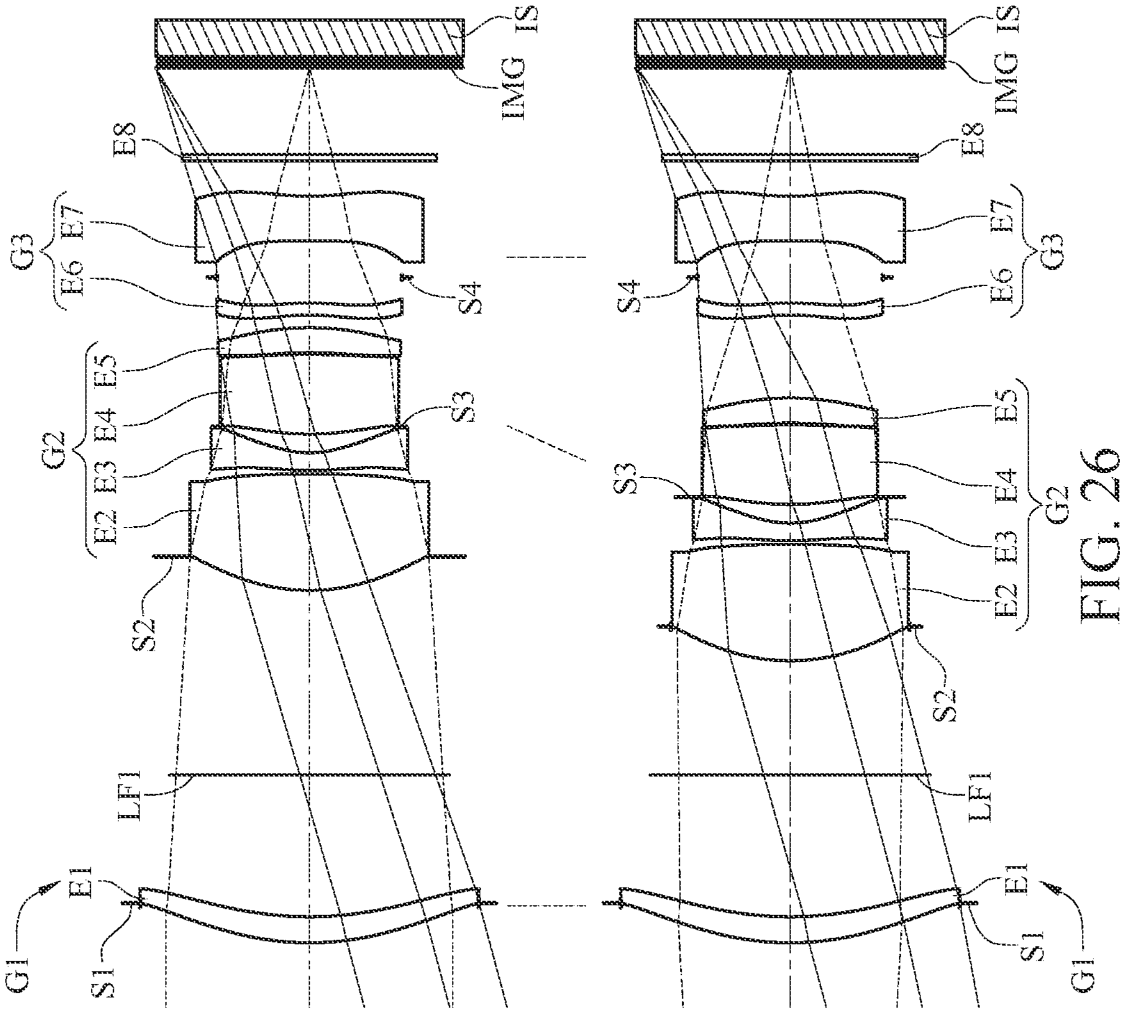
FIG. 26 is a schematic view of an image capturing unit respectively corresponding to an infinite object distance and a short object distance according to the 9th embodiment of the present disclosure.
Figure 27:
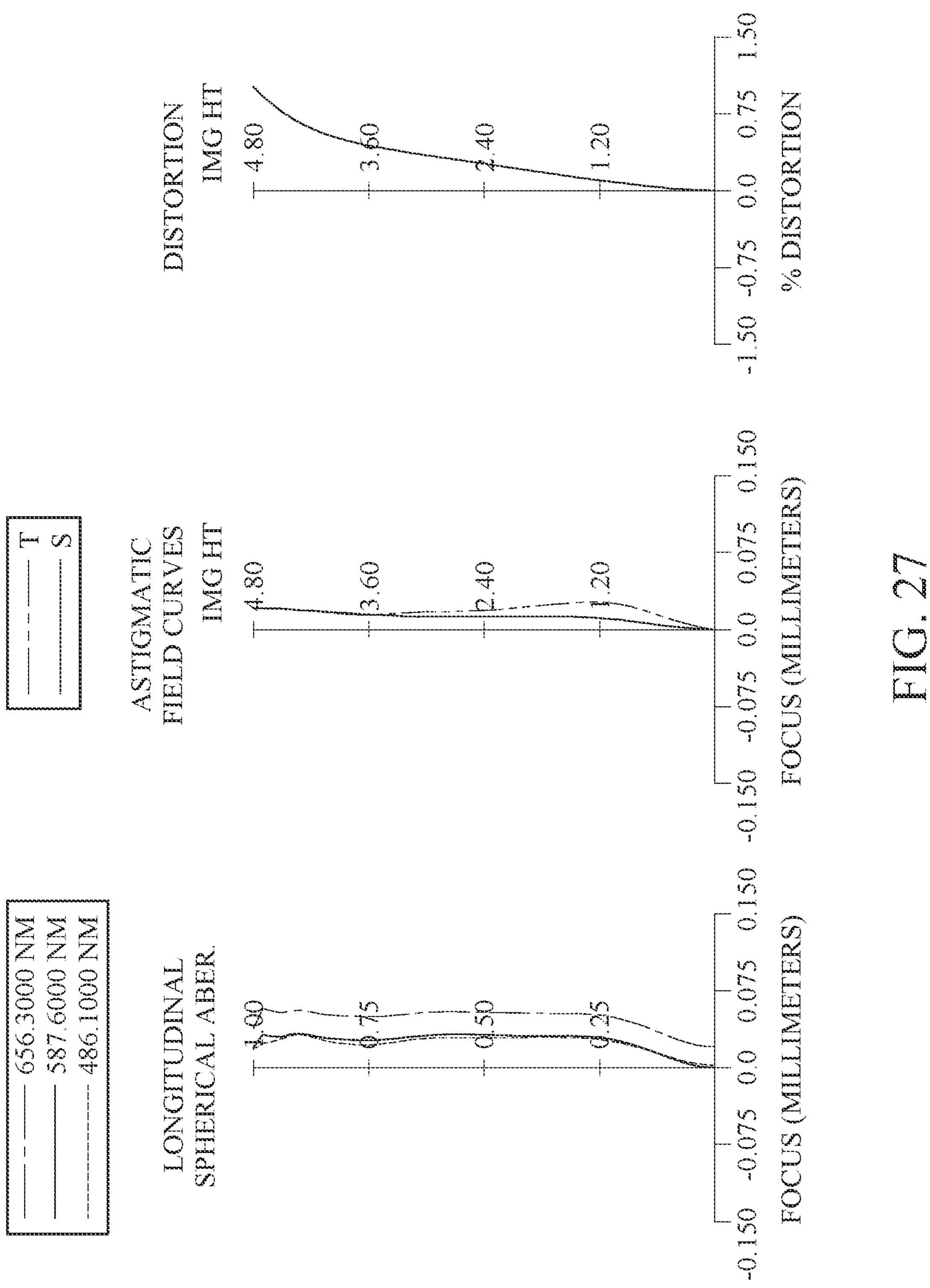
FIG. 27 shows spherical aberration curves, astigmatic field curves and a distortion curve of the image capturing unit corresponding to the infinite object distance according to the 9th embodiment.
Figure 28:
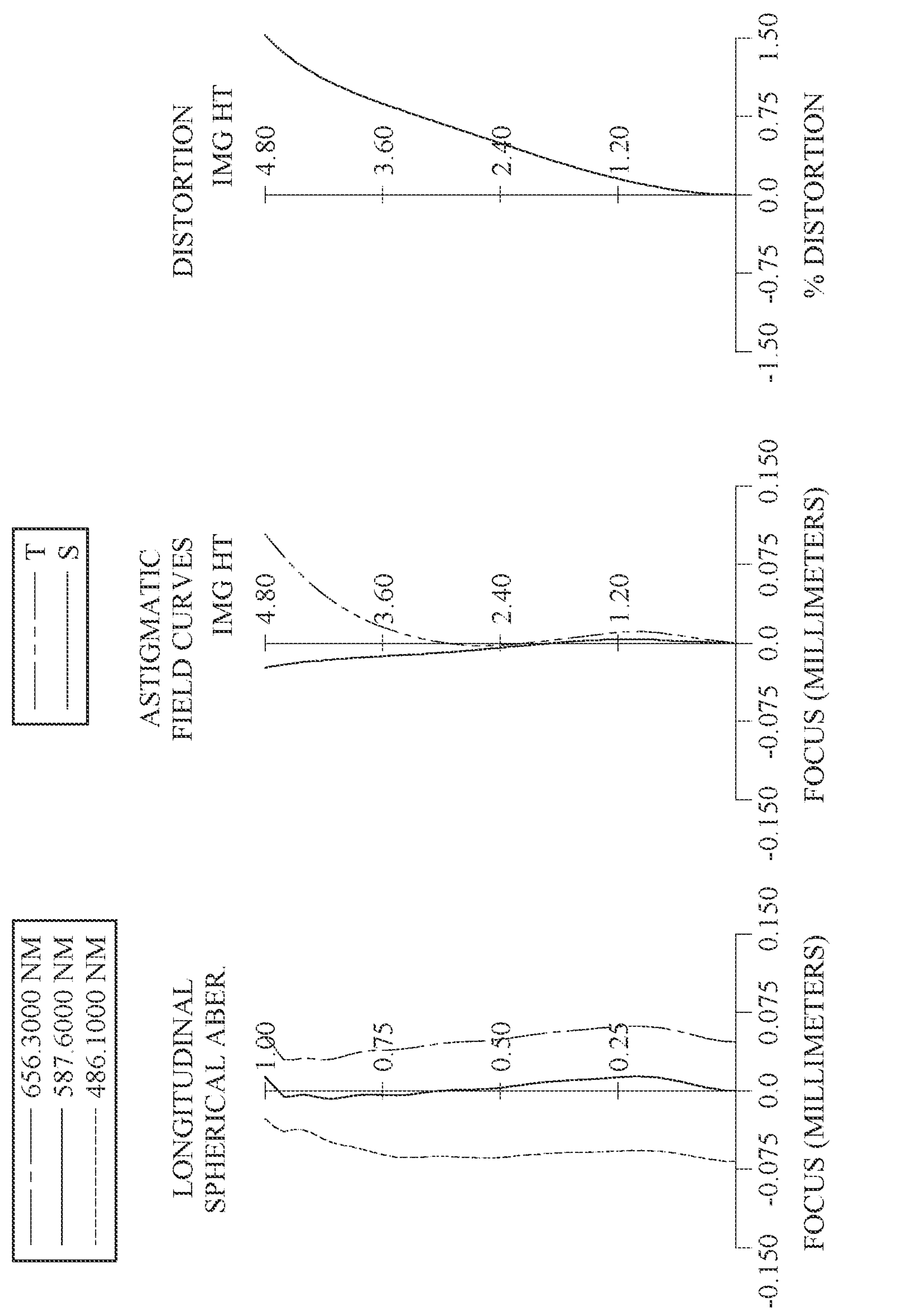
FIG. 28 shows spherical aberration curves, astigmatic field curves and a distortion curve of the image capturing unit corresponding to the short object distance according to the 9th embodiment.

FIG. 26 is a schematic view of an image capturing unit respectively corresponding to an infinite object distance and a short object distance according to the 9th embodiment of the present disclosure. FIG. 27 shows spherical aberration curves, astigmatic field curves and a distortion curve of the image capturing unit corresponding to the infinite object distance according to the 9th embodiment. FIG. 28 shows spherical aberration curves, astigmatic field curves and a distortion curve of the image capturing unit corresponding to the short object distance according to the 9th embodiment. The upper part of FIG. 26 shows the optical photographing lens assembly at a long focus state (a first state), and the lower part of FIG. 26 shows the optical photographing lens assembly at a short focus state (a second state). In FIG. 26, the image capturing unit 9 includes the optical photographing lens assembly (its reference numeral is omitted) of the present disclosure and an image sensor IS. The optical photographing lens assembly includes, in order from an object side to an image side along an optical path, a stop S1, a first lens element E1, a reflective element LF1, a stop S2, a second lens element E2, a third lens element E3, a stop S3, a fourth lens element E4, a fifth lens element E5, a sixth lens element E6, a stop S4, a seventh lens element E7, a filter E8 and an image surface IMG. Further, the optical photographing lens assembly includes, in order from the object side to the image side along the optical path, a first lens group G1, a second lens group G2 and a third lens group G3. The first lens group G1 includes the first lens element E1. The second lens group G2 includes the second lens element E2, the third lens element E3, the fourth lens element E4 and the fifth lens element E5. The third lens group G3 includes the sixth lens element E6 and the seventh lens element E7. The optical photographing lens assembly includes seven lens elements (E1, E2, E3, E4, E5, E6 and E7) with no additional lens element disposed between each of the adjacent seven lens elements.

An axial distance between an imaged object (not shown) and the object-side surface of a lens element closest to the object side is defined as an object distance. In this embodiment, an axial distance between the imaged object and the object-side surface of the first lens element E1 is defined as the object distance. When the object distance changes from the infinite object distance to the short object distance, the optical photographing lens assembly performs a movement focus process to change from the long focus state to the short focus state. As shown in FIG. 26, during the movement focus process, the second lens group G2 moves towards the object side with respect to the first lens group G1 and the third lens group G3 along a direction in parallel with an optical axis. On the other hand, when the object distance changes from the short object distance to the infinite object distance, the second lens group G2 moves towards the image side with respect to the first lens group G1 and the third lens group G3 along a direction in parallel with the optical axis. Moreover, all lens elements of each of the three lens groups have no relative movement with respect to one another during the movement focus process.

The reflective element LF1 is a reflective mirror. The reflective element LF1 provides an optical path folding function. The reflective element can have various forms as shown in FIG. 42 to FIG. 50, which will not be repeated again. Also, the light-folding effect generated by the reflective element LF1 is omitted in FIG. 26.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has one inflection point. The image-side surface of the first lens element E1 has one inflection point.

The second lens element E2 with positive refractive power has an object-side surface being convex in a paraxial region thereof and an image-side surface being convex in a paraxial region thereof. The second lens element E2 is made of glass material and has the object-side surface and the image-side surface being both aspheric. The object-side surface of the second lens element E2 has one inflection point. The image-side surface of the second lens element E2 has one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has two inflection points. The image-side surface of the third lens element E3 has one inflection point. The object-side surface of the third lens element E3 has one concave critical point in an off-axis region thereof.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The object-side surface of the fourth lens element E4 has one inflection point. The image-side surface of the fourth lens element E4 has two inflection points. The object-side surface of the fourth lens element E4 has one concave critical point in an off-axis region thereof.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric. The object-side surface of the fifth lens element E5 has four inflection points. The image-side surface of the fifth lens element E5 has two inflection points. The object-side surface of the fifth lens element E5 has one convex critical point and one concave critical point in an off-axis region thereof.

The sixth lens element E6 with negative refractive power has an object-side surface being concave in a paraxial region thereof and an image-side surface being convex in a paraxial region thereof. The sixth lens element E6 is made of plastic material and has the object-side surface and the image-side surface being both aspheric. The object-side surface of the sixth lens element E6 has one inflection point. The image-side surface of the sixth lens element E6 has one inflection point. The object-side surface of the sixth lens element E6 has one convex critical point in an off-axis region thereof. The image-side surface of the sixth lens element E6 has one concave critical point in an off-axis region thereof.

The seventh lens element E7 with negative refractive power has an object-side surface being concave in a paraxial region thereof and an image-side surface being concave in a paraxial region thereof. The seventh lens element E7 is made of plastic material and has the object-side surface and the image-side surface being both aspheric. The image-side surface of the seventh lens element E7 has one inflection point. The image-side surface of the seventh lens element E7 has one convex critical point in an off-axis region thereof.

The filter E8 is made of glass material and located between the reflective element LF2 and the image surface IMG, and will not affect the focal length of the optical photographing lens assembly. The image sensor IS is disposed on or near the image surface IMG.

The detailed optical data of the 9th embodiment are shown in Table 9A and Table 9B, and the aspheric surface data are shown in Table 9C below.

TABLE 9A

| 9th Embodiment | | | | | | | |
|---|---|---|---|---|---|---|---|
| Surface # | | Curvature Radius | Thickness | Material | Index | Abbe # | Focal Length |
| 0 | Object | Plano | D0 | | | | |
| 1 | Stop | Plano | −1.244 | | | | |
| 2 | Lens 1 | 8.9567 (ASP) | 0.812 | Plastic | 1.534 | 56.0 | 87.66 |
| 3 | | 10.7249 (ASP) | 4.427 | | | | |
| 4 | Reflective element | Plano | D1 | | | | |
| 5 | Stop | Plano | −1.065 | | | | |
| 6 | Lens 2 | 6.1734 (ASP) | 3.642 | Glass | 1.517 | 64.2 | 10.11 |
| 7 | | −27.1559 (ASP) | 0.107 | | | | |
| 8 | Lens 3 | 8.7678 (ASP) | 0.551 | Plastic | 1.660 | 20.4 | −7.17 |
| 9 | | 2.9962 (ASP) | 0.816 | | | | |
| 10 | Stop | Plano | −0.231 | | | | |
| 11 | Lens 4 | 8.6006 (ASP) | 2.491 | Plastic | 1.639 | 23.5 | 9.57 |
| 12 | | −18.7428 (ASP) | 0.053 | | | | |
| 13 | Lens 5 | −13.0817 (ASP) | 0.782 | Plastic | 1.650 | 21.8 | 34.53 |
| 14 | | −8.4574 (ASP) | D2 | | | | |
| 15 | Lens 6 | −6.1167 (ASP) | 0.373 | Plastic | 1.639 | 23.5 | −46.53 |
| 16 | | −7.8852 (ASP) | 0.798 | | | | |
| 17 | Stop | Plano | 1.139 | | | | |
| 18 | Lens 7 | −205.7770 (ASP) | 1.398 | Plastic | 1.544 | 56.0 | −13.48 |
| 19 | | 7.6222 (ASP) | 1.100 | | | | |
| 20 | Filter | Plano | 0.210 | Glass | 1.517 | 64.2 | — |
| 21 | | Plano | 2.697 | | | | |
| 22 | Image | Plano | — | | | | |

Note: Reference wavelength is 587.6 nm (d-line).
The aperture stop may be located on different positions depending on the object distance.
The aperture stop is located on Surface 5 at the long focus state (first state).
The aperture stop is located on Surface 10 at the short focus state (second state).
An effective radius of the stop S1 (Surface 1) is 5.300 mm
An effective radius of the stop S2 (Surface 5) is 3.730 mm
An effective radius of the stop S3 (Surface 10) is 2.743 mm
An effective radius of the stop S4 (Surface 17) is 2.890 mm

TABLE 9B

| Optical data for optical photographing lens assembly with infinite object distance and short object distance | | |
|---|---|---|
| | Infinite object distance (Long focus state) | Short object distance (Short focus state) |
| f [mm] | 17.48 | 12.83 |
| Fno | 1.95 | 2.46 |
| HFOV [deg.] | 15.2 | 12.2 |
| Object distance [mm] | ∞ | 60.000 |
| D0 [mm] | ∞ | 61.244 |
| D1 [mm] | 6.838 | 4.638 |
| D2 [mm] | 0.400 | 2.600 |

In Table 9B, the optical data is the same as the data of the 1st embodiment. Please be noted that in this embodiment, an axial distance between the imaged object and the stop S1 is D0, an axial distance between the reflective element LF1 and the stop S2 is D1, and an axial distance between the image-side surface of the fifth lens element E5 and the object-side surface of the sixth lens element E6 is D2.

Moreover, the optical photographing lens assembly of this embodiment can further have other focal lengths object distances corresponding to the intermediate range of infinity and the close-up distance the long focus state and the short focus state in related to other movement focusing conditions besides the long focus state 10 and the short focus state for different object distances. The present disclosure is not limited to the optical photographing lens assembly in TABLE 9B.

TABLE 9C

| Aspheric Coefficients | | | | |
|---|---|---|---|---|
| Surface # | 2 | 3 | 6 | 7 |
| k = | −5.80784000E−01 | −1.68345000E+00 | 2.71230000E−01 | 4.08012000E+01 |
| A4 = | −1.71523466E−04 | −1.20555971E−04 | −3.96487588E−04 | 4.70916219E−03 |
| A6 = | −1.69315627E−05 | −3.10162101E−05 | −6.08237068E−05 | −3.51942725E−03 |
| A8 = | 3.71332665E−07 | 2.93885787E−06 | 1.87080599E−05 | 1.85908369E−03 |
| A10 = | 9.38897838E−08 | −2.11939772E−07 | −7.33757732E−06 | −5.92364387E−04 |
| A12 = | −1.77752815E−08 | 5.54112061E−09 | 1.78979333E−06 | 8.91642692E−05 |
| A14 = | 1.42652111E−09 | 2.98546922E−10 | −2.92251085E−07 | 4.45075279E−06 |
| A16 = | −6.49647388E−11 | −3.10237927E−11 | 3.23552769E−08 | −4.72687048E−06 |
| A18 = | 1.73272118E−12 | 1.13825760E−12 | −2.41987623E−09 | 9.77660337E−07 |
| A20 = | −2.52271308E−14 | −2.00736900E−14 | 1.17611805E−10 | −1.08987499E−07 |
| A22 = | 1.54790129E−16 | 1.41393456E−16 | −3.36275717E−12 | 7.13160830E−09 |
| A24 = | — | — | 4.29856600E−14 | −2.58453403E−10 |
| A26 = | — | — | — | 4.02147880E−12 |

TABLE 9C-continued

| Aspheric Coefficients | | | | |
|---|---|---|---|---|
| Surface # | 8 | 9 | 11 | 12 |
| k = | 6.51098000E−01 | −4.91083000E−03 | −7.37623000E+00 | −8.45018000E+00 |
| A4 = | −1.45495942E−02 | −2.49135665E−02 | 5.08863289E−04 | 1.13944515E−02 |
| A6 = | −1.43027757E−04 | 2.18818289E−03 | −7.74858037E−04 | −1.33415778E−02 |
| A8 = | 1.15411353E−03 | 8.58968350E−05 | −4.89089023E−05 | 1.22787474E−02 |
| A10 = | −1.21398334E−04 | 1.59756115E−04 | 2.48860505E−04 | −8.12314482E−03 |
| A12 = | −2.00379705E−04 | −2.31193672E−04 | −1.65136089E−04 | 3.56769766E−03 |
| A14 = | 1.13604990E−04 | 1.05328649E−04 | 6.41848479E−05 | −9.66576143E−04 |
| A16 = | −3.09186130E−05 | −2.65643879E−05 | −1.75127718E−05 | 1.46003284E−04 |
| A18 = | 5.10362701E−06 | 4.16487531E−06 | 3.49960065E−06 | −7.09364865E−06 |
| A20 = | −5.35540357E−07 | −4.17761065E−07 | −4.99544144E−07 | −1.46446264E−06 |
| A22 = | 3.50532864E−08 | 2.63631942E−08 | 4.75474921E−08 | 3.15433025E−07 |
| A24 = | −1.30951593E−09 | −9.72555848E−10 | −2.66806856E−09 | −2.73672854E−08 |
| A26 = | 2.13773392E−11 | 1.64084377E−11 | 6.61324641E−11 | 1.18856537E−09 |
| A28 = | — | — | — | −2.12391424E−11 |
| Surface # | 13 | 14 | 15 | 16 |
| k = | −6.63177000E−03 | 1.72449000E+00 | 5.41506000E−01 | −1.08812000E+00 |
| A4 = | 1.23714226E−02 | 1.44067295E−03 | 1.96115056E−02 | 1.73462978E−02 |
| A6 = | −1.34712019E−02 | −1.07006989E−03 | −1.89703302E−03 | −1.54325620E−03 |
| A8 = | 1.22956232E−02 | 1.13883413E−03 | 2.00962816E−04 | 1.01468063E−04 |
| A10 = | −7.96632069E−03 | −8.27508535E−04 | −8.14013269E−05 | −3.57453563E−05 |
| A12 = | 3.40822862E−03 | 4.16634279E−04 | 5.73959854E−05 | 3.15851565E−05 |
| A14 = | −8.79206490E−04 | −1.41531964E−04 | −2.43995444E−05 | −1.52846194E−05 |
| A16 = | 1.15456361E−04 | 3.26628291E−05 | 6.13567867E−06 | 4.32578132E−06 |
| A18 = | 6.38336557E−08 | −5.14163252E−06 | −9.10049276E−07 | −7.53142194E−07 |
| A20 = | −2.60360429E−06 | 5.44727459E−07 | 6.99901453E−08 | 8.06839377E−08 |
| A22 = | 4.37123992E−07 | −3.71908443E−08 | −6.29000163E−10 | −5.04727758E−09 |
| A24 = | −3.57234172E−08 | 1.47796875E−09 | −3.46030233E−10 | 1.59467104E−10 |
| A26 = | 1.52177733E−09 | −2.59640717E−11 | 2.62262070E−11 | −1.64002215E−12 |
| A28 = | −2.71018207E−11 | — | −6.30004821E−13 | — |

| Surface # | 18 | 19 |
|---|---|---|
| k = | −9.90000000E+01 | 1.17302000E+00 |
| A4 = | −9.81185708E−03 | −1.06979358E−02 |
| A6 = | 8.86540680E−04 | 5.97684290E−04 |
| A8 = | −9.98813205E−04 | −4.14146775E−05 |
| A10 = | 8.46115459E−04 | 1.93700191E−05 |
| A12 = | −4.59866078E−04 | −1.07868659E−05 |
| A14 = | 1.66579464E−04 | 3.29218520E−06 |
| A16 = | −4.12145878E−05 | −6.18446383E−07 |
| A18 = | 6.98885507E−06 | 7.55411815E−08 |
| A20 = | −7.98766735E−07 | −6.03836737E−09 |
| A22 = | 5.88029439E−08 | 3.05364185E−10 |
| A24 = | −2.51761218E−09 | −8.87687124E−12 |
| A26 = | 4.76340858E−11 | 1.13127441E−13 |

In the 9th embodiment, the equation of the aspheric surface profiles of the aforementioned lens elements is the same as the equation of the 1st embodiment. Also, the definitions of these parameters shown in Table 9D below are the same as those stated in the 1st embodiment with corresponding values for the 9th embodiment, so an explanation in this regard will not be provided again.

Moreover, these parameters can be calculated from Table 9A to Table 9C as the following values and satisfy the following conditions:

TABLE 9D

| Schematic Parameters | | | |
|---|---|---|---|
| fL [mm] | 17.48 | (\|fL/f1\| + \|fL/f5\|)/\|fL/f4\| | 0.39 |
| FnoL | 1.95 | \|f2/f5\| | 0.29 |
| HFOVL [deg.] | 15.2 | \|f4/f5\| | 0.28 |
| fS [mm] | 12.83 | \|f4/R7\| + \|f4/R8\| | 1.62 |
| FnoS | 2.46 | (R1 − R2)/(R1 + R2) | −0.09 |
| HFOVS [deg.] | 12.2 | \|R6/R2\| | 0.28 |
| TLL/TLS | 1.00 | T12L/Dr3r14L | 0.83 |

TABLE 9D-continued

| Schematic Parameters | | | |
|---|---|---|---|
| BLL/BLS | 1.00 | Dr3r10L/Dr11r14L | 2.21 |
| fG1/fG2 | 7.87 | CT5/CT4 | 0.31 |
| \|fL/fG2N\| | 0.51 | CT6/T67L | 0.19 |
| TG1G2L/DG2G3L | 0.83 | V5/N5 | 13.21 |
| (TG1G2L-TG1G2S)/TG1G2L | 0.22 | V30 | 4 |
| TLL/fL | 1.56 | (T67L-Sag6R2 + Sag7R1)/T67L | 0.59 |
| TLL/BLL | 6.82 | Sag4R2/CT4 | −0.07 |

10th Embodiment

Figure 29:
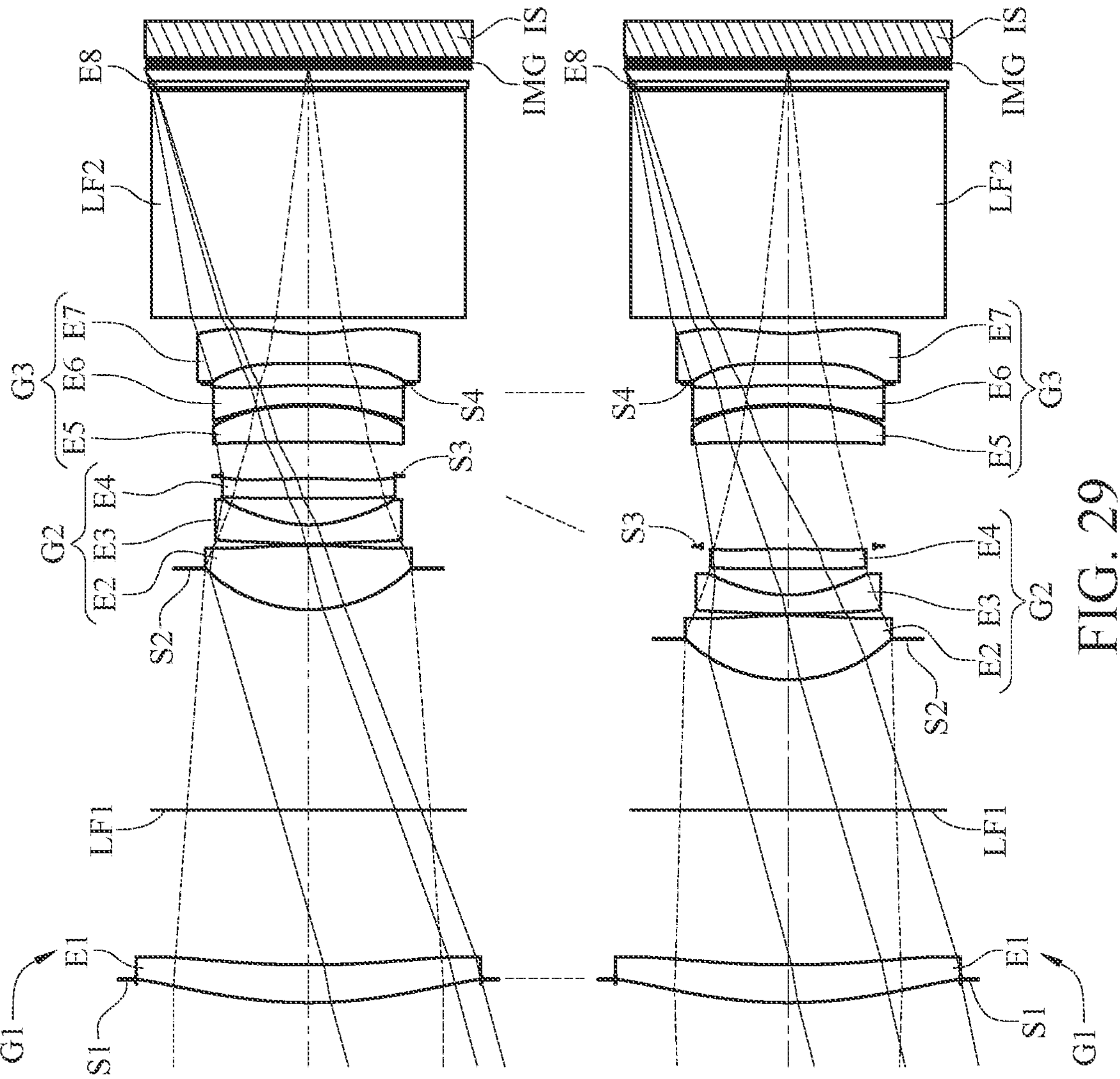
FIG. 29 is a schematic view of an image capturing unit respectively corresponding to an infinite object distance and a short object distance according to the 10th embodiment of the present disclosure.
Figure 30:
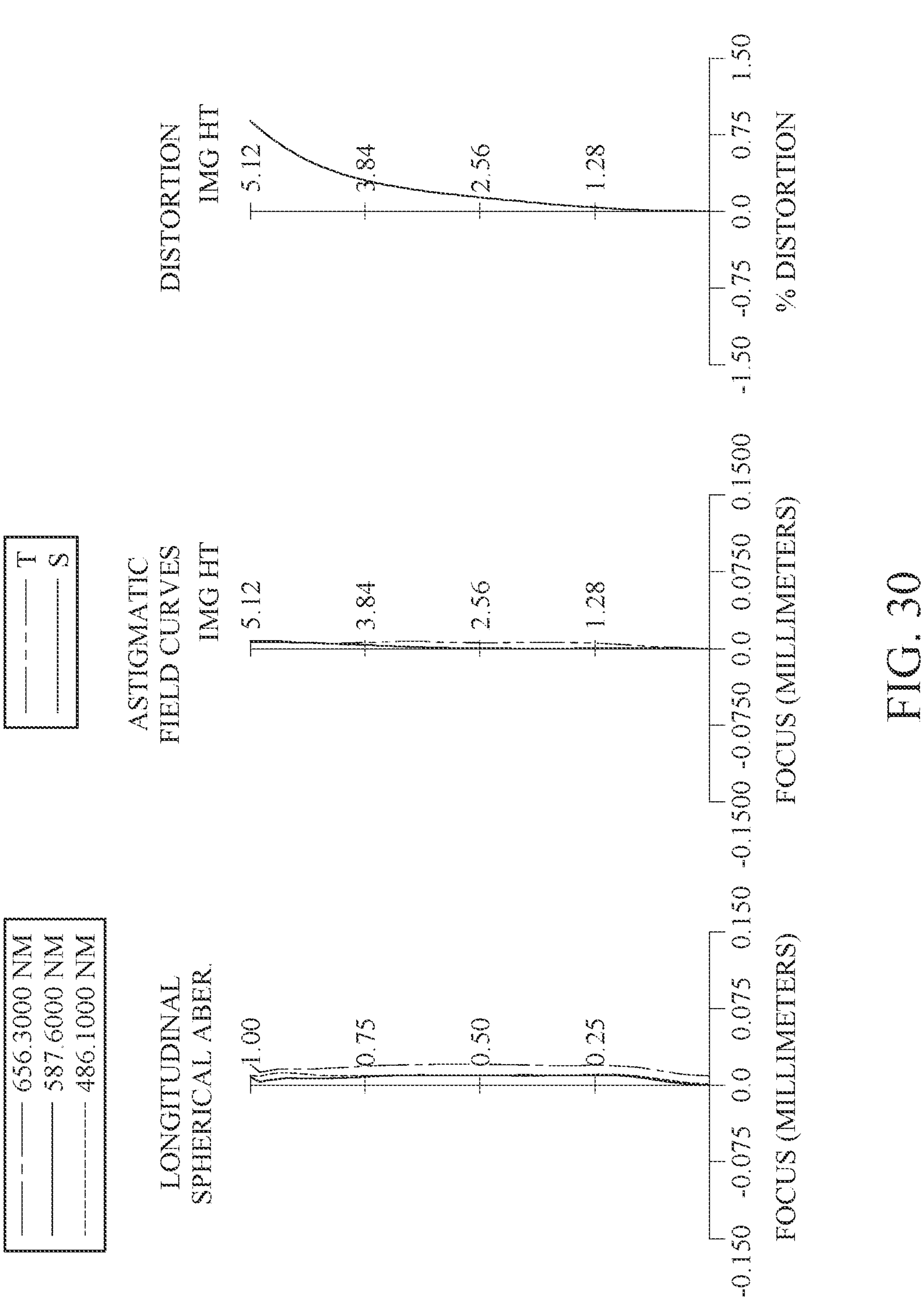
FIG. 30 shows spherical aberration curves, astigmatic field curves and a distortion curve of the image capturing unit corresponding to the infinite object distance according to the 10th embodiment.
Figure 31:
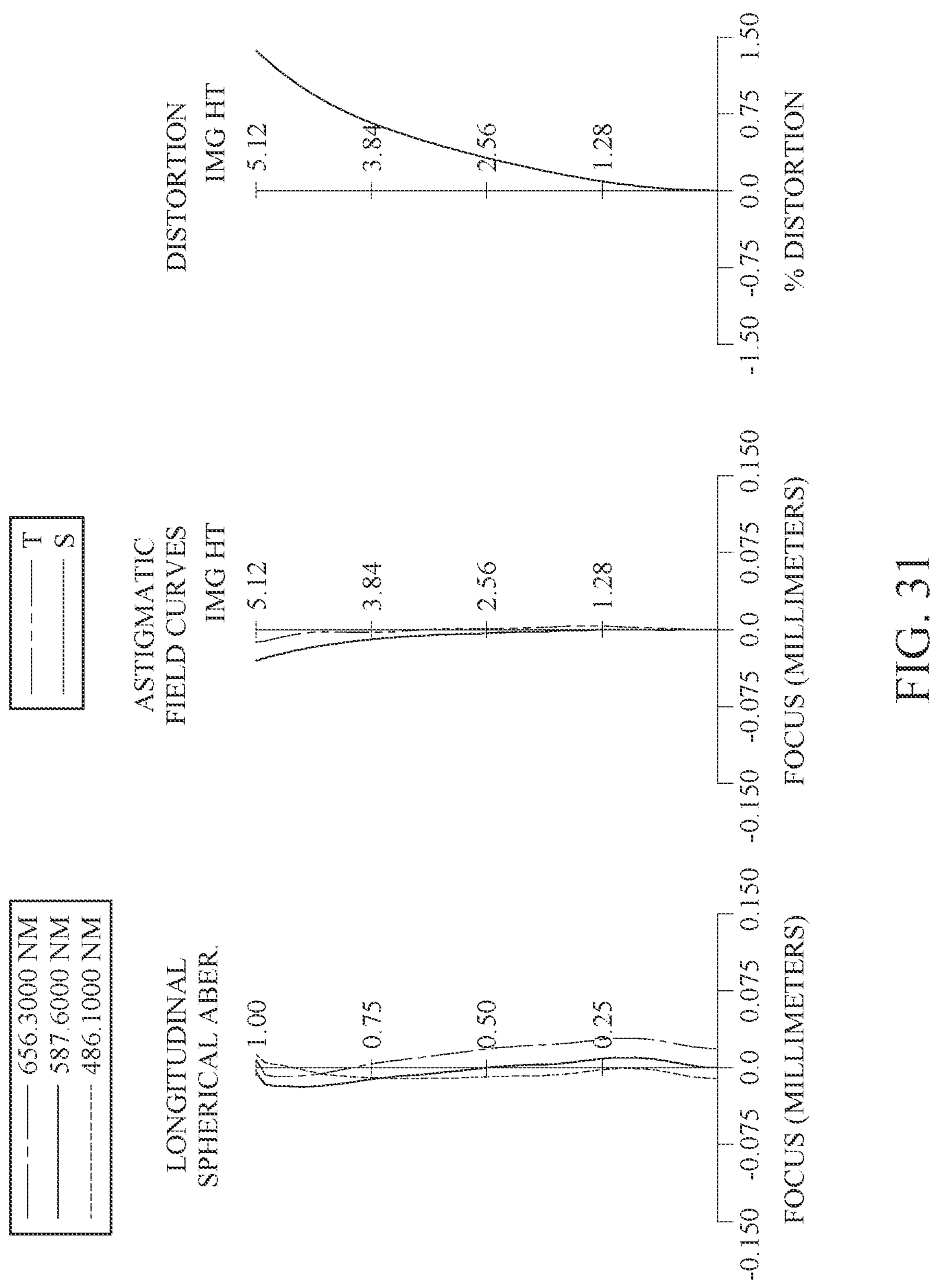
FIG. 31 shows spherical aberration curves, astigmatic field curves and a distortion curve of the image capturing unit corresponding to the short object distance according to the 10th embodiment.

FIG. 29 is a schematic view of an image capturing unit respectively corresponding to an infinite object distance and a short object distance according to the 10th embodiment of the present disclosure. FIG. 30 shows spherical aberration curves, astigmatic field curves and a distortion curve of the image capturing unit corresponding to the infinite object distance according to the 10th embodiment. FIG. 31 shows spherical aberration curves, astigmatic field curves and a distortion curve of the image capturing unit corresponding to the short object distance according to the 10th embodiment. The upper part of FIG. 29 shows the optical photographing lens assembly at a long focus state (a first state), and the lower part of FIG. 29 shows the optical photographing lens assembly at a short focus state (a second state). In FIG. 29, the image capturing unit 10 includes the optical photographing lens assembly (its reference numeral is omitted) of the present disclosure and an image sensor IS. The optical photographing lens assembly includes, in order from an object side to an image side along an optical path, a stop S1, a first lens element E1, a reflective element LF1, a stop S2, a second lens element E2, a third lens element E3, a fourth lens element E4, a stop S3, a fifth lens element E5, a sixth lens element E6, a stop S4, a seventh lens element E7, a reflective element LF2, a filter E8 and an image surface IMG. Further, the optical photographing lens assembly includes, in order from the object side to the image side along the optical path, a first lens group G1, a second lens group G2 and a third lens group G3. The first lens group G1 includes the first lens element E1. The second lens group G2 includes the second lens element E2, the third lens element E3 and the fourth lens element E4. The third lens group G3 includes the fifth lens element E5, the sixth lens element E6 and the seventh lens element E7. The optical photographing lens assembly includes seven lens elements (E1, E2, E3, E4, E5, E6 and E7) with no additional lens element disposed between each of the adjacent seven lens elements.

An axial distance between an imaged object (not shown) and the object-side surface of a lens element closest to the object side is defined as an object distance. In this embodiment, an axial distance between the imaged object and the object-side surface of the first lens element E1 is defined as the object distance. When the object distance changes from the infinite object distance to the short object distance, the optical photographing lens assembly performs a movement focus process to change from the long focus state to the short focus state. As shown in FIG. 29, during the movement focus process, the second lens group G2 moves towards the object side with respect to the first lens group G1 and the third lens group G3 along a direction in parallel with an optical axis. On the other hand, when the object distance changes from the short object distance to the infinite object distance, the second lens group G2 moves towards the image side with respect to the first lens group G1 and the third lens group G3 along a direction in parallel with the optical axis. Moreover, all lens elements of each of the three lens groups have no relative movement with respect to one another during the movement focus process.

The reflective element LF1 is a reflective mirror, and the reflective element LF2 is a glass prism. The reflective elements LF1, LF2 each provide an optical path folding function. The reflective element can have various forms as shown in FIG. 42 to FIG. 50, which will not be repeated again. Also, the light-folding effect generated by the reflective elements LF1, LF2 is omitted in FIG. 29.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has one inflection point. The image-side surface of the first lens element E1 has one inflection point. The image-side surface of the first lens element E1 has one convex critical point in an off-axis region thereof.

The second lens element E2 with positive refractive power has an object-side surface being convex in a paraxial region thereof and an image-side surface being convex in a paraxial region thereof. The second lens element E2 is made of plastic material and has the object-side surface and the image-side surface being both aspheric. The image-side surface of the second lens element E2 has one inflection point. The image-side surface of the second lens element E2 has one concave critical point in an off-axis region thereof.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has two inflection points.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has one inflection point. The image-side surface of the fourth lens element E4 has one inflection point. The object-side surface of the fourth lens element E4 has one convex critical point in an off-axis region thereof. The image-side surface of the fourth lens element E4 has one concave critical point in an off-axis region thereof.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric. The object-side surface of the fifth lens element E5 has two inflection points.

The sixth lens element E6 with negative refractive power has an object-side surface being concave in a paraxial region thereof and an image-side surface being convex in a paraxial region thereof. The sixth lens element E6 is made of plastic material and has the object-side surface and the image-side surface being both aspheric. The object-side surface of the sixth lens element E6 has two inflection points. The image-side surface of the sixth lens element E6 has one inflection point. The image-side surface of the sixth lens element E6 has one concave critical point in an off-axis region thereof.

The seventh lens element E7 with negative refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has one inflection point. The image-side surface of the seventh lens element E7 has one inflection point. The object-side surface of the seventh lens element E7 has one concave critical point in an off-axis region thereof. The image-side surface of the seventh lens element E7 has one convex critical point in an off-axis region thereof.

The filter E8 is made of glass material and located between the reflective element LF2 and the image surface IMG, and will not affect the focal length of the optical photographing lens assembly. The image sensor IS is disposed on or near the image surface IMG.

The detailed optical data of the 10th embodiment are shown in Table 10A and Table 10B, and the aspheric surface data are shown in Table 10C below.

TABLE 10A

| 10th Embodiment | | | | | | | | |
|---|---|---|---|---|---|---|---|---|
| Surface # | | Curvature Radius | | Thickness | Material | Index | Abbe # | Focal Length |
| 0 | Object | Plano | | D0 | | | | |
| 1 | Stop | Plano | | −0.730 | | | | |
| 2 | Lens 1 | 15.1660 | (ASP) | 1.179 | Plastic | 1.544 | 56.0 | 58.74 |
| 3 | | 28.0717 | (ASP) | 4.860 | | | | |
| 4 | Reflective element | Plano | | D1 | | | | |
| 5 | Stop | Plano | | −1.281 | | | | |
| 6 | Lens 2 | 4.8131 | (ASP) | 2.012 | Plastic | 1.545 | 56.1 | 7.26 |
| 7 | | −18.9592 | (ASP) | 0.040 | | | | |
| 8 | Lens 3 | 12.1807 | (ASP) | 0.600 | Plastic | 1.608 | 26.7 | −9.01 |
| 9 | | 3.7104 | (ASP) | 0.833 | | | | |
| 10 | Lens 4 | −59.7117 | (ASP) | 0.614 | Plastic | 1.647 | 22.2 | 57.20 |
| 11 | | −22.9352 | (ASP) | 0.080 | | | | |
| 12 | Stop | Plano | | D2 | | | | |
| 13 | Lens 5 | −34.1503 | (ASP) | 1.121 | Plastic | 1.558 | 40.8 | 34.84 |
| 14 | | −12.5404 | (ASP) | 0.055 | | | | |
| 15 | Lens 6 | −9.9652 | (ASP) | 0.600 | Plastic | 1.549 | 51.8 | −56.08 |
| 16 | | −15.0519 | (ASP) | 0.030 | | | | |
| 17 | Stop | Plano | | 0.640 | | | | |
| 18 | Lens 7 | 43.8004 | (ASP) | 0.950 | Plastic | 1.578 | 36.1 | −14.50 |
| 19 | | 6.9815 | (ASP) | 0.500 | | | | |
| 20 | Reflective element | Plano | | 7.100 | Glass | 1.847 | 23.8 | — |
| 21 | | Plano | | 0.100 | | | | |
| 22 | Filter | Plano | | 0.210 | Glass | 1.517 | 64.2 | — |
| 23 | | Plano | | 0.359 | | | | |
| 24 | Image | Plano | | — | | | | |

Note: Reference wavelength is 587.6 nm (d-line).
The aperture stop may be located on different positions depending on the object distance.
The aperture stop is located on Surface 5 at the long focus state (first state).
The aperture stop is located on Surface 5 at the short focus state (second state).
An effective radius of the stop S1 (Surface 1) is 5.401 mm
An effective radius of the stop S2 (Surface 5) is 3.236 mm
An effective radius of the stop S3 (Surface 12) is 2.707 mm
An effective radius of the stop S4 (Surface 17) is 3.006 mm

TABLE 10B

| Optical data for optical photographing lens assembly with infinite object distance and short object distance | | |
|---|---|---|
| | Infinite object distance (Long focus state) | Short object distance (Short focus state) |
| f [mm] | 18.60 | 15.52 |
| Fno | 2.20 | 2.72 |
| HFOV [deg.] | 15.3 | 12.9 |
| Object distance [mm] | ∞ | 100.000 |
| D0 [mm] | ∞ | 100.730 |
| D1 [mm] | 7.554 | 5.354 |
| D2 [mm] | 1.076 | 3.276 |

In Table 10B, the optical data is the same as the data of the 1st embodiment. Please be noted that in this embodiment, an axial distance between the imaged object and the stop S1 is D0, an axial distance between the reflective element LF1 and the stop S2 is D1, and an axial distance between the stop S3 and the object-side surface of the fifth lens element E5 is D2.

Moreover, the optical photographing lens assembly of this embodiment can further have other focal lengths object distances corresponding to the intermediate range of infinity and the close-up distance the long focus state and the short focus state in related to other movement focusing conditions besides the long focus state 10 and the short focus state for different object distances. The present disclosure is not limited to the optical photographing lens assembly in TABLE 10B.

TABLE 10C

| Aspheric Coefficients | | | | |
|---|---|---|---|---|
| Surface # | 2 | 3 | 6 | 7 |
| k = | 0.00000000E+00 | 0.00000000E+00 | 0.00000000E+00 | 0.00000000E+00 |
| A4 = | −1.66205520E−04 | −1.88104672E−04 | 3.38526521E−04 | 2.66828038E−03 |
| A6 = | −4.09159823E−06 | −5.22894928E−06 | 1.88685878E−05 | −1.88213349E−04 |
| A8 = | 6.71409607E−08 | 2.50554743E−07 | −2.96147056E−05 | 3.62630498E−05 |
| A10 = | −7.50293785E−09 | −2.45777792E−08 | 2.16537573E−05 | −6.73129921E−05 |
| A12 = | 2.82308965E−10 | 1.29244590E−09 | −9.02773212E−06 | 4.57390385E−05 |
| A14 = | −5.89946765E−12 | −4.02369607E−11 | 2.37228124E−06 | −1.51701170E−05 |
| A16 = | 4.46073287E−14 | 6.67969210E−13 | −4.04124854E−07 | 2.92748623E−06 |
| A18 = | — | −4.65445060E−15 | 4.46355357E−08 | −3.47790965E−07 |

TABLE 10C-continued

| Aspheric Coefficients | | | | |
|---|---|---|---|---|
| A20 = | — | — | −3.09125386E−09 | 2.51970697E−08 |
| A22 = | — | — | 1.22151666E−10 | −1.02459887E−09 |
| A24 = | — | — | −2.10296989E−12 | 1.79581493E−11 |

| Surface # | 8 | 9 | 10 | 11 |
|---|---|---|---|---|
| k = | 0.00000000E+00 | 0.00000000E+00 | 0.00000000E+00 | 0.00000000E+00 |
| A4 = | −9.67408222E−03 | −1.32262802E−02 | 3.53338975E−03 | 3.57664425E−03 |
| A6 = | 1.63492333E−03 | 1.71573779E−03 | −2.52336847E−04 | −1.75209559E−04 |
| A8 = | −1.10544255E−04 | 1.08790355E−04 | 1.11197903E−04 | 2.57646963E−04 |
| A10 = | −1.55055374E−04 | −3.33167761E−04 | −7.24932039E−05 | −1.96768792E−04 |
| A12 = | 1.12108986E−04 | 1.86783881E−04 | 1.73488435E−05 | 9.07717050E−05 |
| A14 = | −3.81401690E−05 | −5.79753763E−05 | 3.43902102E−06 | −2.62013002E−05 |
| A16 = | 7.66416944E−06 | 1.08828221E−05 | −3.21667258E−06 | 4.73801591E−06 |
| A18 = | −9.57587088E−07 | −1.23559240E−06 | 8.59783286E−07 | −5.18733333E−07 |
| A20 = | 7.34037640E−08 | 7.97528387E−08 | −1.16330707E−07 | 3.13254922E−08 |
| A22 = | −3.17129703E−09 | −2.43557431E−09 | 8.08289152E−09 | −7.96780200E−10 |
| A24 = | 5.92523028E−11 | 1.70787334E−11 | −2.29323374E−10 | — |

| Surface # | 13 | 14 | 15 | 16 |
|---|---|---|---|---|
| k = | 0.00000000E+00 | 0.00000000E+00 | 0.00000000E+00 | 0.00000000E+00 |
| A4 = | 1.45667779E−03 | −4.17872975E−03 | 6.27256308E−04 | 6.41773001E−03 |
| A6 = | 2.42128140E−04 | 7.39585654E−06 | −1.25530570E−03 | −1.50623417E−03 |
| A8 = | −1.78102900E−04 | −4.00691235E−05 | 1.28685200E−04 | 2.24758019E−04 |
| A10 = | 9.82574581E−05 | 1.22162421E−05 | 4.38175664E−05 | −1.63063253E−05 |
| A12 = | −4.05356683E−05 | −1.99091669E−05 | −4.77890494E−05 | 5.56560902E−07 |
| A14 = | 1.13691587E−05 | 1.67500380E−05 | 2.83544813E−05 | 6.24185885E−07 |
| A16 = | −2.21528973E−06 | −5.66041643E−06 | −8.54054703E−06 | −1.80814909E−07 |
| A18 = | 2.97061088E−07 | 9.70837231E−07 | 1.40197431E−06 | 1.78259729E−08 |
| A20 = | −2.60695516E−08 | −8.95896771E−08 | −1.28869286E−07 | −5.95361758E−10 |
| A22 = | 1.34677548E−09 | 4.13137460E−09 | 6.25700616E−09 | — |
| A24 = | −3.12290466E−11 | −6.26449663E−11 | −1.25199751E−10 | — |
| A26 = | — | −7.79653646E−13 | — | — |

| Surface # | 18 | 19 |
|---|---|---|
| k = | 0.00000000E+00 | 0.00000000E+00 |
| A4 = | −1.10561135E−02 | −1.28215981E−02 |
| A6 = | 1.37742978E−04 | 1.12891045E−03 |
| A8 = | 1.51738079E−04 | −1.11833333E−04 |
| A10 = | −8.71063899E−05 | 1.04269163E−05 |
| A12 = | 3.18469954E−05 | −8.12378499E−07 |
| A14 = | −7.73100840E−06 | 6.58481123E−08 |
| A16 = | 1.26413331E−06 | −5.73843651E−09 |
| A18 = | −1.31317776E−07 | 3.32994341E−10 |
| A20 = | 7.67009983E−09 | −8.02526386E−12 |
| A22 = | −1.89394644E−10 | — |

In the 10th embodiment, the equation of the aspheric surface profiles of the aforementioned lens elements is the same as the equation of the 1st embodiment. Also, the definitions of these parameters shown in Table 10D below are the same as those stated in the 1st embodiment with corresponding values for the 10th embodiment, so an explanation in this regard will not be provided again.

Moreover, these parameters can be calculated from Table 10A to Table 10C as the following values and satisfy the following conditions:

TABLE 10D

| Schematic Parameters | | | |
|---|---|---|---|
| fL [mm] | 18.60 | (\|fL/f1\| + \|fL/f5\|)/\|fL/f4\| | 2.62 |
| FnoL | 2.20 | \|f2/f5\| | 0.21 |
| HFOVL [deg.] | 15.3 | \|f4/f5\| | 1.64 |
| fS [mm] | 15.52 | \|f4/R7\| + \|f4/R8\| | 3.45 |
| FnoS | 2.72 | (R1 − R2)/(R1 + R2) | −0.30 |
| HFOVS [deg.] | 12.9 | \|R6/R2\| | 0.13 |
| TLL/TLS | 1.00 | T12L/Dr3r14L | 1.29 |
| BLL/BLS | 1.00 | Dr3r10L/Dr11r14L | 2.87 |

TABLE 10D-continued

| Schematic Parameters | | | |
|---|---|---|---|
| fG1/fG2 | 4.75 | CT5/CT4 | 1.83 |
| \|fL/fG2N\| | 0.33 | CT6/T67L | 0.90 |
| TG1G2L/DG2G3L | 1.29 | V5/N5 | 26.19 |
| (TG1G2L-TG1G2S)/TG1G2L | 0.20 | V30 | 2 |
| TLL/fL | 1.57 | (T67L-Sag6R2 + Sag7R1)/T67L | 0.24 |
| TLL/BLL | 3.54 | Sag4R2/CT4 | 0.07 |

11th Embodiment

Figure 32:
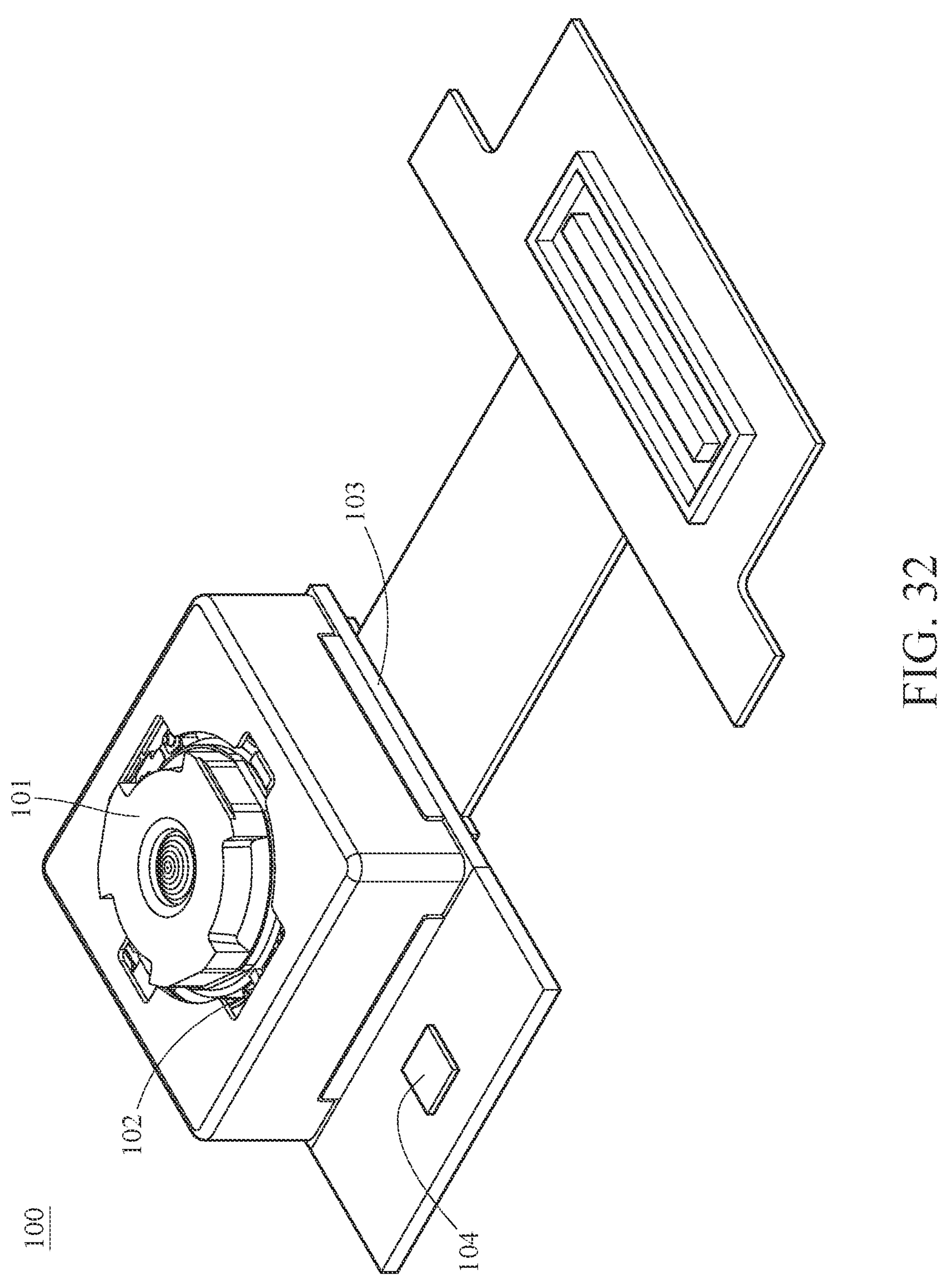
FIG. 32 is a perspective view of an image capturing unit according to the 11th embodiment of the present disclosure.

FIG. 32 is a perspective view of an image capturing unit according to the 11th embodiment of the present disclosure. In this embodiment, an image capturing unit 100 is a camera module including a lens unit 101, a driving device 102, an image sensor 103 and an image stabilizer 104. The lens unit 101 includes the optical photographing lens assembly disclosed in the 1st embodiment, a barrel and a holder member (their reference numerals are omitted) for holding the optical photographing lens assembly. However, the lens unit 101 may alternatively be provided with the optical photographing lens assembly disclosed in other embodiments of the present disclosure, and the present disclosure is not limited thereto. The imaging light converges in the lens unit 101 of the image capturing unit 100 to generate an image with the driving device 102 utilized for image focusing on the image sensor 103, and the generated image is then digitally transmitted to other electronic component for further processing.

The driving device 102 can have auto focusing functionality, and different driving configurations can be obtained through the usages of voice coil motors (VCM), micro electro-mechanical systems (MEMS), piezoelectric systems, or shape memory alloy materials. The driving device 102 is favorable for obtaining a better imaging position of the lens unit 101, so that a clear image of the imaged object can be captured by the lens unit 101 with different object distances. The image sensor 103 (for example, CCD or CMOS), which can feature high photosensitivity and low noise, is disposed on the image surface of the optical photographing lens assembly to provide higher image quality.

The image stabilizer 104, such as an accelerometer, a gyro sensor and a Hall effect sensor, is configured to work with the driving device 102 to provide optical image stabilization (OIS). The driving device 102 working with the image stabilizer 104 is favorable for compensating for pan and tilt of the lens unit 101 to reduce blurring associated with motion during exposure. In some cases, the compensation can be provided by electronic image stabilization (EIS) with image processing software, thereby improving image quality while in motion or low-light conditions.

12th Embodiment

Figure 33:
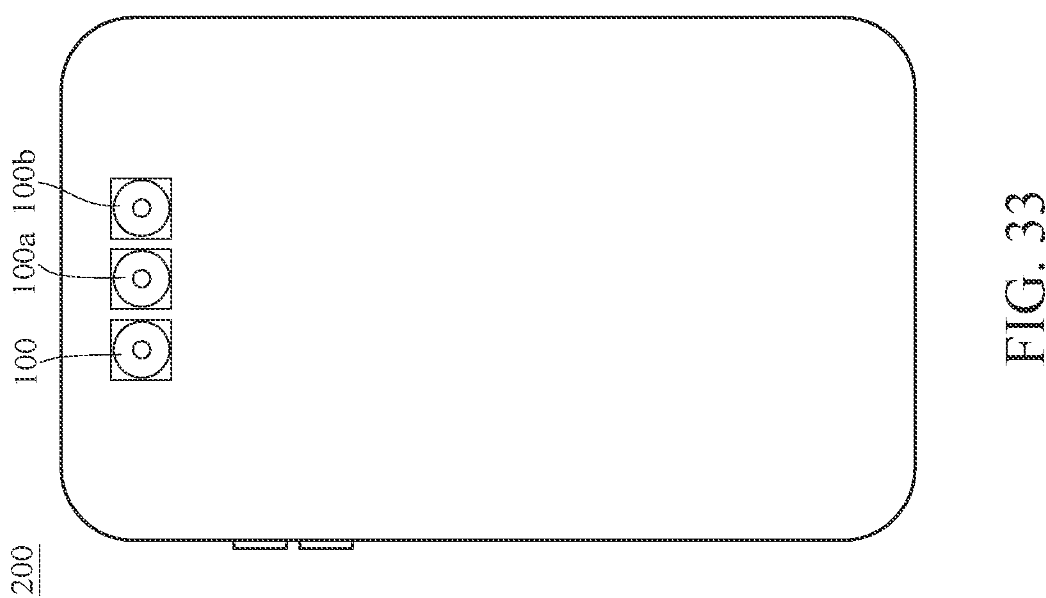
FIG. 33 is one perspective view of an electronic device according to the 12th embodiment of the present disclosure.
Figure 34:
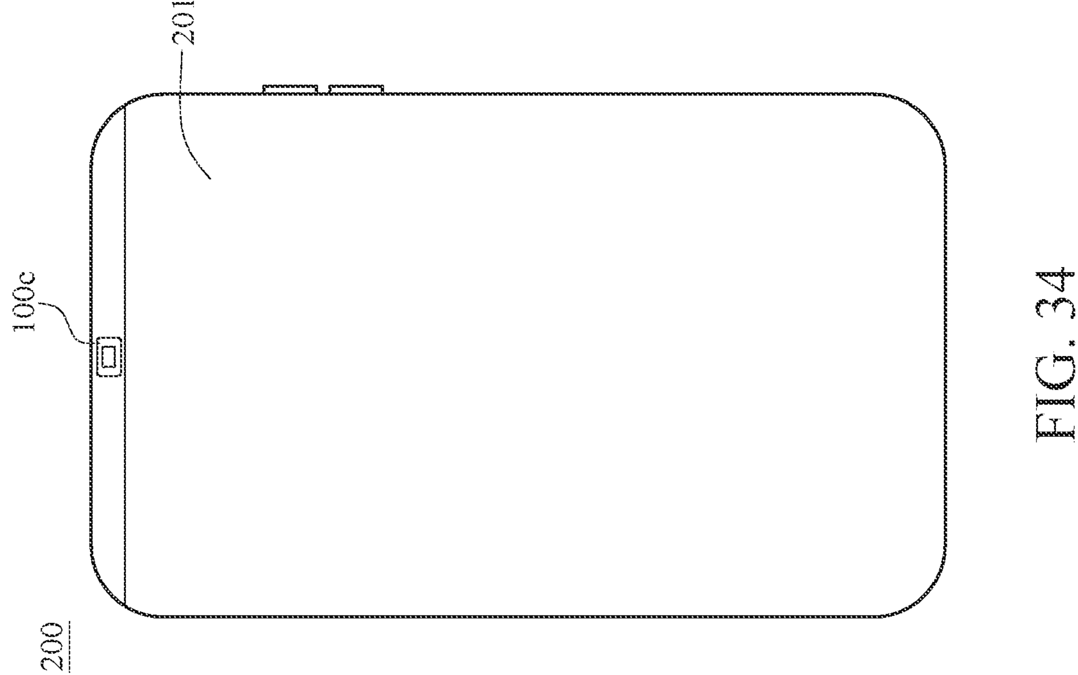
FIG. 34 is another perspective view of the electronic device in FIG. 33.

FIG. 33 is one perspective view of an electronic device according to the 12th embodiment of the present disclosure. FIG. 34 is another perspective view of the electronic device in FIG. 33.

In this embodiment, an electronic device 200 is a smartphone including the image capturing unit 100 disclosed in the 11th embodiment, an image capturing unit 100*a*, an image capturing unit 100*b*, an image capturing unit 100*c* and a display unit 201. As shown in FIG. 33, the image capturing unit 100, the image capturing unit 100*a* and the image capturing unit 100*b* are disposed on the same side of the electronic device 200 and face the same side, and each of the image capturing units 100, 100*a* and 100*b* has a single focal point. As shown in FIG. 34, the image capturing unit 100*c* and the display unit 201 are disposed on the opposite side of the electronic device 200, such that the image capturing unit 100*c* can be a front-facing camera of the electronic device 200 for taking selfies, but the present disclosure is not limited thereto. Furthermore, each of the image capturing units 100*a*, 100*b* and 100*c* can include the optical photographing lens assembly of the present disclosure and can have a configuration similar to that of the image capturing unit 100. In detail, each of the image capturing units 100*a*, 100*b* and 100*c* can include a lens unit, a driving device, an image sensor and an image stabilizer, and each of the lens unit can include an optical lens assembly such as the optical photographing lens assembly of the present disclosure, a barrel and a holder member for holding the optical photographing lens assembly.

The image capturing unit 100 is a telephoto image capturing unit, the image capturing unit 100*a* is a wide-angle image capturing unit, the image capturing unit 100*b* is an ultra-wide-angle image capturing unit, and the image capturing unit 100*c* is a wide-angle image capturing unit. In this embodiment, the image capturing units 100, 100*a* and 100*b* have different fields of view, such that the electronic device 200 can have various magnification ratios so as to meet the requirement of optical zoom functionality. Moreover, as shown in FIG. 34, the image capturing unit 100*c* can have a non-circular opening, and the lens barrel or the lens elements in the image capturing unit 100*c* can have one or more trimmed edges at outer diameter positions thereof for corresponding to the non-circular opening. Therefore, it is favorable for further reducing the length of the image capturing unit 100*c* along single axis, thereby reducing the overall size of the lens, increasing the area ratio of the display unit 201 with respect to the electronic device 200, reducing the thickness of the electronic device 200, and achieving compactness of the overall module. In this embodiment, the electronic device 200 includes multiple image capturing units 100, 100*a*, 100*b* and 100*c*, but the present disclosure is not limited to the number and arrangement of image capturing units.

13th Embodiment

Figure 35:
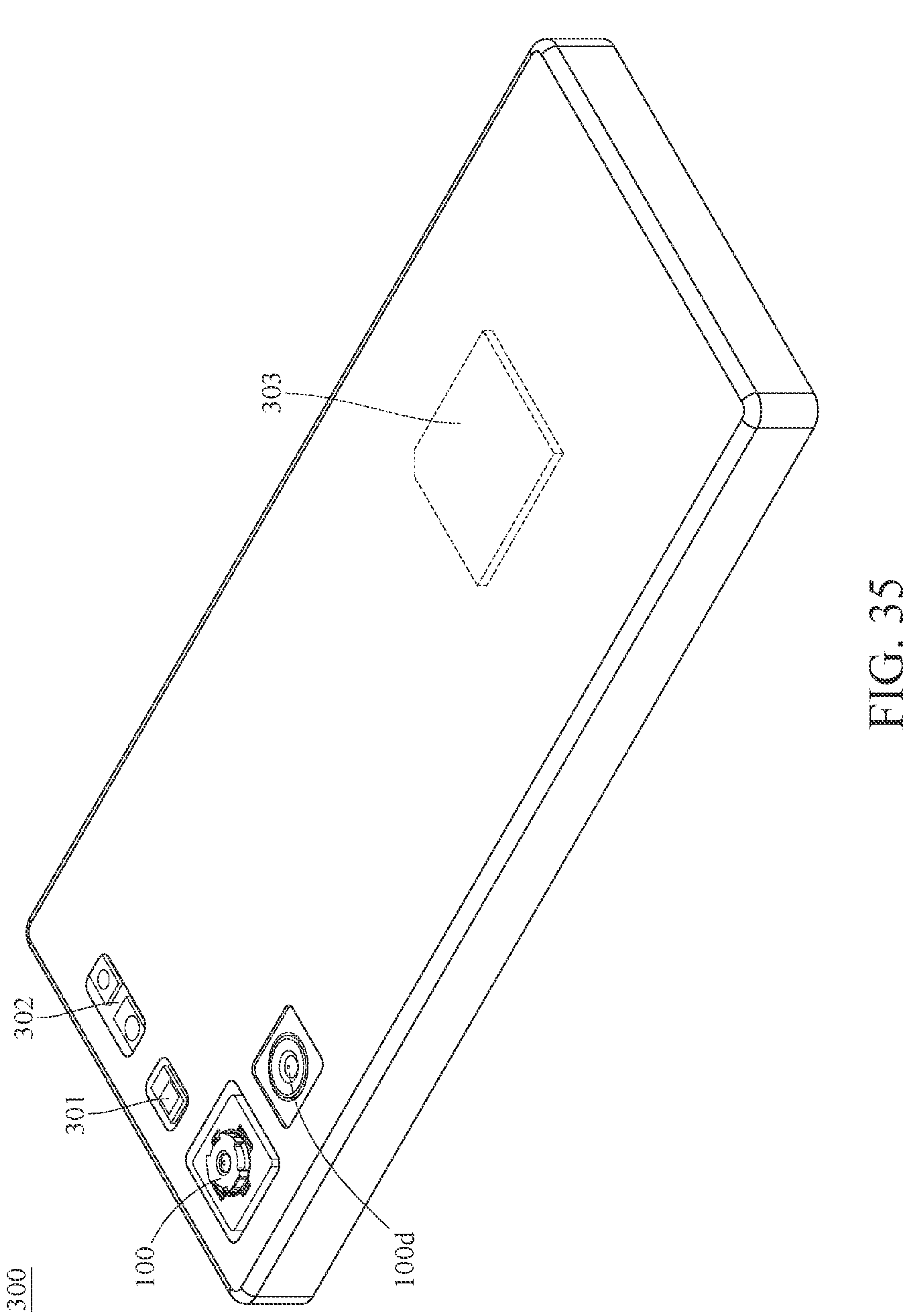
FIG. 35 is one perspective view of an electronic device according to the 13th embodiment of the present disclosure.
Figure 36:
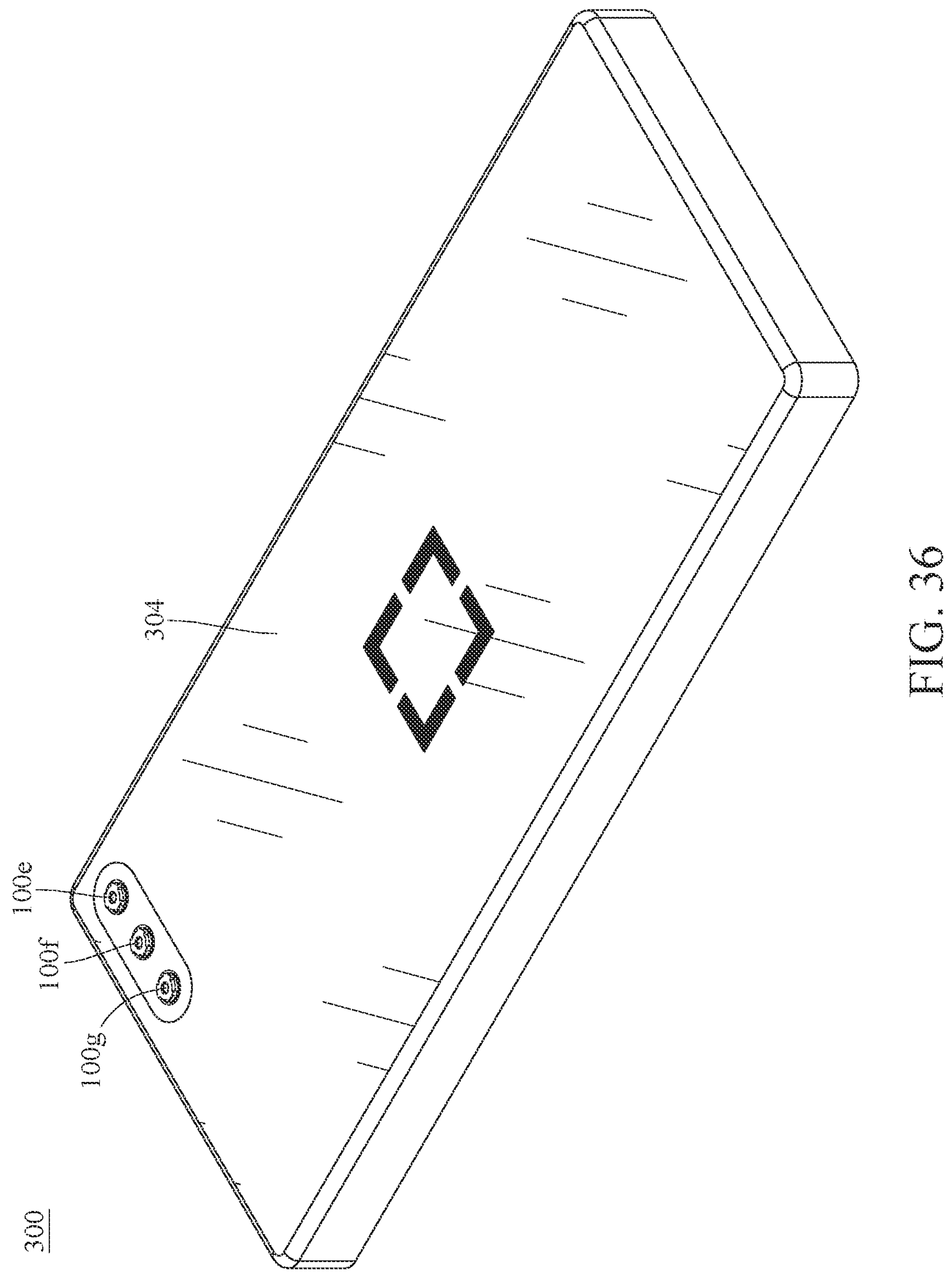
FIG. 36 is another perspective view of the electronic device in FIG. 35.
Figure 37:
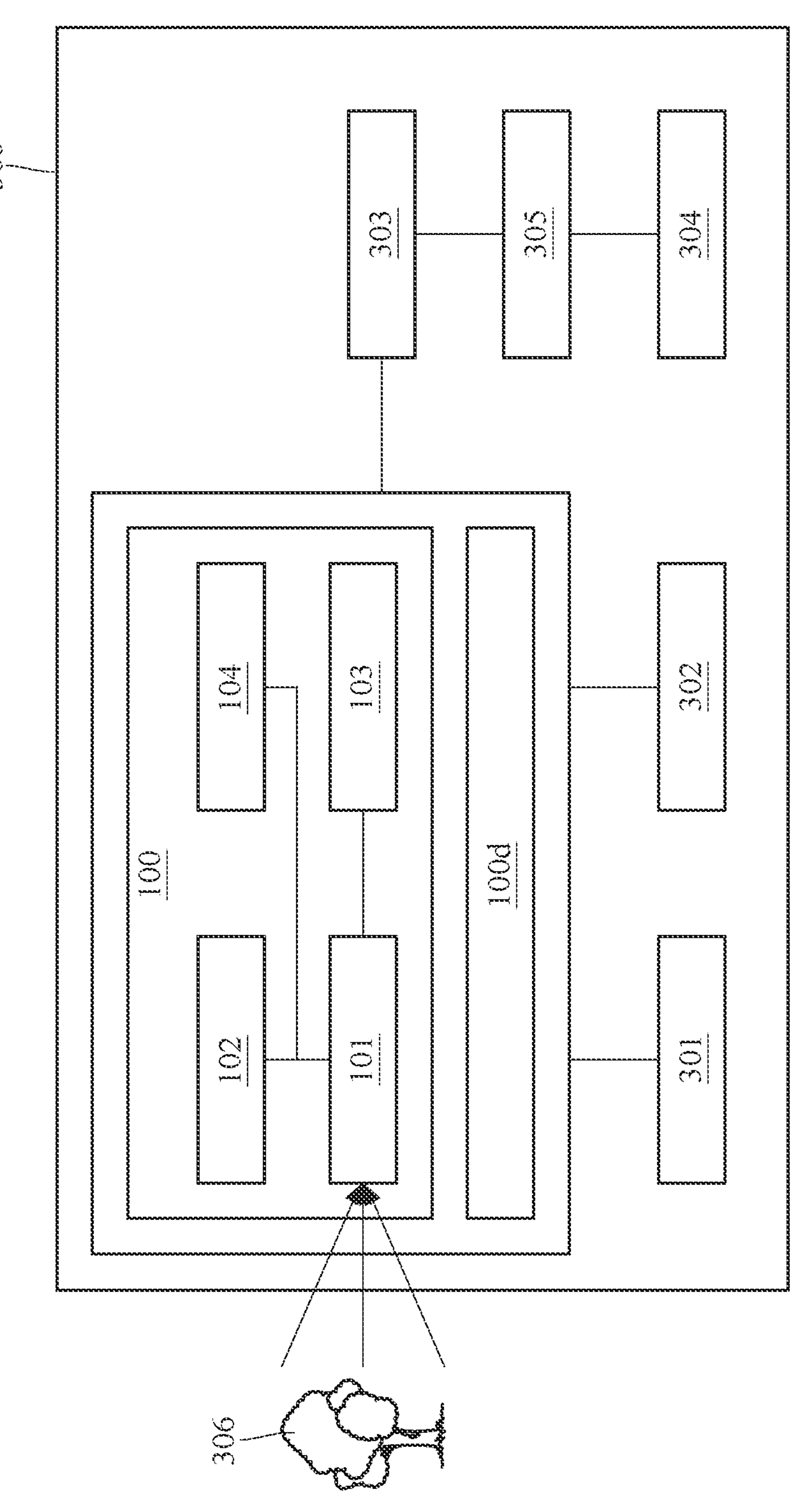
FIG. 37 is a block diagram of the electronic device in FIG. 35.

FIG. 35 is one perspective view of an electronic device according to the 13th embodiment of the present disclosure. FIG. 36 is another perspective view of the electronic device in FIG. 35. FIG. 37 is a block diagram of the electronic device in FIG. 35;

In this embodiment, an electronic device 300 is a smartphone including the image capturing unit 100 disclosed in the 11th embodiment, an image capturing unit 100*d*, an image capturing unit 100*e*, an image capturing unit 100*f*, an image capturing unit 100*g*, a flash module 301, a focus assist module 302, an image signal processor 303, a display module 304 and an image software processor 305. The image capturing unit 100 and the image capturing unit 100*d* are disposed on the same side of the electronic device 300. The focus assist module 302 can be a laser rangefinder or a ToF (time of flight) module, but the present disclosure is not limited thereto. The image capturing unit 100*e*, the image capturing unit 100*f*, the image capturing unit 100*g* and the display module 304 are disposed on the opposite side of the electronic device 300, and the display module 304 can be a user interface, such that the image capturing units 100*e*, 100*f*, 100*g* can be front-facing cameras of the electronic device 300 for taking selfies, but the present disclosure is not limited thereto. Furthermore, each of the image capturing units 100*d*, 100*e*, 100*f* and 100*g* can include the optical photographing lens assembly of the present disclosure and can have a configuration similar to that of the image capturing unit 100. In detail, each of the image capturing units 100*d*, 100*e*, 100*f* and 100*g* can include a lens unit, a driving device, an image sensor and an image stabilizer, and each of the lens unit can include an optical lens assembly such as the optical photographing lens assembly of the present disclosure, a barrel and a holder member for holding the optical photographing lens assembly.

The image capturing unit 100 is a telephoto image capturing unit, the image capturing unit 100*d* is an ultra-wide-angle image capturing unit, the image capturing unit 100*e* is a wide-angle image capturing unit, the image capturing unit 100*f* is an ultra-wide-angle image capturing unit, and the image capturing unit 100*g* is a ToF image capturing unit. In this embodiment, the image capturing units 100 and 100*d* have different fields of view, such that the electronic device 300 can have various magnification ratios so as to meet the requirement of optical zoom functionality. In addition, the image capturing unit 100*g* can determine depth information of the imaged object. In this embodiment, the electronic device 300 includes multiple image capturing units 100, 100*d*, 100*e*, 100*f* and 100*g*, but the present disclosure is not limited to the number and arrangement of image capturing units.

When a user captures images of an object 306, the light rays converge in the image capturing unit 100 or the image capturing unit 100*d* to generate images, and the flash module 301 is activated for light supplement. The focus assist module 302 detects the object distance of the imaged object 306 to achieve fast auto focusing. The image signal processor 303 is configured to optimize the captured image to improve image quality. The light beam emitted from the focus assist module 302 can be either conventional infrared or laser. In addition, the light rays may converge in the image capturing unit 100*e*, 100*f* or 100*g* to generate images. The display module 304 can include a touch screen, and the user is able to interact with the display module 304 and the image software processor 305 having multiple functions to capture images and complete image processing. Alternatively, the user may capture images via a physical button. The image processed by the image software processor 305 can be displayed on the display module 304.

14th Embodiment

Figure 38:
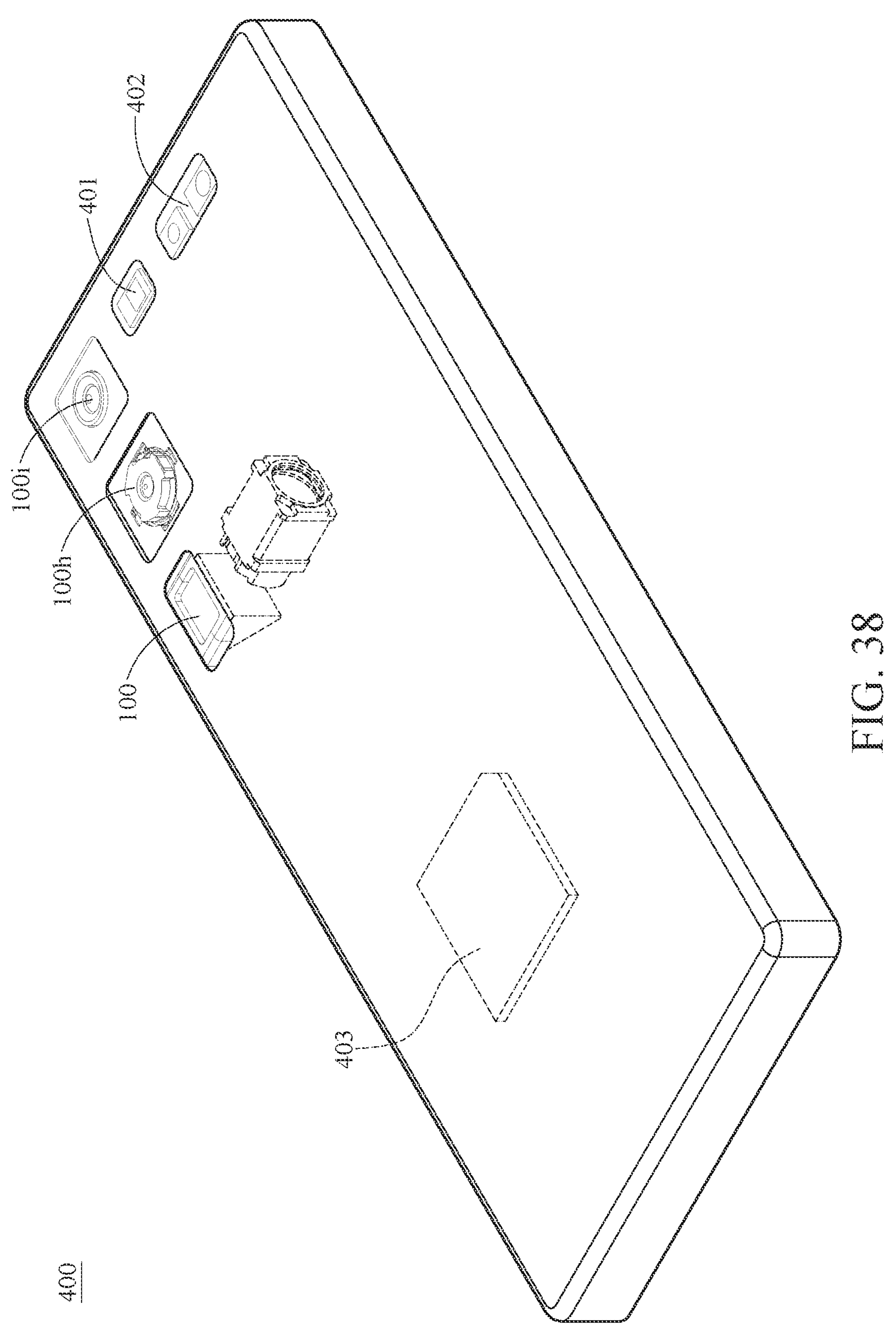
FIG. 38 is one perspective view of an electronic device according to the 14th embodiment of the present disclosure.

FIG. 38 is one perspective view of an electronic device according to the 14th embodiment of the present disclosure.

In this embodiment, an electronic device 400 is a smartphone including the image capturing unit 100 disclosed in the 11th embodiment, an image capturing unit 100*h*, an image capturing unit 100*i*, a flash module 401, a focus assist module, an image signal processor, a display module and an image software processor (not shown). The image capturing unit 100, the image capturing unit 100*h* and the image capturing unit 100*i* are disposed on the same side of the electronic device 400. The display module is disposed on the opposite side of the electronic device 400. Furthermore, each of the image capturing units 100*h* and 100*i* can include the photographing lens assembly of the present disclosure and can have a configuration similar to that of the image capturing unit 100, and the description is not repeated herein.

The image capturing unit 100 is a telephoto image capturing unit, the image capturing unit 100*h* is a wide-angle image capturing unit, and the image capturing unit 100*i* is an ultra-wide-angle image capturing unit. In this embodiment, the image capturing units 100, 100*h* and 100*i* have different fields of view, such that the electronic device 400 can have various magnification ratios so as to meet the requirement of optical zoom functionality. Moreover, the image capturing unit 100 can be a telephoto image capturing unit having an optical path folding element configuration such as a reflective element configuration, such that the total track length of the image capturing unit 100 is not limited by the thickness of the electronic device 400. Moreover, the optical path folding element configuration of the image capturing unit 100 can be similar to, for example, one of the structures shown in FIG. 42 to FIG. 50, which can be referred to foregoing descriptions corresponding to FIG. 42 to FIG. 50, and the details in this regard will not be provided again.

When a user captures images of an object, the light rays converge in the image capturing unit 100, the image capturing unit 100*h* or the image capturing unit 100*i* to generate images, and the flash module 401 is activated for light supplement. The post-processing is performed in a manner similar to the aforementioned embodiments to complete the photography, and the details in this regard will not be provided again.

15th Embodiment

Figure 39:
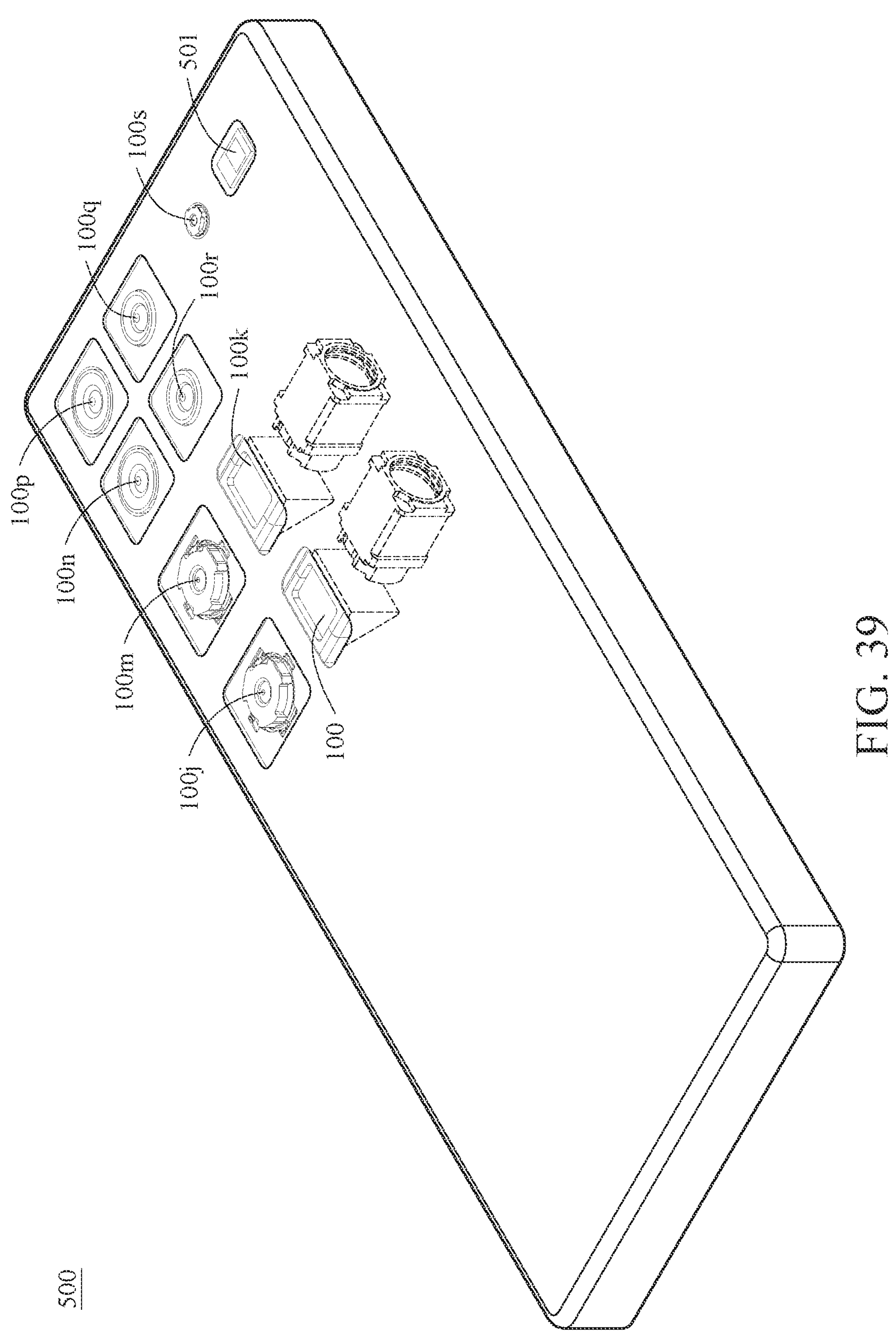
FIG. 39 is one perspective view of an electronic device according to the 15th embodiment of the present disclosure.

FIG. 39 is one perspective view of an electronic device according to the 15th embodiment of the present disclosure.

In this embodiment, an electronic device 500 is a smartphone including the image capturing unit 100 disclosed in the 11th embodiment, an image capturing unit 100*j*, an image capturing unit 100*k*, an image capturing unit 100*m*, an image capturing unit 100*n*, an image capturing unit 100*p*, an image capturing unit 100*q*, an image capturing unit 100*r*, an image capturing unit 100*s*, a flash module 501, a focus assist module, an image signal processor, a display module and an image software processor (not shown). The image capturing units 100, 100*j*, 100*k*, 100*m*, 100*n*, 100*p*, 100*q*, 100*r* and 100*s* are disposed on the same side of the electronic device 500, while the display module is disposed on the opposite side of the electronic device 500. Furthermore, each of the image capturing units 100*j*, 100*k*, 100*m*, 100*n*, 100*p*, 100*q*, 100*r* and 100*s* can include the photographing lens assembly of the present disclosure and can have a configuration similar to that of the image capturing unit 100, and the details in this regard will not be provided again.

The image capturing unit 100 is a telephoto image capturing unit, the image capturing unit 100*j* is a wide-angle image capturing unit, the image capturing unit 100*k* is a telephoto image capturing unit, the image capturing unit 100*m* is a wide-angle image capturing unit, the image capturing unit 100*n* is an ultra-wide-angle image capturing unit, the image capturing unit 100*p* is an ultra-wide-angle image capturing unit, the image capturing unit 100*q* is a telephoto image capturing unit, the image capturing unit 100*r* is a telephoto image capturing unit, and the image capturing unit 100*s* is a ToF image capturing unit. In this embodiment, the image capturing units 100, 100*j*, 100*k*, 100*m*, 100*n*, 100*p*, 100*q* and 100*r* have different fields of view, such that the electronic device 500 can have various magnification ratios so as to meet the requirement of optical zoom functionality. Moreover, each of the image capturing units 100 and 100*k* can be a telephoto image capturing unit having an optical path folding element configuration such as a reflective element configuration. Moreover, the optical path folding element configuration of each of the image capturing unit 100 and 100*k* can be similar to, for example, one of the structures shown in FIG. 42 to FIG. 50, which can be referred to foregoing descriptions corresponding to FIG. 42 to FIG. 50, and the details in this regard will not be provided again. In addition, the image capturing unit 100*s* can determine depth information of the imaged object. In this embodiment, the electronic device 500 includes multiple image capturing units 100, 100*j*, 100*k*, 100*m*, 100*n*, 100*p*, 100*q*, 100*r* and 100*s*, but the present disclosure is not limited to the number and arrangement of image capturing units. When a user captures images of an object, the light rays converge in the image capturing unit 100, 100*j*, 100*k*, 100*m*, 100*n*, 100*p*, 100*q*, 100*r* or 100*s* to generate images, and the flash module 501 is activated for light supplement. Further, the subsequent processes are performed in a manner similar to the abovementioned embodiments, and the details in this regard will not be provided again.

The smartphone in this embodiment is only exemplary for showing the image capturing unit of the present disclosure installed in an electronic device, and the present disclosure is not limited thereto. The image capturing unit can be optionally applied to optical systems with a movable focus. Furthermore, the optical photographing lens assembly of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1A-10D show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical photographing lens assembly comprising seven lens elements, the seven lens elements being, in order from an object side to an image side along an optical path, a first lens element, a second lens element, a third lens element, a fourth lens element, a fifth lens element, a sixth lens element and a seventh lens element, and each of the seven lens elements having an object-side surface facing toward the object side and an image-side surface facing toward the image side;

wherein the object-side surface of the first lens element is convex in a paraxial region thereof, the second lens element has positive refractive power, the third lens element has negative refractive power, the image-side surface of the third lens element is concave in a paraxial region thereof, the image-side surface of the seventh lens element is concave in a paraxial region thereof, and at least one of the object-side surface and the image-side surface of at least one lens element of the seven lens elements has at least one inflection point;

wherein an axial distance between an imaged object and the object-side surface of a lens element closest to the object side is defined as an object distance, an axial distance between the first lens element and the second lens element in the optical photographing lens assembly with an infinite object distance is T12L, an axial distance between the object-side surface of the second lens element and the image-side surface of the fifth lens element in the optical photographing lens assembly with the infinite object distance is Dr3r10L, an axial distance between the object-side surface of the second lens element and the image-side surface of the seventh lens element in the optical photographing lens assembly with the infinite object distance is Dr3r14L, an axial distance between the object-side surface of the sixth lens element and the image-side surface of the seventh lens element in the optical photographing lens assembly with the infinite object distance is Dr11r14L, a focal length of the fourth lens element is f4, a focal length of the fifth lens element is f5, and the following conditions are satisfied:

$$0.50 < T12L/Dr3r14L < 2.50;$$

$$1.00 < Dr3r10L/Dr11r14L < 3.50; \text{ and}$$

$$0 < |f4/f5| < 1.00.$$

2. The optical photographing lens assembly of claim 1, wherein the first lens element has positive refractive power.

3. The optical photographing lens assembly of claim 1, wherein the axial distance between the first lens element and the second lens element in the optical photographing lens assembly with the infinite object distance is T12L, the axial distance between the object-side surface of the second lens element and the image-side surface of the seventh lens element in the optical photographing lens assembly with the infinite object distance is Dr3r14L, and the following condition is satisfied:

$$0.75 < T12L/Dr3r14L < 1.80.$$

4. The optical photographing lens assembly of claim 1, wherein the object-side surface of the fifth lens element is concave in a paraxial region thereof, and at least one of the object-side surface and the image-side surface of the seventh lens element has at least one inflection point.

5. The optical photographing lens assembly of claim 1, wherein the object-side surface of the sixth lens element is concave in a paraxial region thereof, and the object-side surface of the sixth lens element has at least one convex critical point in an off-axis region thereof.

6. The optical photographing lens assembly of claim 1, wherein half of a maximum field of view of the optical photographing lens assembly with the infinite object distance is HFOVL, and the following condition is satisfied:

$$5.0 \text{ degrees} < HFOVL < 25.0 \text{ degrees}.$$

7. The optical photographing lens assembly of claim 1, wherein a focal length of the second lens element is f2, the focal length of the fifth lens element is f5, and the following condition is satisfied:

$$0 < |f2/f5| < 0.80.$$

8. The optical photographing lens assembly of claim 1, wherein a central thickness of the sixth lens element is CT6, an axial distance between the sixth lens element and the seventh lens element in the optical photographing lens assembly with the infinite object distance is T67L, and the following condition is satisfied:

$$0.05 < CT6/T67L < 2.00.$$

9. The optical photographing lens assembly of claim 1, wherein the focal length of the fourth lens element is f4, a curvature radius of the object-side surface of the fourth lens element is R7, a curvature radius of the image-side surface of the fourth lens element is R8, and the following condition is satisfied:

$$0.10 < |f4/R7| + |f4/R8| < 6.00.$$

10. The optical photographing lens assembly of claim 1, further comprising at least one reflective element, wherein the at least one reflective element is disposed between the imaged object and an image surface.

11. The optical photographing lens assembly of claim 10, wherein the at least one reflective element comprises at least two reflective elements, at least one of the at least two reflective elements is a reflective mirror, and the reflective mirror is disposed between the first lens element and the second lens element.

12. An image capturing unit comprising:

the optical photographing lens assembly of claim 1;

an image stabilizer, disposed corresponding to the optical photographing lens assembly; and an image sensor, disposed on an image surface of the optical photographing lens assembly.

13. An electronic device comprising:

the image capturing unit of claim 12.

14. An optical photographing lens assembly comprising seven lens elements, the seven lens elements being, in order from an object side to an image side along an optical path, a first lens element, a second lens element, a third lens element, a fourth lens element, a fifth lens element, a sixth lens element and a seventh lens element, and each of the seven lens elements having an object-side surface facing toward the object side and an image-side surface facing toward the image side;

wherein the second lens element has positive refractive power, the object-side surface of the second lens element is convex in a paraxial region thereof, the third lens element has negative refractive power, the image-side surface of the third lens element is concave in a paraxial region thereof, the fourth lens element has positive refractive power, the image-side surface of the seventh lens element is concave in a paraxial region thereof, and at least one of the object-side surface and the image-side surface of at least one lens element of the seven lens elements has at least one inflection point;

wherein an axial distance between an imaged object and the object-side surface of a lens element closest to the object side is defined as an object distance, an axial distance between the first lens element and the second lens element in the optical photographing lens assembly with an infinite object distance is T12L, an axial distance between the object-side surface of the second lens element and the image-side surface of the seventh lens element in the optical photographing lens assembly with the infinite object distance is Dr3r14L, an axial distance between the object-side surface of the lens element closest to the object side and an image surface in the optical photographing lens assembly with the infinite object distance is TLL, an axial distance between the image-side surface of a lens element closest to the image side and the image surface in the optical photographing lens assembly with the infinite object distance is BLL, an Abbe number of the fifth lens element is V5, a refractive index of the fifth lens element is N5, and the following conditions are satisfied:

$$0.50 < T12L/Dr3r14L < 2.50;$$

$$1.00 < TLL/BLL < 8.00; \text{ and}$$

$$5.00 < V5/N5 < 32.00.$$

15. The optical photographing lens assembly of claim 14, wherein the Abbe number of the fifth lens element is V5, the refractive index of the fifth lens element is N5, and the following condition is satisfied:

$$7.00 < V5/N5 < 30.00.$$

16. The optical photographing lens assembly of claim 14, wherein the first lens element has positive refractive power, a total number of lens elements having an Abbe number smaller than 30 in the optical photographing lens assembly is V30, and the following condition is satisfied:

$$3 \leq V30.$$

17. The optical photographing lens assembly of claim 14, wherein the image-side surface of the first lens element has at least one inflection point, a curvature radius of the object-side surface of the first lens element is R1, a curvature radius of the image-side surface of the first lens element is R2, and the following condition is satisfied:

$$-1.50 < (R1 - R2)/(R1 + R2) < 0.2.$$

18. The optical photographing lens assembly of claim 14, wherein a central thickness of the fourth lens element is CT4, a central thickness of the fifth lens element is CT5, and the following condition is satisfied:

$$0.10 < CT5/CT4 < 0.80.$$

19. The optical photographing lens assembly of claim 14, wherein a focal length of the optical photographing lens assembly with the infinite object distance is fL, a focal length of the first lens element is f1, a focal length of the fourth lens element is f4, a focal length of the fifth lens element is f5, and the following condition is satisfied:

$$0.05 < (|fL/f1| + |fL/f5|)/|fL/f4| < 1.20.$$

20. An optical photographing lens assembly comprising seven lens elements, the seven lens elements being, in order from an object side to an image side along an optical path, a first lens element, a second lens element, a third lens element, a fourth lens element, a fifth lens element, a sixth lens element and a seventh lens element, and each of the seven lens elements having an object-side surface facing toward the object side and an image-side surface facing toward the image side;

wherein the second lens element has positive refractive power, the object-side of the second lens element is convex in a paraxial region thereof, the third lens element has negative refractive power, the image-side surface of the third lens element is concave in a paraxial region thereof, the fourth lens element has positive refractive power, the image-side surface of the fourth lens element is convex in a paraxial region thereof, the seventh lens element has negative refractive power, and at least one of the object-side surface and the image-side surface of the seventh lens element has at least one inflection point;

wherein an axial distance between an imaged object and the object-side surface of a lens element closest to the object side is defined as an object distance, an axial distance between the first lens element and the second lens element in the optical photographing lens assembly with an infinite object distance is T12L, an axial distance between the object-side surface of the second lens element and the image-side surface of the seventh lens element in the optical photographing lens assembly with the infinite object distance is Dr3r14L, an axial distance between the object-side surface of the lens element closest to the object side and an image surface in the optical photographing lens assembly with the infinite object distance is TLL, an axial distance between the image-side surface of a lens element closest to the image side and the image surface in the optical photographing lens assembly with the infinite object distance is BLL, and the following conditions are satisfied:

$$0.50 < T12L/Dr3r14L < 2.50; \text{ and}$$

$$1.00 < TLL/BLL < 10.00.$$

21. The optical photographing lens assembly of claim 20, wherein the axial distance between the object-side surface of the lens element closest to the object side and the image surface in the optical photographing lens assembly with the infinite object distance is TLL, a focal length of the optical photographing lens assembly with the infinite object distance is fL, and the following condition is satisfied:

$$0.50 < TLL/fL < 3.50.$$

22. The optical photographing lens assembly of claim 20, wherein the first lens element has positive refractive power, and the image-side surface of the seventh lens element has at least one convex critical point in an off-axis region thereof.

23. The optical photographing lens assembly of claim 20, wherein a curvature radius of the image-side surface of the first lens element is R2, a curvature radius of the image-side surface of the third lens element is R6, and the following condition is satisfied:

$$0 < |R6/R2| < 1.00.$$

24. The optical photographing lens assembly of claim 20, wherein a displacement in parallel with an optical axis from an axial vertex of the image-side surface of the fourth lens element to a maximum effective radius position of the image-side surface of the fourth lens element is Sag4R2, a central thickness of the fourth lens element is CT4, and the following condition is satisfied:

$$-1.00 < Sag4R2/CT4 < -0.02.$$

25. The optical photographing lens assembly of claim 20, wherein an axial distance between the sixth lens element and the seventh lens element in the optical photographing lens assembly with the infinite object distance is T67L, a displacement in parallel with an optical axis from an axial vertex of the image-side surface of the sixth lens element to a maximum effective radius position of the image-side surface of the sixth lens element is Sag6R2, a displacement in parallel with the optical axis from an axial vertex of the object-side surface of the seventh lens element to a maximum effective radius position of the object-side surface of the seventh lens element is Sag7R1, and the following condition is satisfied:

$$0.03 < (T67L - Sag6R2 + Sag7R1)/T67L < 1.00.$$

26. The optical photographing lens assembly of claim 20, wherein the axial distance between the first lens element and the second lens element in the optical photographing lens assembly with the infinite object distance is T12L, an axial distance between the object-side surface of the second lens element and the image-side surface of the fifth lens element in the optical photographing lens assembly with the infinite object distance is Dr3r10L, the axial distance between the object-side surface of the second lens element and the image-side surface of the seventh lens element in the optical photographing lens assembly with the infinite object distance is Dr3r14L, an axial distance between the object-side surface of the sixth lens element and the image-side surface of the seventh lens element in the optical photographing lens assembly with the infinite object distance is Dr11r14L, the axial distance between the object-side surface of the lens element closest to the object side and the image surface in the optical photographing lens assembly with the infinite object distance is TLL, the axial distance between the image-side surface of the lens element closest to the image side and the image surface in the optical photographing lens assembly with the infinite object distance is BLL, a focal length of the fourth lens element is f4, a focal length of the fifth lens element is f5, an Abbe number of the fifth lens element is V5, a refractive index of the fifth lens element is N5, and the following conditions are satisfied:

$$0.83 \leq T12L/Dr3r14L \leq 1.44;$$

$$1.92 \leq Dr3r10L/Dr11r14L \leq 2.95;$$

$$0.02 \leq |f4/f5| \leq 1.64;$$

-continued $$3.40 \leq TLL/BLL \leq 6.82; \text{ and}$$

$$9.61 \leq V5/N5 \leq 26.19.$$

* * * * *